US012466496B2

(12) United States Patent
Relph

(10) Patent No.: US 12,466,496 B2
(45) Date of Patent: Nov. 11, 2025

(54) WORK MACHINE WITH AUTOMATIC CAB TILTING

(71) Applicant: Great Plains Manufacturing, Inc., Salina, KS (US)

(72) Inventor: John M. Relph, Abilene, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 0 days.

(21) Appl. No.: 18/533,671

(22) Filed: Dec. 8, 2023

(65) Prior Publication Data

US 2024/0191468 A1   Jun. 13, 2024

Related U.S. Application Data

(60) Provisional application No. 63/387,032, filed on Dec. 12, 2022.

(51) Int. Cl.
*B62D 33/067* (2006.01)
*B60H 1/00* (2006.01)
(Continued)

(52) U.S. Cl.
CPC ....... *B62D 33/067* (2013.01); *B60H 1/00357* (2013.01); *B60H 1/00535* (2013.01); *B60H 1/00564* (2013.01); *B60H 1/26* (2013.01); *B60J 5/02* (2013.01); *B60K 25/02* (2013.01); *B60K 25/06* (2013.01); *B60K 35/10* (2024.01); *B60K 35/22* (2024.01); *B60K 35/28* (2024.01); *B60K 35/53* (2024.01); *B60K 35/55* (2024.01); *B60K 35/60* (2024.01); *B60K 35/654* (2024.01); *B60K 35/81* (2024.01); *B60R 21/02* (2013.01); *B62D 33/0617* (2013.01); *B62D 55/06* (2013.01); *B62D 55/1083* (2013.01); *B62D 55/1086* (2013.01); *B62D 55/15* (2013.01); *B62D 65/02* (2013.01); *E02F 3/3654* (2013.01); *E02F 3/3663* (2013.01); *E02F 3/7609* (2013.01);
(Continued)

(58) Field of Classification Search
CPC .. B62D 33/067; B62D 33/0617; B62D 65/02; E02F 3/3414
See application file for complete search history.

(56) References Cited

U.S. PATENT DOCUMENTS 3,975,987 A * 8/1976 Panis ............... F15B 13/01
60/476
4,081,053 A * 3/1978 Sherman ............ B62D 33/07
180/89.15
(Continued)

FOREIGN PATENT DOCUMENTS

JP   2001-151166 A   6/2001
JP   2002-206253 A   7/2002
(Continued)

OTHER PUBLICATIONS

PCT Search Report and Written Opinion dated Apr. 9, 2024 for related PCT Patent Application No. PCT/US2023/083402, 11 pages.

*Primary Examiner* — Paul N Dickson
(74) *Attorney, Agent, or Firm* — Hovey Williams LLP; Kameron D. Kelly

(57) ABSTRACT

A compact work machine, such as a compact track loader and/or a compact utility loader, which can carry and operate a wide range of attachments while maintaining a reduced operating footprint.

20 Claims, 76 Drawing Sheets

(51) Int. Cl.

| | | |
|---|---|---|
| *B60H 1/26* | (2006.01) | |
| *B60J 5/02* | (2006.01) | |
| *B60K 25/02* | (2006.01) | |
| *B60K 25/06* | (2006.01) | |
| *B60K 35/10* | (2024.01) | |
| *B60K 35/22* | (2024.01) | |
| *B60K 35/28* | (2024.01) | |
| *B60K 35/53* | (2024.01) | |
| *B60K 35/55* | (2024.01) | |
| *B60K 35/60* | (2024.01) | |
| *B60K 35/65* | (2024.01) | |
| *B60K 35/81* | (2024.01) | |
| *B60R 21/02* | (2006.01) | |
| *B62D 33/06* | (2006.01) | |
| *B62D 55/06* | (2006.01) | |
| *B62D 55/108* | (2006.01) | |
| *B62D 55/15* | (2006.01) | |
| *B62D 65/02* | (2006.01) | |
| *E02F 3/36* | (2006.01) | |
| *E02F 3/76* | (2006.01) | |
| *E02F 3/96* | (2006.01) | |
| *E02F 9/02* | (2006.01) | |
| *E02F 9/08* | (2006.01) | |
| *E02F 9/16* | (2006.01) | |
| *E02F 9/20* | (2006.01) | |
| *E02F 9/22* | (2006.01) | |
| *E02F 9/26* | (2006.01) | |
| *E05D 15/22* | (2006.01) | |
| *E05F 15/53* | (2015.01) | |
| *F01P 1/06* | (2006.01) | |
| *B60R 21/00* | (2006.01) | |
| *E02F 3/34* | (2006.01) | |

(52) U.S. Cl.
CPC ............... *E02F 3/96* (2013.01); *E02F 9/02* (2013.01); *E02F 9/0808* (2013.01); *E02F 9/0833* (2013.01); *E02F 9/0841* (2013.01); *E02F 9/0858* (2013.01); *E02F 9/0866* (2013.01); *E02F 9/0883* (2013.01); *E02F 9/0891* (2013.01); *E02F 9/16* (2013.01); *E02F 9/163* (2013.01); *E02F 9/166* (2013.01); *E02F 9/2004* (2013.01); *E02F 9/2012* (2013.01); *E02F 9/2253* (2013.01); *E02F 9/2267* (2013.01); *E02F 9/2271* (2013.01); *E02F 9/2275* (2013.01); *E02F 9/2296* (2013.01); *E02F 9/26* (2013.01); *E05D 15/22* (2013.01); *E05F 15/53* (2015.01); *F01P 1/06* (2013.01); *B60K 2025/026* (2013.01); *B60K 2025/065* (2013.01); *B60K 2360/111* (2024.01); *B60K 2360/122* (2024.01); *B60K 2360/1438* (2024.01); *B60K 2360/162* (2024.01); *B60K 2360/167* (2024.01); *B60K 2360/48* (2024.01); *B60K 2360/77* (2024.01); *B60K 2360/816* (2024.01); *B60R 2021/0081* (2013.01); *B60R 2021/022* (2013.01); *E02F 3/3414* (2013.01); *E02F 9/2033* (2013.01); *E02F 9/2235* (2013.01); *E02F 9/2292* (2013.01); *E02F 9/264* (2013.01); *E05Y 2900/518* (2013.01); *E05Y 2900/531* (2013.01)

(56) References Cited

U.S. PATENT DOCUMENTS

| | | | | |
|---|---|---|---|---|
| 4,493,386 | A * | 1/1985 | Sonneborn | B62D 33/07 180/89.15 |
| 4,551,973 | A * | 11/1985 | Broadhead | F15B 15/18 91/420 |
| 4,556,118 | A * | 12/1985 | London | B62D 33/07 180/89.15 |
| 5,042,602 | A * | 8/1991 | Nakatani | B60K 11/04 165/41 |
| 5,941,330 | A | 8/1999 | Miller et al. | |
| 7,607,721 | B2 | 10/2009 | Grimes et al. | |
| 9,200,429 | B2 | 12/2015 | Thompson et al. | |
| 10,954,968 | B2 * | 3/2021 | Kumeuchi | E02F 9/2004 |
| 12,221,328 | B2 * | 2/2025 | Wolf | B66C 1/585 |
| 2005/0264038 | A1 | 12/2005 | Albright | |
| 2008/0150325 | A1 * | 6/2008 | Seidel | B62D 33/0617 296/190.11 |
| 2008/0314038 | A1 * | 12/2008 | Tozawa | E02F 9/2075 290/1 R |
| 2009/0038186 | A1 | 2/2009 | Osswald et al. | |
| 2010/0268407 | A1 * | 10/2010 | Yanagisawa | B60K 6/46 180/65.265 |
| 2022/0178104 | A1 | 6/2022 | Kumbhar et al. | |

FOREIGN PATENT DOCUMENTS

| | | | |
|---|---|---|---|
| JP | 2010-163035 A | 7/2010 | |
| KR | 1020120048066 A | 5/2012 | |
| WO | WO-2016099342 A1 * | 6/2016 | ........... B60G 99/002 |

* cited by examiner

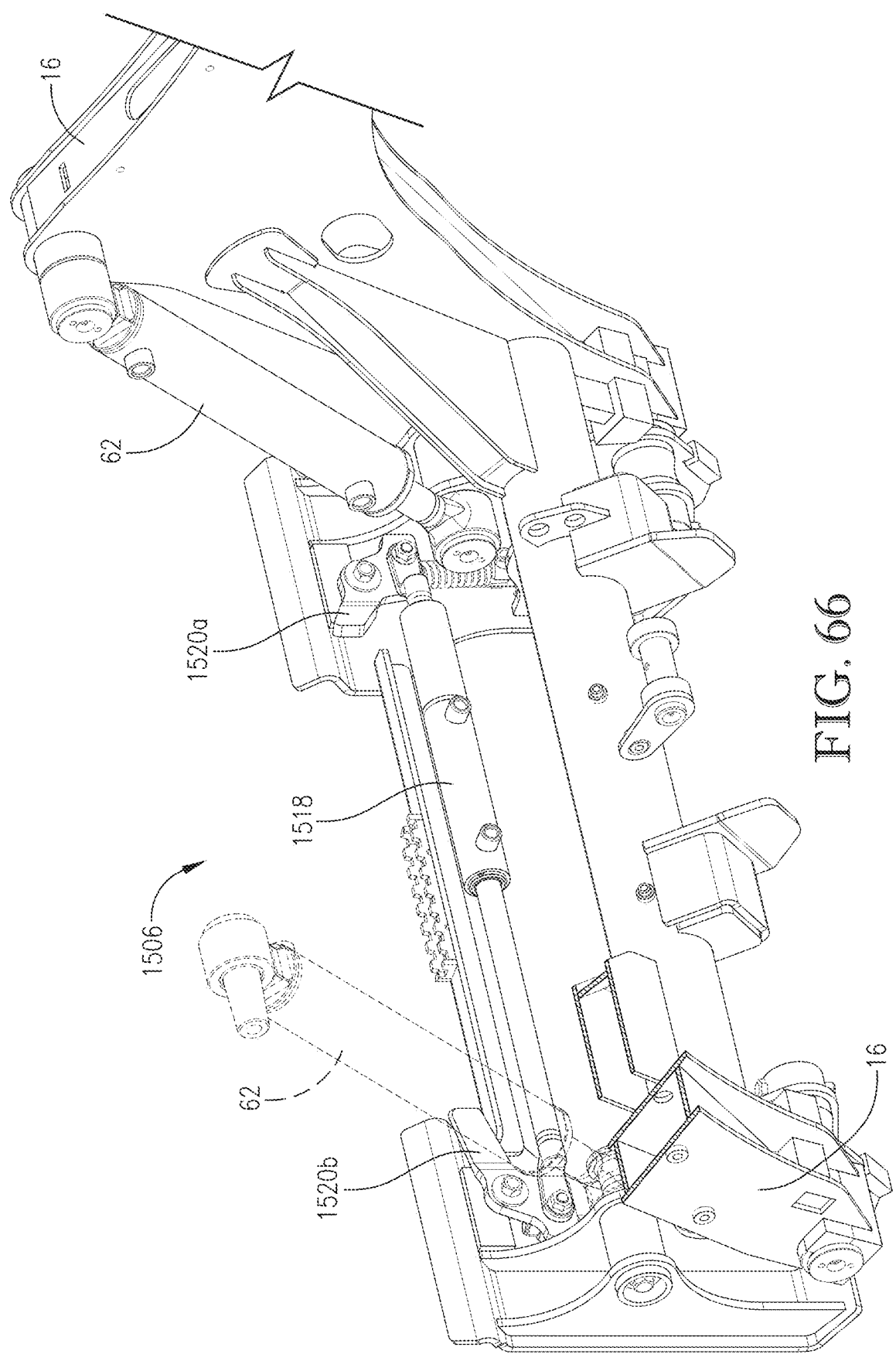

WORK MACHINE WITH AUTOMATIC CAB TILTING

CROSS-REFERENCE TO RELATED APPLICATION

The present non-provisional patent application claims priority benefit to U.S. Provisional Patent Application Ser. No. 63/387,032, filed Dec. 12, 2022, and entitled "WORK MACHINE." The entirety of the above-identified provisional patent application is hereby incorporated by reference into the present non-provisional patent application.

FIELD OF THE INVENTION

Embodiments of the present invention are generally directed to work machines. More particularly, embodiments of the present invention are directed to compact work machines, such as compact track loaders and/or compact utility loaders, which can carry and operate a wide range of attachments while maintaining a reduced operating footprint.

BACKGROUND OF THE INVENTION

Many types of work machines are on the market today. An exemplary type of work machine is a loader, which is a machine commonly used as a hydraulic tool carrier configured to carry and operate a variety of hydraulically-driven attachments (e.g., implements or tools). Common attachments include augers, trenchers, grapples, etc. Other non-hydraulic attachments may also be carried and operated by loaders, such as buckets, rakes, etc.

Unfortunately, most currently-available loaders are manufactured in large sizes (e.g., having large widths and lengths), which can make the loaders difficult to maneuver and operate. Although there are many jobs that can be efficiently performed by loaders, such as the excavation of building foundations and basements, many residential and commercial real-estate properties have narrow entryways/exits onto the properties. As such, most currently-available loaders are too large to pass through the entryways/exits to access the properties. As a result, there is a need for a work machine, and particularly for a compact loader, having a small, reduced footprint (e.g., length and/or width), so as to provide for improved maneuverability and accessibility of confined spaces. Furthermore, it would be beneficial to provide such a reduced-footprint work machine that includes improved functionality and operating characteristics.

SUMMARY OF THE INVENTION

One aspect of the present invention concerns a loader that broadly includes a loader frame and a tracked drive assembly. The loader frame defines a longitudinal loader axis. The tracked drive assembly supports the loader frame on ground and is configured to propel the loader over the ground. The tracked drive assembly includes an endless track, with upper and lower runs extending longitudinally between forward and aft track margins. The tracked drive assembly further includes forward and aft idler wheels, one or more roller wheels spaced longitudinally between the idler wheels, and a torsion axle, with the track being entrained on the idler wheels and the one or more roller wheels. The idler wheels are supported relative to the loader frame and support the track adjacent the forward and aft track margins. The torsion axle shiftably supports a single one of the one or more roller wheels relative to the idler wheels and urges the single roller wheel into rolling engagement with the lower run, with the torsion axle permitting up-and-down movement of at least part of the lower run relative to the idler wheels.

Another aspect of the present invention concerns a loader that broadly includes a loader frame and a tracked drive assembly. The loader frame defines a longitudinal loader axis. The tracked drive assembly supports the loader frame on ground and is configured to propel the loader over the ground. The tracked drive assembly includes an endless track, with upper and lower runs extending longitudinally between forward and aft track margins. The tracked drive assembly further includes roller wheels spaced longitudinally along the loader axis, and torsion axles, with the track being entrained on the roller wheels. Each of the torsion axles shiftably supports a respective one of the roller wheels relative to the loader frame and urges the respective roller wheel into rolling engagement with the lower run, with the torsion axles cooperatively permitting up-and-down movement of at least part of the lower run relative to the loader frame.

Another aspect of the present invention concerns a loader that broadly includes a loader frame and a tracked drive assembly. The loader frame defines a longitudinal loader axis. The tracked drive assembly supports the loader frame on ground and is configured to propel the loader over the ground. The tracked drive assembly includes an endless track, with upper and lower runs extending longitudinally between forward and aft track margins. The tracked drive assembly further includes a roller wheel entrained by the track and a support arm that shiftably supports the roller wheel. The roller wheel is in rolling engagement with the lower run and is shiftably supported relative to the loader frame to permit up-and-down movement of at least part of the lower run relative to the loader frame. The roller wheel includes a roller axle mounted on the support arm, and a pair of rollers fixed to the roller axle on opposite sides of the support arm so that the roller axle and rollers are rotatable with one another.

Another aspect of the present invention concerns a loader that broadly includes a loader frame, an HVAC unit, and an operator cab. The loader frame presents a frame compartment and defines a longitudinal loader axis. The HVAC unit is operably supported by the loader frame and is located at least partly within the frame compartment. The operator cab is shiftably connected relative to the loader frame and is shiftable into and out of an operating position, in which the operator cab is configured to receive an operator during loader use. The operator cab includes a supply duct operable to receive supply air discharged from the HVAC unit and direct the supply air into the operator cab. The HVAC unit and the supply duct are in fluid communication with one another via an interface when the operator cab is in the operating position to provide fluid communication between the HVAC unit and the operator cab.

Another aspect of the present invention concerns a loader that broadly includes a loader frame, an HVAC unit, a supply plenum, a return plenum, and an operator cab. The HVAC unit is operably supported relative to the loader frame. The supply plenum is operable to discharge supply air from the HVAC unit. The return plenum is operable to receive return air from the operator cab. The operator cab is supported relative to the loader frame and presents a cab interior configured to receive an operator during loader use. The operator cab includes a manifold that presents supply air and return air passages that fluidly communicate with the supply plenum and return plenum, respectively. The supply air and return air passages fluidly communicate with the cab interior. The supply plenum and the supply air passage are operably engaged relative to one another along an interface when the operator cab is in the operating position to provide fluid communication between the HVAC unit and the operator cab.

Another aspect of the present invention concerns a loader that broadly includes a loader frame and a tracked drive assembly. Loader frame presents forward and aft frame ends and a frame compartment. Loader frame defines a longitudinal loader axis that extends between the forward and aft frame ends, with the loader configured to be advanced in a forward direction associated with the longitudinal loader axis. Tracked drive assembly includes a pair of transversely-spaced endless tracks that support the loader frame on ground, with the tracked drive assembly configured to propel the loader in the forward direction. The loader frame includes a rear section that extends rearwardly of the tracked drive assembly to define a lower pocket of the frame compartment. The rear section extends transversely relative to the longitudinal loader axis to at least partly overlap with the endless track along a transverse direction and along a vertical direction.

Another aspect of the present invention concerns a work machine comprising a frame, an operator cab, one or more control elements, and one or more control lines. The frame presents an interior compartment. The operator cab presents an interior space and is hingedly connected to the frame so that the cab can be selectively positioned in a lowered position and a raised position. The control elements are located in the interior space and are configured to be manipulated by a user to control functions of the work machine. The control lines extend from the cab to the frame and only include electrical conductors. This obviates the need for any linkage, HVAC lines, or hydraulic lines extending from the cab, which enables the cab to be readily tilted and/or removed for service.

Another aspect of the present invention concerns a work machine comprising a frame, a hydraulic system, an operator cab, and a control system. The frame presents an interior compartment. The hydraulic system is at least partially positioned in the interior compartment. The operator cab presents an interior space and is hingedly connected to the frame so that the cab can be selectively positioned in a lowered position and a raised position. The control system is at least partially located in the interior space of the operator cab and includes a controller, one or more control elements, and control lines. The controller is configured to control operations of the hydraulic system. The control elements are located in the interior space of the cab and are in electrical communication with the controller. The control lines extend from the cab to the frame and only include electrical conductors.

Another aspect of the present invention concerns a work machine comprising a frame, a drive assembly, an engine or motor, an operator cab, one or more control elements, and control lines. The frame presents an interior compartment and includes an upwardly extending rearward portion. The drive assembly supports the frame and is configured to propel the frame. The engine or motor is at least partially mounted in the interior compartment and is configured to power the drive assembly. The operator cab presents an interior space and is hingedly connected to the rearward portion of the frame so that the cab can be selectively positioned in a lowered position and a raised position.

Another aspect of the present invention concerns a loader configured for travel primarily in a forward direction. The loader comprises a cab defines an operator area therein. The cab includes a door shiftable from a closed position to an open position. The open position facilitates operator access to the operator area. The door is disposed at a forward portion of the cab when in the closed position and is at least substantially received within and/or disposed above the operator area when in the open position. The cab further includes a door casing that engages the door when the door is in the closed position. The door includes a door panel and a guide element fixed relative to the door panel to move therewith. The door casing includes a guide structure that engages the guide element during shifting of the door from the closed position to the open position, such that the guide structure directs the guide element along a generally upward travel path. The travel path includes a primary path segment that extends upwardly and forwardly such that the guide element and an adjacent portion of the door panel primarily travel upward and forward during shifting of the door from the closed position to the open position.

Another aspect of the present invention concerns a loader configured for travel primarily in a forward direction. The loader comprises a cab that defines an operator area therein. The cab includes a door shiftable from a closed position to an open position. The open position facilitates operator access to the operator area. The door is disposed at a forward portion of the cab when in the closed position and is at least substantially received within and/or disposed above the operator area when in the open position. The door includes an at least substantially transparent door panel. The door panel presents top and bottom margins. The door panel tilts forward when the door is in the closed position, such that the top margin is disposed forward of the bottom margin.

Another aspect of the present invention concerns a loader configured for travel primarily in a forward direction. The loader comprises a cab that defines an operator area therein. The cab includes a door shiftable from a closed position to an open position. The open position facilitates operator access to the operator area. The door is disposed at a forward portion of the cab when in the closed position. The door includes an at least substantially transparent door panel extending along perpendicular lateral and longitudinal door panel axes. The lateral door panel axis extends transversely and perpendicular to the forward direction when the door is in the closed position. The door panel presents top and bottom margins. The door panel tilts forward when the door is in the closed position, such that the top margin is disposed forward of the bottom margin.

Another aspect of the present invention concerns a lap bar for mounting proximate to a seat of a work machine. The lap bar comprises a first portion, a second portion, a display, and one or more control elements. The first portion is operable to be mounted along a first axis that is oblique to a horizontal plane. The second portion is pivotable about the first axis. The display is mounted on the second portion. The display is configured to display operational data of the work machine. The one or more control elements are mounted on said second portion and are configured to receive control inputs.

Another aspect of the present invention concerns a seat system for a work machine. The seat comprises a seat and a lap bar. The lap bar is for helping to retain a user in the seat and includes a first portion, a second portion, and a display. The first portion is mounted to the seat along a first axis that is oblique to a horizontal plane. The second portion is connected to the first portion and is pivotable about the first axis. The display is mounted on the second portion and is configured to display operational data of the work machine.

Another aspect of the present invention concerns a computer-implemented method of interfacing with a user of a work machine. The computer-implemented method comprises determining that a pivotable portion of a lap bar is in an operational position via a sensor configured to detect a position of the pivotable portion. The pivotable portion pivots about a stationary portion mounted to a seat of the work machine. The stationary portion extends obliquely relative to a horizontal plane. The computer-implemented method further includes displaying operational data of the work machine via a touch screen display mounted on the pivotable portion; and receiving control input via the touch screen display.

Another aspect of the present invention concerns a work machine comprising a frame, an operator cab, and an electrohydraulic actuator. The frame presents an interior compartment and comprises a bottom portion and a rearward portion extending vertically from the bottom portion. The operator cab presents an interior space and includes a back side hingedly connected to the rearward portion of the frame so that the cab can be selectively positioned in a lowered position and a raised position. The electrohydraulic actuator is secured to the rearward portion of the frame and the back side of the cab and is configured to shift the cab between the lowered position and the raised position.

Another aspect of the present invention concerns a method of providing access to components of a work machine. The method comprises electrically connecting a switch positioned outside an interior space of a cab of the work machine to an energy storage device connector positioned within an interior compartment defined by a frame of the work machine. The cab is hingedly connected to the frame so that the cab shifts between a lowered position and a raised position. The method further comprises electrically connecting to the switch an electrohydraulic actuator that is secured to a rearward portion of the frame and to a back side of the cab so that the electrohydraulic actuator can shift the cab to the raised position.

Another aspect of the present invention concerns a work machine comprising a frame, an operator cab, an energy storage device connector, an engine, and an electrohydraulic actuator. The frame presents an interior compartment and comprises a bottom portion and a rearward portion extending vertically from the bottom portion. The operator cab presents an interior space and includes a back side hingedly connected to the rearward portion of the frame so that the cab can be selectively positioned in a lowered position and a raised position. The energy storage device connector and the engine are located in the interior compartment. The electrohydraulic actuator is secured to the rearward portion of the frame and the back side of the cab and is configured to shift the cab between the lowered position and the raised position. The electrohydraulic actuator is electrically connected to the energy storage device connector, such that the electrohydraulic actuator is operable without the engine operating.

Another aspect of the present invention concerns a seat system for a work machine. The seat comprises a seat, a lap bar, a display, and one or more control elements. The lap bar helps retain a user in the seat and is connected to the seat. The display is mounted on the lap bar and is configured to display operational data of the work machine. The control elements are mounted to the seat frame and are configured to be manipulated by a user to control functions of the work machine.

Another aspect of the present invention concerns a work machine comprising a frame, a drive assembly, an engine or motor, an operator cab, a seat, a lap bar, a display, and one or more control elements. The drive assembly supports the frame and is configured to propel the frame. The engine or motor is mounted on the frame and is configured to power the drive assembly. The operator cab is mounted to the frame. The seat is mounted in the operator cab. The lap bar helps retain a user in the seat and is connected to the seat. The display is mounted on the lap bar and is configured to display operational data of the engine or motor. The control elements are mounted to the seat. At least one of the control elements is configured to be manipulated by a user to generate control signals for the engine or motor.

Another aspect of the present invention concerns a method of reducing unintended feedback loops during operation of a work machine. The method comprises suspending a seat on a mount in a cab of the work machine; mounting a lap bar to the seat; mounting a display to the lap bar; and mounting one or more control elements configured to be manipulated by a user to control functions of the work machine to the seat so that the control elements are also suspended, thereby at least partially synchronizing movement of said seat and the one or more control elements and at least partially attenuating a transfer of energy from the cab to the seat to reduce the unintended feedback loops.

Another aspect of the present invention concerns a cooling system for an engine of work machine. The cooling system comprises a base frame configured to be mounted to the engine, a nozzle frame coupled with the base frame, and a fan positioned within a fan-receiving space located between the base frame and the nozzle frame. The cooling system presents a convergent nozzle surface surrounding the fan-receiving space.

Another aspect of the present invention concerns a work machine comprising an engine configured to power components of the work machine, and a cooling system configured to cool the engine. The cooling system comprises a base frame configured to be mounted to the engine, a nozzle frame coupled with said base frame, and a fan positioned within a fan-receiving space located between the base frame and the nozzle frame. The cooling system presents a convergent nozzle surface surrounding the fan-receiving space.

Another aspect of the present invention concerns a method of cooling an engine of a work machine. The method comprises an initial step of providing a cooling system that includes a base frame mounted to the engine, a nozzle frame coupled with the base frame, and a fan positioned within a fan-receiving space located between the base frame and the nozzle frame. An additional step includes forcing air, via the fan, across the engine and through the base frame and the nozzle frame. During the forcing step (b), the air flows through a convergent nozzle surface surrounding the fan-receiving space. A further step includes forcing air, via the fan, from the base frame and the nozzle frame into a radiator of the work machine.

Another aspect of the present invention concerns a work machine configured to operate an attachment. The work machine comprises a drive assembly configured to propel the work machine over a ground surface, a pair of drive motors configured to power the drive assembly, and an engine. The work machine additionally comprises an auxiliary pump configured to provide hydraulic power to the attachment. The auxiliary pump receives rotary power from the engine and auxiliary pump is positioned between the pair of drive motors. The work machine further comprises at least one hydrostatic transmission configured to provide hydraulic power to the pair of drive motors. Furthermore, the auxiliary pump is positioned between the engine and the at least one hydrostatic transmission.

Another aspect of the present invention concerns a work machine configured to operate an attachment. The work machine comprises a drive assembly configured to propel the work machine over a ground surface, a pair of drive motors configured to power the drive assembly, and an engine. The work machine additionally comprises an auxiliary pump configured to provide hydraulic power to the attachment. The auxiliary pump receives rotary power from the engine. The work machine further comprises at least one hydrostatic transmission configured to provide hydraulic power to the pair of drive motors. Each of the auxiliary pump and the at least one hydrostatic transmission is formed as a cuboid with a top side, a bottom side, a front side, a back side, a left side, and a right side. At least one of the auxiliary pump and the at least one hydrostatic transmission is oriented such said left side and/or right side forms an angle between 15 and 70° with respect to a vertical axis.

Another aspect of the present invention concerns a method of operating a work machine that operably supports an attachment. The method comprises a step of providing a drive assembly configured to propel the work machine over a ground surface, a pair of drive motors configured to power the drive assembly, and an engine. An additional step includes providing power from the engine to an auxiliary pump configured to provide hydraulic power to the attachment. The auxiliary pump is positioned between the pair of drive motors. A further step includes providing power through the auxiliary pump to at least one hydrostatic transmission configured to provide power to the pair of drive motors Another aspect of the present invention concerns a work machine that may include a frame, an operator cab mounted to the frame, loader arms supported on the frame, a quick attach coupler for securing an attachment to the loader arms, an electrical output for connecting to an attachment, and a hydraulic coupler for connecting to an attachment. The work machine may furthermore include a selector element positioned in the operator cab and configured to receive an input representative of a selection of one of a plurality of control modes. The work machine may in addition include control elements mounted in the operator cab and configured to be manipulated by a user to generate control signals. The control elements include a pair of joysticks. The work machine may moreover include a controller configured to receive a signal representative of the selection of one of the control modes and adjust function assignments of the control elements based at least in part on the selection. Each of the function assignments connects one of the control elements to one of a plurality of functions of the work machine.

Another aspect of the present invention concerns a computer-implemented method of toggling control modes of a work machine may include receiving, via a selector element of the work machine, an input representative of a selection of one of the control modes. The computer-implemented method may also include adjusting, via a processing element, a function assignment of at least one of a first joystick, a second joystick, a first user control located on the first joystick, or a second user control located on the second joystick based at least in part on the input. The function assignment connects the at least one of a first joystick, a second joystick, a first user control located on the first joystick, or a second user control located on the second joystick to one of a plurality of functions of the work machine.

Another aspect of the present invention concerns a computer-implemented method of toggling control modes of a work machine may include displaying, via a display, a plurality of graphics representative of the control modes. The computer-implemented method may also include receiving an input representative of a selection of at least one of the control modes. The computer-implemented method may furthermore include adjusting, via a processing element, function assignments of control elements based at least in part on the input. Each of the function assignments connects one of the control elements to one of a plurality of functions of the work machine, and the control elements are associated with a pair of joysticks of the work machine Another aspect of the present invention concerns a work machine comprising a frame presenting an interior compartment, an operator area, loader arms supported on the frame, one or more actuator operatively associated with the loader arms, an engine or motor positioned in the interior compartment, an auxiliary pump configured to provide hydraulic power to the plurality of actuators, a control valve hydraulically connecting the auxiliary pump to the one or more actuator, and one or more control element associated with the operator area. The actuator comprises a hydraulic cylinder. The auxiliary pump receives rotary power from the engine or motor, and the auxiliary pump is a variable displacement pump. The control valve is an open center control valve that includes an adjustable spool and an electrical actuator configured to adjust a position of the spool. The control element is configured to be manipulated by a user to generate an electrical control signal for the electrical actuator of the control valve.

Another aspect of the present invention concerns a work machine comprising a frame, an operator area, loader arms, one or more actuator, an engine or motor, a drive assembly, a pair of drive motors, an auxiliary pump, one or more control valve, and one or more control element. The frame presents an interior compartment. The loader arms are supported on the frame. The actuator is operatively associated with the loader arms and includes one or more hydraulic cylinder. The engine or motor is positioned within the interior compartment. The drive assembly is configured to propel the work machine over a ground surface and includes a pair of transversely-spaced endless tracks that support the frame on the ground surface. The drive motors are configured to power the drive assembly. The auxiliary pump is configured to provide hydraulic power to the actuator. The auxiliary pump receives rotary power from the engine or motor and is a variable displacement pump. The control valve hydraulically connects the auxiliary pump to the actuator and is an open center control valve that includes an adjustable spool and an electrical actuator configured to adjust a position of the spool. The control element is associated with the operator area and is configured to be manipulated by a user to generate an electrical control signal for the electrical actuator of the control valve.

Another aspect of the present invention concerns a work machine including a frame presenting an interior compartment, a drive assembly configured to propel the frame over a ground surface, an operator area, loader arms supported on the frame, actuators operatively associated with the loader arms, an engine or motor positioned in the interior compartment, a pair of drive motors configured to power the drive assembly, a pair of hydrostatic transmissions that receive rotary power from the engine or motor and positioned forward of the engine or motor and configured to provide hydraulic power to the pair of drive motors, an auxiliary pump configured to provide hydraulic power to the plurality of actuators, and a control valve hydraulically connecting the auxiliary pump to the actuators. The actuators comprise hydraulic cylinders. The auxiliary pump receives rotary power from the engine or motor and is positioned between the engine or motor and the pair of hydrostatic transmissions. The auxiliary pump is also positioned between the pair of drive motors and is a variable displacement pump. The control valve hydraulically connects the auxiliary pump to the actuators and is an open center control valve that includes an adjustable spool and an actuator configured adjust a position of the spool.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 66 is a perspective view of the loader of FIGS. 1-8 with an attachment removed to show a quick attach coupler;

Figure 1:
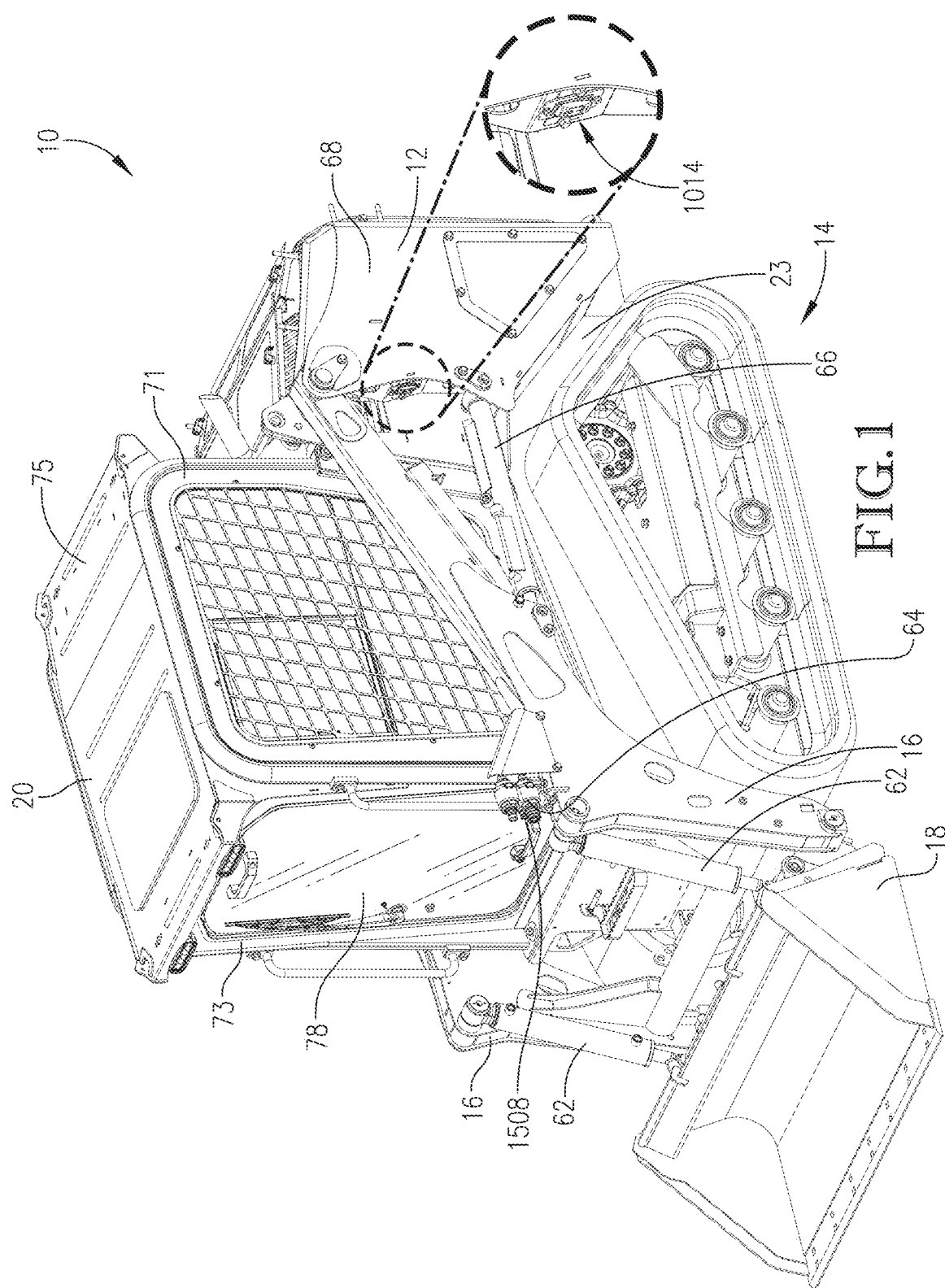
FIG. 1 is a front perspective view of a loader according to embodiments of the present invention.

The drawing figures do not limit the present invention to the specific embodiments disclosed and described herein. While the drawings do not necessarily provide exact dimensions or tolerances for the illustrated structures or components, the drawings are to scale with respect to the relationships between the components of the structures illustrated in the drawings.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Overview

Figure 9:
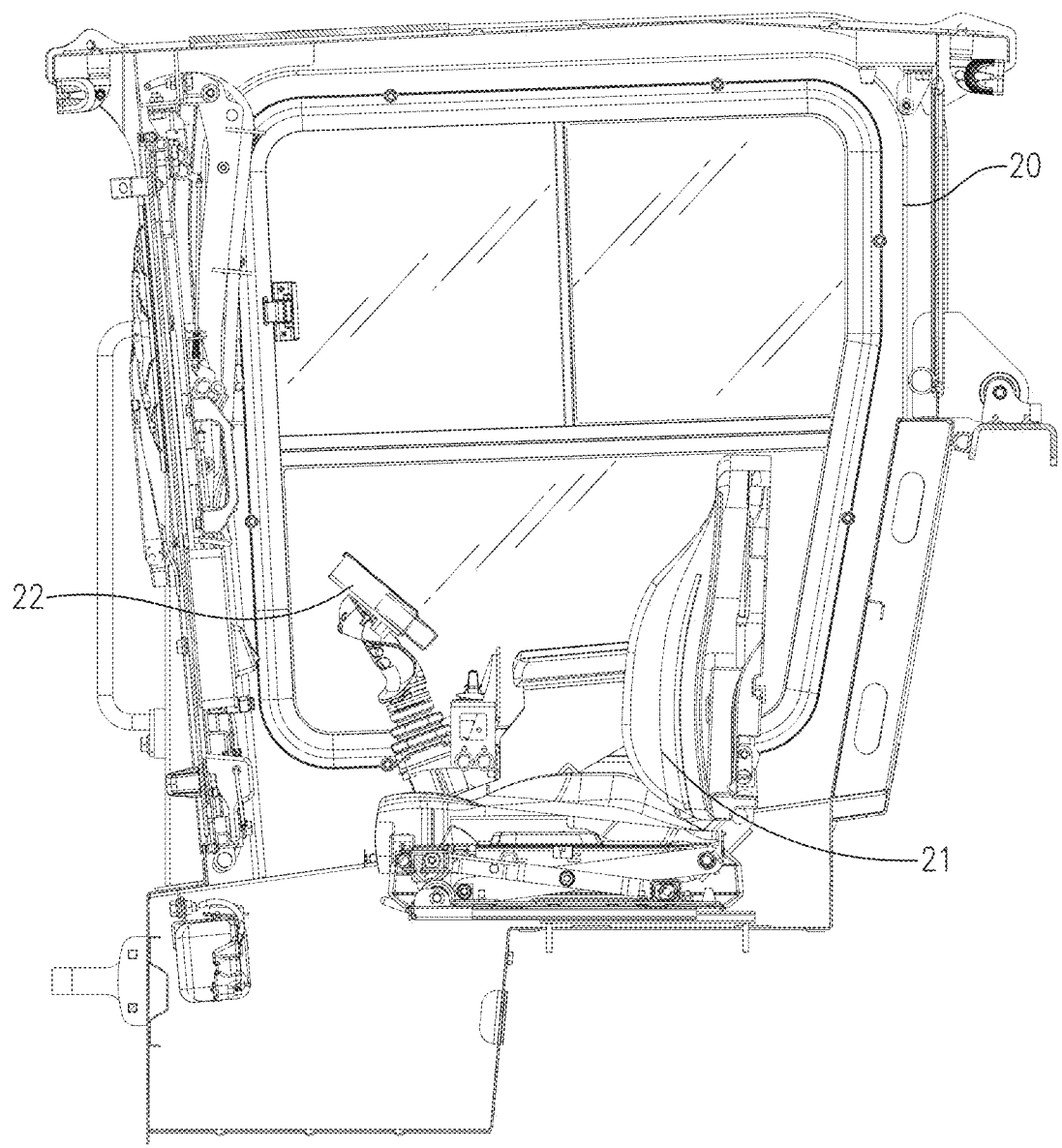
FIG. 9 is a side view of an interior space of a cab of the loader from FIGS. 1-8, with a portion of the cab removed to illustrate user controls of the loader.

Embodiments of the present invention are directed to a loader 10 (the "loader 10"), as illustrated in exemplary FIGS. 1-8. Broadly, the loader 10 may comprise a frame 12 supported on the ground by a drive assembly 14. As will be discussed in more detail below, in addition to supporting the loader 10 on the ground, the drive assembly 14 is configured to propel the loader 10 over the ground. The loader 10 may additionally comprise one or more (e.g., a pair of) loader arms 16 supported by the frame 12 and configured to be raised and lowered. The loader arms 16 are further configured to support various types of attachments 18 for performing various types of work, as required by an operator of the loader 10. The loader 10 may include an operator area, such as a cab 20 supported by the frame 12. The cab 20 may, as illustrated by FIG. 9, house a seat 21 and one or more user controls 22 (e.g., buttons, switches, levers, joysticks, touchscreen displays, etc.). The user controls 22 may be used by the operator to control various functions of the loader 10, as will be described in more detail below. Although the figures generally illustrate the operator area in the form of an enclosed cab, it is understood that embodiments of the present invention may also include loaders with other forms of operating areas, such as operating areas that allow for stand-on or walk-behind control of the loaders. More specifically, for instance, it is contemplated that embodiment of the present invention may include or otherwise be applicable to compact utility loaders with operating areas at the rear of the loaders. Such operating areas may not be enclosed but may include user controls that are accessible by an operator standing on a platform that is secured to a back side of the frame of the loader.

As used herein, directional terms are from the perspective of an operator sitting in the seat 21 of the loader 10 in an operating position (i.e., facing a front end of the loader 10). Thus, the terms "front", "forward", pre "fore", mean a longitudinal direction towards the front end of the loader 10. It is noted that the attachment 18 is supported at the front end of the loader 10 by connections with front ends of the loader arms 16. The terms "back," "rear", "rearward", or "aft" mean a longitudinal direction towards the back end of the loader 10, i.e., behind the cab 20. The term "left" or "leftward" means a left lateral direction from the perspective of the operator sitting in the cab 20 and facing forward, and the terms "right" or "rightward" means a right lateral direction from the perspective of the operator sitting in the cab 20 and facing forward. Similarly, "upper" or "top" means an upward direction, while "lower" or "bottom" means a downward direction.

The loader 10 of embodiments of the present invention may comprise a "compact utility loader" or a "CUL," or may specifically comprise a "compact track loader" or "CTL." As used herein the term "loader" means is a self-propelled work machine comprising one or more loader arms configured to support various interchangeable, attachments that are operably connected with front ends of the loader arms. The attachments may be tools that have hydraulically-driven auxiliary functions, such as augers, grinders, tillers, rollers, trenchers, digger derrick, or the like. However, the loader 10 may support non-hydraulic attachments, such as buckets, blades, or the like. Regardless, because the inventive loader 10 of the present invention may be "compact," i.e., having a smaller size and weight than standard loaders, such compact loader may be much more maneuverable and provide more efficient load/weight distribution than standard loaders.

In more detail, in some embodiments, the loader 10 may have a front-to-back length (excluding the attachment 18) of between 60 and 100 inches, between 70 and 90 inches, or about 85 inches. The loader 10 may have a top-to-bottom height (as measured from a bottom of the drive assembly 14 tracks and a top of the cab 20) of between 50 and 100 inches, between 60 and 90 inches, between 70 and 80 inches, or about 85 inches. The loader 10 may have a lateral width (as measured between the outside lateral edges of the drive assembly 14 tracks) of between 36 and 56 inches, between 40 and 52 inches, or about 45 inches. The frame 12 of the loader 10 may have a lateral width (as measured between the outside lateral edges of the frame 12) of between 32 and 52 inches, between 36 and 48 inches, or about 41 inches. In some embodiments, the loader 10 will be configured with a ground clearance (as measured from the ground surface to a bottom side of the frame 12) of between 7 and 12 inches, between 8 and 10 inches, or about 9 inches. Given such dimensional characteristics, the loader 10 is configured with various enhanced features and functionalities (as described in more detail below), yet maintains an overall small footprint so as to increase maneuverability and to enhance accessibility of the loader to confined working areas/spaces.

Beginning with the frame 12 of the loader 10, the frame 12 may broadly form a housing that defines an interior compartment within which various components of the loader 10 (e.g., engine, hydraulic system, etc.) are housed and supported, as will be discussed in more detail below. The frame 12 may comprise a left side 23 (See FIG. 1) and a right side 24 (See FIG. 2), which are connected together via a bottom side 26 (See FIG. 2). As such, the frame 12 can present the interior compartment for supporting various components of the loader 10, as will be discussed in more detail below.

Figure 10:
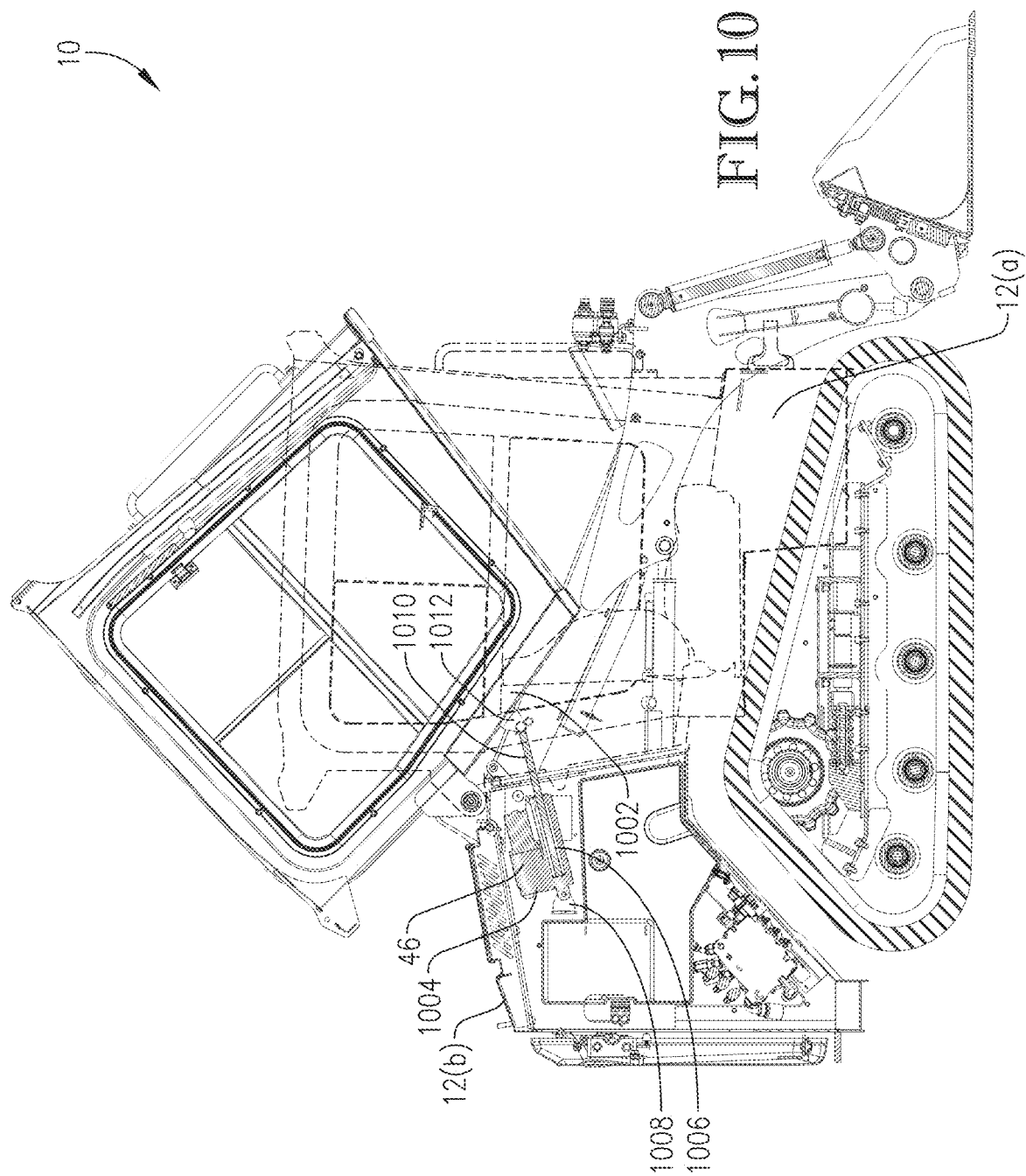
FIG. 10 is a side elevation view of the loader from FIGS. 1-8, with a cab of the loader shown positioned in both a raised position (solid line) and a lowered position (in broken line)
Figure 11:
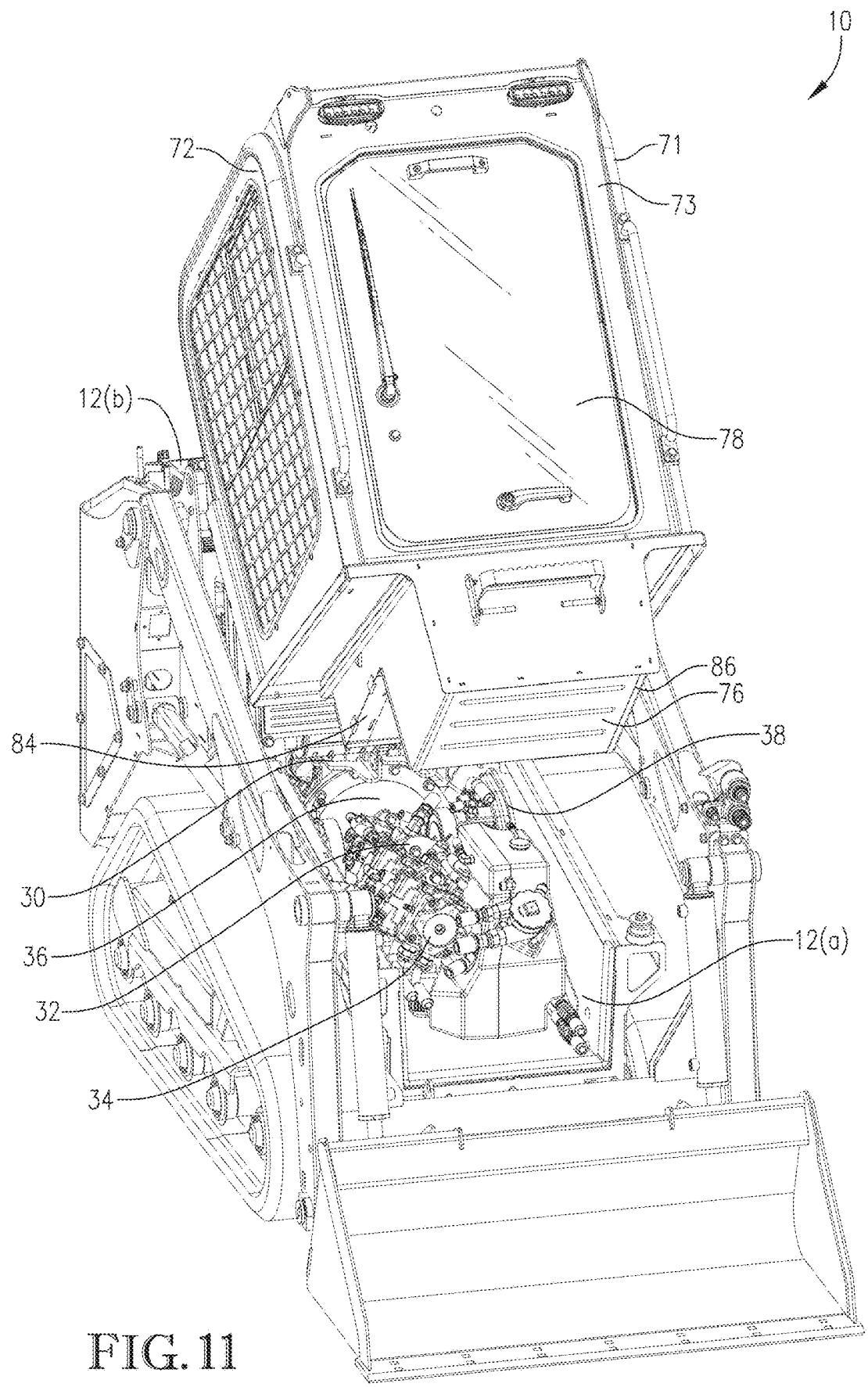
FIG. 11 is a front perspective view of the loader from FIGS. 1-8, with a cab of the loader shown in a raised position.

Furthermore, and with reference to FIGS. 10 and 11, as the frame 12 may comprise a forward portion 12(*a*) and a rearward portion 12(*b*). In general, the forward portion 12(*a*) of the frame 12 may have a height that is less than height of the rearward portion 12(*b*). In some embodiments, the cab 20 may be hingedly connected to a top of the frame 12, such that the cab 20 can be selectively positioned in a closed, operating position (See, e.g., FIG. 22) and an open, raised position (See, e.g., FIGS. 10 and 11). Specifically, as shown in FIG. 10, a back side of the cab 20 may be hingedly connected to a top of the frame 12, near or at a front of the rearward portion 12(b) of the frame 12. The hinge connection may be a lateral extending, horizontal connection, such that the cab 20 can be vertically raised and lowered. When in the closed, operating position, a front, lower portion of the cab 20 may be securely coupled, e.g., via threaded fasteners, latches, or other locking mechanisms, to securely hold the cab 20 in place (with respect to the frame 12) in the closed, operating position. Further, the loader 10 may include an access door 28 hingedly connected to the frame 12 at the back end of the loader 10, and configured to be selectively positioned in a closed position (See, e.g., FIGS. 2 and 6) and an open position (See, e.g., FIG. 12). Specifically, in some embodiments, a right side of the access door 28 may be hingedly connected to a back end of the right side 24 of the frame 12. The hinge connection may be a vertical connection, such that the access door 28 can be opened and closed about a vertical axis. A left side of the access door 28 may include a locking mechanism (e.g., a latch) that permits the access door 28 to be selectively coupled with the left side 23 of the frame 12, so as to maintain the access door 28 in the closed position.

In view of the above, the frame 12, in addition to the cab 20 and the access door 28, are configured to present (and selectively enclose) the interior compartment within which various components of the loader 10. Specifically, with the cab 20 and the access door 28 in the closed position, various components of the loader 10 are enclosed within the interior compartment. Furthermore, however, with the cab 20 and/or the access door 28 in the open position, certain of those various components within the interior compartment may be accessed for maintenance, repair, or the like. For example, and with reference to FIG. 11, the interior compartment of the frame 12 may house a power unit, such as a combustion engine 30 of the loader 10, at least a portion of which may be positioned within a rearward portion 12(b) of the frame 12. It is noted that in some embodiments, the loader 10 may include a power unit in the form of an electric motor to power the loader 10, in place of (or in addition to) the combustion engine 30. A hydraulic auxiliary pump 32 may be operably connected to a front end of the engine 30, and a hydrostatic transmission 34 may be operably connected to a front end of the auxiliary pump 32. As such, the engine 30 may provide rotary power to each of the auxiliary pump 32 and the hydrostatic transmission 34. As will be described in more detail below, the auxiliary pump 32 may provide hydraulic power to the loader arms 16 and to the attachments 18 of the loader 10, as necessary. The hydrostatic transmission 34 may provide hydraulic power to the drive assembly 14, as discussed in more detail below. In some embodiments, a flywheel 36 may be positioned between the engine 30 and the auxiliary pump 32 and the hydrostatic transmission 34. Such flywheel 36 may be used to maintain a consistent power output from the engine 30 during varying RPMs.

In certain embodiments, the loader 10 may include a pair of drive motors 38 positioned within the interior compartment of the frame 12, on either side of the auxiliary pump 32 (i.e., a left side drive motor 38 and a right side drive motor 38). Such drive motors 38 may be used to provide power to the drive assembly 14. Specifically, the hydrostatic transmission 34 may be configured to provide hydraulic power to the drive motors 38, which in turn provide rotary power to the drive assembly 14 (e.g., tracks or wheels) of the loader 10. In some embodiments, the loader 10 may be in the form of a compact track loader, such that the drive assembly 14 comprises a pair of tracks, as described in more detail below. However, the loader 10 may, alternatively, be propelled by one or more wheels in place of, or in addition to, tracks. Regardless, as discussed above, the interior compartment of the frame 12, may house the engine 30, the auxiliary pump 32, the hydrostatic transmission 34, the flywheel 36, and the drive motors 38, as well as various other components of the loader's 10 hydraulic system (e.g., hydraulic fluid reservoir, filters, ride control valve, accumulator, brake valve, lines/conduits, etc.). In some embodiments, the engine 30 may be positioned within the rearward portion 12(b) of the frame 12, while the auxiliary pump 32, the hydrostatic transmission 34, the flywheel 36, and the drive motors 38, as well as various other components of the loader's 10 hydraulic system may be positioned in the forward portion 12(a) of the frame 12.

Figure 12:
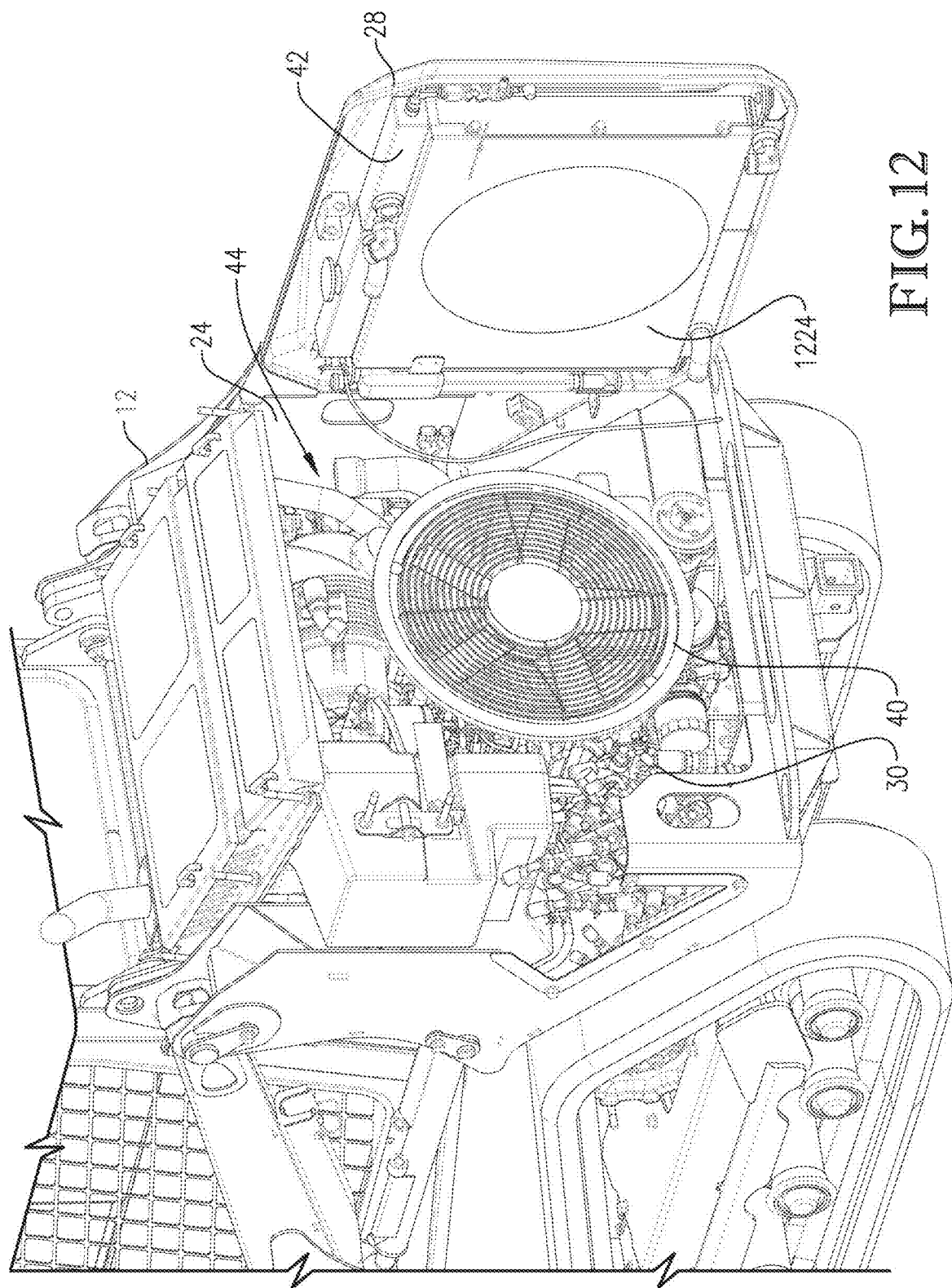
FIG. 12 is a rear perspective view of the loader from FIGS. 1-8, with a rear access door of the loader illustrated in an open position.
Figure 13:
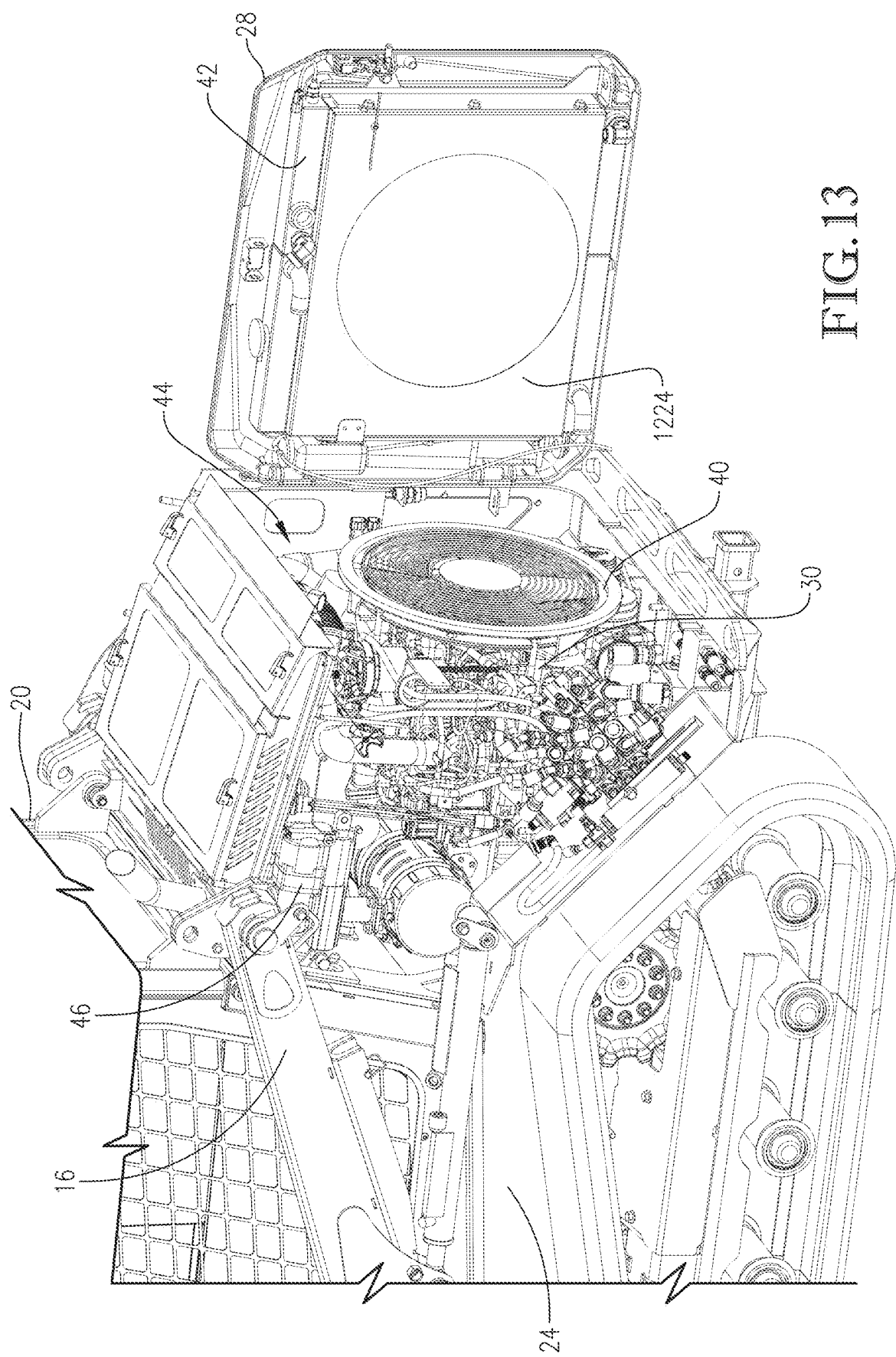
FIG. 13 is another rear perspective view of the loader from FIGS. 1-8, with a portion of a frame of the loader cut away to illustrate internal components of the loader.

Turning to the rearward portion 12(b) of the frame 12, as illustrated in FIGS. 12 and 13, various components of the loader 10 may be positioned within the internal compartment presented by the rearward portion 12(b). For instance, as noted previously, the engine 30 (or at least a portion thereof) may be positioned within the rearward portion 12(b) of the frame 12. A cooling system may be positioned rearward of the engine 30. In particular, the cooling system may comprise a fan 40 attached to a rear side of the engine 30. The cooling system may additionally comprise a radiator 42 positioned rearward of the fan 40. In some embodiments, as will be described in more detail below, the radiator 42 may be attached to the access door 28 and configured to rotate open and closed (with respect to the fan 40) in conjunction with the access door 28. In addition, the rearward portion 12(b) of the frame 12 may house a heating, ventilation, and air-conditioning ("HVAC") system 44, which is configured to provide temperature controlled airflow to the cab 20, as will be discussed in more detail below. Furthermore, the rearward portion 12(b) of the frame 12 may house an actuator 46, as shown in FIG. 13, in operable engagement with the cab 20 and configured to selectively shift the cab 20 between open and closed positions, as noted above and as will be discussed in more detail below. The actuator may comprise an electro-hydraulic actuator, as well as various other types linear actuators. Finally, the rearward portion 12(b) of the frame 12 may house various other components of the loader, such as components of the loader's 10 electrical system (e.g., battery, engine 30 starter, alternator), fuel tank, associated cables/lines, etc.

Notably, the cab 20 and the access door 28 being configured to selectively open and close provide access to the interior compartment of the frame 12. For example, the cab 20 can be raised to the open position to provide access to the engine 30, the auxiliary pump 32, the hydrostatic transmission 34, the flywheel 36, the drive motors and/or various other components of the loader's 10 hydraulic system. The access door 28 can be opened to provide access to the engine 30, the cooling system (e.g., the fan 40 and radiator 42), the HVAC system 44, electrical system, and/or other related components. Such access can facilitate efficient service and maintenance of the loader 10.

Figure 4:
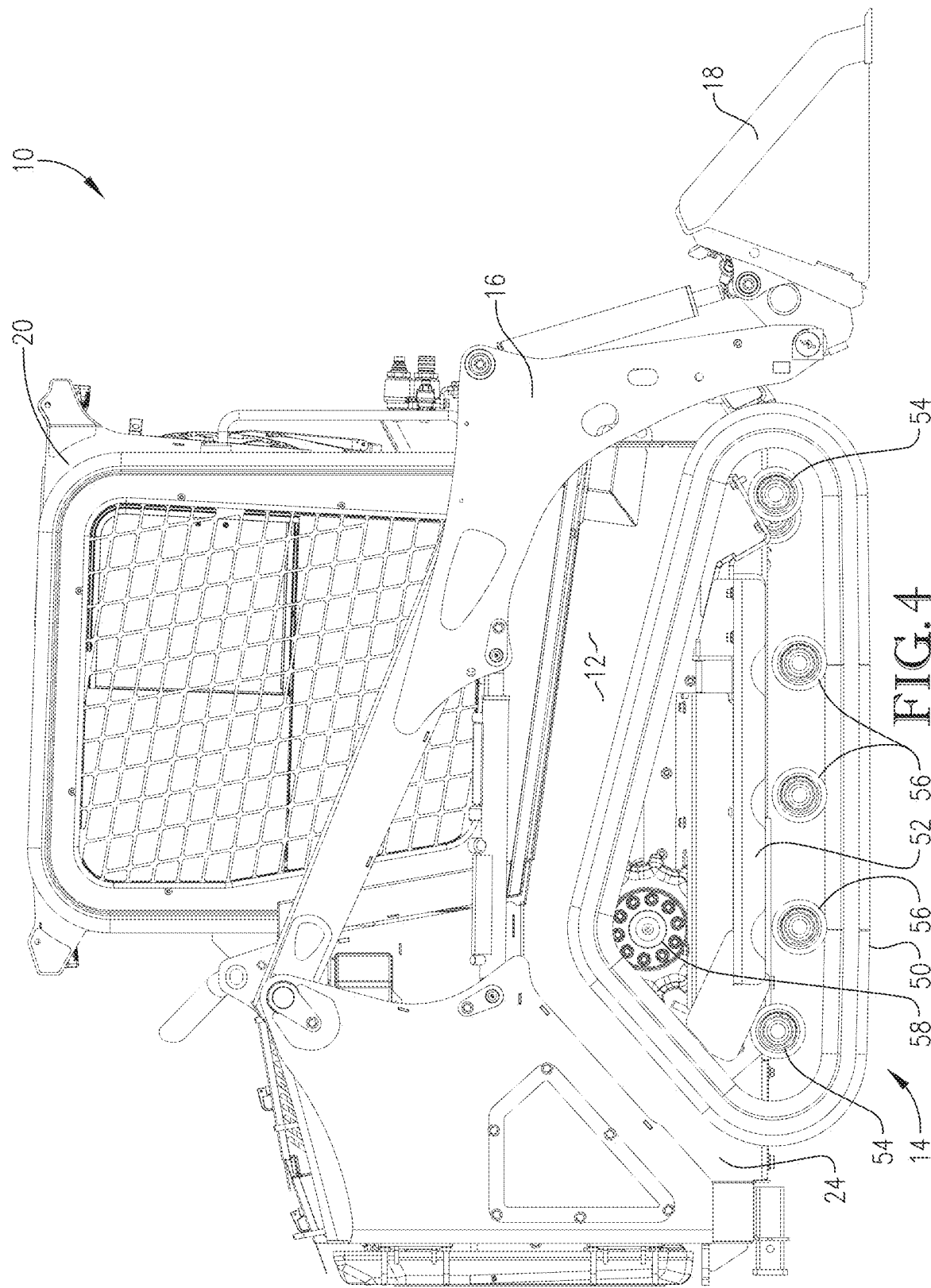
FIG. 4 is a right side elevation view of the loader from FIGS. 1-3
Figure 5:
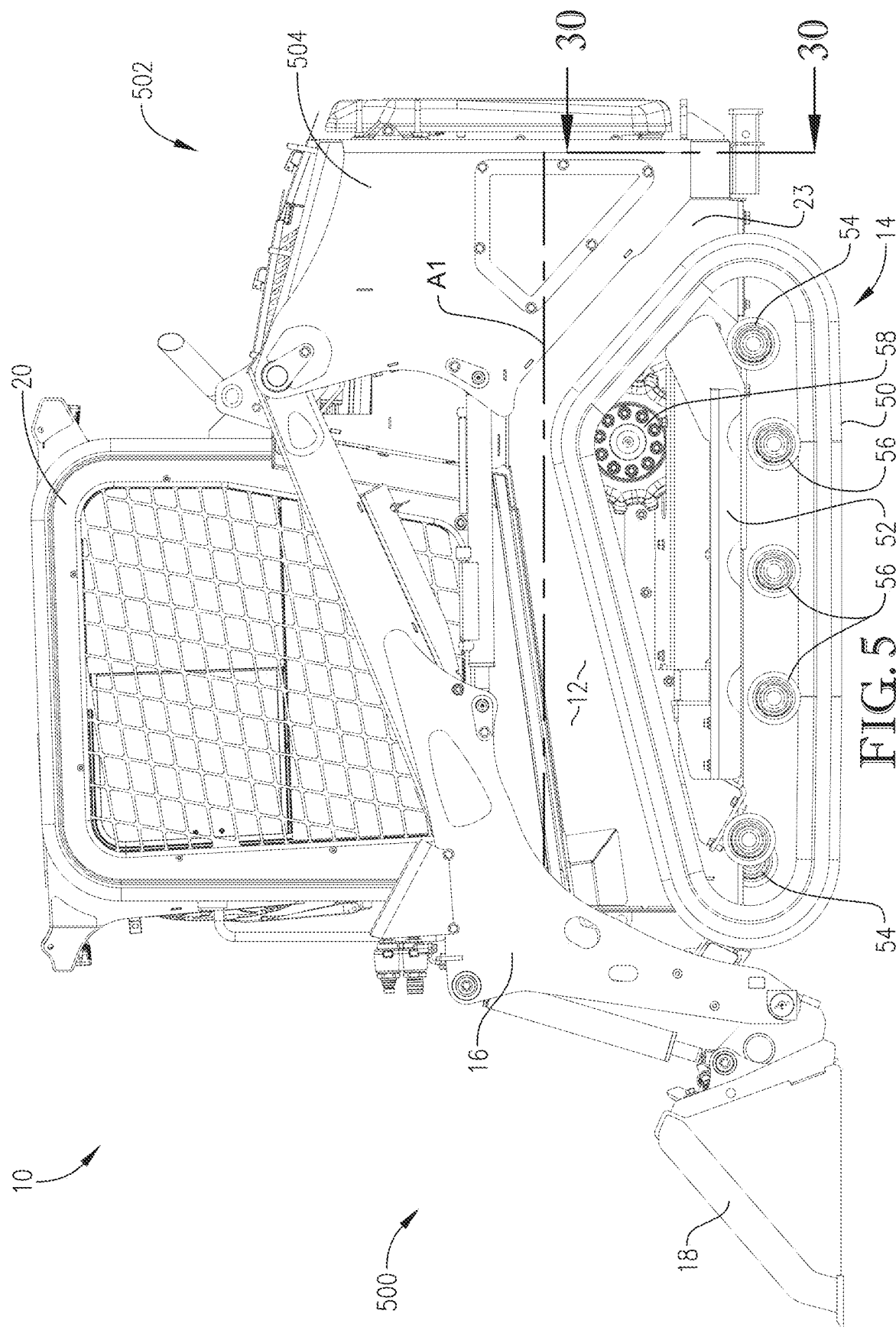
FIG. 5 is a left side elevation view of the loader from FIGS. 1-4

With reference to FIGS. 4 and 5, the drive assembly 14 of the loader may comprise a pair of endless tracks 50 that extend from the exteriors of the left side 23 and the right side 24 of the frame 12. In more detail, the drive assembly 14 may comprise a pair of track frames 52, with each track frame 52 being rigidly secured to one exterior side 23, 24 of the frame 12 of the loader 10. Specifically, the left side track frame 52 may be rigidly secured (e.g., via welding) to the left side 23 of the frame 12, so as to extend laterally away from the frame 12. Similarly, the right side track frame 52 may be rigidly secured (e.g., via welding) to the right side 24 of the frame 12, so as to extend laterally away from the frame 12. As shown in FIGS. 4 and 5, the track frames 52 may support one or more wheels rotatably secured thereto, so as to permit the tracks 50 to rotate around the track frames 52. Specifically, each track frame 52 may support a pair of idler wheels 54, with a front idler wheel 54 secured to a front of the track frame 52 and a rear idler wheel 54 secured to a rear of the track frame 52. In addition, each track frame 52 may support a plurality of roller wheels 56 (e.g., three roller wheels) secured to the track frame 52 between the idler wheels 54 in a front-to-back direction. As will be described in more detail below, each of the roller wheels 56 be secured to a bottom of the track frame 52 via an independent suspension element so as to provide enhanced stability and driveability of the loader 10. In contrast, the idler wheels 54 may be directly secured to the track frames 52 via an axle.

One of the tracks 50 may loop around each of the track frames 52 and associated wheels (e.g., idler wheels 54 and roller wheels 56) so as to present a left track 50 and a right track 50. The tracks 50 may be formed from rubber, metal, or combinations thereof. Although the loader 10 is illustrated as having tracks 50, in some embodiments, the loader 10 may include one or more wheels on each side 23, 24 of the frame 12 to support and to propel the loader 10.

To facilitate rotation of the tracks 52, the drive assembly 14 may additionally comprise a pair of drive sprockets 58 positioned on either exterior side 23, 24 of the frame 12, as shown in FIGS. 4 and 5. Specifically, in some embodiments, a left side drive sprocket 58 may extend from the left side 23 of the frame 12 at a position above the left side track frame 52. Similarly, a right side drive sprocket 58 may extend from the right side 24 of the frame 12 at a position above the right side track frame 52. Each of the tracks 50 may be looped around the associated track frame 52, wheels (e.g., idler wheels 54 and roller wheels 56), and drive sprocket 58. As such, the tracks 50 may be configured in a triangular shape, when viewed from the sides of the loader 10. An interior surface of the tracks 50 may be formed with nubs that engage with teeth of the drive sprockets 58, such that rotation of the drive sprockets 58 will cause a corresponding rotation of the tracks 50. As such, the loader 10 can be propelled by rotating the drive sprockets 58, which causes rotation of the tracks 50. Specifically, the left side drive sprocket 58 may be operably connected with the left side drive motor 38, and the right side drive sprocket 58 may be operably connected with the right side drive motor 38, such that the drive motors 38 can drive the drive sprockets 58. As a result, the loader 10 can be propelled forward, rearward, and turn leftward/rightward.

Turning to the loader arms 16 of the loader 10, the loader arms 16 may comprise two loader arms 16 in the form of a left loader arm (i.e., positioned on a left side of the loader 10) and a right loader arm (i.e., positioned on a right side of the loader 10). Each of the loader arms 16 may have a rear end that is pivotably coupled with the frame 12 of the loader 10, near the back end of the loader 10. Each of the loader arms 16 may extend forward to a front end that supports a hitch assembly 60, as perhaps best shown in FIG. 2. Such hitch assembly 60 may extend at least partially between the left and right loader arms and may generally comprise one or more connection plates configurable to releasably secure various types of attachments 18 to the loader arms 16. The loader arms 16 may additionally include a cross-bar, as perhaps best shown in FIG. 1, that extends between the left and right loader arms 16. In certain embodiments, the cross-bar may be positioned adjacent to and behind the hitch assembly 60. Furthermore, in some embodiments, each of the loader arms 16 may include a tilt actuator 62, as shown in FIG. 1, that extends from the loader arm 16 to one of the lateral sides of the hitch assembly 60, so as to permit tilting of the hitch assembly 60 and any attachment 18 coupled with the hitch assembly 60. The tilt actuators 62 may comprise hydraulic cylinders (e.g., single or double-acting cylinders), pneumatic cylinders, and/or electric linear actuators. For example, if an attachment 18 in the form of a bucket is attached to the hitch assembly 60, actuation of the tilt actuators 62 will permit the bucket to be tilted such as for selectively collecting and dumping material. Finally, one or more of the loader arms 16 may include a hydraulic coupler 64, as shown in FIG. 1, with which one or more hydraulic lines may be coupled to provide hydraulic power to attachments 18 that operate on hydraulic power.

The loader arms 16 may be raised and lowered via lift actuators 66. In some embodiments, the lift actuators 66 may comprise linear actuators, such as hydraulic cylinders (e.g., single or double-acting cylinders), pneumatic cylinders, and/or or electric linear actuators. In more detail, each loader arm 16 may be associated with a lift actuator 66 that is pivotably coupled at a rearward end with one lateral side the frame 12. Each lift actuator 66 extends generally forward to a respective loader arm 16, such that a forward end of the lift actuator 66 is pivotably coupled with the loader arm 16 at a position between the rearward and forward end of the loader arm 16. In some embodiments, the frame 12 may include a cover panel 68 one each lateral side of the loader 10 that is spaced apart from the left side 23 and right side 24 of the frame 12. In certain embodiments, the cover panels 68 may cover rearward portions of the loader arms 16 and the lift actuators 66, so as to cover the connections between the loader arms 16 and the lift actuators 66 to the frame 12. In some embodiments, connection between the loader arms 16 and the lift actuators 66 to the frame 12 may also include a connection with the cover panels 68. Specifically, the rearward ends of the loader arms 16 and the lift actuators 66 may be positioned between the respective left or right sides 23, 24 of the frame 12 and the respective cover panels 68 of the frame, such that the rearward ends of the loader arms 16 and the lift actuators 66 are simultaneously rotatably coupled with both the left or right sides 23, 24 and the respective cover panels 68.

Because the rear ends of the loader arms 16 are rotatably coupled with the frame 12 at a fixed pivot point, the loader arms are configured in a "pivot-lift configuration" (also commonly referred to as a "radial lift configuration). In such a configuration, the forward ends of the loader arms 16, and any attachment 18 coupled therewith, will generally travel in an arc-like or circular travel path. In some other embodiments (not shown in the drawings), the loader arms 16 may be configured in a "vertical-lift configuration." In such a configuration, the entirety of the loader arms 16 shift position upward, downward, forward, and/or rearward with respect to the frame 12 of the loader 10 as the loader arms 16 transition between lowered and raised positions. As such, the forward ends of vertical-lift configured loader arms 16, and any attachment 18 coupled therewith, can travel along a substantially vertical travel path.

As noted previously, the cab 20 of the loader 10 may be rotatably coupled with the frame 12, as illustrated in FIG. 10, such that the cab 20 can be selectively positioned in a closed, operating position and in an open, raised position.

Figure 2:
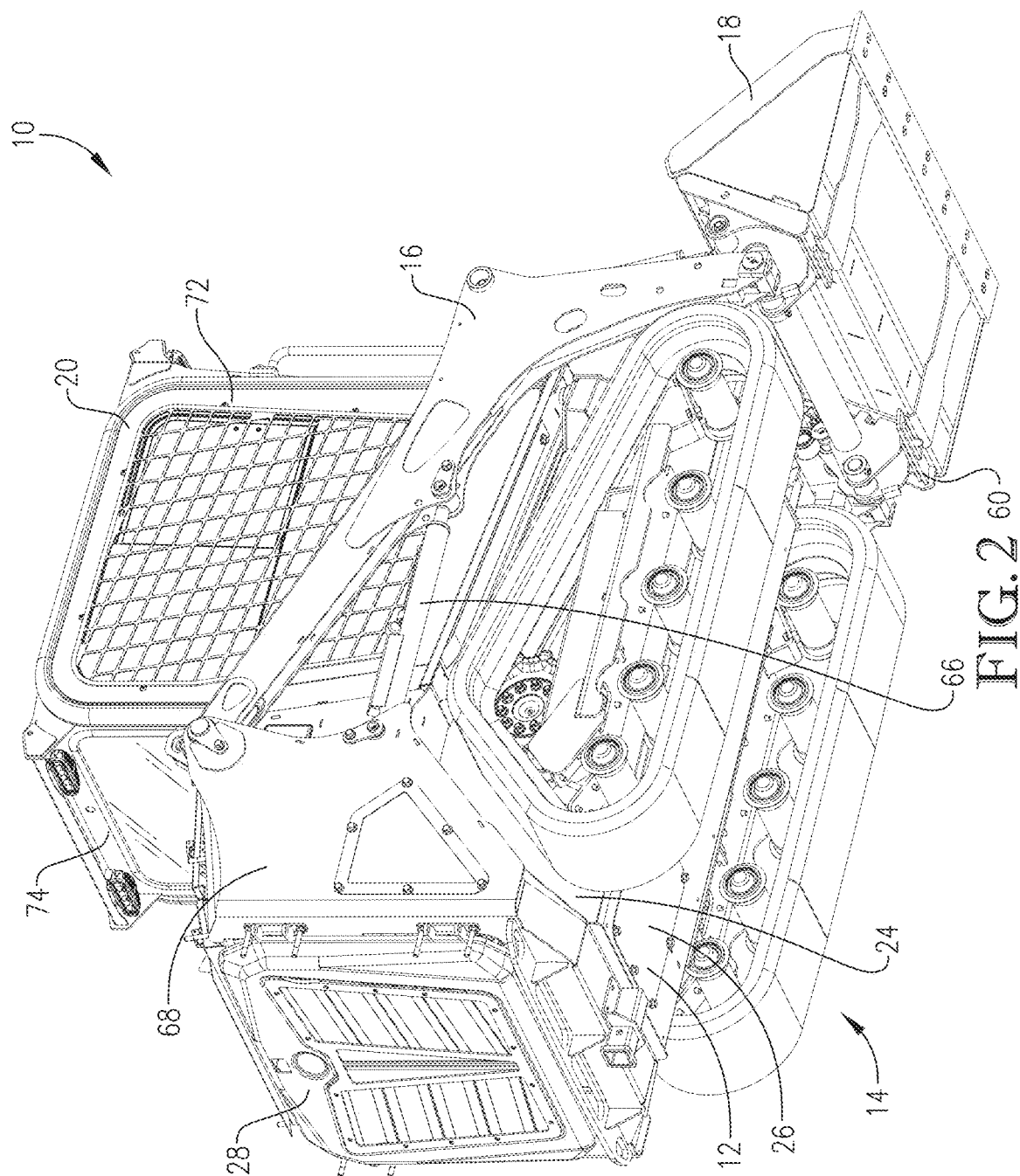
FIG. 2 is a rear perspective view of the loader from FIG. 1.
Figure 3:
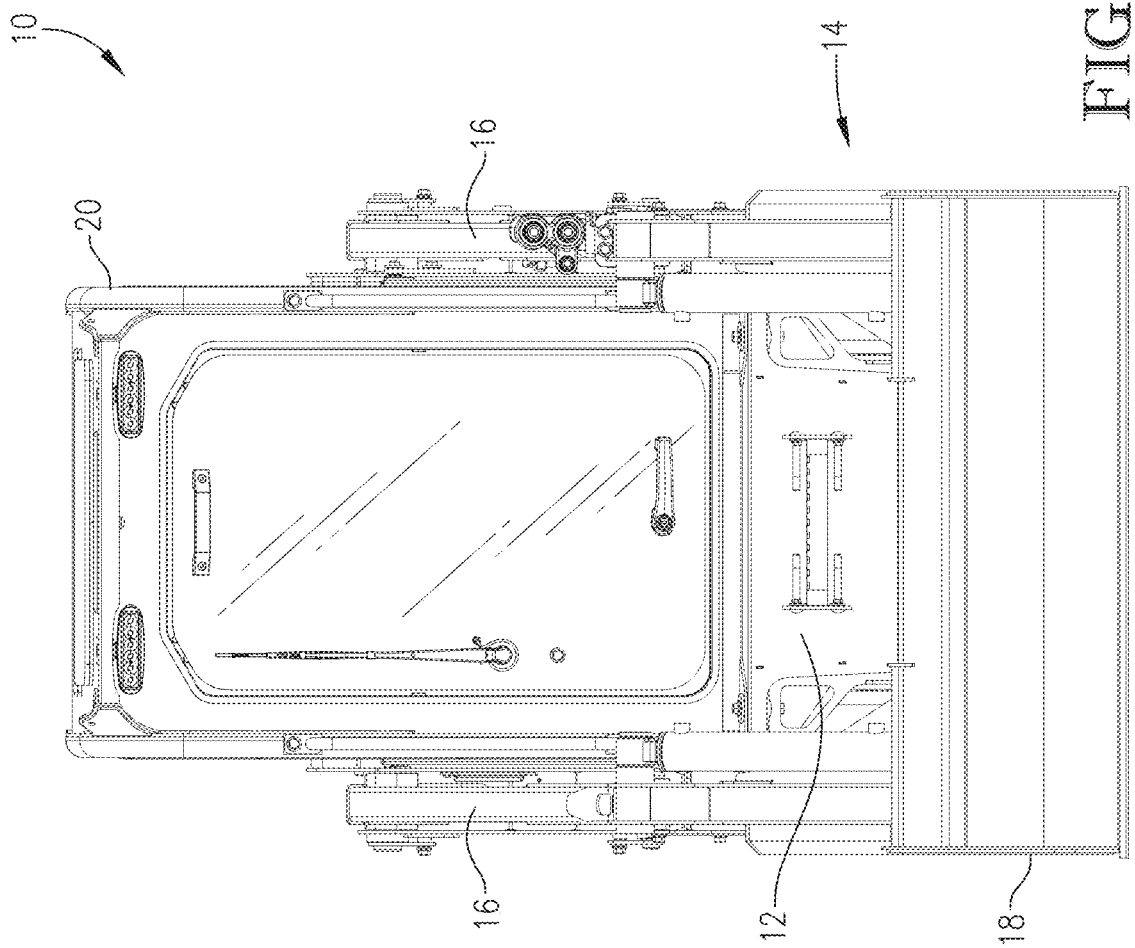
FIG. 3 is a front elevation view of the loader from FIGS. 1 and 2.

The cab 20 may, as shown in FIGS. 1, 2, and/or 11, have a generally rectangular shape with a left side 71, a right side 72, a front side 73, a back side 74, a top side 75, and a bottom side 76. The sides 71-76 of the cab 20 may enclose an interior space within which an operator can be positioned to operate the loader, as will be disclosed in more detail below. Each of the left side 71, the right side 72, and the back side 74 may comprise a frame bordering a transparent material (e.g., plastic or glass) configured to operate as a window, such that an operator of the loader 10 can view the eternal environment. In certain embodiments, the back side 74 may comprise a lower portion and an upper portion. The upper portion may comprise the transparent material, while the lower portion may comprise a generally solid, sheet of material (e.g., steel). However, the lower portion may include one or more openings or ports configured to facilitate airflow into and out of the cab 20 from the HVAC system 44, as will be described in more detail below. In some embodiments, the top side 75 may also include one or more windows so as to permit light to enter the interior space of the cab 20.

Figure 14A:
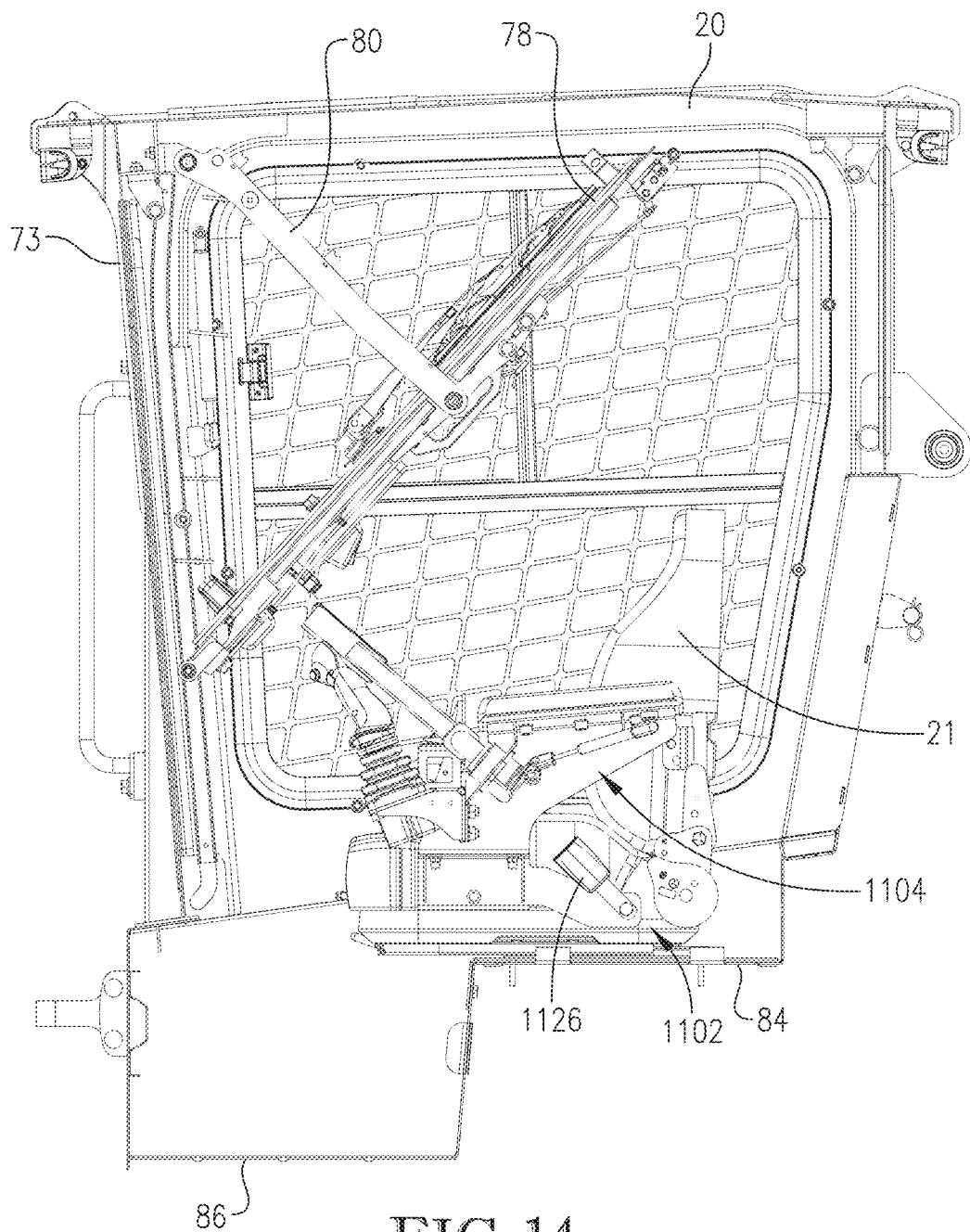
FIG. 14a is a left side elevation view of an interior space of a cab of the loader from FIGS. 1-8, with a portion of the cab removed to illustrate a main door in an intermediate position between a closed position and an opened position.
Figure 14B:
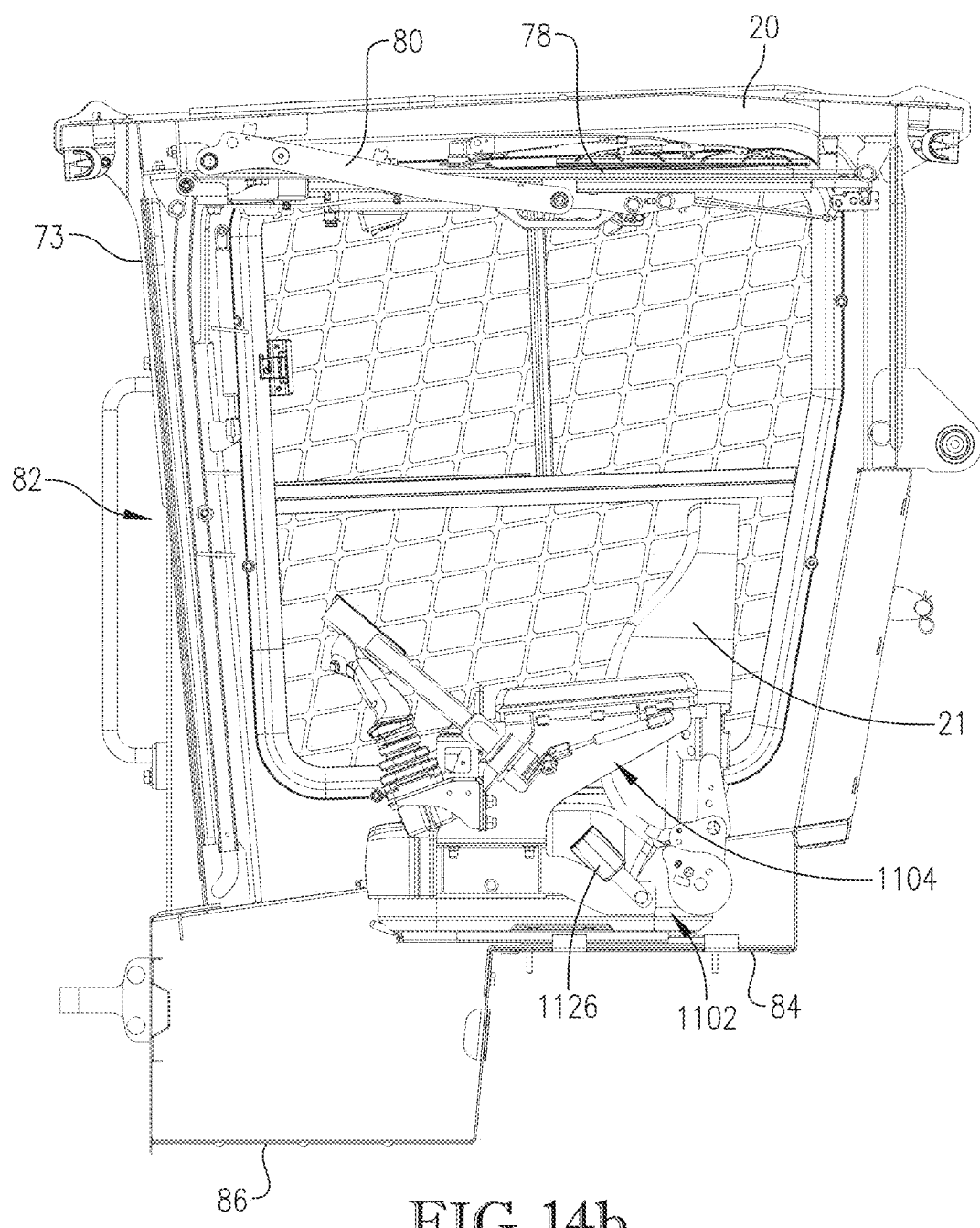
FIG. 14b is a left side elevation view of the interior space of the cab from FIG. 14b, with the main door the opened position.

The front side 73 of the cab 20 may comprise a frame that borders a main door 78. As shown in FIGS. 14a and 14b, the main door 78 may be attached to other components of the cab 20 via an actuation assembly 80 configured to permit the main door 78 to selectively transition back and forth between an opened position (e.g., FIG. 14b) and a closed position (e.g., FIG. 1), as will be described in more detail below (it is noted that FIG. 14a illustrates the main door in a transition state between the opened position and the closed position). The main door 78 may comprise a transparent material (e.g., plastic or glass) configured to operate as a window. With the main door 78 in a closed position (i.e., positioned generally parallel with and adjacent to the frame of the front side 73 as shown in FIG. 1), the door 78 acts as a window, such that the operator can view forward so as to observe the environment, the loader arms 16, the attachment 18, etc. of the loader 10. When the main door 78 in an open position, as shown in FIG. 14b (i.e., positioned generally parallel with and adjacent to the top side 75), the main door 78 is actuated away from the front side 73 of the cab so as to present an open entryway 82 through which an operator can enter and exit the interior space of the cab 20.

With reference to FIG. 11, the bottom side 76 of the cab 20 may comprise a main platform 84 on which the seat 21 is positioned within the interior space of the cab 20. The bottom side 76 may additionally comprise a lowered platform 86 positioned forward of the main platform 84, and is configured to receive the feet of the operator of the loader 10 when the operator is seated on the seat 21 to operate the loader 10.

Figure 15A:
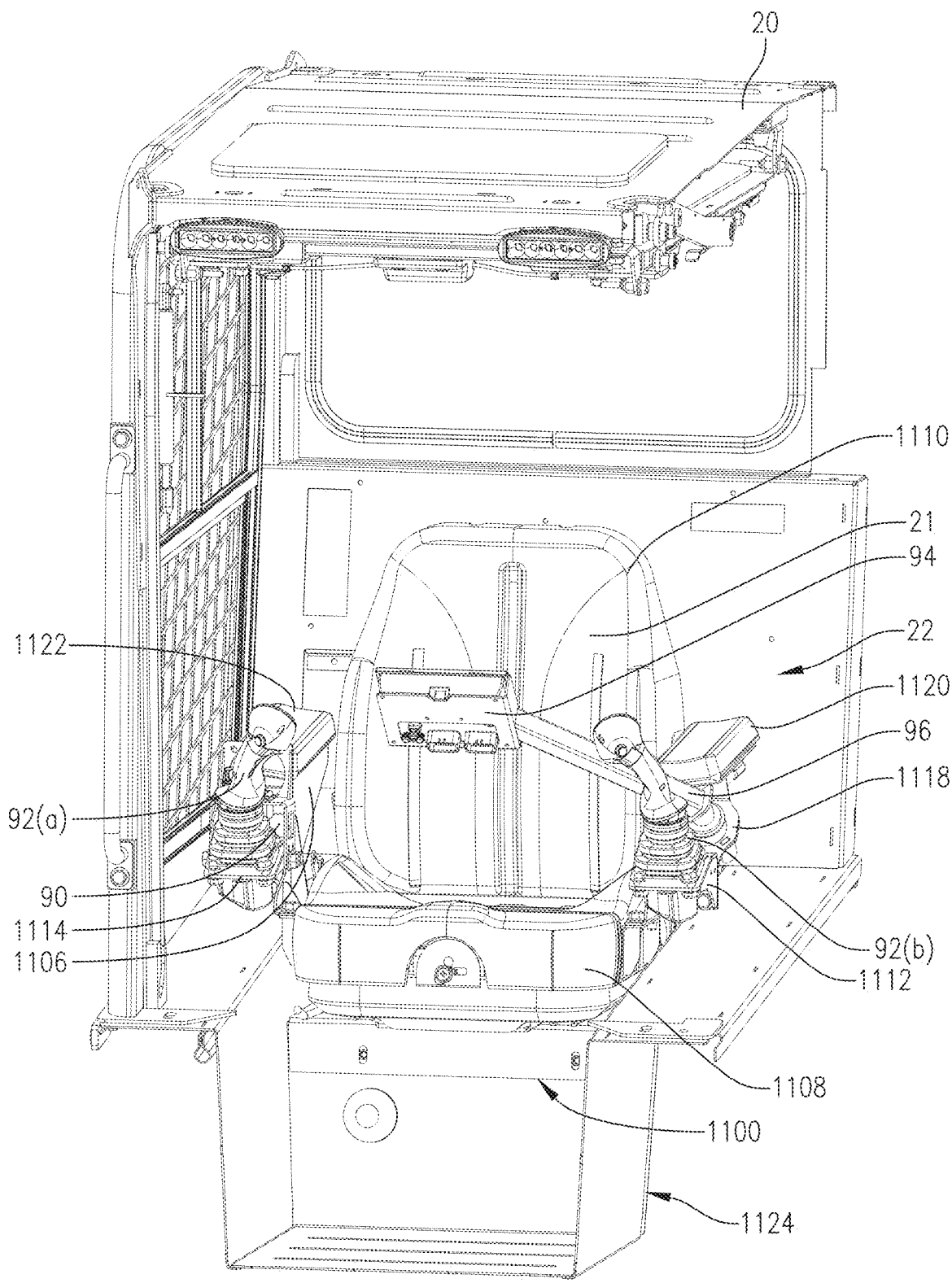
FIG. 15a is a front perspective view of a cab of the loader from FIGS. 1-8, with a portion of the cab cut away to illustrate user controls of the loader, and with a graphic display and lap bar in a lowered, operating position.
Figure 15B:
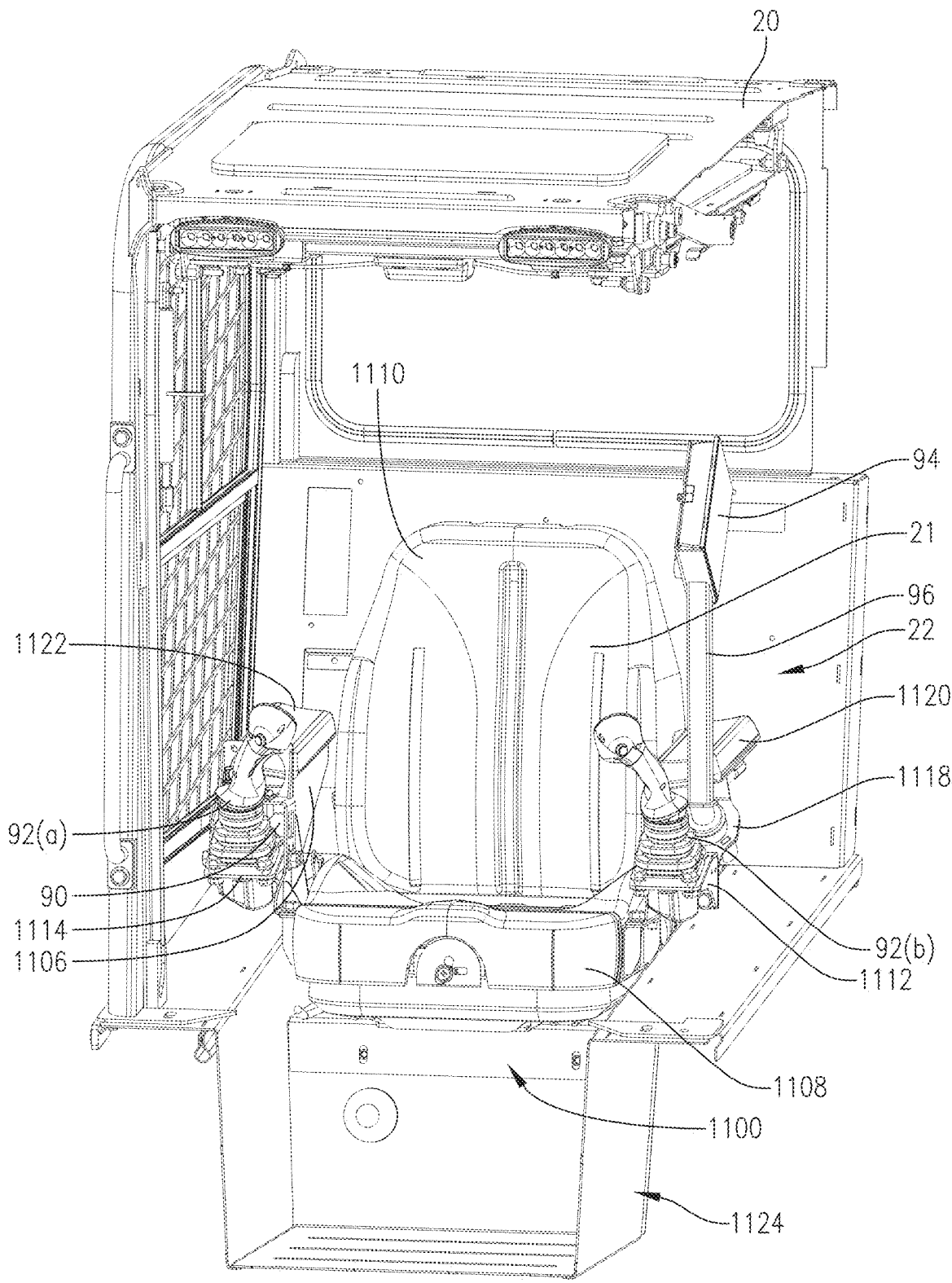
FIG. 15b is a front perspective view of the cab from FIG. 15a, with the graphic display and lap bar in a raised, non-operating position.

Turning to FIGS. 15a and 15b, the interior space of the cab 20 includes a plurality of user controls 22 (e.g., buttons, switches, levers, joysticks, touchscreen displays, etc.) that the operator can access and manipulate when the operator is seated on the seat 21. As such, the interior space of the cab 20 may be referred to as a control station. In more detail, the seat 21 may include a pair of armrests on which a user may rest his/her arms when seated in the seat 21 and operating the loader 10. A control panel 90 with one or more user controls 22, in the form of buttons, switches, or levers, may be positioned forward of one of the armrests. The operator may select such user controls 22 on the control panel 90 to perform various functions of the loader, such as (i) providing electrical power from the battery to various components of the loader, (ii) turning on/off vehicle lights of the loader, which may be positioned on exterior portions of the cab 20, (iii) starting the engine 30 of the loader 10.

In addition, a pair of joysticks 92 may be positioned forward of the armrests such that an operator can comfortably reach the joysticks 92 when seated in the seat 21. A first of the joysticks 92 may be a loader arm & attachment ("LA&A") joystick 92(a) for controlling actuation of the loader arms 16 (e.g., raising and lowering) and various hydraulically-operated functions of the attachment 18 that may be supported on the front of the loader arms 16. For example, the hydraulically-operated functions may include a tilt function for buckets or auxiliary hydraulic functions for other hydraulically-operated attachments 18 such as, e.g., bit rotation of a drill, bit actuation of a jack-hammer, rotation of a blade for a saw, rotation of multiple blades for a rotary cutter, brush rotation of a sweeper, etc. In addition, a second of the joysticks 92 may include a drive joystick 92(b), which is configured to control actuation of the tracks 50 (e.g., via control the drive motors 38 and the sprockets 58) for controlling overall movement (e.g., travel direction and speed) of the loader 10. In more detail, the drive joystick 92(b) may extend upward in front of the armrests, such that an operator may grasp and shift the drive joystick 92(b) so as to cause a corresponding movement of the loader 10. In certain embodiments, the loader 10 may include an electric-over-hydraulic ("EOH") system, such that the joysticks 92 may generate electric signals, which are configured to control hydraulic components, as will be discussed in more detail below.

In addition, the user controls 22 may include a graphic display 94 comprising an electronic display, such as a cathode ray tube, liquid crystal display, plasma, or touch screen that is operable to display visual graphics, images, text, etc. In embodiments in which the graphic display 94 is a touchscreen, the operator can manipulate the graphic display 94 to control various aspects and/or functionalities of the loader 10, as will be described in more detail below. The graphic display 94 may include, or may otherwise be associated with, one or more memory elements and processing elements. The memory elements may comprise non-transitory computer readable media and/or firmware, with a computer program stored thereon. The processing elements may comprise processors, CPUs, FPGAs, etc., which are configured to execute computer programs stored on the memory elements to perform various functions and features of the loader 10. It should be understood that certain of the loader's 10 functions and features discussed above and below may be performed by execution of the computer program by the processing elements. For example, the graphic display 94 may be configured to (by the processing elements executing the computer program stored on the memory elements) (i) obtain information from various components of the loader 10 (e.g., via sensors, actuators, timers, clocks, etc.) so as to present such information to the operator via the graphic display 94, and (ii) receive instructions from the operator (e.g., via the graphic display 94 or other of the control elements 24) to control various operations of the loader 10. For example, the graphic display 94 may present various graphical user interfaces (GUIs) that provides information to the operator and/or that facilitate interaction and control of the loader 10 by the operator. In embodiments in which the graphic display 94 is a touchscreen, the GUIs enable the operator to interact with the loader 10 by touching or pointing at display areas of the GUI. In some other embodiments, the operator will interact with the GUIs and/or the loader by manipulating interactable graphical icons/elements that are associated with the graphic display 94. The functionality of the graphic display 94 will be described in more detail below.

As illustrated in FIGS. 15a and 15b, the graphic display 94 may be coupled to an end of a rotatable lap bar 96. As such, the graphic display 94 and the lap bar 96 may be selectively shiftable between a raised, non-operable position (i.e., FIG. 15b) to and a lowered, operating position (i.e., FIG. 15a). In the raised, non-operable position, the graphic display 94 and the lap bar 96 are rotated away from the seat 21 such that space is provided for the operator to access or disembark from the seat 21. Once the operator has sat down in the seat 21, the graphic display 94 and the lap bar 96 can be rotated down towards the seat, such that the graphic display 94 is positioned in the lap area of the operator. As such, the operator can easily interact with the graphic display 94 to obtain information for and/or control functions of the loader 10. In some embodiments, the loader 10 may include a position sensor associated with the lap bar 96 and configured to determine if the lap bar 96 is in either the raised, non-operable position or the lowered, operating position. In some embodiments, certain functions of the loader 10 may not be operable unless the lap bar 96 is in the lowered, operating position. In addition, some embodiments may provide for the seat 21 to include a presence sensor configured to determine whether an operator is seated in the seat 21. In some embodiments, certain functions of the loader 10 may not be operable unless the operator is seated. The above-described position/presence sensors may comprise electronic sensors, such an inductive proximity switch configured to be triggered by the position of the lap bar and/or weight of the operator present in the seat 21. Thus, the loader 10 is configured to determine whether or not an operator is positioned within the seat 21 and with the lap bar 96 in the lowered, operating position. As will be discussed in more detail below, in some embodiments, certain operational features of the loader 10 may be restricted (e.g., starting the engine 30 of the loader, maneuvering the loader 10, actuating the loader arms 16 and/or attachment 18, etc.) if an operator is not present in the seat 21 and/or the lap bar 96 is not positioned in the lowered, operating position.

Undercarriage

Figure 16:
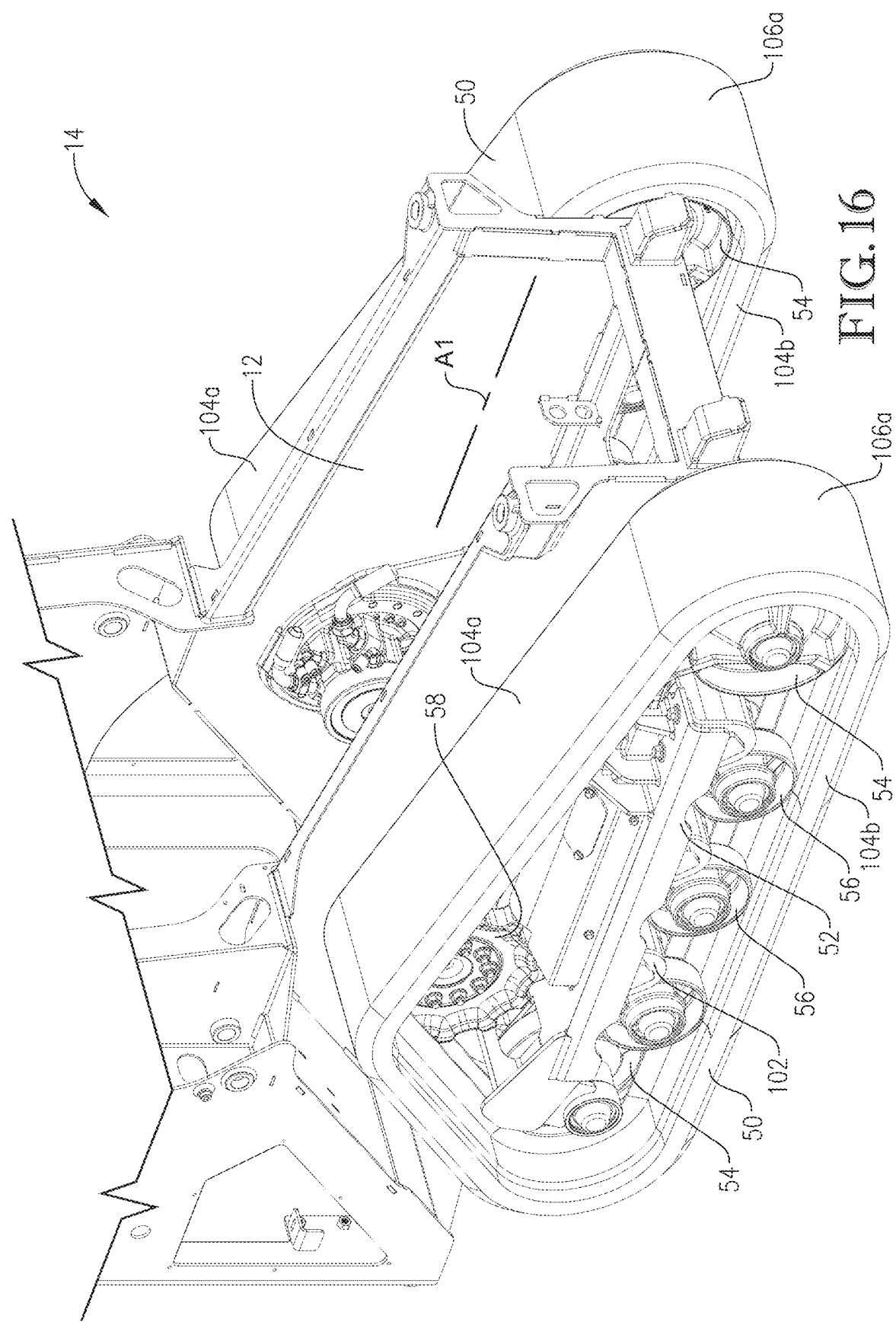
FIG. 16 is a fragmentary front perspective view of the loader from FIG. 1 to FIG. 8, depicting the tracked drive assembly supporting the loader frame.
Figure 17:
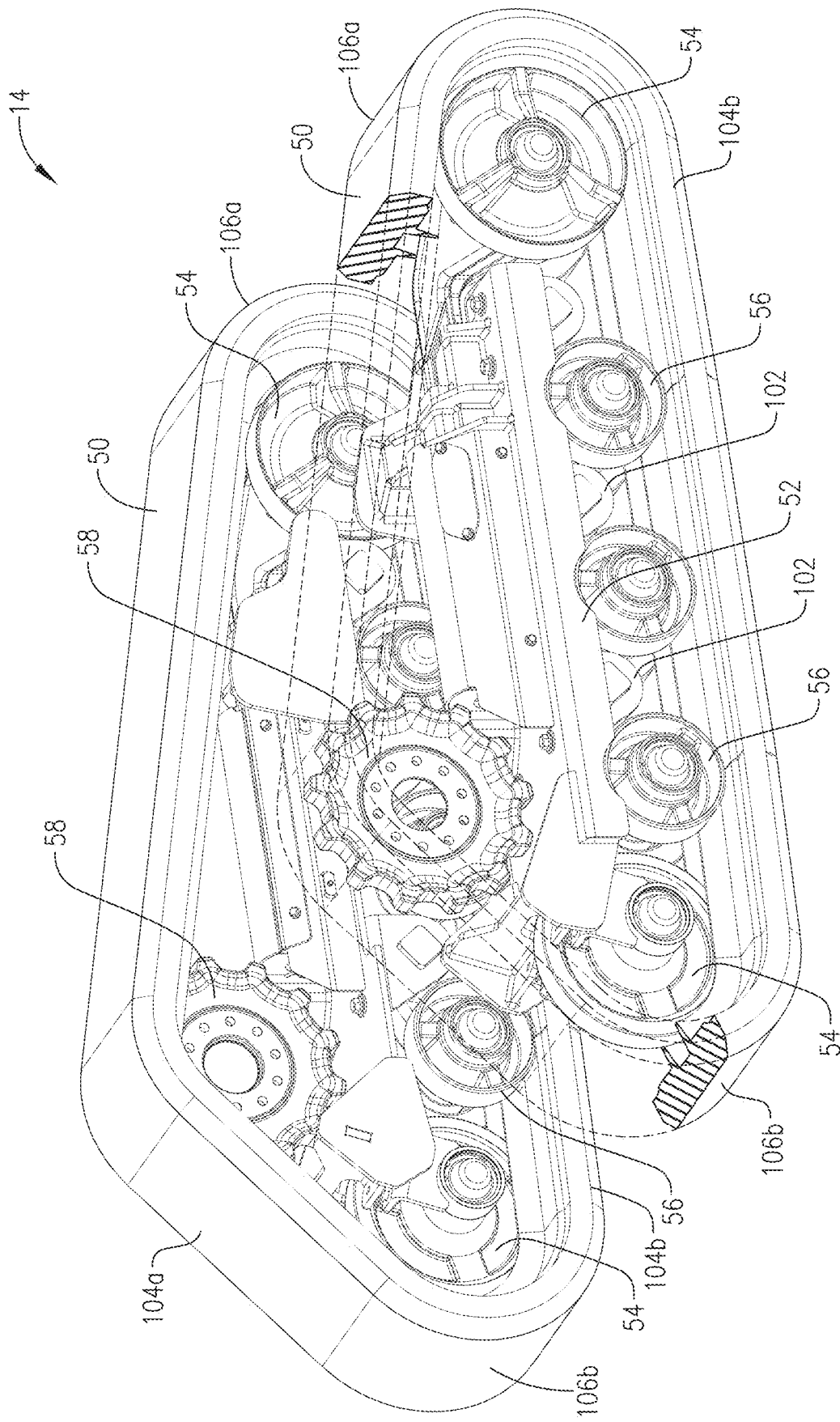
FIG. 17 is a right side elevation view of the tracked drive assembly from FIG. 16, depicting endless tracks, track frames, idler wheels, roller wheels, and drive sprockets.
Figure 18:
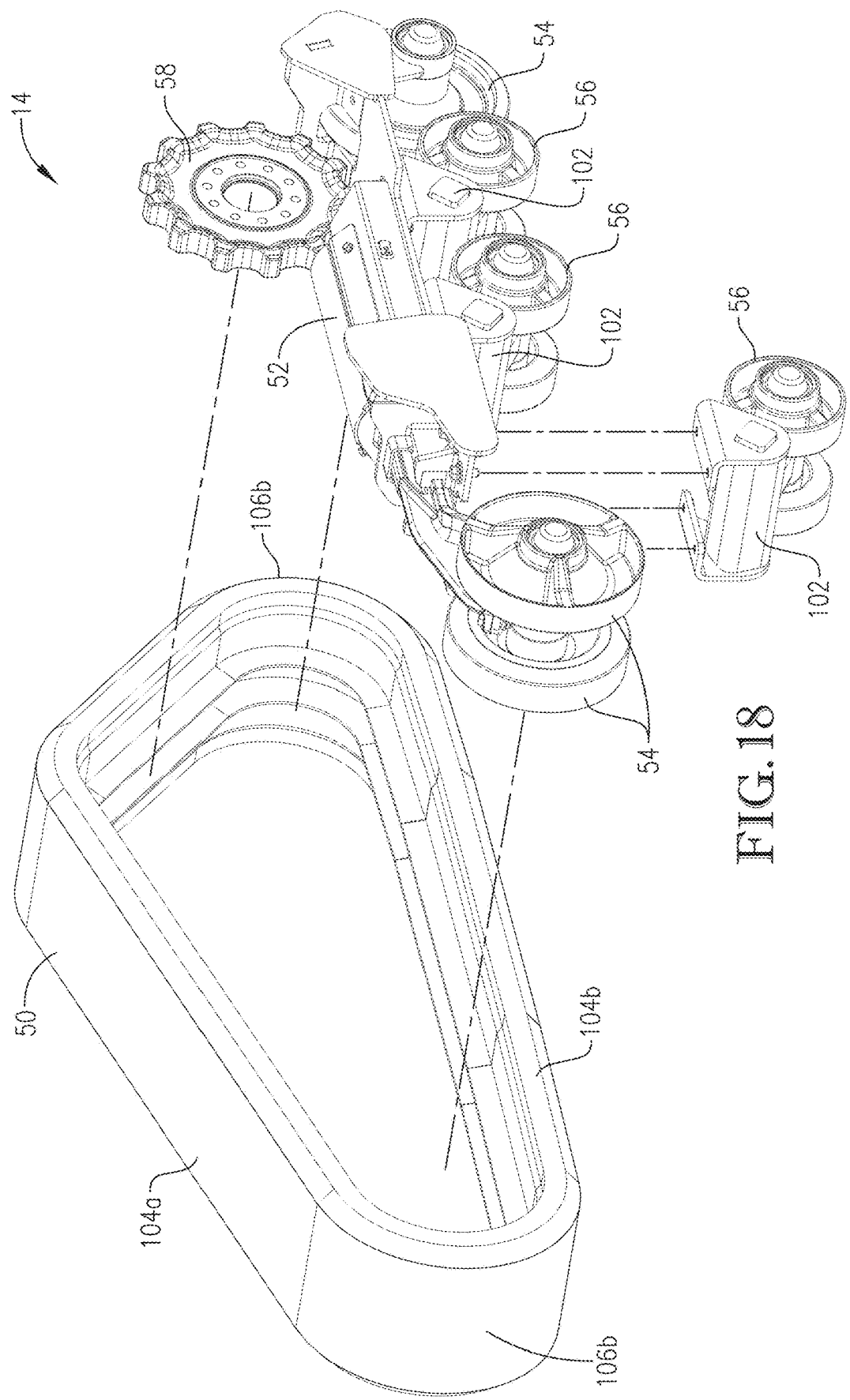
FIG. 18 is an exploded front perspective view of the tracked drive assembly from FIG. 16 to FIG. 17, showing one of the tracks exploded from the corresponding track frame, drive sprocket, idler wheels, and roller wheels.
Figure 19:
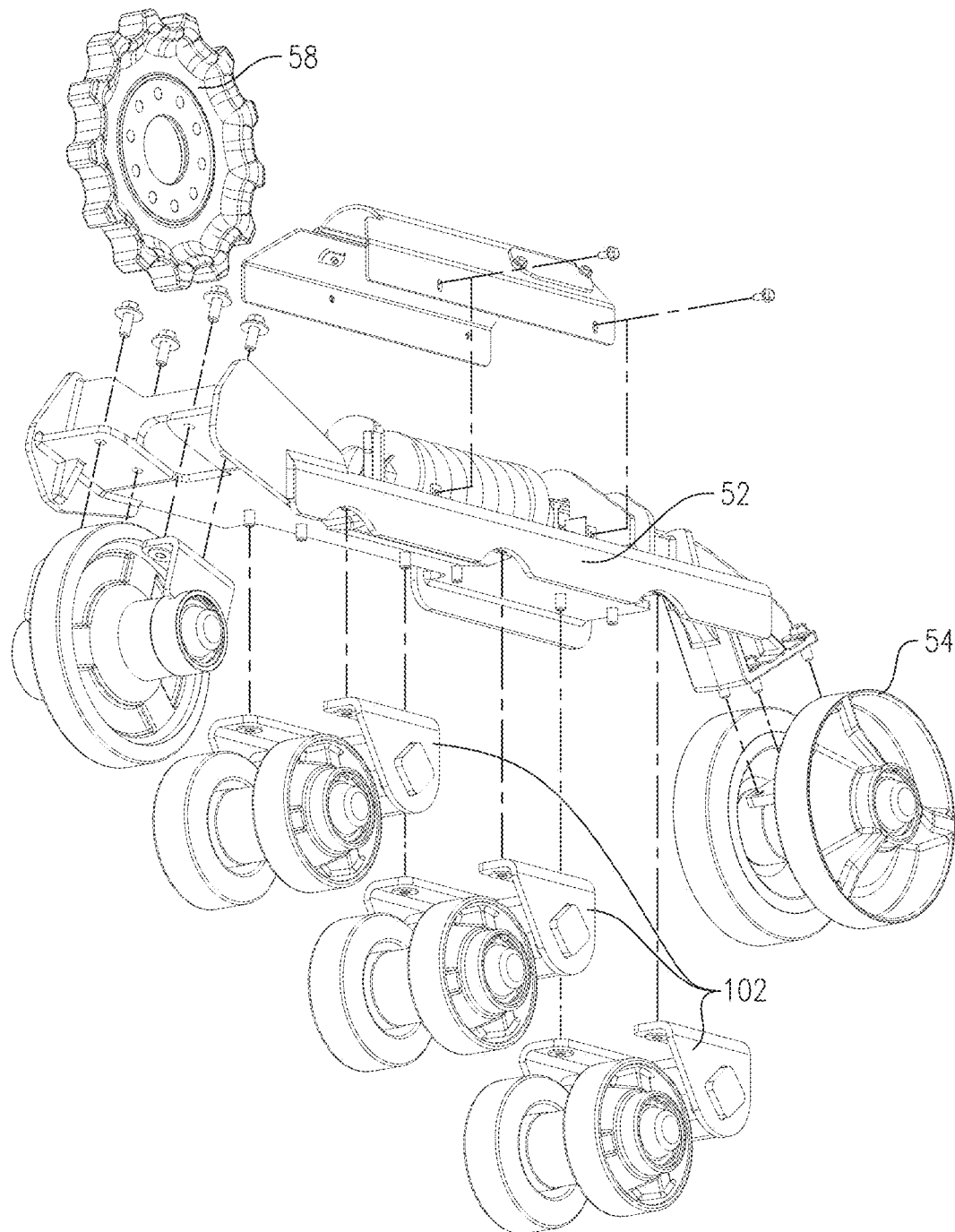
FIG. 19 is an exploded rear perspective view of the tracked drive assembly from FIG. 18 depicting the drive sprocket, idler wheel, and roller wheels exploded from the track frame.

Turning to FIG. 16 through FIG. 22, tracked drive assembly 14 supports the loader frame 12 on ground (or another work surface) and is configured to propel the loader 10 over the ground. As will be described, drive assembly 14 permits advancement of the loader 10 over an undulating work surface and/or obstacles on the work surface, while the loader 10 maintains a stable footing. Moreover, the loader 10 remains stable while supporting and/or shifting a load relative to the work surface. The illustrated drive assembly 14 broadly includes, as shown in FIGS. 16 and 17, a pair of endless tracks 50, track frames 52, idler wheels 54, roller wheels 56, drive sprockets 58, and torsion axles 102.

Each track 50 extends along a fore-and-aft extending loader axis A1 (See FIG. 16) defined by the loader frame 12. Track 50 includes upper and lower runs 104a,104b extending longitudinally between forward and aft track margins 106a,106b. As will be described, each track 50 is entrained on respective idler wheels 54 and roller wheels 56. Roller wheels 56 are in rolling engagement with the lower run 104b and are spaced longitudinally between the idler wheels 54.

In the usual manner, idler wheels 54 are rotatably supported relative to the loader frame 12 and the track frames 52 via bearings. The idler wheels 54 preferably serve to support the track 50 adjacent the forward and aft track margins 106a,106b. It will be appreciated that the idler wheels 54 are shiftable relative to each other along the length of the loader axis A1. For instance, at least one of the idler wheels 54 may be shiftably mounted relative to the loader frame 12, such that the idler wheel 54 operates as a tensioner to support the track adjacent a respective one of the forward and aft track margins. In this manner, idler wheels 54 may be adjustably positioned to snugly entrain the track 50 onto idler wheels 54, roller wheels 56, and drive sprocket 58. In at least certain embodiments, at least one of the idler wheels 54 may be rigidly mounted relative to the loader frame 12 to support the track adjacent a respective one of the forward and aft track margins.

While being in rolling engagement with the lower run 104b, roller wheels 56 are shiftably supported relative to the idler wheels 54 to permit up-and-down movement of at least part of the lower run 104b relative to the idler wheels 54. Each roller wheel 56 is shiftably supported by a torsion arm of a respective torsion axle 102 for shifting relative to an axle pivot joint 108. Each roller axis A2 of the roller wheel 56 is preferably in a trailing position relative to the corresponding axle pivot joint 108 (see FIG. 21).

Figure 20:
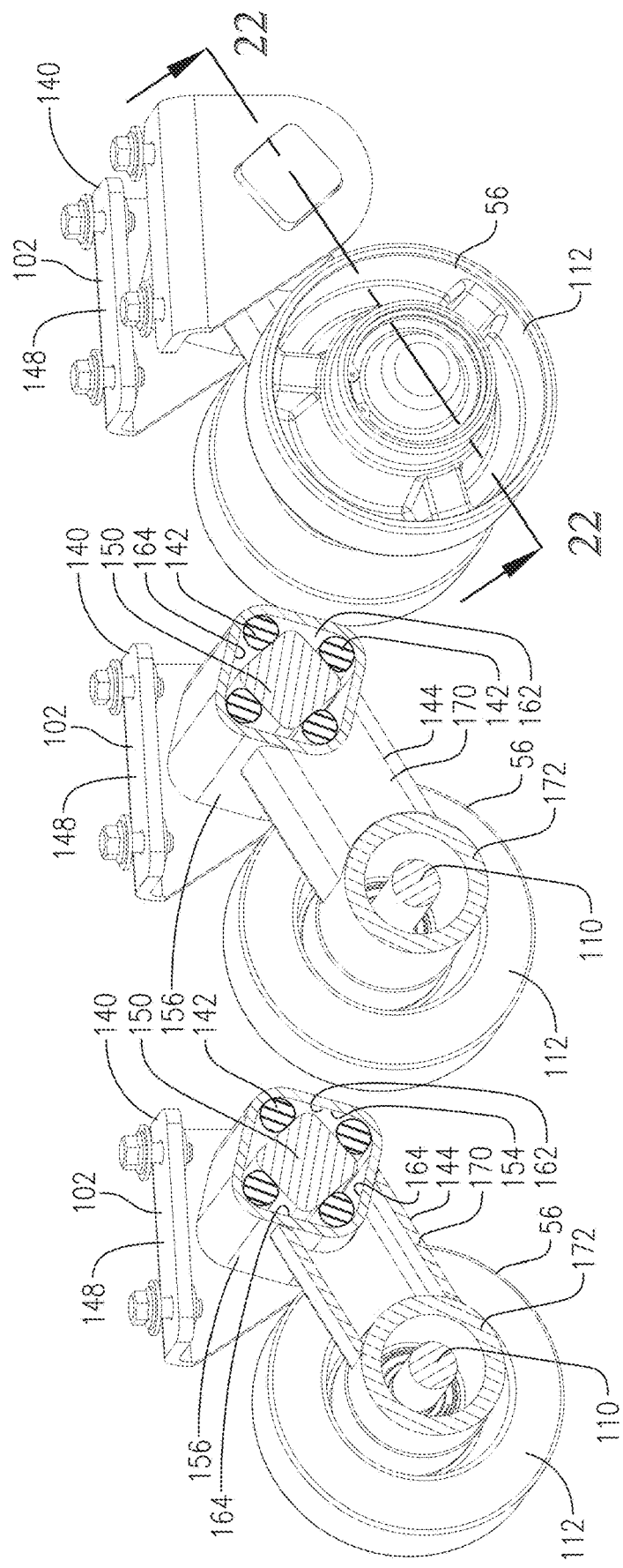
FIG. 20 is a fragmentary side perspective view of the tracked drive assembly from FIG. 18, depicting roller wheels that each include a torsion axle in a neutral condition.
Figure 21:
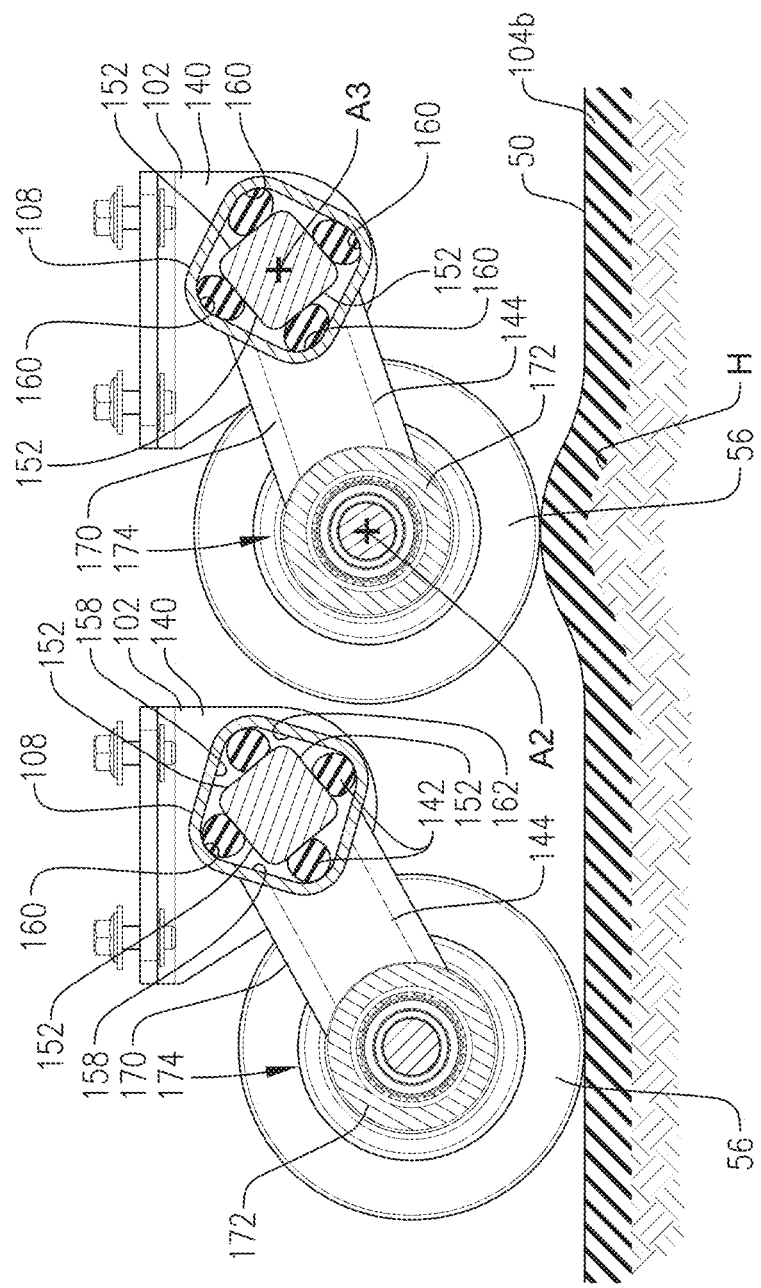
FIG. 21 is a fragmentary side elevation view of the tracked drive assembly similar to FIG. 20, but showing one of the roller wheels be advanced over a surface undulation and the corresponding swung from the neutral condition to a flexed condition in which inserts of the torsion axle are deformed.
Figure 22:
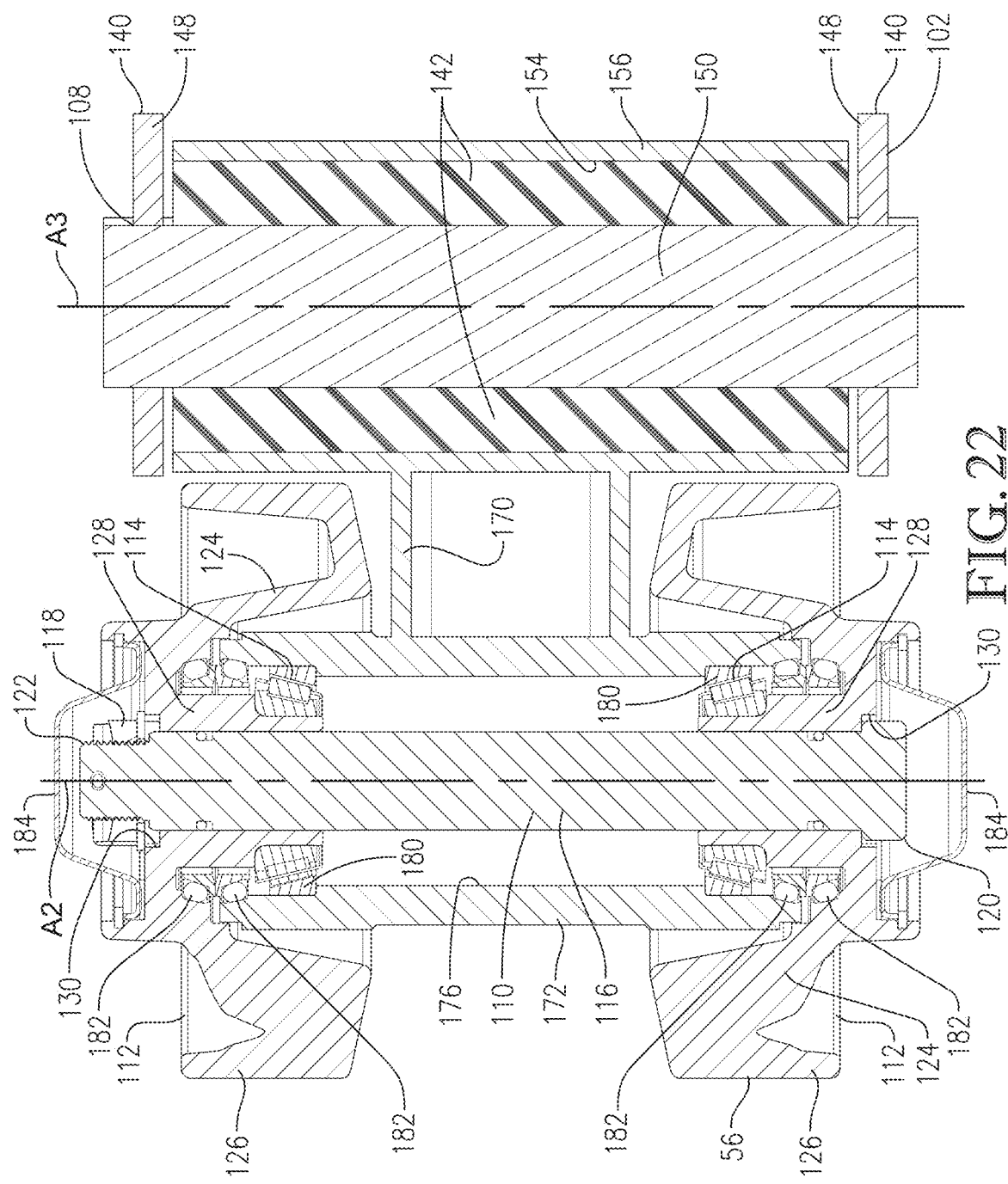
FIG. 22 is a cross-sectional view of one roller wheel taken along the cross-sectional line 22-22 shown in FIG. 20, showing an axle mount, torsion arm, and shiftable axle spindle.

Turning to FIGS. 20-22, roller wheel 56 includes a roller axle 110 and rollers 112 mounted on the axle 110. Roller wheel 56 preferably includes a pair of rollers 112 fixed to the roller axle 110 on opposite sides of a torsion arm. That is, rollers 112 are fixed to the roller axle 110 so that the roller axle 110 and rollers 112 are rotatable with one another. As will be described, the depicted roller axle 110 is rotatably supported relative to the torsion axle 102 by bearings 114 (See FIG. 22). Although rollers 112 are preferably located on opposite sides of the torsion arm, alternative embodiments of roller wheels 56 may have one or more rollers, with all of such rollers being located inboard of the torsion arm or outboard of the torsion arm.

It is also within the scope of certain aspects of the present invention for one or more rollers to be alternatively supported for rotation. In alternative embodiments, rollers may be rotatably mounted on the roller axle (e.g., by one or more bearings). In such embodiments, it will be appreciated that the roller axle does not rotate with the rollers. Instead, the rollers are freely rotatable relative to the roller axle. Although each roller axle preferably receives a pair of rollers, alternative embodiments of a roller wheel may include a roller axle with a single roller or a roller axle with more than two rollers.

In the illustrated embodiment, roller axle 110 and each of said rollers 112 include, respectively, complemental male elements and female elements that engage one another to restrict relative rotation between the roller axle 110 and the rollers 112. More specifically, and with reference to FIG. 22, the depicted roller axle 110 includes an elongated axle pin 116 and a threaded fastener 118. Axle pin 116 includes an enlarged head end 120 and a threaded end 122 that is configured to removably receive the fastener 118.

Roller 112 has a unitary construction and includes a wheel body 124, an outermost rim 126, and a central hub 128. The hub 128 presents a countersunk bore 130 that is configured to receive the roller axle 110. In particular, axle pin 116 is configured to be extended through countersunk bores 130 and secured by the fastener 118.

It is also within the ambit of certain aspects of the present invention for the roller axle and roller to be alternatively fixed relative to each other. In such alternative embodiments, the roller may be alternatively fixed to the roller axle (e.g., with one or more pins, threaded fasteners, welds, and/or adhesive) so that the roller and roller axle rotate with one another. For certain aspects, one or more rollers may be rotatable relative to the roller axle (for instance, one or more rollers may be rotatably mounted on the roller axle with respective bearings).

Turning to FIG. 20 through FIG. 22, each torsion axle 102 shiftably urges a respective roller wheel 56 into rolling engagement with the lower run 104b (See FIG. 21) and permits up-and-down movement of at least part of the lower run 104b relative to the idler wheels 54 and the track frame 52. Torsion axle 102 preferably includes an axle mount 140, elastomeric inserts 142, and a torsion arm 144 that cooperatively define the axle pivot joint 108. Torsion arm 144 is swingably supported relative to the axle mount 140 by the elastomeric inserts 142 and rotatably supports the corresponding roller wheel 56.

The depicted axle mount 140 includes opposed mounting brackets 148 and a laterally extending torsion bar 150 that interconnects the mounting brackets 148. Torsion bar 150 shiftably supports the torsion arm 144 and permits swinging movement of the torsion arm 144 relative to the track frames 52 and loader frame 12 about a lateral pivot axis A3 (See FIGS. 21 and 22).

Preferably, torsion bar 150 has a unitary construction and presents a generally square cross-sectional profile shape that is substantially uniform along the axial length of the torsion bar 150. The torsion bar 150 presents generally flat inner surfaces 152 configured to engage the inserts 142 (See FIGS. 20 and 21).

Torsion arm 144 presents a laterally extending bore 154 that rotatably receives the torsion bar 150. In particular, torsion arm 144 includes a tubular housing 156 supported along the length of the torsion bar 150. Preferably, the tubular housing 156 presents the bore 154, which has a generally square cross-sectional profile shape that is generally uniform along the axial length of the housing 156. The housing 156 presents generally flat interior surfaces 158 and concave interior surfaces 160 located between adjacent flat interior surfaces 158 to receive and engage the inserts 142 (see FIG. 21).

Bore 154 is preferably oversized relative to the torsion bar 150 so that the torsion bar 150 and housing 156 may rotate relative to each other and cooperatively define a space 162 therebetween. Furthermore, the space 162 is preferably sized to receive the inserts 142. In particular, each concave outer surface 160, the respective pair of adjacent flat interior surfaces 158, and the corresponding flat inner surface 152 of the torsion bar 150 cooperatively define a pocket 164 to receive a corresponding insert 142 (see FIG. 20).

With the housing 156 and torsion bar 150 located relative to each other in a neutral position, the inserts 142 are located in corresponding pockets 164 in a relatively relaxed condition in which the insert material is generally unflexed and uncompressed. However, for at least certain aspects of the present invention, one or more inserts may be at least partly flexed and/or at least partly compressed while in the neutral position.

As the housing 156 is rotated relative to the torsion bar 150 about the pivot axis A3 (See FIG. 21) out of the neutral position, it will be appreciated that the inner surfaces 152 and interior surfaces 158,160 cooperatively compress the inserts 142. As the housing 156 is progressively rotated away from the neutral position toward a series of flexed positions, the inserts 142 provide increasing resistance to further rotation of the housing 156 away from the neutral position. That is, the inserts 142 serve as springs to apply an increasing torque to the housing 156 as the housing is progressively rotated away from the neutral position. Accordingly, the inserts 142 cooperatively urge the housing 156 from a flexed position toward the neutral position.

Although the illustrated torsion bar spring configuration is preferred, it is within the scope of at least certain aspects of the present invention for the drive assembly to have alternative torsion bar features to shiftably support roller wheels. For instance, while the generally square profile shapes of the housing 156 and torsion bar 150 provide four (4) pockets 164 to receive four (4) corresponding inserts 142, the housing and/or torsion bar may be alternatively configured to provide fewer than four (4) pockets or greater than four (4) pockets.

Again, each torsion axle 102 preferably includes the depicted torsion bar spring configuration. However, for certain aspects of the present invention, one or more axles shiftably supporting the roller wheels may utilize a suspension spring other than a torsion bar spring.

Preferably, each torsion axle 102 is configured to support a respective one of the roller wheels, so that the roller wheels are independently supported for shifting movement relative to the track frame 52 and loader frame 12. It is also within the ambit of certain aspects of the present invention for more than one roller wheel of the drive assembly to be supported by a common torsion axle. Alternatively, one or more roller wheels may be cooperatively supported by a combination of multiple axles and/or spring-loaded supports.

The illustrated torsion arm 144 includes a radially extending tube 170 and a cylindrical sleeve 172 mounted at a distal end 174 of the tube 170, as shown in FIGS. 20-22. Sleeve 172 presents a laterally extending bore 176 configured to operably receive the bearings 114 and the roller axle 110, with rollers 112 located at opposite ends of the sleeve 172. Preferably, bores 154 and 176 have axes that are substantially parallel with each other so that the roller axis A2 and pivot axis A3 are substantially parallel to one another (see FIG. 22).

It is within the scope of at least certain aspects of the present invention for the torsion arm to be alternatively configured for supporting swinging movement of the roller wheels 56. For instance, the tube may have an alternative shape, such as an alternative length dimension (measured along the tube axis), to accommodate suitable shifting of the roller wheels 56.

As mentioned above, the drive assembly 14 also preferably includes bearings 114, as shown in FIG. 22, that rotatably support the roller wheel 56 relative to the torsion arm 144 of torsion axle 102. Bearings 114 preferably comprise roller bearings that are mounted within counterbored holes 180 defined by opposite ends of the bore 176 (see FIG. 22). Bearings 114 are also mounted on the hubs 128 of respective rollers 112. Seals 182 are provided between the sleeve 172 and hubs 128 to restrict the ingress of contaminants into bearings 114. End caps 184 are also provided on the hubs 128 to cover the ends of the roller axles 110 and restrict contaminant ingress relative to that roller axles 110 and bearings 114.

The depicted torsion arm 144 is preferably configured to support rollers on opposite inboard and outboard sides of the torsion arm 144. It is also within the scope of at least certain aspects of the present invention for the roller wheels to be supported by an alternative torsion arm configuration. Such alternative embodiments may have a torsion arm located inboard and/or outboard of both rollers.

Each of the torsion arms 144 and roller wheels 56 are preferably biased toward the neutral position by respective sets of inserts 142 and are also operable to be shifted out of the neutral position as the track is advanced over a hump H (see FIG. 21) formed by undulating terrain and/or an obstacle. As the track advances over the hump, the roller wheels 56, torsion arm 144, and housing 156 are rotated relative to the torsion bar 150 about the pivot axis A3 out of the neutral position toward one of a series of flexed positions. As described above, as the housing 156 is progressively rotated out of the neutral position, the inner surfaces 152 and interior surfaces 158,160 increasingly compress the inserts 142. Accordingly, progressive compression of the inserts 142 causes the inserts 142 to apply a progressively increasing torque. Thus, the inserts 142 cooperatively urge the housing 156, torsion arm 144, and roller wheels 56 to rotate from the flexed position toward the neutral position.

HVAC

Turning to FIGS. 23 through 29, the HVAC system 44 is configured to provide an adjustable, temperature controlled airflow to the cab 20. Frame 12 presents a frame compartment 300, which defines the longitudinal loader axis A1, that is configured to support and receive the HVAC system 44.

In the usual manner, cab 20 preferably presents a cab interior 302 configured to receive an operator during loader use. The cab 20 and the access door 28 are each configured to selectively open and close so as to provide access to the compartment 300 of the frame 12 (see FIGS. 2, 11 and 12). In particular cab 20 is swingably connected relative to the loader frame 12 at a cab pivot joint 304 and is shiftable into and out of an operating position, in which the cab 20 is configured to receive an operator during loader use. In the operating position, the cab 20 at least partly overlies and is positioned adjacent to the frame compartment 300 in the operating position.

Figure 26:
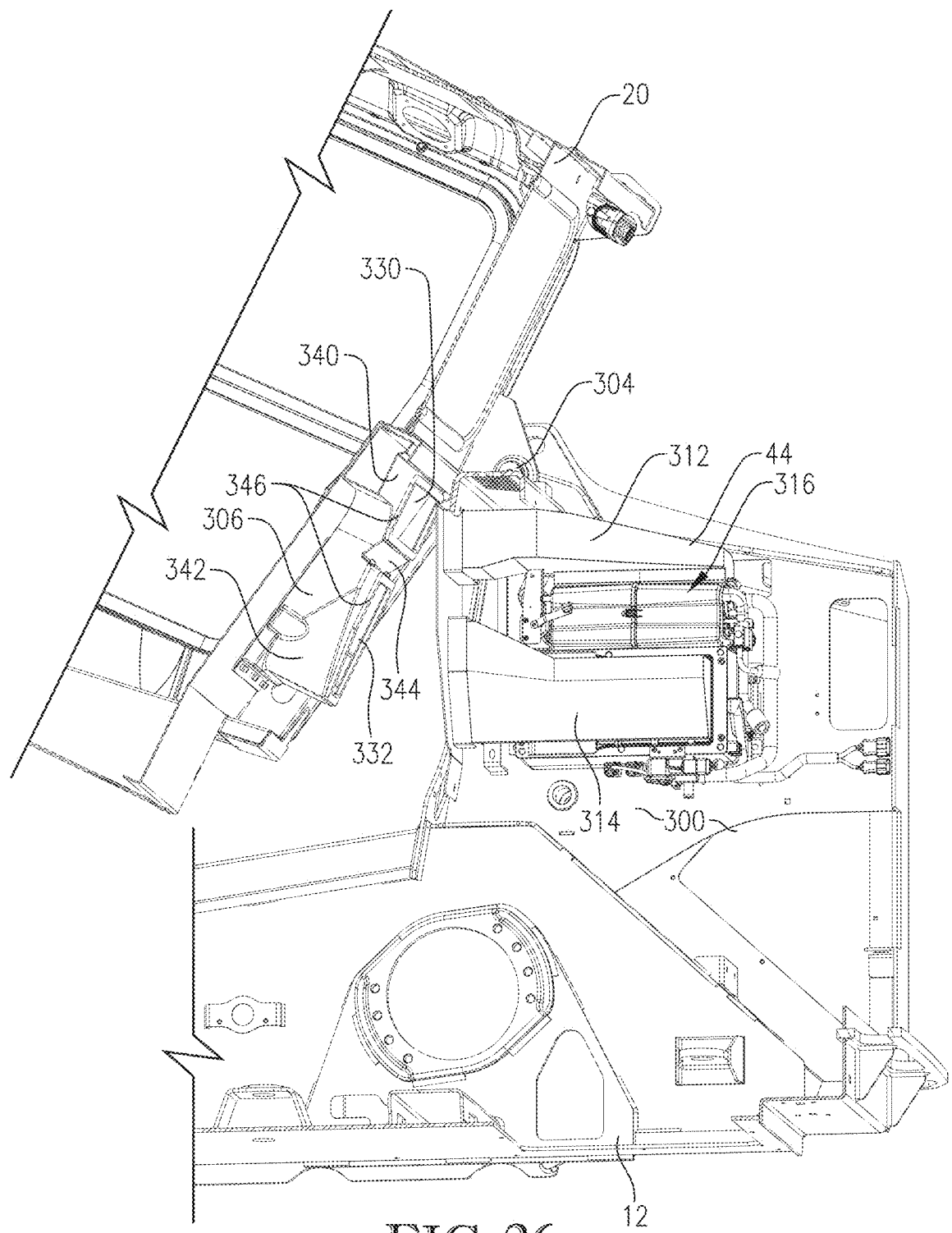
FIG. 26 is a fragmentary right side elevation of the loader similar to FIG. 3-25, but showing the cab swung into an access position.

Preferably, the pivot joint 304 permits the cab 20 to swing between the operating position (e.g., FIGS. 23-25) and an access position (e.g., FIG. 26). In the illustrated embodiment, the cab pivot joint 304 preferably defines a horizontal pivot axis permitting the cab 20 to swing vertically when moving between the operating position and the access position.

In the access position, at least part of the cab 20 is shifted away from the loader frame 12 to expose the frame compartment 300, with portions of the HVAC system 44 (described in greater detail below) being fluidly disconnected from the cab 20. It is also within the ambit of certain aspects of the present invention for the cab 20 to be alternatively shiftably supported relative to the loader frame 12. For certain aspects of the present invention, alternative loader embodiments may include at least part of the cab as being fixed relative to the loader frame.

Figure 29:
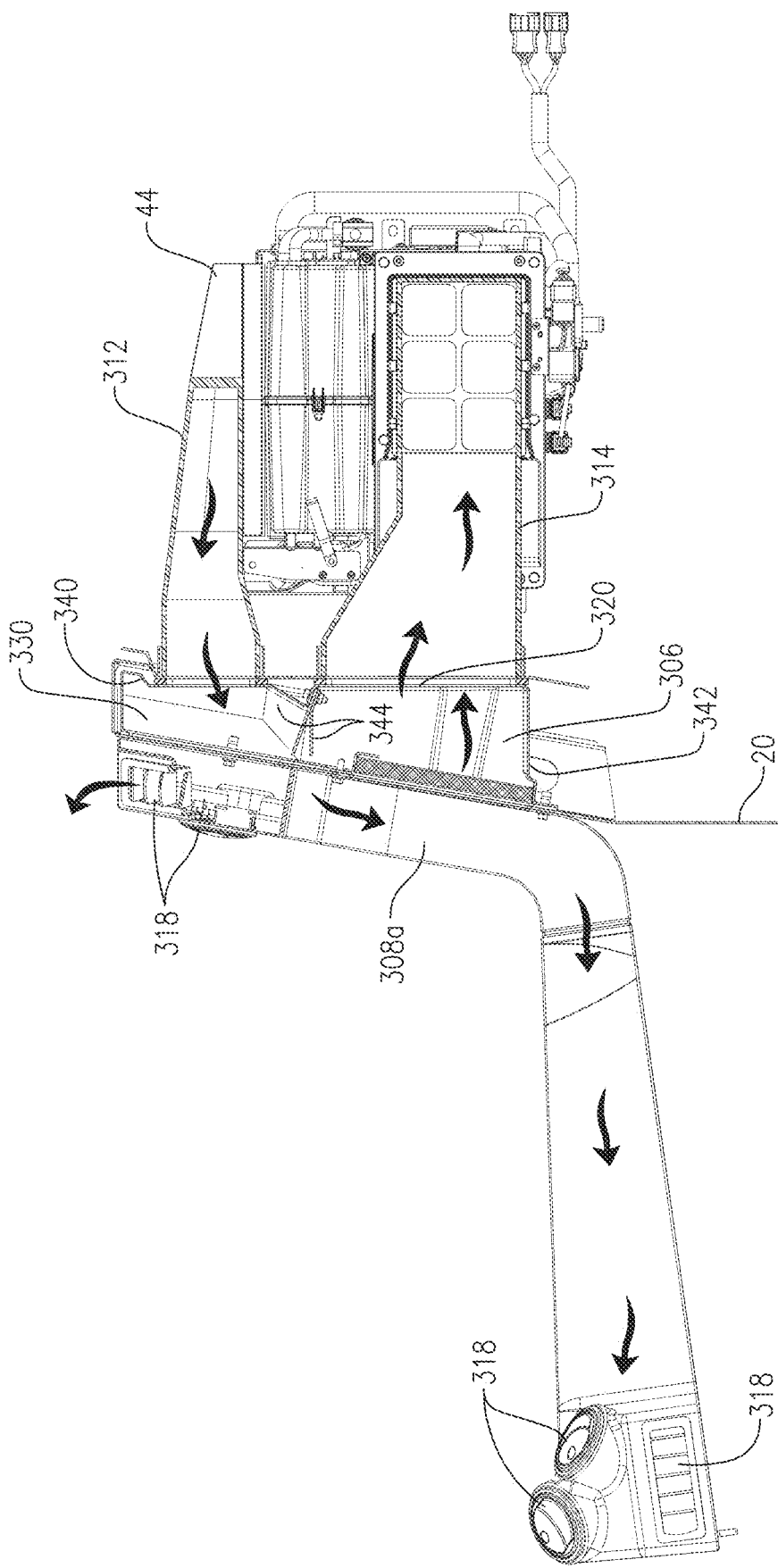
FIG. 29 is a fragmentary side elevation of the loader shown in FIG. 27 and FIG. 28.

As will be described further, and as illustrated in FIG. 29, the HVAC system 44 includes a manifold 306 coupled with a back side of the cab 20, with the manifold 306 facilitating selective fluid communication between the interior 302 of the cab 20 and other component of the HVAC system 44. Although the manifold 306 may form part of the HVAC system 44, in some embodiments, the manifold 306 may form part of the cab 20. The preferred HVAC system 44 also includes supply ducts 308a,308b positioned within the interior 302 of the cab 20, which aid in supplying or extracting temperature controlled airflow to/from the cab 20.

Figure 27:
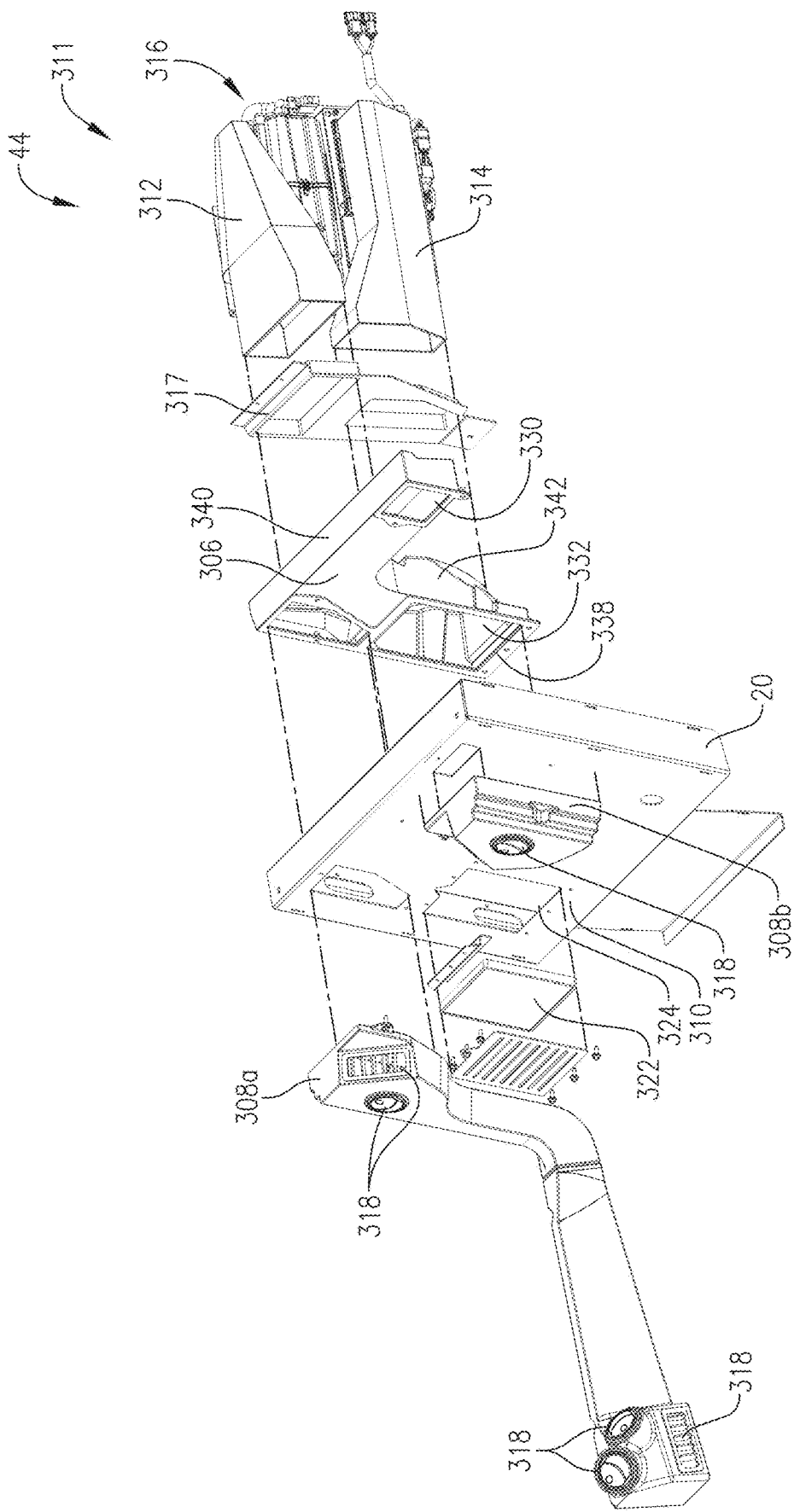
FIG. 27 is an exploded front perspective view of the loader from FIG. 23 to FIG. 26, depicting the loader frame and portions of the cab removed to show the HVAC system, the manifold, a supply duct, and a return structure.
Figure 28:
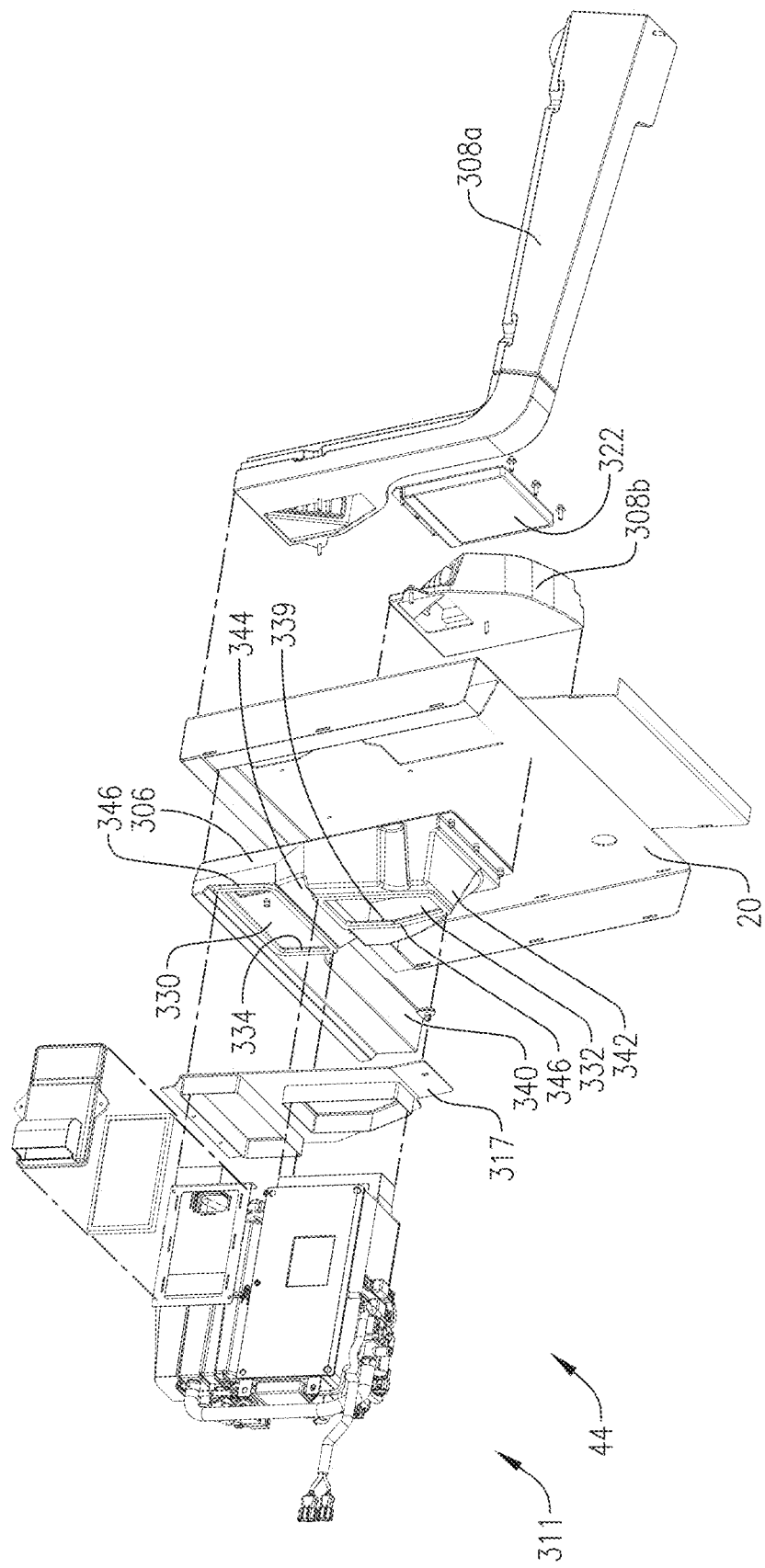
FIG. 28 is an exploded rear perspective view of the loader similar to FIG. 27, but taken from the opposite side.

As illustrated in FIGS. 27 and 28, HVAC system 44 includes an HVAC unit 311, a supply plenum 312, and a return plenum 314. The HVAC unit 311 may comprise an evaporator 316, a condenser, a receiver drier, a fan, and a compressor. In the usual manner, the return plenum 314 receives a relatively warm return air flow from the cab 20 and directs the return air flow through the evaporator 316. Air flow is chilled while passing through the evaporator 316. The chilled air flow is then supplied through the supply plenum 312 and discharged from the HVAC system 44 for circulation within the cab 20. In some embodiments, certain components of the HVAC system 44 and/or the HVAC unit 311 may be supported by the frame 12 of the loader 10. For example, the evaporator 316, condenser, receiver drier, and fan may be directly supported by the frame 12. However, other components may be indirectly supported by the frame 12. For instance, the compressor of the HVAC system 44 and/or the HVAC unit 311 may be supported by/on the engine 30 of the loader 12, such that the compressor is indirectly supported by the frame 12.

In preferred embodiments, the illustrated loader 10 has a cab 20 that is configured so that no part of the HVAC unit 311 is located within the cab interior or supported on the cab (such that the cab is devoid of any component of the depicted and described HVAC unit 311). Furthermore, the HVAC unit 311 is fluidly connected to the interior 302 of the cab 20 when the cab 20 is in the operating position and is not fluidly connected to the interior 302 of the cab 20 when the cab 20 is in the access position. It has been found that the preferred configuration of the cab and HVAC unit 311, along with their relative positioning, provides the loader 10 with a relatively compact envelope, efficient maintenance capabilities (e.g., via easy access the HVAC unit 311 when the cab 20 is in the access position), and reliable operation, among other numerous advantages.

HVAC system 44 further includes an interface flange 317. The flange 317, as shown in FIG. 27, includes elements that are integrally provided as respective parts of the supply plenum 312 and the return plenum 314. In the illustrated embodiment, flange 317 also preferably joins forward ends of the supply plenum 312 and return plenum 314. The interface flange 317 presents a flange face that is configured to be located in abutting engagement with the manifold 306 when the cab of the loader 10 is in the operating position. Preferred embodiments of the interface flange may be variously configured within the ambit of the present invention. For instance, embodiments of the interface flange may include a weldment and/or a sheet metal plate. The flange 317 may be integrally formed with the supply plenum 312 and the return plenum 314, or the flange 317 may be a separate component.

In more detail, the manifold 306 (described in more detail below), is rigidly secured to the back side of the cab 20. The supply and return plenums 312, 314 are configured to releasably mate with the manifold 306 (i.e., via the interface flange 317). Specifically, when the cab 20 is in the lowered operating position, the supply and return plenums 312, 314 engage with the manifold 306 (See FIG. 25). In contrast, when the cab 20 is in the raised, access position, the supply and return plenums 312, 314 are disengaged from the manifold 306 (See FIG. 26).

Figure 23:
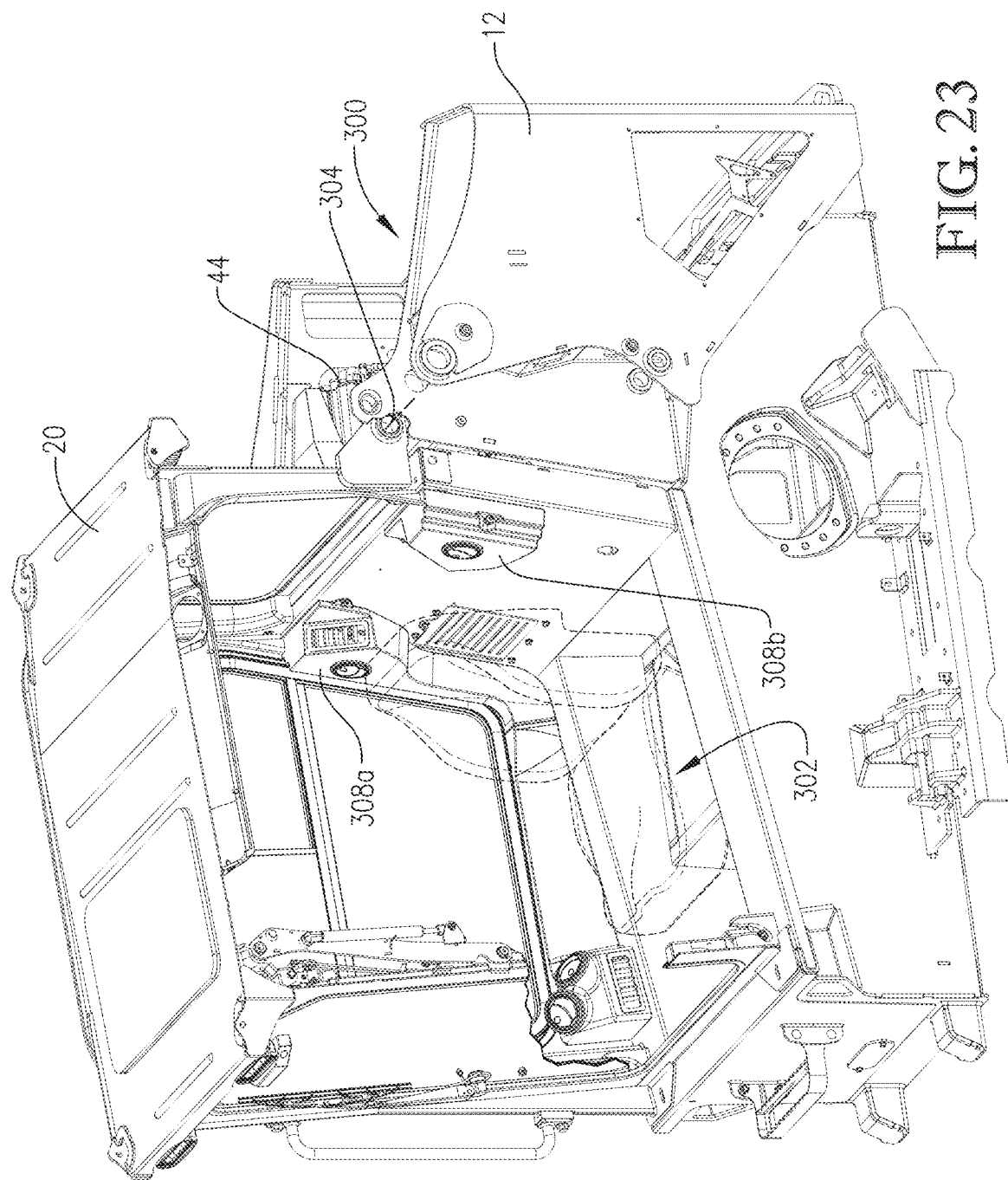
FIG. 23 is a fragmentary front perspective view of the loader from FIG. 1 to FIG. 8, depicting the cab supported on the loader frame in an operating position.
Figure 24:
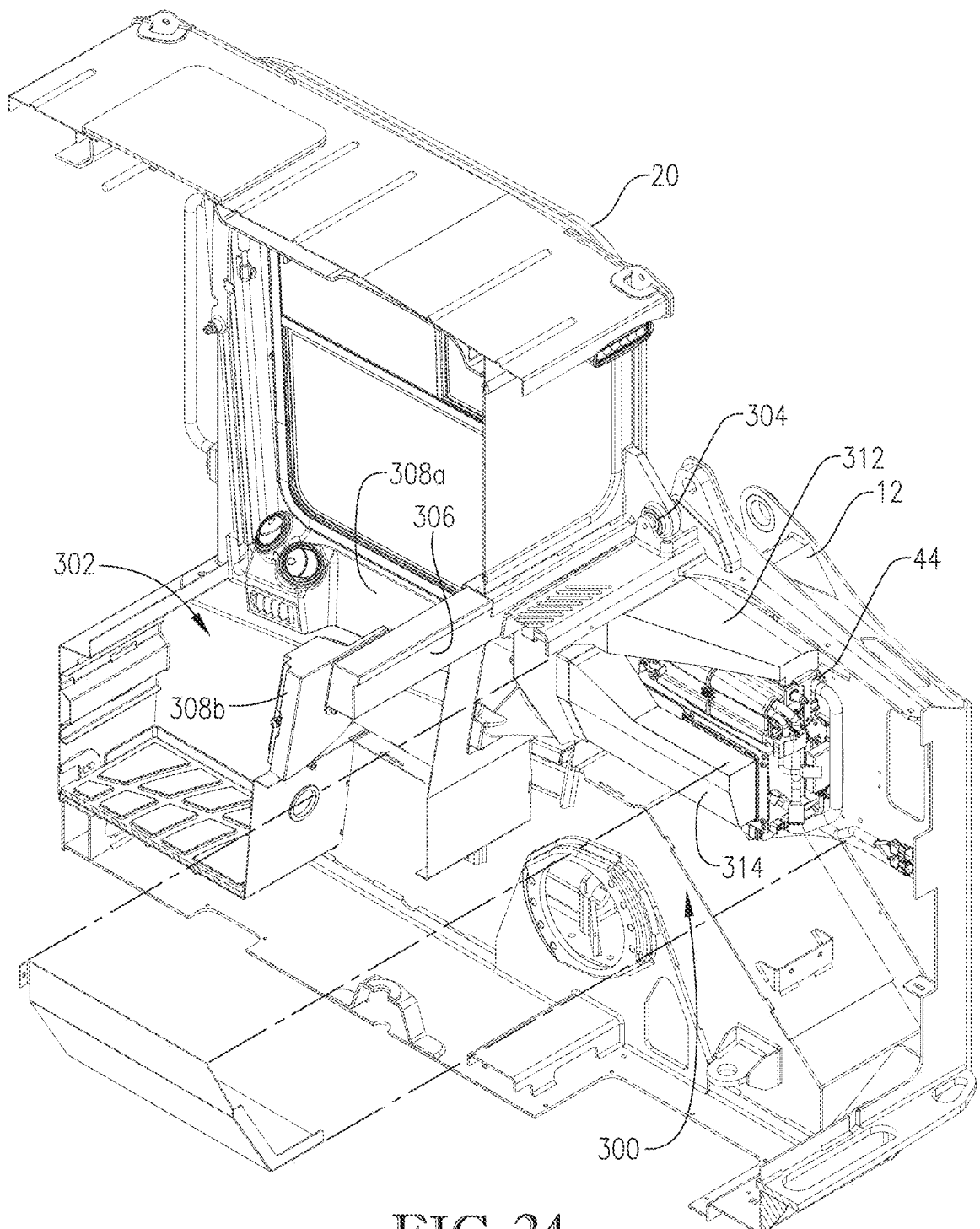
FIG. 24 is a fragmentary rear perspective view of the loader from FIG. 23, with part of the loader frame broken away to depict an HVAC system received within a frame compartment.
Figure 25:
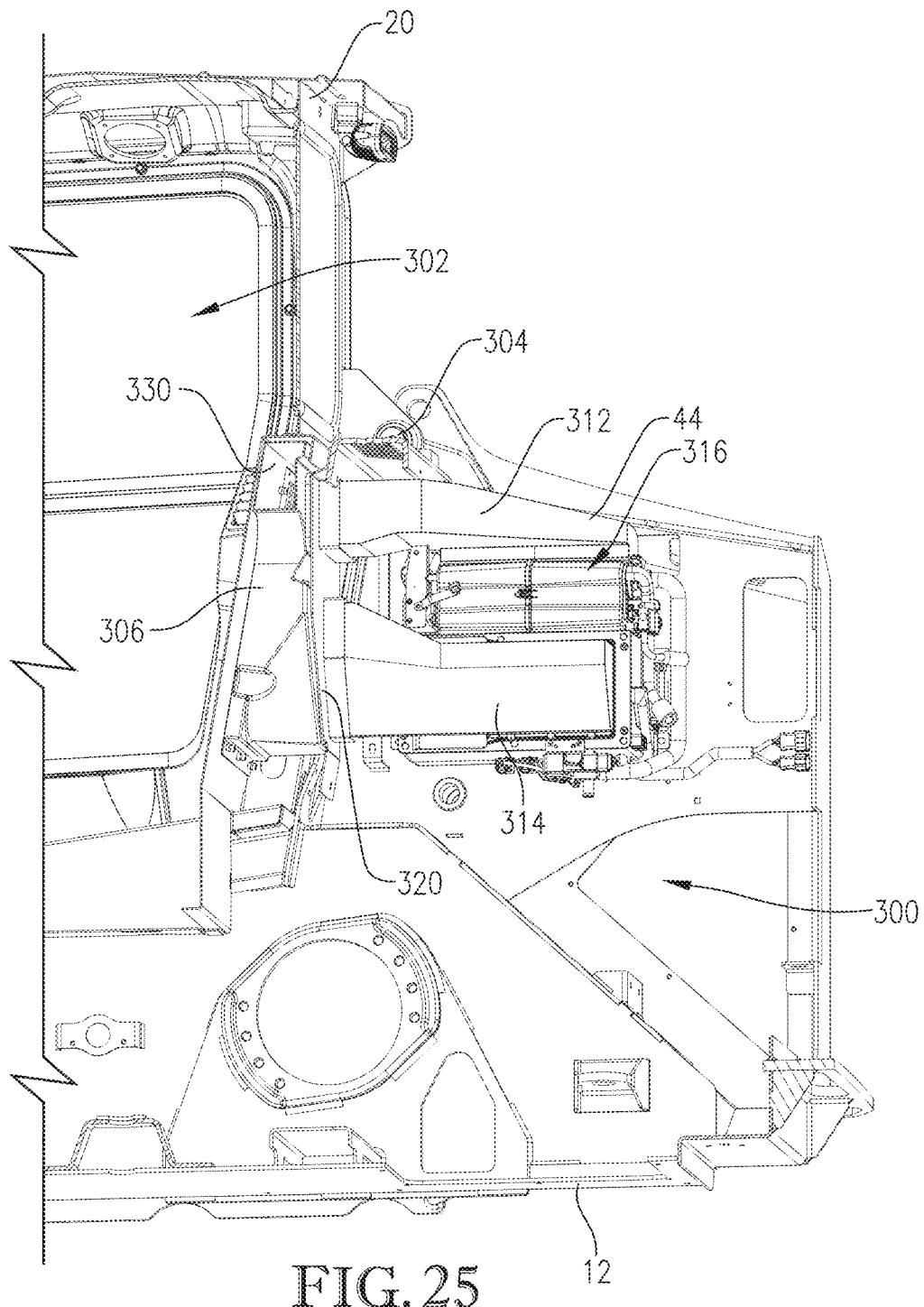
FIG. 25 is a fragmentary right side elevation of the loader from FIG. 23 to FIG. 24, showing the HVAC system operably associated with the cab, with the cab including a manifold to provide fluid communication between the HVAC system and the cab interior.

As such, the supply ducts 308a,308b of the HVAC system 44, which supported within the interior 302 of the cab 20, as shown in FIGS. 23 and 24, are in fluid communication with the HVAC unit 311, via the manifold 306, when the cab 20 is in the operating position. As such, the supply ducts 308a, 308b are operable to receive supply air discharged from the supply plenum 312. Supply ducts 308a,308b are further configured to direct supply air into the interior of the cab 20 via the use of air supply vents 318. In contrast, the supply ducts 308a,308b of the HVAC system 44, are not in fluid communication with the HVAC unit 311 when the cab 20 is in the access position (due to the supply plenum 312 being disengaged from the manifold 306). As such, the supply ducts 308a, 308b are not operable to receive supply air discharged from the supply plenum 312

It will be appreciated that the illustrated supply ducts 308a,308b provide a preferred configuration for supplying air to the cab interior. However, in alternative loader embodiments, one or more supply ducts may be alternatively configured within the scope of the present invention (e.g., to suitably supply air to the cab interior). For certain aspects of the present invention, embodiments of the loader may be configured so that only the manifold 306 provides a supply duct of the cab.

The return plenum 314 of the HVAC system 44 is operable to receive return air from the cab 20, as illustrated in FIG. 29. In particular, the illustrated cab 20 also preferably includes the return structure 310 (which is formed as part of the back side of the cab) and a cab filter 322 that is supported by the return structure 310 (See FIG. 27). The return structure 310 presents a return opening 342 through which return air is configured to flow from the interior 302 of the cab 20 toward the return plenum 314 via the manifold 306 (See FIG. 29) when the cab 20 is in the operating position.

It will be appreciated that return structure 310 is formed as part of the cab 20 and has a relatively small thickness. However, in alternative embodiments, the return structure may be alternatively configured within the scope of the present invention (e.g., to comprise a more elongated conduit or duct that may be required to suitably draw air from the cab interior).

Preferably, the return plenum 314 and manifold 306 are engaged with one another when the cab 20 in the operating position and are disengaged when the cab 20 is shifted out of the operating position into the access position. The depicted return plenum 314 and manifold 306 are preferably in abutting engagement with one another when the cab 20 is in the operating position to facilitate fluid communication between the return plenum 314 and the interior 302 of the cab 20. In contrast, with the return plenum 314 disengaged from the manifold 306 (with the cab 20 raised to the access position), the return plenum 314 does not receive returned air from the interior 302 of the cab 20. Thus, the HVAC unit 311 is in fluid communication with the interior 302 of the cab 20 when the cab 20 is in the operating position, while the HVAC unit 311 is not in fluid communication with the interior 302 of the cab 20 when the cab 20 is in the access position.

Again, cab 20 has a lower portion that may include one or more openings or ports configured to facilitate airflow into and out of the cab 20 from the HVAC unit 311. In the illustrated embodiment, an interface 320 (which may simply comprise the junction between the supply and return plenums 312, 314 and the manifold 306 (e.g., the interface 320 may be the interface flange 317)) provides fluid communication between the supply and return plenums 312, 314 and manifold 306 when the cab 20 is in the operating position so that the HVAC unit 311 and cab 20 fluidly communicate with one another (See, e.g., FIG. 25).

In the depicted embodiment, supply plenum 312 and the manifold 306 of cab 20 are in abutting engagement with one another in the operating position to facilitate fluid communication between supply plenum 312 and supply duct 308. Similarly, the return plenum 314 and manifold 306 of cab 20 are preferably in abutting engagement with one another in the operating position to facilitate fluid communication between the return plenum 314 and the return structure 310.

Manifold 306, as shown in FIG. 27, presents a supply air passage 330 and return air passage 332 that fluidly communicate with the supply plenum 312 and return plenum 314, respectively of the HVAC system 44. Manifold 306 also presents a single supply intake port 334 (See FIG. 28) and a pair of spaced apart supply discharge ports 336 (See FIG. 27) that fluidly communicate with the supply air passage 330. Manifold 306 further presents a return intake port 338 (See FIG. 27) and a return discharge port 339 (See FIG. 27) that fluidly communicate with the return air passage 332.

Although the manifold 306 is preferably associated and/or coupled with the cab 20, alternative embodiments of the loader 10 may have a manifold coupled with the supply and return plenums 312, 314 and/or the HVAC unit 311, such that the cab 20 is shiftable relative to the manifold.

Supply air and return air passages 330,332 of the manifold 306 fluidly communicate with the interior 302 of the cab 20 via the supply ducts 308a,308b and return structure 310, as illustrated in FIG. 29. Preferably, the supply plenum 312 and supply air passage 330 are operably engaged relative to one another along the interface 320 when the cab 20 is in the operating position to provide fluid communication between the HVAC system 44 and the cab 20.

As described above, the cab 20 is shiftable into and out of the access position in which at least part of the cab 20 is shifted away from the loader frame 12 (see FIG. 26). In the access position, the supply plenum 312 and supply ducts 308a, 308b are preferably disengaged from each other along the interface 320.

Preferably, manifold 306 includes a supply air manifold section 340 and a return air manifold section 342 that define respective supply air and return air passages 330,332, as shown in FIG. 28. Supply air manifold section 340 preferably extends laterally to present supply discharge ports 336 at opposite ends thereof. Preferably, manifold sections 340, 342 cooperatively form a unitary, integral manifold structure. For at least certain aspects of the present invention, manifold sections may be provided by a plurality of components that are removably attached to one another.

At least one of the manifold sections 340,342 define an intermediate wall structure 344 that separates the supply air and return air passages 330,332 from one another. Preferably, the wall structure 344 restricts fluid communication between the supply air and return air passages 330,332. The intermediate wall structure 344 defines at least part of the interface 320.

The depicted manifold 306 also preferably includes seal elements 346 that extend along the interface 320 to engage at least one of the supply plenum 312 and the return plenum 314 for restricting fluid communication therebetween.

Rear Frame

Turning to FIGS. 5 and 30 through 33, the frame 12 of loader 10 presents forward and aft frame ends 500,502 and the frame compartment 300. Frame 12 also defines the longitudinal loader axis A1, which extends between the forward and aft frame ends 500,502 (see FIG. 5). In the usual manner, loader 10 is configured to be advanced in a forward direction associated with the longitudinal loader axis A1.

As described above, the tracked drive assembly 14 includes, among other things, the endless tracks 50. Tracks 50 are transversely spaced relative to one another and are configured to propel the loader in the forward direction.

Again, loader frame 12 includes left and right sides 23,24. Loader frame 12 also presents the frame compartment 300, which defines the longitudinal loader axis A1. Loader frame 12 also includes a rear section 504 that extends rearwardly of the tracked drive assembly 14 to define a lower pocket 506 of the frame compartment 300.

Figure 30:
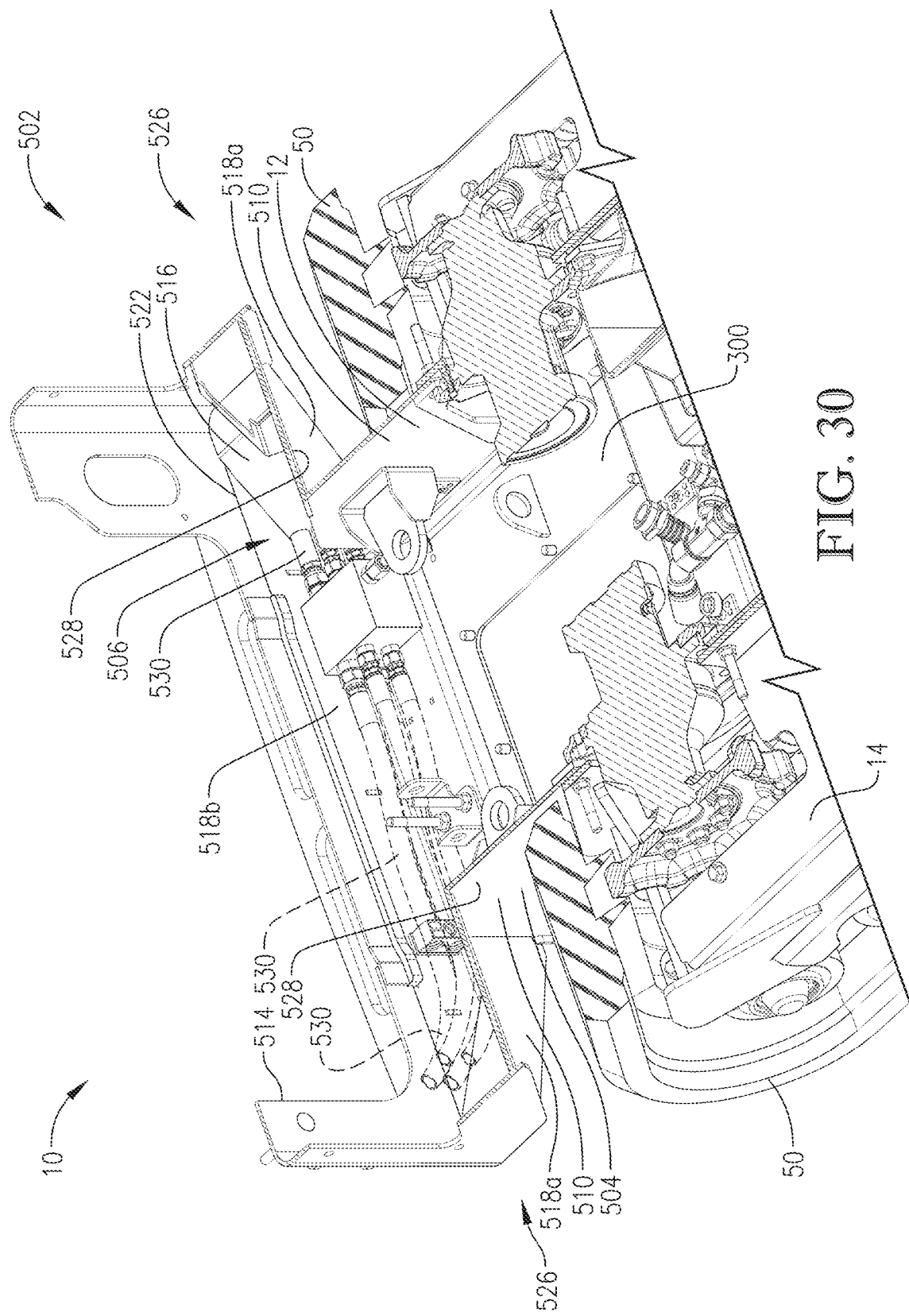
FIG. 30 is a fragmentary front perspective view of the loader from FIG. 1 to FIG. 8, depicting the loader cross sectioned to depict a rear section of the loader frame supported by the tracked drive assembly and including a frame compartment located between tracks of the tracked drive assembly, and further showing a lower channel of the rear section having a lower pocket, with fragmentary portions of conduits being illustrated as located within the lower pocket.

Left and right sides 23,24 of the loader frame 12 extend along the longitudinal loader axis A1 to form part of the rear section 504, as illustrated in FIG. 5. Sides 23,24 each preferably include an inner upright wall 510 extending longitudinally between the endless tracks 50, as shown in FIG. 30. Upright walls 510 are opposed to one another and define therebetween a respective portion of the frame compartment 300.

Figure 31:
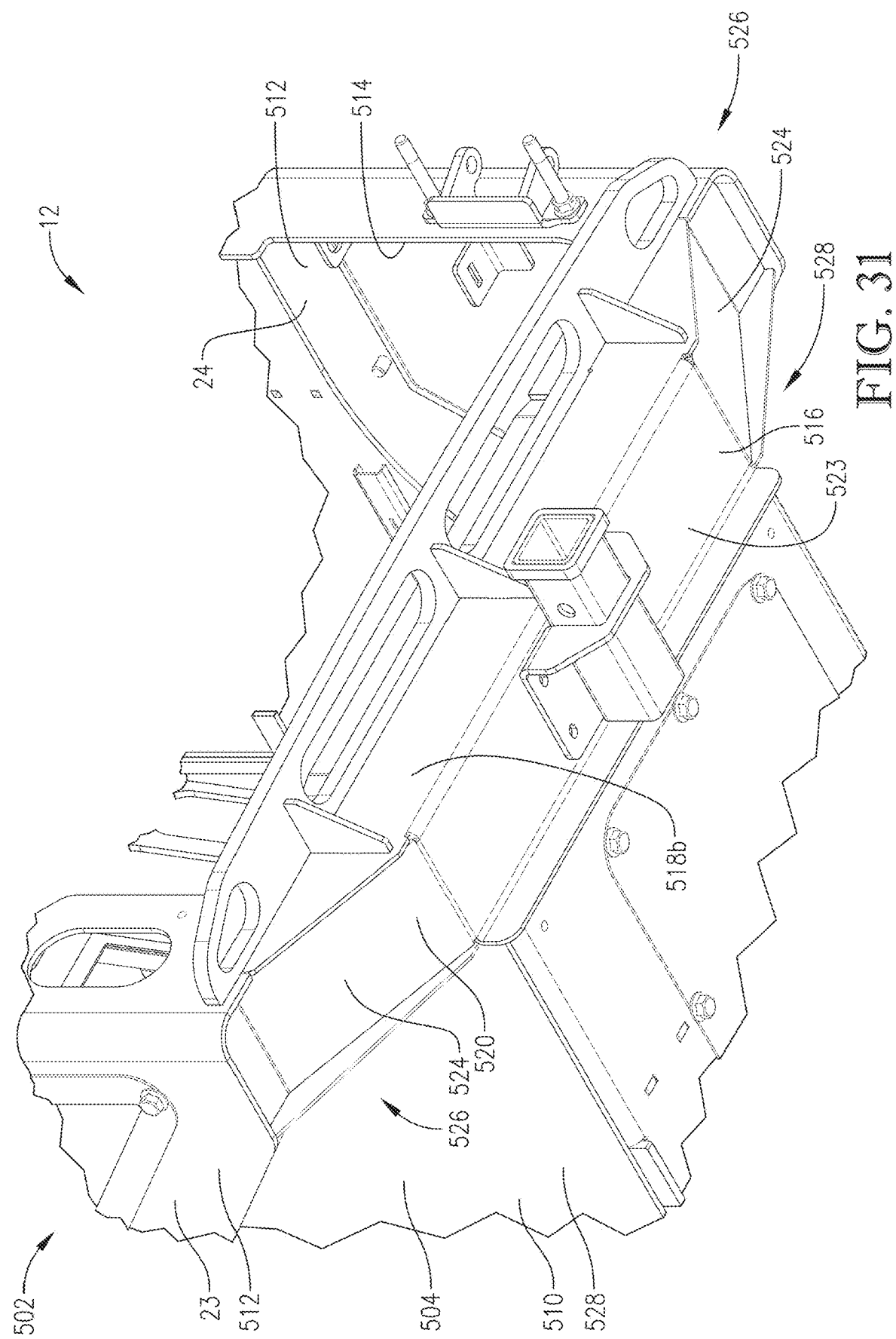
FIG. 31 is a lower rear perspective view of the loader from FIG. 30, depicting the lower channel located adjacent an aft frame end of the loader frame.

Preferably, sides 23,24 each further include a respective outboard wall 512 located adjacent the respective upright wall 510, as illustrated in FIG. 31. Rear section 504 extends in an outboard direction from the respective upright wall 510 to the corresponding outboard wall 512.

The rear section 504 of the loader frame 12 also presents an upright, rear-facing access opening 514 that provides user access to the frame compartment 300 from adjacent the aft frame end 502. As is customary, opening 514 is exposed to permit ingress and egress relative to the frame compartment 300 when the access door 28 is opened.

Figure 32:
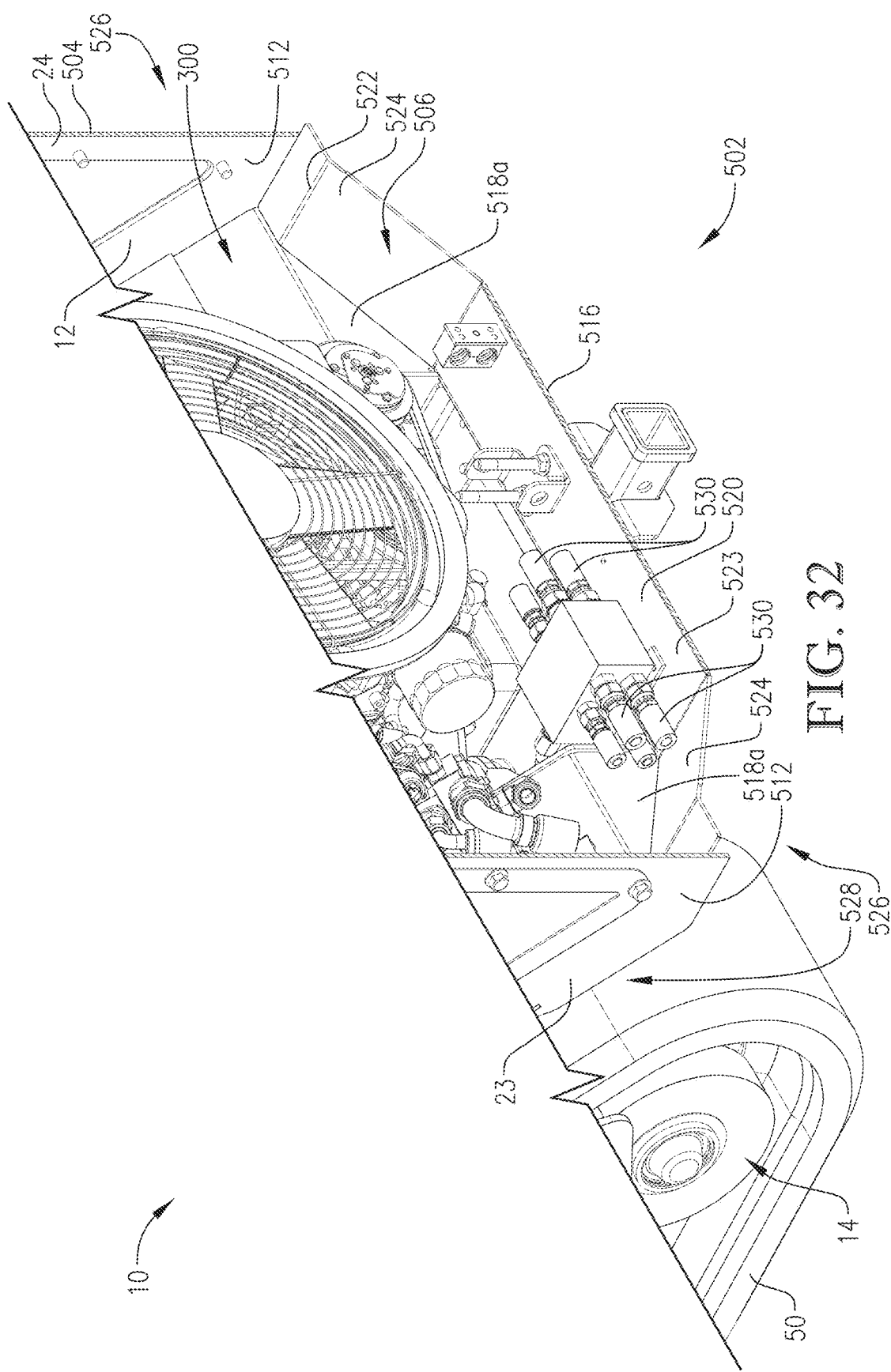
FIG. 32 is an upper rear perspective view of the loader from FIG. 30 to FIG. 31, showing a door of the loader removed to depict a lower pocket defined by the lower channel, with fragmentary portions of conduits being illustrated as located within the lower pocket.
Figure 33:
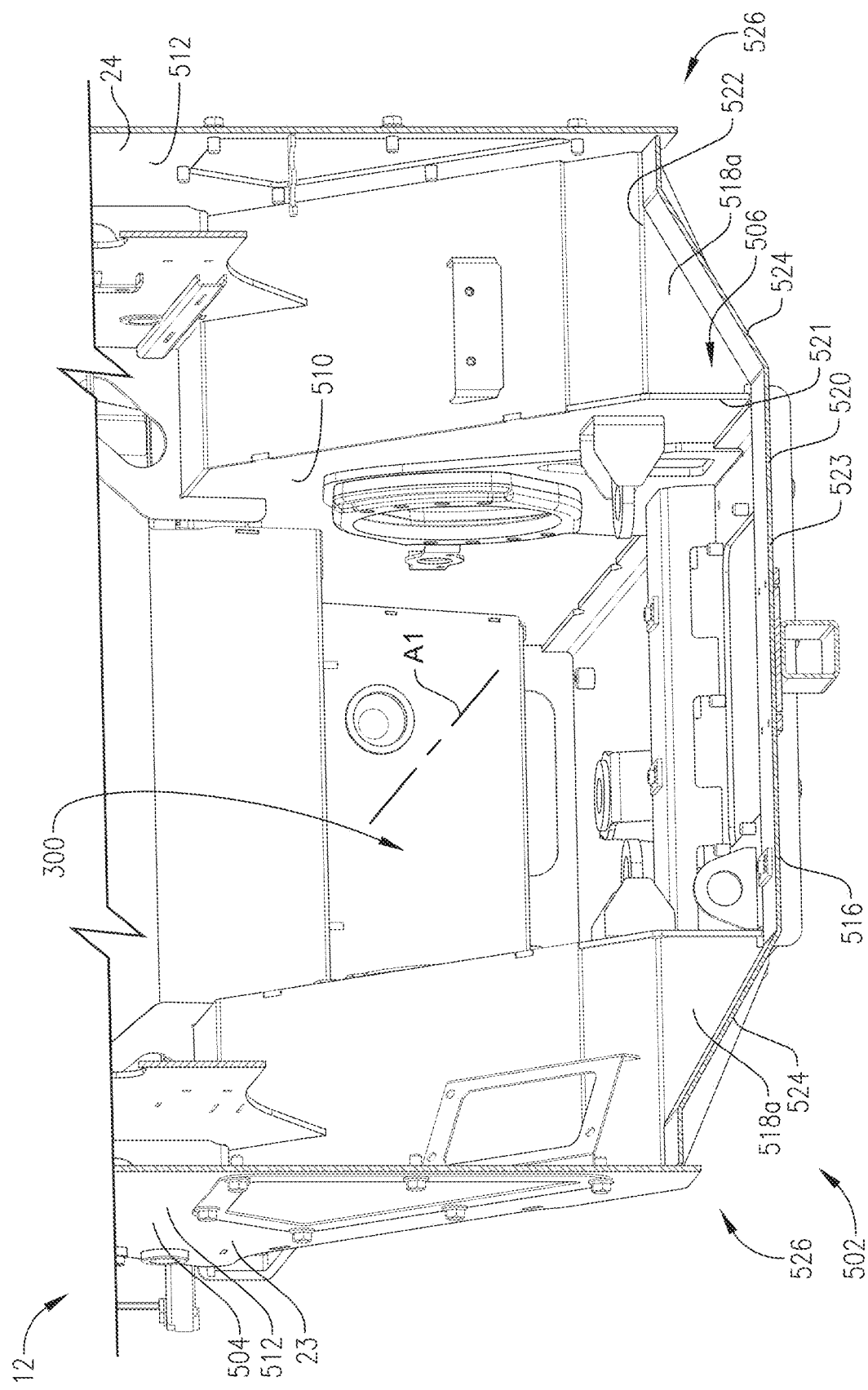
FIG. 33 is a fragmentary rear perspective of the loader from FIG. 30 through FIG. 32, showing the engine and HVAC system removed to illustrate the frame compartment, including the lower pocket.

In preferred embodiments, rear section 504 extends transversely relative to the longitudinal loader axis A1 to at least partly overlap with at least one of the endless tracks 50 along a transverse direction (which extends laterally and in a direction transverse to the longitudinal loader axis A1) and along a vertical direction, as illustrated in FIGS. 30 and 32.

Remaining with FIG. 30, rear section 504 of the loader frame 12 preferably includes a lower channel 516 that forms the lower pocket 506. Lower channel 516 includes opposed side walls 518a,518b and a bottom wall 520. In the depicted embodiment, side walls 518a and bottom wall 520 cooperatively define a U-shaped opening 521 that extends laterally. Lower channel 516 also presents an open top 522.

The open top 522 and openings 521 each permit communication between the lower pocket 506 and other adjacent portions of the frame compartment 300. Open top 522 also permits one or more conduits to extend into and out of the lower pocket 506. However, it is also within the scope of certain aspects of the present invention for the lower channel 516 to be associated with one or more alternative openings (e.g., to accommodate other internal loader components, such as components associated with the engine, radiator, and/or HVAC system).

Bottom wall 520 includes a lowermost section 523 and outboard sections 524 that angle upwardly from the lowermost section 523 toward a respective outboard end 526 of the lower channel 516, as shown in FIG. 31.

Lower channel 516 preferably presents opposed outboard ends 526 that are laterally spaced apart. The depicted lower channel 516 extends continuously between the outboard ends 526, as shown in FIG. 30. It is also within the ambit of certain aspects of the present invention for the lower channel 516 to have an alternative construction (such as alternative side walls and/or an alternative bottom wall). It will be appreciated that an alternative channel configuration may be configured to accommodate other internal loader components, such as components associated with the engine, hydraulic system, radiator, and/or HVAC system).

In the illustrated embodiment, lower channel 516 is spaced rearwardly of the tracked drive assembly 14, as shown in FIG. 30. Preferably, the lower channel 516 and the respective upright wall 510 cooperatively form at least part of an exterior well 528 that operably receives a corresponding endless track 50.

Preferably, the lower channel 516 is located entirely below the access opening 514 so that at least one conduit 530 extends underneath the access opening 514.

Conduits 530 are located within the lower pocket 506 of the frame compartment 300 and extend along substantially the entire length of the lower channel 516.

The conduits 530 each comprise a flexible tube that extends along the lowermost section 523 and turns along at least one of the outboard sections 524 to extend vertically through the open top 522 and out of the lower pocket 506. In the illustrated embodiment, one or more conduits may comprise a flexible hydraulic hose. It will also be understood that one or more conduits may include alternative flexible lines, such as a coolant hose and/or one or more electrical lines. Such alternative flexible lines may be combined as part of a harness construction. It is also within the scope of certain aspects of the present invention for conduits to include one or more rigid lines.

Tilting Cab

Figure 34:
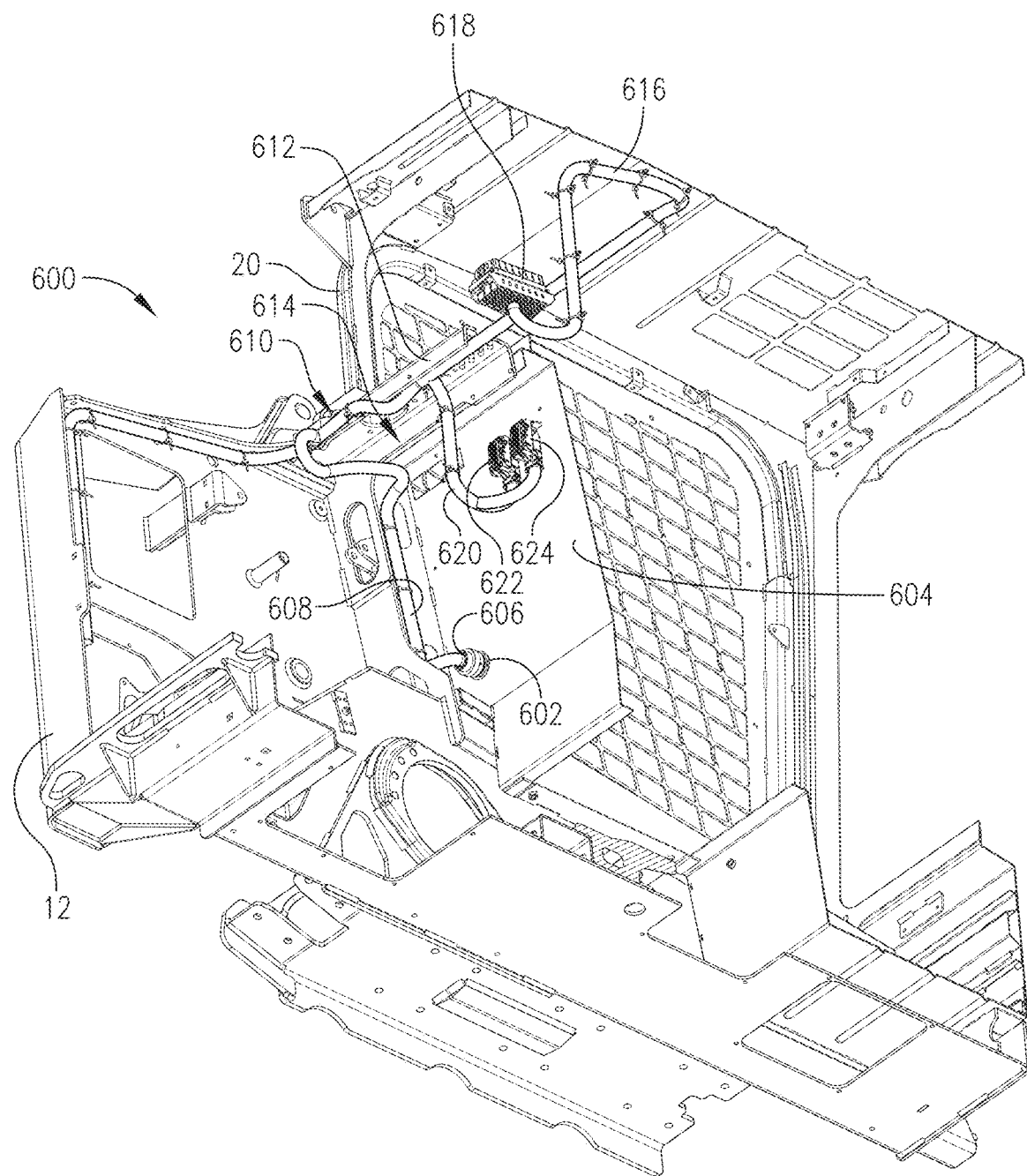
FIG. 34 is a rear lower perspective view of the loader from FIGS. 1-8 with portions of the cab and frame cut away to depict a harness.

Turning to FIG. 34, in some embodiments the loader 10 includes a wiring harness 600 that is connected to one or more of the user control elements 22 within the cab 20. The wiring harness 600 extends between the cab 20 and the interior compartment defined by the frame 12. In some embodiments, the loader 10 includes only a single wiring harness 600. The wiring harness 600 comprises one or more control lines comprising a plurality of communication lines and/or electrical conductors for facilitating communication between the control elements 22 and other components of the loader 10. As used herein, the communication lines may comprise metal wires or electrical conductors for transmitting electrical signals, fiber optic cables for transmitting signals, electrical conductors for providing electrical power, or the like, but do not include hydraulic lines or hoses, HVAC lines or hoses, mechanical control linkages, or mechanical control cables. In preferred embodiments, the communication lines comprise EOH communication lines. The EOH communication lines may be configured to conduct control signals generated at the user control elements 22 to corresponding electrohydraulic valves of the hydraulic system, as discussed below. In some embodiments, communications from the control elements in the cab 20 to components located in the frame 12 are only wireless communications, such as communications utilizing radiofrequency signals and/or data that comply with communication standards such as cellular 2G, 3G, 4G, 5G, or LTE, WiFi, WiMAX, Bluetooth®, BLE, or the like, or combinations thereof.

Figure 37:
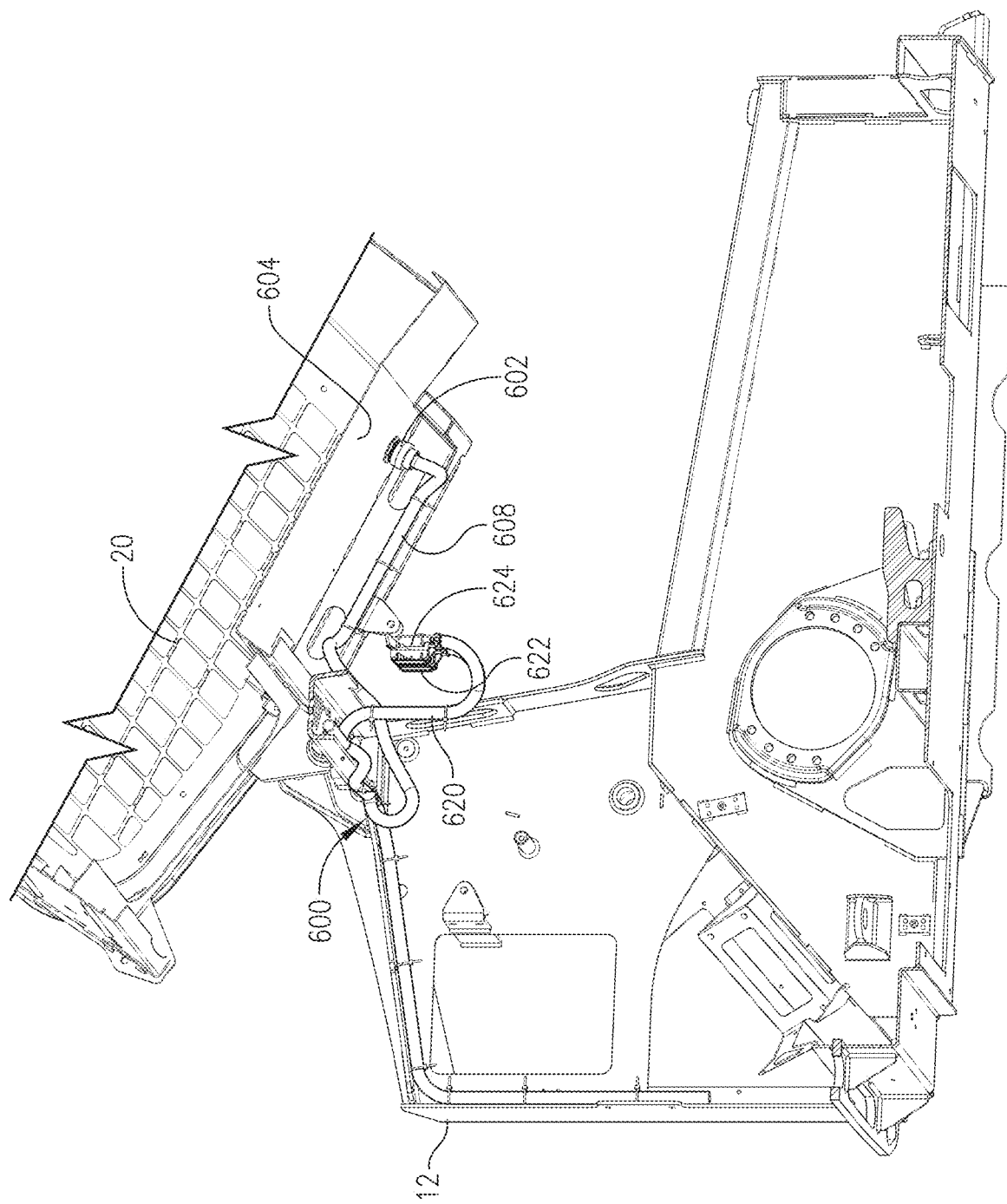
FIG. 37 is a side orthogonal view of the loader from FIGS. 1-8 with portions of the cab and frame cut away and depicting the cab in a raised position.

The wiring harness 600 may extend from a wiring harness port 602 located at a lower portion 604 of the back side 74 of the cab 20. The wiring harness 600 may comprise a connector 606 that releasably mates with the wiring harness port 602. The wiring harness 600 may include a portion 608 that extends up along and is secured to the back side 74 of the cab 20 and joins a portion 610 of the wiring harness 600 secured to and extending along the horizontal hinge connection 612. The frame 12 may include an opening 614 that prevents the portion 608 from getting pinched by moving parts, such as when the cab 20 is shifted between the raised and lowered positions (depicted in FIG. 37). As discussed elsewhere herein, the frame 12 may include an air outlet connected to the HVAC system 44, and the cab 20 may include a port or inlet that interfaces with the outlet when the cab 20 is in the lowered position. This obviates the need for any kind of HVAC conduit or hose extending from the cab 20 to the frame 12 when the cab 20 is raised.

Figure 35:
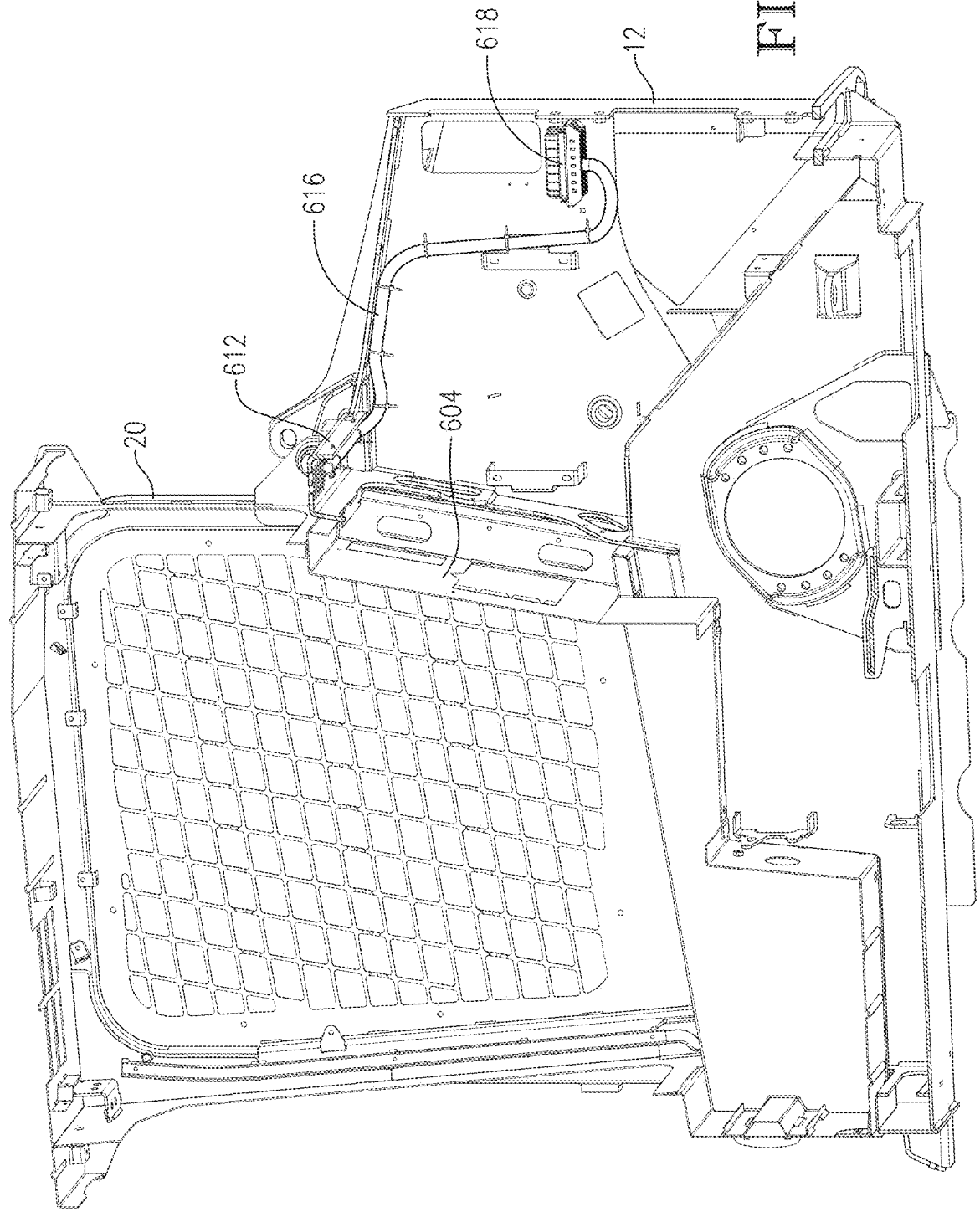
FIG. 35 is a side orthogonal view of the loader from FIGS. 1-8 with portions of the cab and frame cut away to depict a harness and a connector.
Figure 36:
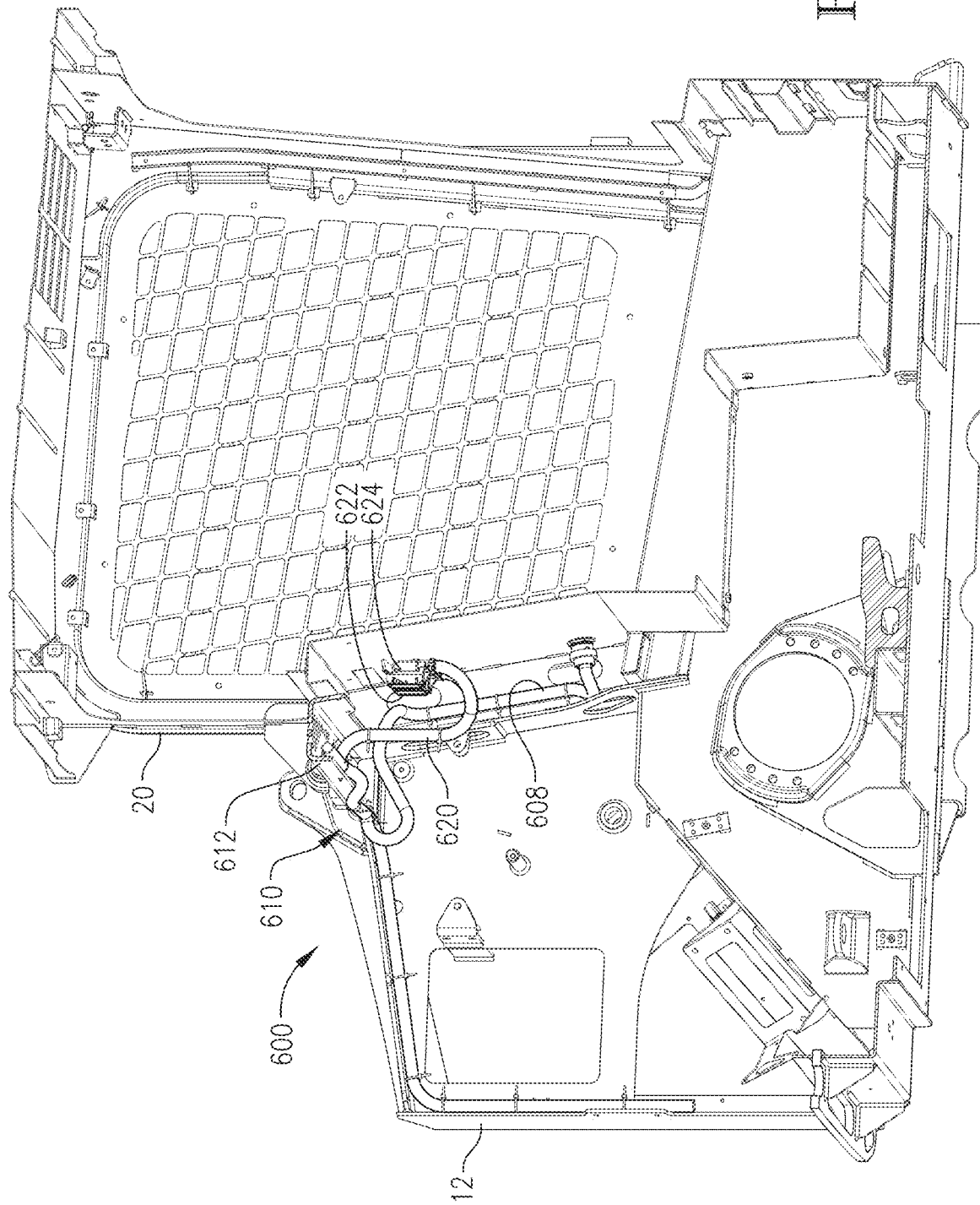
FIG. 36 is a side orthogonal view of the loader from FIGS. 1-8 with portions of the cab and frame cut away to depict a harness and hydraulic system connectors.

Turning to FIG. 35, the wiring harness 600 may also include a portion 616 extending within the interior compartment of the frame 12 of the loader 10. The portion 616 of the wiring harness 600 may include a connector 618 for connecting, directly or indirectly, to power (e.g., a battery) and control system elements of the loader. The portion 616 of the wiring harness 600 may encase electrical conductors for providing electrical power to other components of the loader 10, such as, for example, the hydraulic system, the user control elements 22, the display 94, the engine 30, the auxiliary pump 32, etc. Turning to FIG. 36, the wiring harness 600 may also include a portion 620 extending toward the hydraulic system and having wiring harness connectors 622, 624. The portion 620 may include EOH communication lines from the user control elements 22 that are connected to the connectors 622, 624 and pass electrical control signals from the user control elements 22 to electrohydraulic valves of the hydraulic system and auxiliary pump 32.

Figure 38:
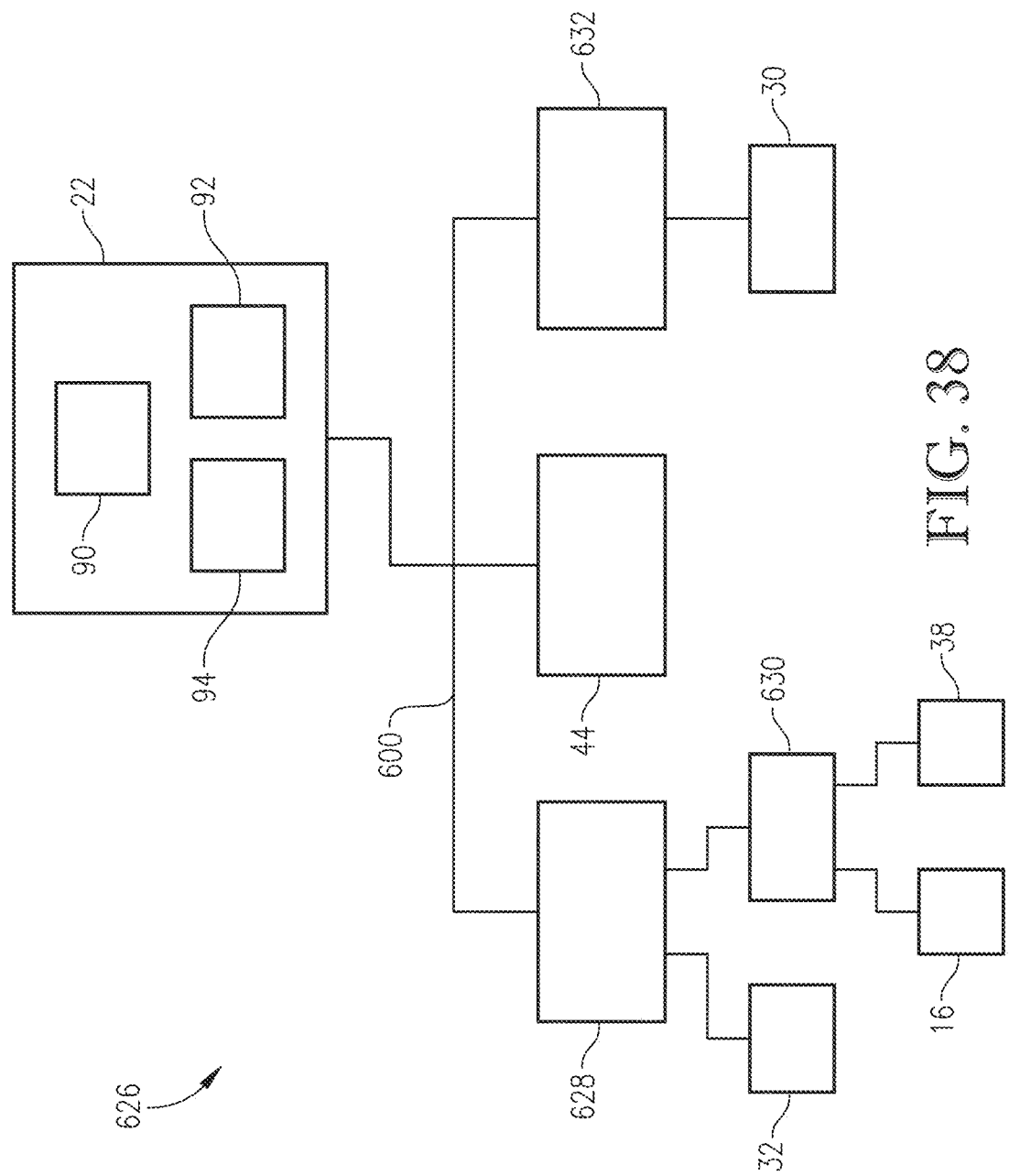
FIG. 38 is a schematic diagram depicting select components of a control system of the loader from FIGS. 1-8.

Turning to FIG. 38, the loader 10 may include a control system 626 for controlling operations of the loader 10. The control system 626 may include a hydraulic system controller 628 for controlling and monitoring the auxiliary pump 32, electrohydraulic valves 630, which modify outputs to the hydraulic components such as the loader arms 16 or the drive motors 38. The control system 626 may also include an engine controller 632 for controlling and monitoring the engine 30. The controllers 628, 632 may be in communication with one another and/or the user control elements 22, such as the joysticks 92 and the display 94. Each of the described controllers 628, 632 may include one or more processing elements and memory elements, as described above.

The wiring harness 600 may encase the electrical conductors that relay control signals and provide power between the different components of the control system 626. For example, one or more of the joysticks 92 may generate electrical control signals that are passed via electrical conductors of the wiring harness 600 to the hydraulic system controller 628. The controller 628 may generate a resulting control signal for one of the electrohydraulic valves 630 to generate an output in the loader arms 16, one of the motors 38, or one of the other hydraulic components of the loader 10. Additionally or alternatively, one or more of the joysticks 92 may generate an electrical control signal that is passed to the engine controller 632, which may generate a resulting control signal that affects the operation of the engine 30. Further, the display 94 and/or the control panel 90 may generate electrical signals that are passed through the electrical conductors of the wiring harness 600 to one of the controllers 628, 632. Moreover, the display 94 may generate electrical signals that are passed through the electrical conductors of the wiring harness 600 to the HVAC system 44 for controlling the climate within the cab 20.

While the depicted control system 626 includes a plurality of controllers, the control system 626 may include any number of controllers without departing from the scope of the present invention. For example, one or more of the controllers may be integrated into a single controller.

Cab Door

As noted previously, the loader 10 includes the cab 20, which includes a front side 73, a back side 74, a top side 75, and a bottom side 76. The main door 78 is disposed at the front side 73 and is attached to other components of the cab 20 by means of the actuation assembly 80. An open entryway 82 into an interior space of the cab 20 is defined upon shifting of the main door 78 away from the front side 73. The bottom side 76 of the cab 20 preferably includes a main platform 84 supporting a seat 21. The bottom side 76 also preferably includes a lowered platform 86 providing a footrest for an operator seated on the seat 21.

More particularly, and with reference to FIGS. 39*a*-46, the cab 20 preferably includes a main door assembly 710 including the main door 78 and various associated elements 712. In the illustrated embodiment, for instance, and as best shown in FIGS. 41-44, the associated elements 712 include an upper exterior handle 714; a lower exterior handle 716 coupled with lock engagement elements 718 disposed under a lock engagement element cover 720; a pair of lock assemblies 722 coupled with the lock engagement elements 718 and in part supported by upper and lower brackets 724 and 726, respectively; a pair of laterally spaced apart interior side handles 728; a pair of lower slide locks 730; and a wiper assembly 732.

It is noted that additional associated elements (e.g., lights, reflectors, decals, visors, shades, etc.) may be provided without departing from the scope of some aspects of the present invention. Likewise, one or more of the illustrated associated elements may be omitted without departing from the scope of some aspects of the present invention. Still further, variations in the configurations of the illustrated associated elements fall within the scope of the present invention, unless otherwise specified. Among other things, for instance, changes to one or more handle designs might be made within the ambit of the present invention, or the slide locks might be replaced with latches or other securement means.

Each of the lock assemblies 722 preferably includes a cable 734 extending from the lock engagement elements 718, a thumb latch 736, a biasing element 738 (a spring in the illustrated embodiment), an actuating rod 740, and a locking clip 742 configured to engage corresponding structure of the front side 73 of the cab 20. However, alternatively configured lock assemblies fall within the scope of the present invention.

The wiper assembly 732 preferably includes a wiper power box 744 and a single-blade wiper blade assembly 746. A wiper assembly including more than blade assembly and/or other features might alternatively be provided.

The main door assembly 710 also includes the previously introduced actuation assembly 80, which will be discussed in greater detail below.

The main door 78 preferably includes a door panel 748, a frame 750 extending perimetrically around and in part overlying the panel 748 so as to support the panel 748, a perimetrically extending brace 752 rigidifying the frame 750, and a gasket or seal 754 disposed between the panel 748 and the frame 750.

The main door 78 further includes a pair of guide elements 756 fixed relative to the door panel 748 to move therewith. In a preferred embodiment, the guide elements 756 are fixed to the door frame 750 by means of respective brackets 758, although other attachment mechanisms fall within the scope of some aspects of the present invention.

In the illustrated embodiment, each guide element 756 comprises a rotatable bearing-supported roller or wheel. Other guide element configurations, including but not limited to sliders or other non-rolling structures, fall within the scope of some aspects of the present invention, however.

Preferably, the door panel 748, the door frame 750, the brace 752, and the gasket 754 are each generally rectangular and correspond with one another in shape and size. More particularly, with regard to shape, the door panel 748 and the gasket 754 in the illustrated embodiment are each rectangular with the exception of angled and rounded upper corners and rounded lower corners. An inner perimetrical margin of the door frame 750 as illustrated matches the aforementioned shapes of the door panel 748 and the gasket 754, whereas an outer perimetrical margin of the door frame 752 rounds the top and bottom corners to a lesser degree.

With regard to size, the outer perimetrical margin of the door frame 750 is preferably slightly perimetrically larger than an outer margin of the panel 748. However, the inner perimetrical margin of the door frame 750 is slightly perimetrically smaller than the outer margin of the panel 748, such that the panel 748 overlies a portion of the frame 750. The seal or gasket 754 is preferably slightly larger than the inner margin of the door frame 750 but smaller than the outer margin of the panel 748, such that the seal or gasket 754 is sandwiched between the panel 748 and the frame 750.

Numerous shape variations, including but not limited to alternatively rounded or angled corners, or alternative shapes in a broad sense, as applied to some or all relevant components, are permissible without departing from the scope of the present invention, however. For instance, the door panel and gasket might be generally oval in shape but surrounded by a frame having a generally rectangular outer perimeter.

The frame 750 preferably includes a top rail 750a, a bottom rail 750b, and a pair of laterally spaced apart side rails 750c, although other configurations fall within the scope of the present invention. The top and bottom rails 750a and 750b, respectively, define respective top and bottom margins 760 and 762 of the main door 78 in a general sense. It is noted that projection past the margins 760 and 762 by certain of the associated elements 712 is permissible.

The panel 748 also presents top and bottom margins 764 and 766.

Preferably, the guide elements 756 are disposed adjacent the bottom margin 762 of the main door 78 (more particularly, slightly below the bottom margin 762) and, in turn, may also be understood as being disposed adjacent the bottom margin 766 of the panel 748.

In a preferred embodiment, at least a portion of the panel 748 is at least substantially transparent so as to facilitate operationally functional visibility therethrough by an operator. "At least substantially transparent" as used herein shall be understood in the context of the provision of operationally functional visibility for an operator to safely operate the loader 10, rather than in the context of absolute scientifically lossless transmission of light. For instance, an "at least substantially transparent" portion of a panel might comprise, among other things, tinted glass, clear plastic having imperfect optical clarity but still sufficient clarity for safe visibility, clear glass overlaid with a perforated shade, a slightly translucent or milky (as opposed to perfectly transparent) material, or a combination thereof. An "at least substantially transparent" portion might also be entirely devoid of material (e.g., comprise an opening through the panel).

Furthermore, the exact degree of "transparency" provided by a suitably "at least substantially transparent" portion of a panel might vary in different regions thereof. Variable tinting might be provided, or a light-restricting (but still visibility-facilitating) overlay might cover only an upper portion of the portion.

The "at least substantially transparent" portion may also comprise the entirety of the panel. In the illustrated embodiment, for instance, the entirety of the panel 748 comprises transparent glass, with any optical imperfections being incidental to the manufacturing and production of the panel 748.

The door panel 748 is preferably unitary, and the main door 78 preferably includes only a single door panel 748. However, it is permissible according to some aspects of the present invention for the panel to be segmented, for more than one panel to be provided, etc.

In a preferred embodiment, the main door 78 is shiftable between a closed position (see, for instance, FIG. 39a) and an open position (see, for instance, FIG. 39c), wherein the open position facilitates operator access through the open entryway 82 into or out of an operator area 768 in the interior space of the cab 20. The open and closed positions, as well as intermediate positions therebetween (see, for instance, FIG. 39b), will be discussed in greater detail below.

The cab 20 includes a door casing 770 (see, for instance, FIG. 44) at the front side 73 thereof. The casing 770 engages the main door 78 when the door is in the closed position and will be discussed in greater detail below.

As illustrated, the main door 78 may be broadly understood to be an up-and-over type of door. That is, in shifting from the closed position to the open position, the main door 78 generally moves upwardly and rearwardly from a largely up-and-down or vertical orientation at the forward portion of the cab 20 (i.e., at or adjacent the front side 73) to a largely fore-and-aft or horizontal orientation at a top portion of the cab 20 (i.e., at or adjacent the top side 75). (As will be readily apparent to those of ordinary skill in the art, in shifting instead from the open position to the closed position, the main door 78 moves oppositely, in generally forwardly and downwardly directions.)

It is noted that specific details of the closed and open orientations of the main door 78 will be discussed in greater detail below.

Figure 39A:
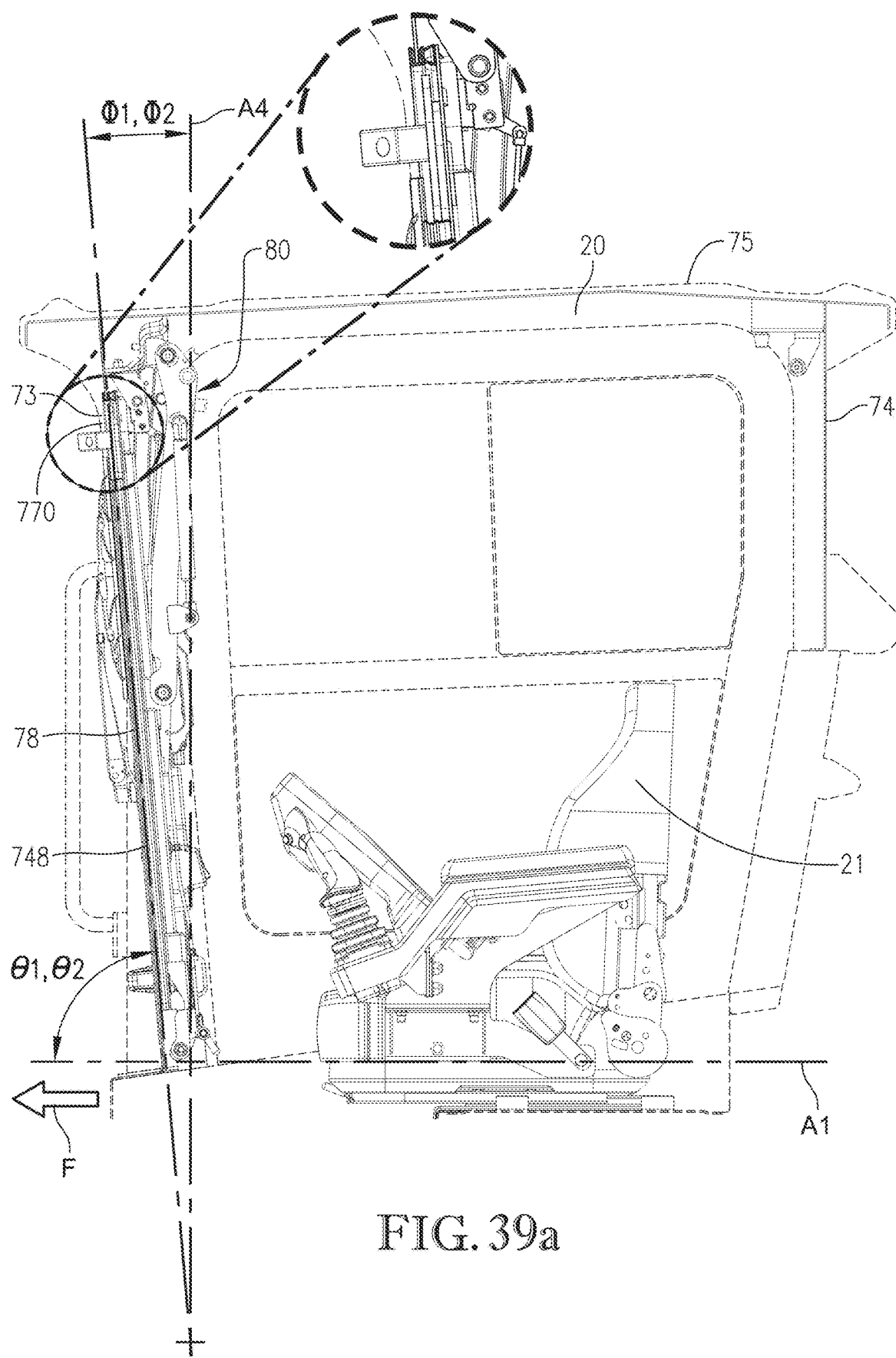
FIG. 39a is a simplified left side elevation view of the interior space of the cab of the loader of FIGS. 1-8, with a portion of the cab removed to illustrate the main door in the closed position.
Figure 39B:
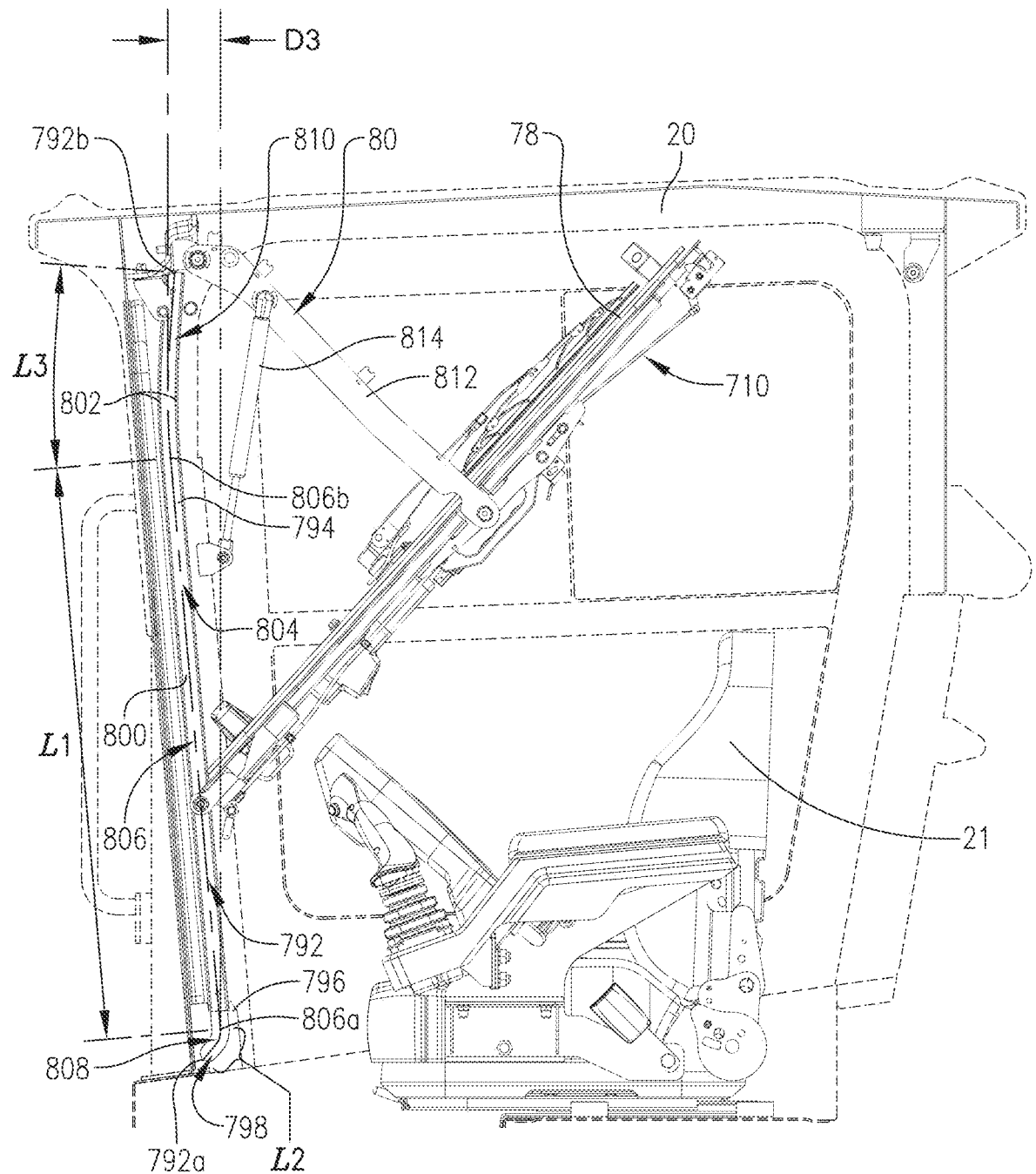
FIG. 39b is a simplified left side elevation view of the interior space of the cab of FIG. 39a, with the main door in the intermediate position.
Figure 39C:
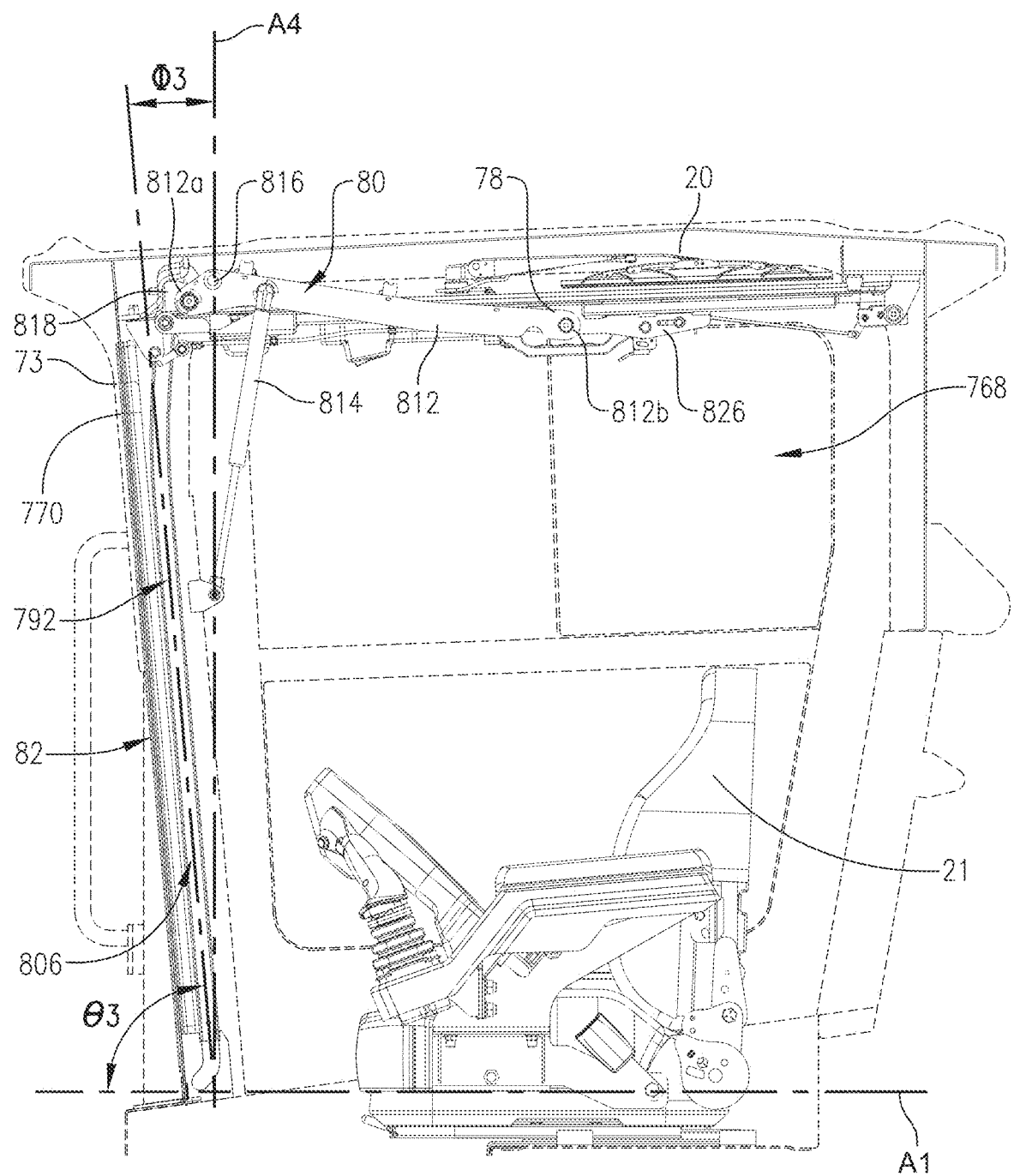
FIG. 39c is a simplified left side elevation view of the interior space of the cab of FIGS. 39a and 39b, with the main door in the open position.

The main door 78 is preferably received in its entirety within the operator area 768 when in the open position (see, for instance, FIG. 39c). The main door 78 is thus configured to be disposed above the head of an operator seated in the operator area 768 (e.g., on the seat 21), when applicable.

Only partial receipt of the main door within the operator area when in the open position may in some instances fall within the scope of the present invention, although it is preferred that the door be at least substantially received therein. For instance, a small portion of the open door (e.g., an edge or handle thereof) might permissibly project forward of the cab in some embodiments.

It is also permissible according to some aspects of the present invention for the main door to be disposed above and external to the operator area when in the open position. For instance, the door might shift upward and over the top of the roof or top side when shifting from the closed position to the open position.

In yet another alternative, a panel or shelf disposed below an exterior roof might cooperate with the exterior roof to form a slot for receiving the main door or at least part thereof, with the main door thereby being at least substantially separated both from the operator area (and any operator therein) and from external elements.

As will be readily apparent to those of ordinary skill in the art, the loader 10 is configured for travel primarily in a forward direction F (see FIG. 39a) and may be understood to have a longitudinally extending fore-aft axis A1 (see FIG. 39a) extending parallel to or being coincident with the forward direction F. Although the loader 10 is also preferably capable of travel in reverse, the forward direction is the predominant direction of motion during travel and normal operation.

The front of the loader 10 and, by association, the forward direction F are also indicated in the preferred embodiment by the positioning of the loader arms 16 and the attachment 18 supported thereby.

As associated terrain changes during operation of the loader 10, the forward direction F will change relative to the environment. However, due to the substantial rigidity of the frame 12 of the loader 10, the fore-aft axis A1 will generally shift in a corresponding manner.

In the illustrated embodiment, certain components of the loader 10 include surfaces that extend in the forward direction F or, alternatively stated, along or parallel to the fore-aft axis A1. For instance, the main platform 84, the bottom of the seat 21, and the lowered platform 86 each extend parallel to the fore-aft axis A1 and in the forward direction F.

Figure 41:
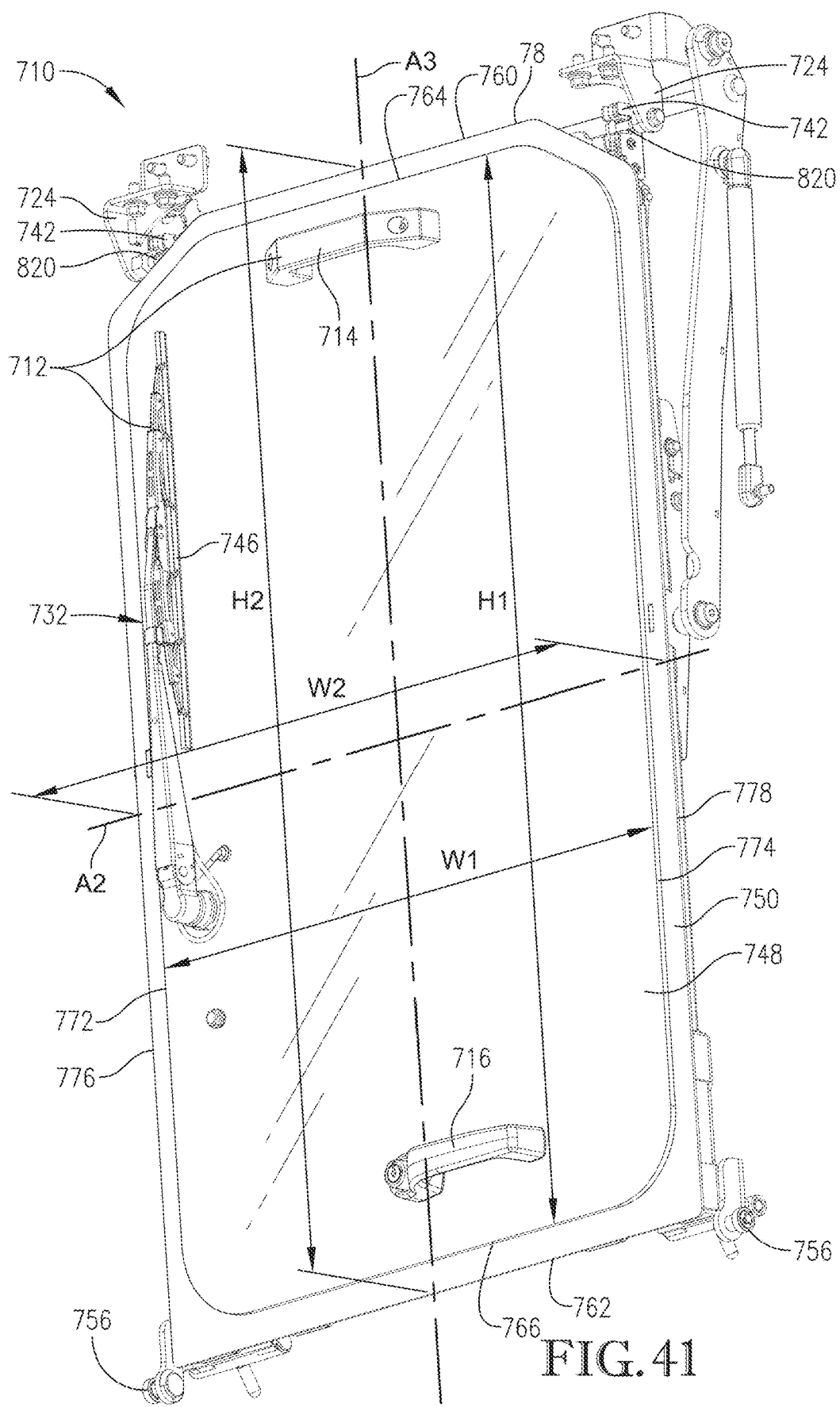
FIG. 41 is an enlarged front perspective view of the main door assembly of the cab of FIGS. 39a-40b.
Figure 42:
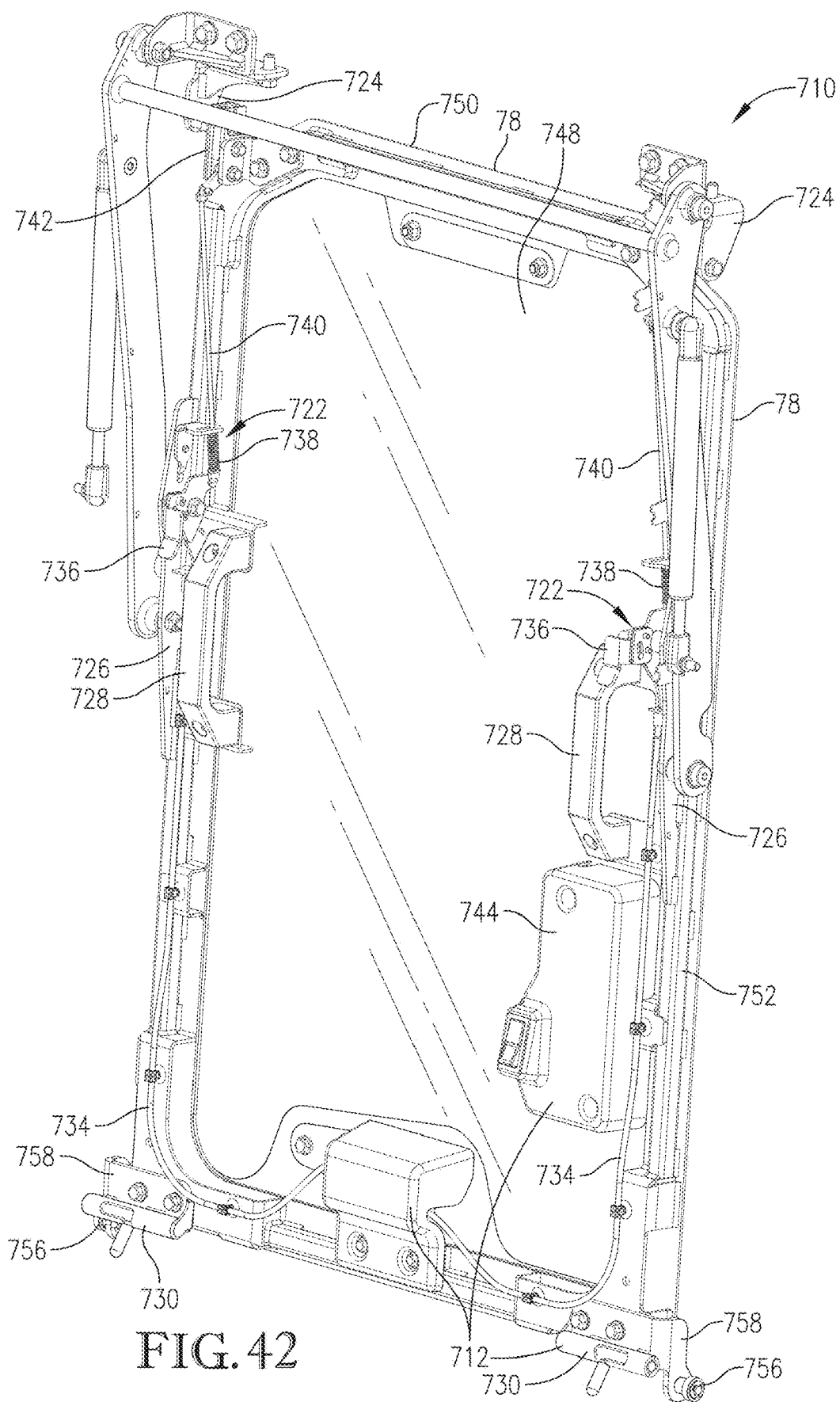
FIG. 42 is a rear perspective view of the main door assembly of FIG. 41.
Figure 43:
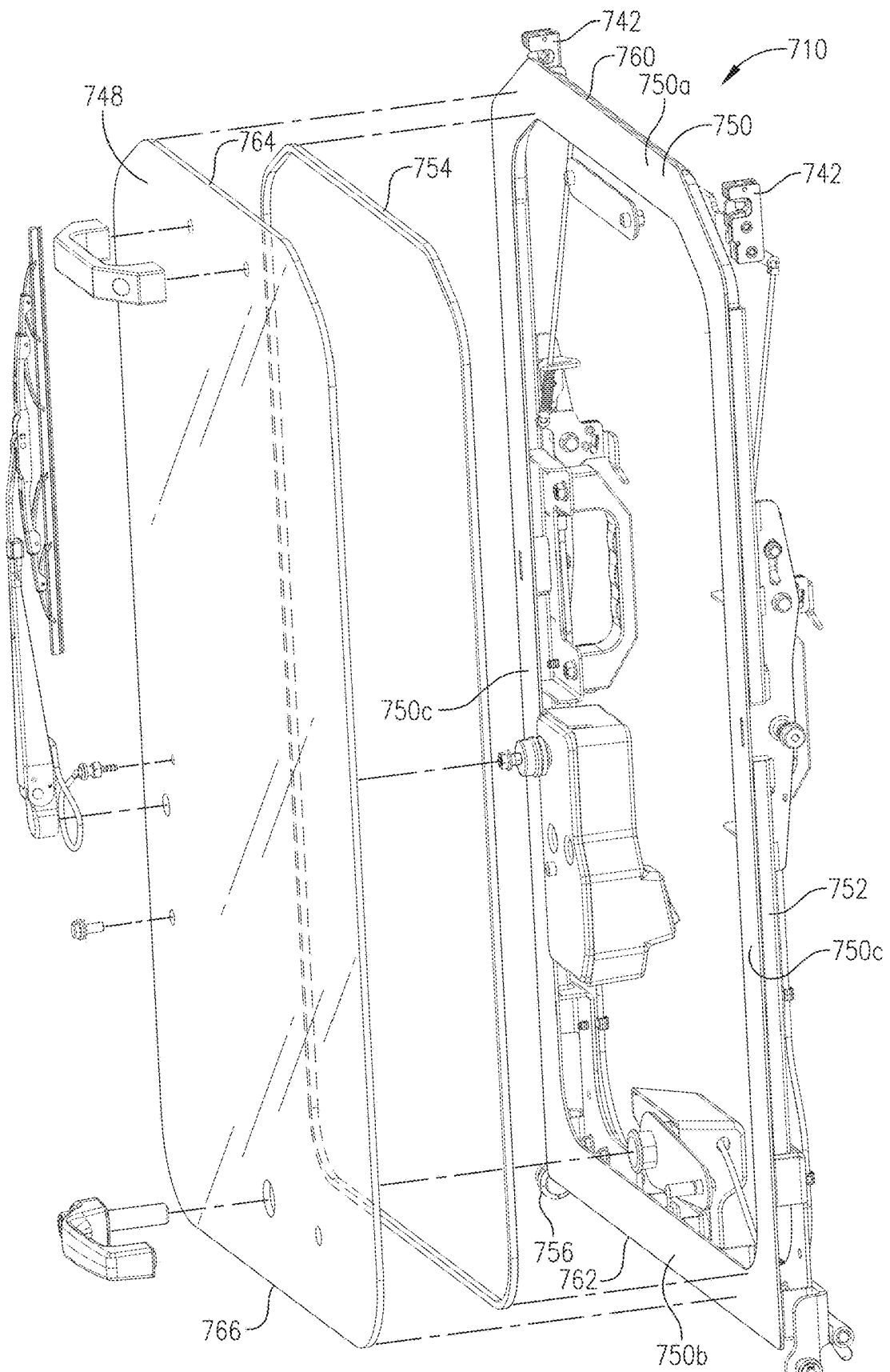
FIG. 43 is a partially exploded front perspective view of the main door assembly of FIGS. 41 and 42.

The main door 78 in a general sense and, more specifically, the door panel 748 thereof, preferably extends planarly along perpendicular lateral and longitudinal door panel axes A2 and A3 (see FIG. 41). In the context of the loader 10 as a whole, the lateral door panel axis A2 preferably extends transversely and, more specifically, perpendicular to the forward direction F and to the fore-aft axis A1 when the main door 78 is in the closed position. When the main door is in the closed position, the longitudinal door panel axis A3 preferably extends largely vertically and thus also extends generally perpendicularly to the forward direction F and the fore-aft axis A1. (As will be apparent from detailed discussions below, the longitudinal door panel axis A3 preferably tilts slightly forward relative to vertical, rather than extending perfectly vertically.)

Alternatively stated, the main door 78 is preferably generally orthogonal with or "square" with the fore-aft axis A1 and the forward direction F when in the closed position, with any deviance from orthogonality being in the form the preferred forward tilt mentioned briefly above and described in detail below.

Because the main door 78 moves in a generally up-and-over pattern, the lateral door panel axis A2 preferably remains perpendicular with the fore-aft axis A1 and the forward direction F throughout the entire range of motion of the main door 78. That is, the lateral door panel axis A2 also preferably extends transversely and, more specifically, perpendicular to the forward direction F and to the fore-aft axis A1 of the loader 10 when the main door 78 is in its open position and in any one of its infinite intermediate positions between the open and closed positions. As will be apparent to those of ordinary skill in the art, this is in direct contrast to a conventional side-hinged door, in which the lateral axis defines a variable angle relative to the fore-aft axis as the door swings open and closed.

The longitudinal door panel axis A3, however, preferably changes its orientation during the course of opening so as to extend generally in a fore-aft direction along or parallel to the fore-aft axis A1 when the main door 78 is in its open (i.e., overhead) position. That is, the longitudinal door panel axis A3 defines a variable angle relative to the fore-aft axis A1 as the main door 78 shifts between closed and open positions.

It is noted that the top side 75 of the cab 20 preferably extends generally parallel to the fore-aft axis A1 and the forward direction F. (Some degree of tilt relative to the fore-aft axis A1 is permissible, but at least general horizontality is preferred). The door panel 748 is thus preferably disposed generally parallel with (and, as noted previously, adjacent) the top side 75 when the main door 78 is in the open position.

In a preferred embodiment, the door panel 748 in its entirety is planar. However, the door panel might alternatively be in part or in entirety non-planar without departing from the scope of some aspects of the present invention. For instance, the entire door panel might be curved so as to bow outward (i.e., forward) when in the closed position; or curved regions originating at the upper and lower margins thereof might be provided, with a planar central portion comprising the majority of the panel.

As noted previously, the door panel 748 presents longitudinally spaced apart top and bottom margins 764 and 766, respectively. A door panel height H1 is defined between the top and bottom margins 764 and 766. The door panel height H1 is preferably between about thirty (30) inches and about fifty (50) inches, more preferably between about thirty-five (35) inches and about forty-five (45) inches, and most preferably about thirty-eight and five tenths (38.5) inches.

Similarly, the door panel 748 presents laterally spaced apart side margins 772 and 774. A door panel width W1 is defined between the side margins 772 and 774. The door panel width W1 is preferably between about fifteen (15) inches and about thirty-five (35) inches, more preferably between about twenty (20) inches and about thirty (30) inches, and most preferably about twenty-four and two tenths (24.2) inches.

Figure 40A:
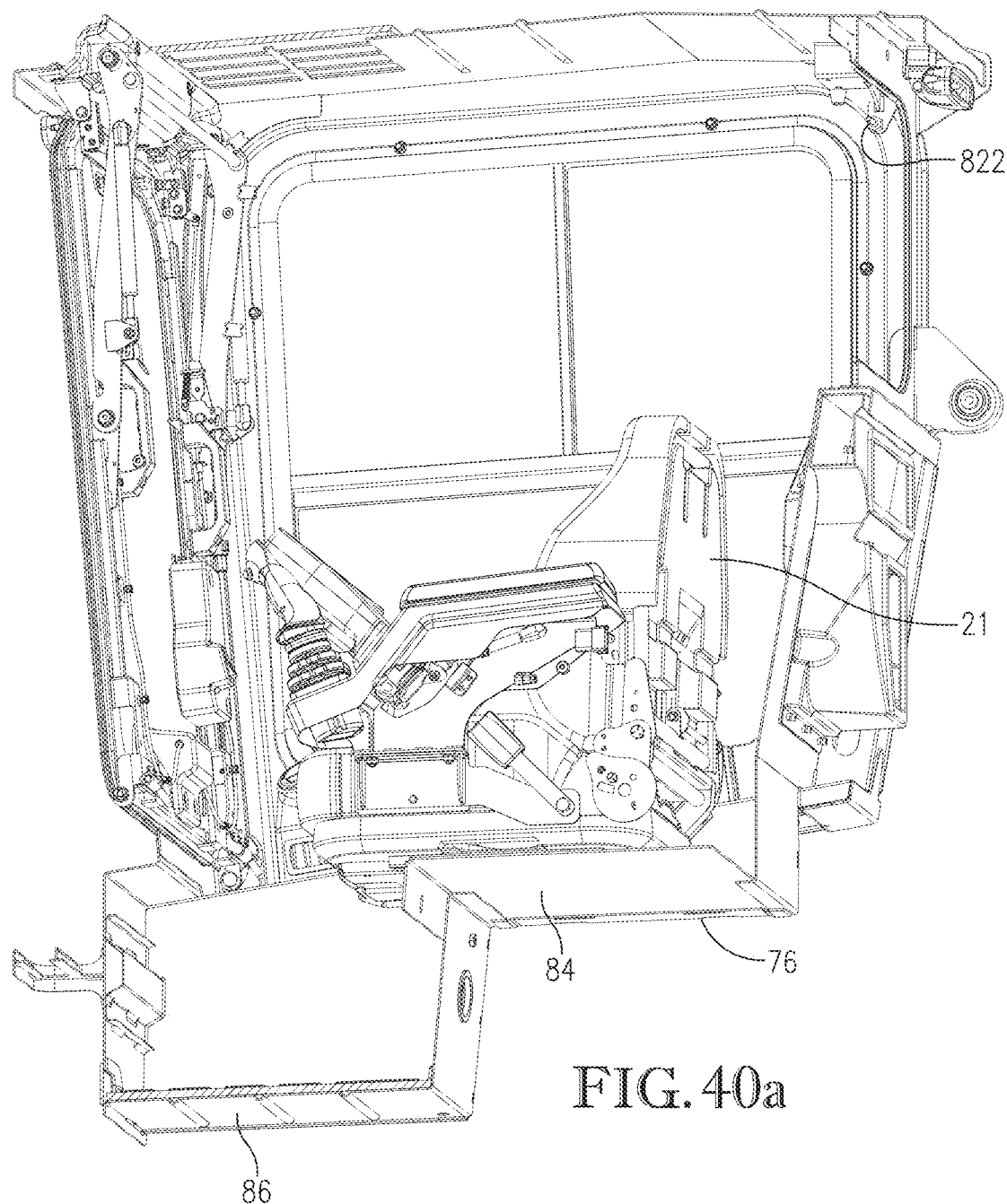
FIG. 40a is a simplified left side perspective view of the interior space of the cab of FIGS. 39a-c, with the main door in the closed position.
Figure 40B:
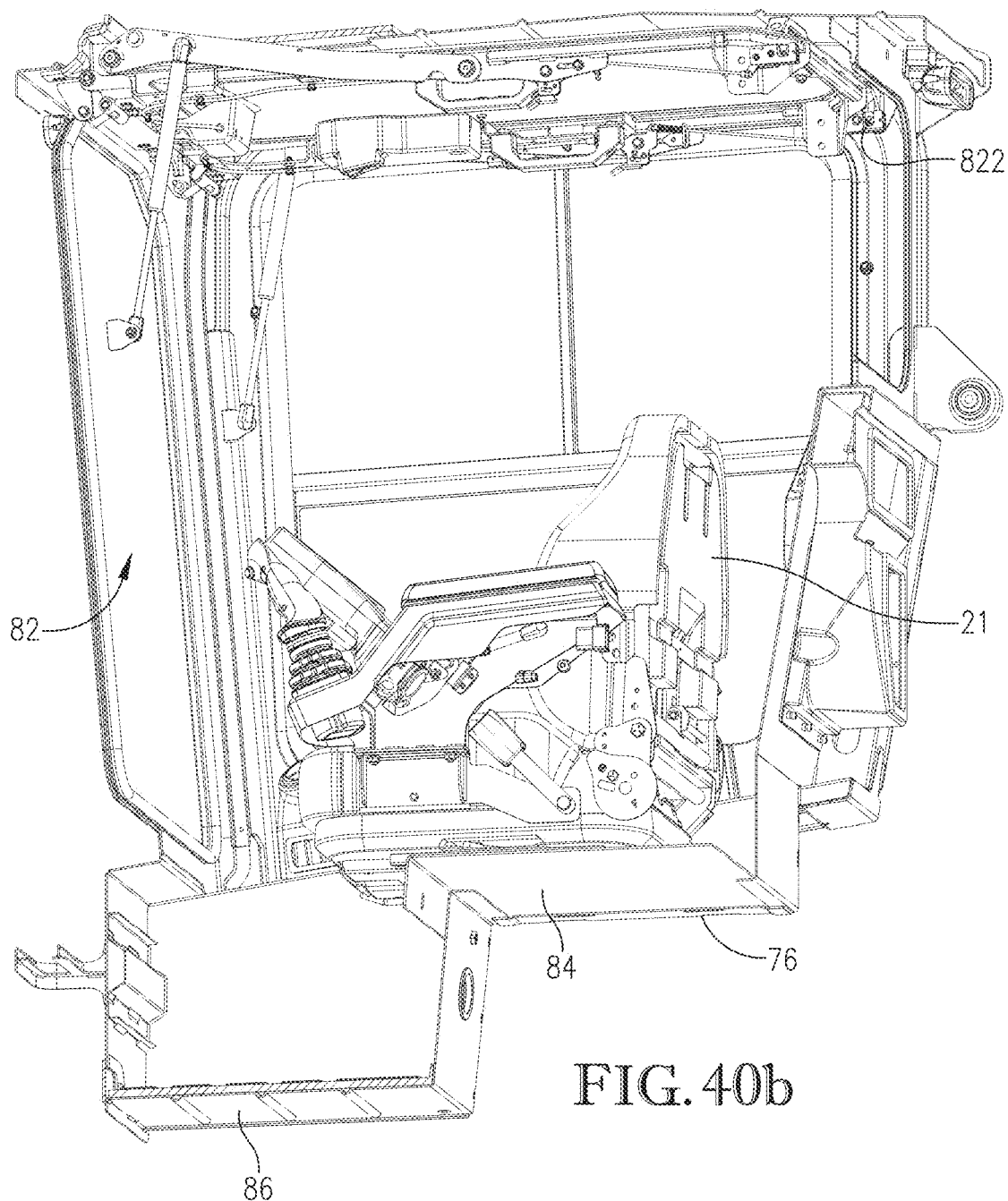
FIG. 40b is a simplified left side perspective view of the interior space of the cab of FIG. 40a, with the main door in the open position.
Figure 45:
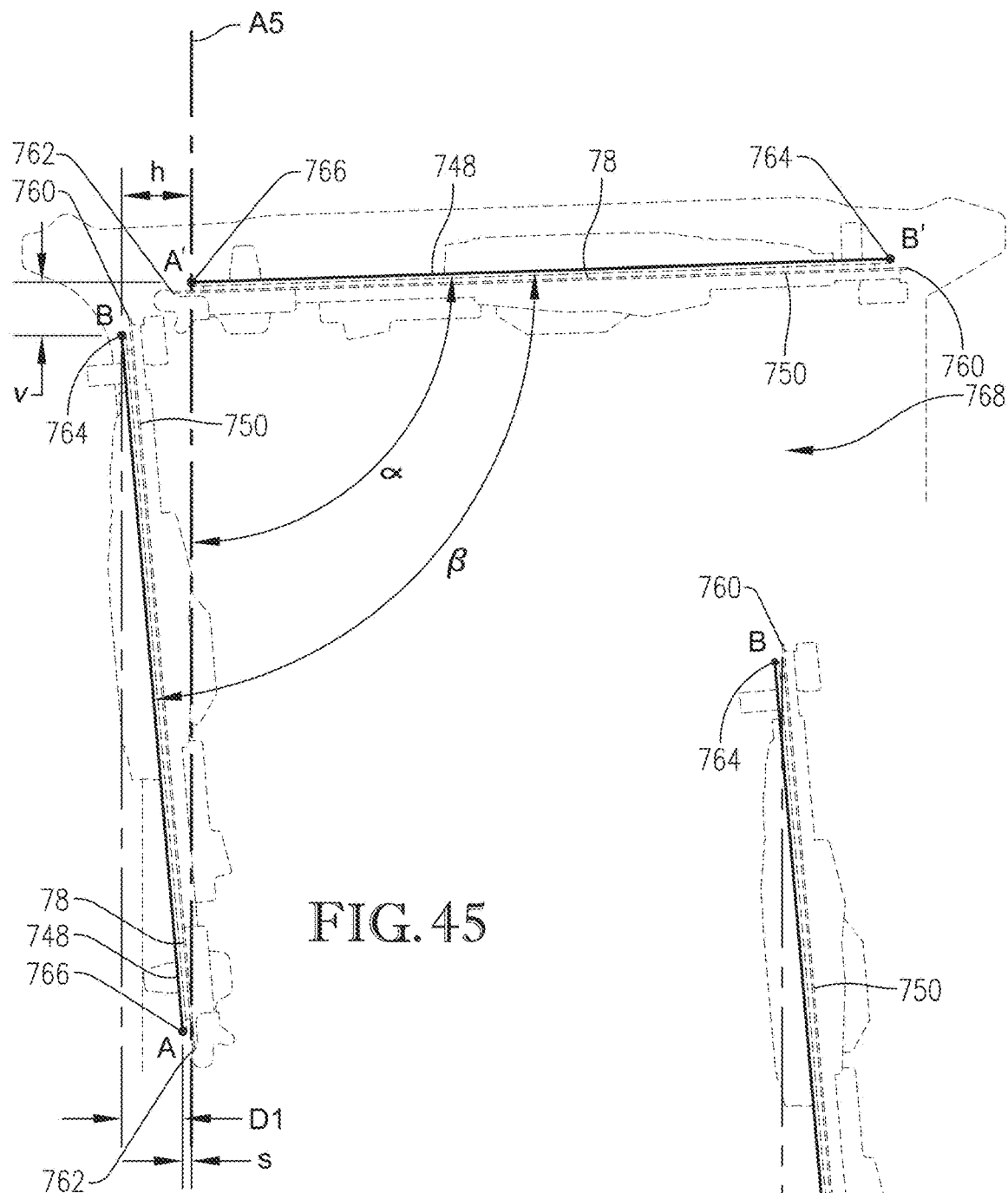
FIG. 45 is a schematic left side elevation view of a portion of the cab of FIGS. 39a-40b, with the door panel shown in solid line and remaining components shown in hidden line, and with the main door shown in both closed and open positions to particularly illustrate the open and closed geometries of the door panel and the operator area.

In a preferred embodiment, and as best shown in FIGS. 39a, 40a, and 45, the door panel 748 tilts forward when the main door 78 is in the closed position, such that the top margin 764 is disposed forward of the bottom margin 766. (Likewise, the top margin 760 of the main door 78, as defined by the frame 750, is disposed forward of the bottom margin 762 of the main door 78, as also defined by the frame 750.)

With reference to FIG. 39a, the forward tilt of the door panel 748 may be characterized in terms of a forward door panel tilt angle $\theta 1$ formed by the door panel 748 relative to the fore-aft axis A1. In a preferred embodiment, for instance, the door panel 748 forms a forward door panel tilt angle $\theta 1$ greater than sixty (60) degrees and less than ninety (90) degrees relative to the fore-aft axis A1. More preferably, the door panel 748 forms a forward door panel tilt angle $\theta 1$ of between about eighty (80) degrees and about eighty-seven and five tenths (87.5) degrees relative to the fore-aft axis A1. Most preferably, the door panel 748 forms a forward door panel tilt angle $\theta 1$ of about eighty-five (85) degrees relative to the fore-aft axis A1.

Characterization relative to a vertical axis A4, wherein the vertical axis A4 is perpendicular to the fore-aft axis A1, is permissible as well. For instance, as best shown in FIG. 39a, the door panel 748 preferably forms a vertical door panel tilt angle $\phi 1$ greater than zero (0) degrees and less than thirty (30) degrees relative to the vertical axis A4. More preferably, the door panel 748 forms a vertical door panel tilt angle $\phi 1$ of between about two and five tenths (2.5) degrees and about ten (10) degrees relative to the vertical axis A4. Most preferably, the door panel 748 forms a vertical door panel tilt angle $\phi 1$ of about five (5) degrees relative to the vertical axis A4. As will be readily apparent to those of skill in the art, the tilt angles $\theta 1$ and $\phi 1$ are complementary angles.

Nominally, the top margin 764 of the door panel 748 is disposed forward of the bottom margin 766 by a forward door panel tilt distance D1 (see FIG. 45). The forward door panel tilt distance D1 is preferably between one (1) inch and about five (5) inches, more preferably between about two (2) inches and about four (4) inches, and most preferably about three (3.0) inches.

In a relative sense, the forward door panel tilt distance D1 is preferably between about four (4) percent and about twelve (12) percent of the door panel height H1, more preferably between about six (6) percent and about ten (10) percent of the door panel height H1, and most preferably about seven and nine tenths (7.9) percent of the door panel height H1.

At least substantially similar tilt of the main door 78 in general, as best characterized by the frame 750 and the top and bottom margins 760 and 762 thereof, is also preferred.

That is, the aforementioned preferred door panel tilt angles θ1 and φ1 also characterize the tilt of the main door 78 more broadly. In contrast, the preferred nominal values of tilt distance are slightly greater for the main door 78 (as measured at the top and bottom margins 760 and 762 of the frame 750) due the overall larger dimensions of the frame 750.

More specifically, as shown in FIG. 39*a*, the main door 78 forms a forward main door tilt angle θ2 greater than sixty (60) degrees and less than ninety (90) degrees relative to the fore-aft axis A1. More preferably, the main door 78 forms a forward main door tilt angle θ2 of between about eighty (80) degrees and about eighty-seven and five tenths (87.5) degrees relative to the fore-aft axis A1. Most preferably, the main door 78 forms a forward main door tilt angle θ2 of about eighty-five (85) degrees relative to the fore-aft axis A1.

The main door 78 forms a vertical main door tilt angle φ2 greater than zero (0) degrees and less than thirty (30) degrees relative to the vertical axis A4. More preferably, the main door 78 forms a vertical main door tilt angle φ2 of between about two and five tenths (2.5) degrees and about ten (10) degrees relative to the vertical axis A4. Most preferably, the main door 78 forms a vertical main door tilt angle φ2 of about five (5) degrees relative to the vertical axis A4.

With reference to FIG. 41, a main door height H2 is defined between the top and bottom margins 760 and 762. The main door height H2 is preferably between about thirty (30) inches and about fifty (50) inches, more preferably between about thirty-five (35) inches and about forty-five (45) inches, and most preferably about forty and six tenths (40.6) inches.

Similarly, the main door 78 presents laterally spaced apart side margins 776 and 778. A main door width W2 is defined between the side margins 776 and 778. The main door width W2 is preferably between fifteen (15) inches and about thirty-five (35) inches, more preferably between about twenty (20) inches and about thirty (30) inches, and most preferably about twenty-six and two tenths (26.2) inches.

Figure 46:
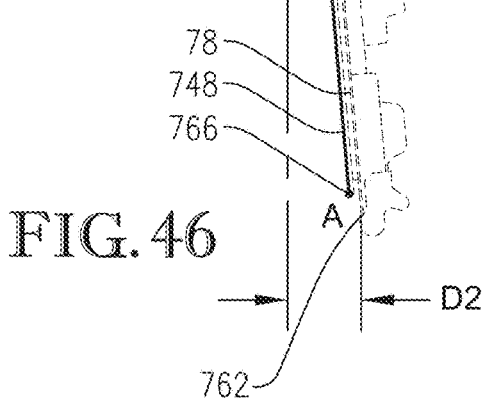
FIG. 46 is a schematic left side elevation view of a portion of the cab as shown in FIG. 45, with the door panel shown in solid line and remaining components shown in hidden line, and with the main door shown in the closed position.

As shown in FIG. 46, the top margin 760 of the main door 78 is disposed forward of the bottom margin 762 by a forward main door tilt distance D2. The forward main door tilt distance D2 is preferably between about one and five tenths (1.5) inches and about five and five tenths (5.5) inches, more preferably between about two and five tenths (2.5) inches and about four and five tenths (4.5) inches, and most preferably about three and five tenths (3.5) inches.

In a relative sense, the forward main door tilt distance D2 is preferably between about five (5) percent and about thirteen (13) percent of the main door height H2, more preferably between about seven (7) percent and about eleven (11) percent of the main door height H2, and most preferably about eight and seven tenths (8.7) percent of the main door height H2.

The forward tilt of the main door 78 (and the door panel 748 thereof) when the main door 78 is in the closed position corresponds to forward tilt of the front side 73 of the cab 20 in a broad sense, and more specifically corresponds to forward tilt of selected elements of the door casing 770 (see, for instance, FIGS. 39*a* and 40*a*).

Figure 44:
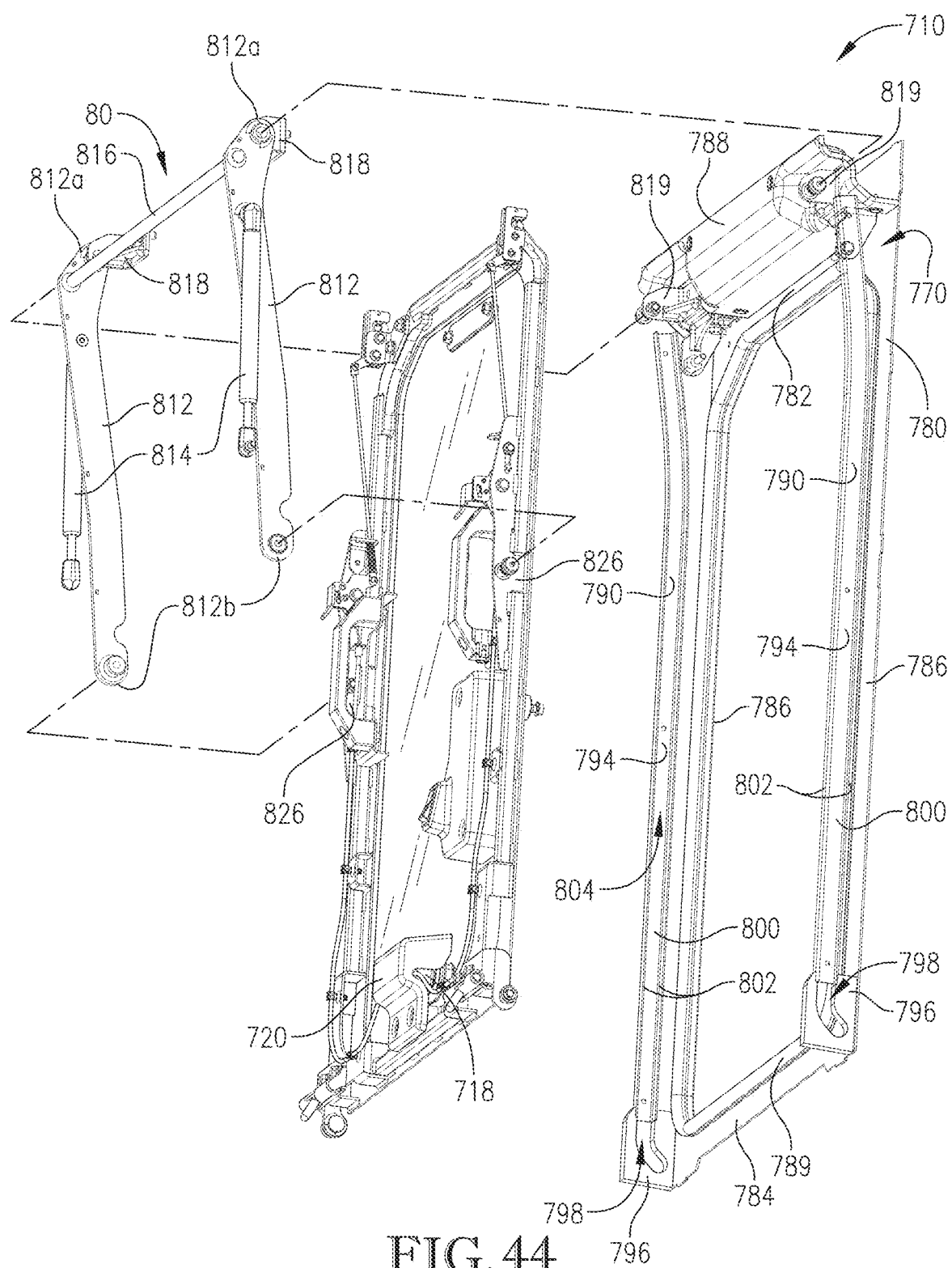
FIG. 44 is a partially exploded rear perspective view of the main door assembly of FIG. 44 and the door casing formed by the cab.

With reference to FIG. 44, the door casing 770 preferably includes a surround 780 including an upper head 782 and a lower sill 784, as well as a pair of laterally spaced apart jambs 786 each extending between and interconnecting the head 782 and the sill 784.

The cab 20 may also include a headliner, a portion 788 of which is shown in FIG. 44 and others.

A seal 789 extends perimetrically along an inner margin of the casing 770 and, when the main door 78 is in the closed position, at least substantially sealingly engages the frame 750 thereof.

The casing 770 also preferably includes a pair of laterally spaced apart guide structures 790 for engaging corresponding ones of the aforementioned guide elements 756 during shifting of the main door 78 from the closed position to the open position, and from the open position to the closed position. As will be discussed in greater detail below, each guide structure 790 directs the corresponding guide element 756 along (alternatively stated, maintains the corresponding guide element 756 within) a generally upwardly and downwardly extending travel path 792 (see FIG. 39*b*, for instance), with the guide elements 756 traveling generally upward along the corresponding travel paths 792 during opening of the main door 78 and traveling generally downwardly along the corresponding travel paths 792 during closing of the main door 78.

In the illustrated embodiment, the guide structures 790 each include a corresponding track 794 and a corresponding tab 796 extending rearwardly from the sill 784 and the corresponding one of the jambs 786. Each tab 796 defines a corresponding slot 798 therein. Each track 794 includes a respective base 800 and a pair of sidewalls 802 each extending perpendicular to the base 800, such that each track 794 is generally U-shaped and defines a channel 804 therethrough.

The guide elements 756 are at least substantially received within corresponding ones of the channels 804 and slots 798 during shifting of the main door 78 between the open and closed positions, with the channels 804 and the slots 798 thereby cooperatively defining the travel paths 792.

As best shown in FIG. 39*b*, each travel path 792 preferably includes a primary travel path segment 806 extending upwardly and forwardly such that the corresponding guide element 756 and an adjacent portion of the door panel 748 (and, more broadly, the adjacent portion of the main door 78) primarily travel upward and forward during shifting of the main door 78 from the closed position to the open position. Conversely, the guide elements 756 and the adjacent portion of the door panel 748 (and, more broadly, the adjacent portion of the main door 78) primarily travel downward and rearward during shifting of the main door 78 from the open position to the closed position.

In a preferred embodiment, as illustrated, the primary travel path segments 806 are defined primarily by the tracks 794. However, a small lowermost portion of each primary travel path segment 806 is defined by an uppermost portion of the corresponding one of the slots 798.

The tracks 794 and the uppermost portions of the slots 798 are preferably straight and in alignment with one another, such that the primary travel path segments 806 are straight. Curves or other irregularities may be present without departing from the scope of some aspects of the present invention, however.

With continued reference to FIG. 39*b*, each travel path 792 further preferably includes an initial travel path segment 808 downward of and interconnecting with the primary travel path segment 806. As illustrated, the initial travel path segments 808 are preferably defined by the slots 798 and extend upwardly and rearwardly.

Still further, each travel path 792 further preferably includes a terminal travel path segment 810 upward of and interconnecting with the primary travel path segment 806.

As illustrated, the terminal travel path segments 810 are preferably defined by the tracks 794 and extend upwardly and rearwardly.

The travel paths 792 each extend between bottom and top travel path endpoints 792a and 792b and have a total travel path length defined between the respective endpoints 792a and 792b.

The total travel path length is preferably between about thirty-five (35) inches and about fifty-five (55) inches, more preferably between about forty (40) inches and about fifty (50) inches, and most preferably about forty-three and three tenths (43.3) inches.

The primary travel path segments 806 each extend between bottom and top primary travel path segment endpoints 806a and 806b and have a primary travel path segment length L1 defined between the endpoints 806a and 806b.

The primary travel path segment length L1 is preferably between about twenty (20) inches and about forty (40) inches, more preferably between about twenty-five (25) inches and about thirty-five (35) inches, and most preferably about thirty-one and two tenths (31.2) inches.

In a preferred embodiment, the primary travel path segment length L1 is greater than about fifty (50) percent of the total travel path length, more preferably between about sixty five (65) percent and about eighty (80) percent of the total travel path length, and most preferably about seventy-two and one tenth (72.1) percent of the total travel path length.

Each initial travel path segment 808 has an initial travel path segment length L2 between the bottom travel path endpoint 792a and the bottom primary travel path segment endpoint 806a that is preferably less than about four (4) inches, more preferably between about one (1) inch and about three (3) inches, and most preferably about two (2.0) inches.

Each terminal travel path segment 810 has a terminal travel path segment length L3 between the top primary travel path segment endpoint 806b and the top travel path endpoint 792b that is preferably between about five (5) inches and about fifteen (15) inches, more preferably between about seven and five-tenths (7.5) inches and about twelve and five tenths (12.5) inches, and most preferably about ten and one tenth (10.1) inches.

It is noted that the total travel path length is simply the sum of the initial, primary, and terminal travel path segment lengths L2, L1, and L3, respectively.

Similarly to the door panel 748 and the main door 78 more generally, the travel path 792 and, more specifically, the primary travel path segment 806 thereof, tilts forward. In a preferred embodiment, for instance, and as shown in FIG. 39c, the primary travel path segment 806 tilts forward by a forward primary travel path segment tilt angle θ3 greater than sixty (60) degrees and less than ninety (90) degrees relative to the fore-aft axis A1, more preferably between about eighty (80) degrees and about eighty-seven and five tenths (87.5) degrees relative to the fore-aft axis A1, and most preferably about eighty-five (85) degrees relative to the fore-aft axis A1.

A corresponding vertical primary travel path segment tilt angle φ3 relative to the vertical axis A4 is likewise formed. The vertical primary travel path segment tilt angle φ3 is preferably greater than zero (0) degrees and less than thirty (30) degrees relative to the vertical axis A4, more preferably between about two and five tenths (2.5) degrees and about ten (10) degrees relative to the vertical axis A4, and most preferably about five (5) degrees relative to the vertical axis A4.

It is noted that the forward tilt angles θ1, θ2, and θ3 (as pertain to the door panel 748, the main door 78, and the primary travel path segment 806, respectively) are all preferably equal. Alternatively stated, the door panel 748, the main door 78 in broad sense, and the primary travel path segment 806 preferably extend parallel to one another when the main door 78 is in the closed position. Portions of the cab front side 73, including portions of the casing 770, likewise preferably extend parallel to the door panel 748, the main door 78 in broad sense, and the primary travel path segment 806. Certain non-parallel configurations fall within the scope of the present invention, however.

As will be readily apparent to those of ordinary skill in the art, the vertical tilt angles φ1, φ2, and φ3 are likewise preferably equal.

In a preferred embodiment, and with reference to FIG. 39b, the top endpoint 806b of the primary travel path segment 806 is disposed forward of the bottom endpoint 806a thereof by a forward travel distance D3. The forward travel distance D3 is preferably between about one (1) inch and about five (5) inches, more preferably between about two (2) inches and about four (4) inches, and most preferably about two and nine-tenths (2.9) inches.

Alternatively characterized, the forward travel distance D3 is preferably between about six (6) percent and about fourteen (14) percent of the primary travel path segment length L1, more preferably between about eight (8) percent and about twelve (12) percent of the primary travel path segment length L1, and most preferably about ten and one tenth (10.1) percent of the primary travel path segment length L1.

It is particularly noted that the travel distance D3 may be alternatively understood as being a rearward travel distance D3 in the context of a door closing motion.

As will be readily apparent from the above descriptions, the main door 78 may be understood to be generally rollably and pivotably shiftable from the closed position to the open position, from the open position to the closed position, and to or from any intermediate positions therebetween. Such shifting is assisted by the actuation assembly 80, which extends between and interconnects the main door 78 and the casing 770.

It is also noted that, despite the preferred rollability of the guide elements 756, such elements even in the preferred wheel/roller configuration may in some instances slide rather than roll along part or all of the travel path. Thus, the main door may in some instances be slidably and pivotably shiftable, instead of or in addition to being rollably and pivotably shiftable.

More particularly, with reference to FIGS. 39c and 44, the actuation assembly 80 includes a pair of laterally spaced apart arms 812; a pair of force-generating assistive elements 814, each corresponding to one of the arms 812; and a reinforcing rod 816 extending between and interconnecting the arms 812. Each arm 812 includes a proximal end 812a pivotably attached to the door casing 770 via brackets 818 and 819 and a distal end 812b pivotably attached to the main door 78 via the lower bracket 726. Each assistive element 814 extends between and interconnects the corresponding arms 812 and the door casing 770.

The assistive elements 814 preferably comprise longitudinally extendable pneumatic cylinders, although other assistive element types may alternatively or additionally be provided.

To operate the main door assembly 710, an operator entering the cab 20 from the exterior thereof preferably first unlocks the main door 78 using a key, PIN pad, badge, proximity sensor, or any other technique known in the art. The lower exterior handle 716 is then turned, resulting in actuation of the lock engagement elements 718 and, in turn, of the lock assembly 722. This results in disengagement of the locking clips 742 from corresponding pins 820 (see, for instance, FIG. 41) defined by or extending from the upper bracket 724 fixed to the door casing 770.

The main door 78 may then be pushed backwards and upwards such that the guide elements 814 travel through the lower portions of the slots 798 and thus along the initial travel path segment 808 of the travel path 792.

The lower exterior handle 716 may then be used to lift the bottom of the main door 78 further upward. With reference to FIG. 39b, the bottom of the main door 78, adjacent the bottom margin 762, shifts upward, guided by receipt of the guide elements 756 in the upper portions of the slots 798 and thereafter in the channels 804 of the tracks 794. Alternatively stated, the guide elements 756 travel generally upward and forward along the primary travel path segment 806 of the travel path 792.

In contrast, the top of the main door 78, adjacent the top margin 760, shifts rearwardly, with a mid-region of the main door 78 pivoting about the distal ends 812b of the arms 812 concurrently with rearward swinging of the arms 812 themselves as they pivot about their proximal ends 812a.

During this intermediate stage of shifting, the actuation assembly 80 provides an upward and rearward force on the arms 812 via longitudinal or axial extension of the assistive elements 814 (e.g., the pneumatic cylinders) to assist in controlling the shifting of the main door 78 and reducing the force required of the operator to perpetuate the shifting.

When the bottom of the main door 78, adjacent the bottom margin 762, reaches the terminal travel path segment 810, it shifts slightly rearwardly as it continues its upward motion. The main door 78 in its final open position (see, for instance, FIG. 39c) is nearly horizontal, but with a slight upward tilt at the now rearward end (adjacent the initially top margin 760) thereof. The arms 812 are likewise generally horizontal, while the pneumatic cylinders or assistive elements 814 extend at a slight rearward angle relative to vertical.

When the main door 78 is in the open position, the locking clips 742 preferably lock the main door 78 into position through engagement with pins 822 (see FIGS. 40a and 40b) adjacent the top side 75 of the cab 20. The operator may then safely and easily enter the cab interior or operator area 768 through the open entryway 82.

To close the main door 78, the operator preferably first uses the thumb tabs 796 to disengage the locking clips 742 from the pins 822. The operator thereafter uses the interior side handles 728 to pull the main door 78 forward and downward, with the reverse process to that described above for opening occurring as a result.

To open the main door 78 from an internal position, the operator may again use the thumb tabs 796 to disengage the locking clips 742, this time from the pins 820. The operator may then use the interior side handles 728 to lift the main door 78 upward and rearward as described above with reference to externally initiated opening of the main door 78.

In a broad sense, the forward tilt of the main door 78 and the primary travel path segment 806, along with the actuation assembly 80, facilitates improved clearance of the main door 78 during opening and closing processes relative to an operator in the operator area 768. Increased overall space in the operator area 768 is also facilitated.

More particularly, with regard to the latter and as shown schematically in FIG. 45, when the main door 78 is in the closed position, the bottom margin 766 of the door panel 748 has a bottom margin closed position A, and the top margin 764 of the door panel 748 has a top margin closed position B. As discussed previously, the top margin closed position B is forward of the bottom margin closed position A by the forward tilt distance D1.

When the main door 78 is in the open position, the bottom margin 766 of the door panel 748 has a bottom margin open position A', and the top margin 764 of the door panel 748 has a top margin open position B'. (As will be readily understood by those of ordinary skill in the art, due to the up-and-over shifting of the main door 78, the "top" margin position B' in the open configuration is primarily a rearward position, and the "bottom" margin position A' is primarily a forward position.)

In a broad sense, the door panel 748 in the open configuration of the main door 78 is disposed in its entirety upward of its own prior position in the closed configuration. For instance, both the top margin open position B' and the bottom margin open position A' are spaced upwardly from the top margin closed position B (and, of course, likewise upward of the bottom margin closed position A).

As shown in FIG. 45, a vertical offset distance v may be defined between the top margin closed position B and the bottom margin open position A'. The vertical offset distance v is preferably between about one (1) inch and about five (5) inches, more preferably between about two (2) inches and about four (4) inches, and most preferably about two and eight tenths (2.8) inches.

In the illustrated embodiment, the open door panel 748 tilts slightly upwardly in the aft direction (or downwardly in the forward direction) such that the bottom margin open position A' denotes the lowermost extent of the door panel 748. That is, the top margin open position B' is positioned upward of the bottom margin open position A'. Thus, it may be understood that an even greater vertical offset distance is defined along the remainder of the door panel 748.

It is permissible according to some aspects of the present invention, however, for some or all of the door panel in the open configuration to be disposed lower than a portion of the door panel in the closed configuration, or for the door panel in the open configuration to tilt upward in the forward direction or to extend horizontally and devoid of tilt.

The door panel 748 in the open configuration of the main door 78 is also preferably disposed in its entirety rearward or aft of its own prior position in the closed configuration. As shown in FIG. 45, for instance, a horizontal offset distance h may be defined between the top margin closed position B and the bottom margin open position A'. The horizontal offset distance h is preferably between about two (2) inches and about six (6) inches, more preferably between about three (3) inches and about five (5) inches, and most preferably about three and eight tenths (3.8) inches.

The bottom margin open position A' is also preferably disposed rearward or aft of the bottom margin closed position A. In the illustrated embodiment of FIG. 45, for instance, a vertical axis A5 (parallel to the previously introduced vertical axis A4) extends through the bottom margin open position A'. The bottom margin closed position A is offset forward of the vertical axis A5 (and thus forward of the bottom margin open position A') by a horizontal shift distance s. In the illustrated embodiment, such horizontal shift distance s is preferably between about three tenths (0.30) inches and about one and one tenth (1.1) inches, more preferably between about five tenths (0.5) inches and about nine tenths (0.9) inches, and most preferably about seven tenths (0.7) inches.

It is permissible according to some aspects of the present invention, however, for some of the door panel in the open configuration to be disposed forward of at least a portion of the door panel in the closed configuration.

In a preferred embodiment, and again as best shown in FIG. 45, the panel 748 in the open configuration of the main door 78 forms an obtuse panel-to-vertical angle α relative to the vertical axis A5 as a result of the previously described tilt of the panel 748 in the open configuration. The panel-to-vertical angle α is preferably greater than ninety (90) degrees and less than about one hundred twenty (120) degrees, more preferably greater than ninety (90) degrees and less than about one hundred (100) degrees, and most preferably about ninety-two (92) degrees. It is permissible according to some aspects of the present invention, however, for the panel-to-vertical angle to instead by a right angle or even an acute angle.

A panel-to-panel angle β between the open and closed panel 748 extension planes may also be defined. The panel-to-panel angle β is preferably between about seventy-five (75) and one hundred (100) degrees, more preferably between about eighty (80) and ninety-five (95) degrees, and most preferably about eighty-seven (87) degrees.

Thus, the initial and final positions of the panel 748 (and, in turn, of the main door 78 in general) cooperatively demarcate an expanded operator area 768 through the course of door opening and closing relative to that which would be achieved via a conventional up-and-over door configuration in which the door is vertical (rather than tilted forward) in its closed position and is horizontal (rather than gently sloped upward in the rearward direction) in its open position. That is, whereas a conventional operator area might feature a square upper front corner, the main door 78 and the travel path 792 of the present invention are configured such that the operator area 768 includes a "bumped out" upper front corner and a "bumped up" upper margin that rises even more toward the expected operator head area when seated on the seat 21. Thus, the present design markedly improves the space in the interior area of the cab 20 and, in turn, may have a positive influence on operator comfort and performance.

Lap Bar with Display

Figure 47:
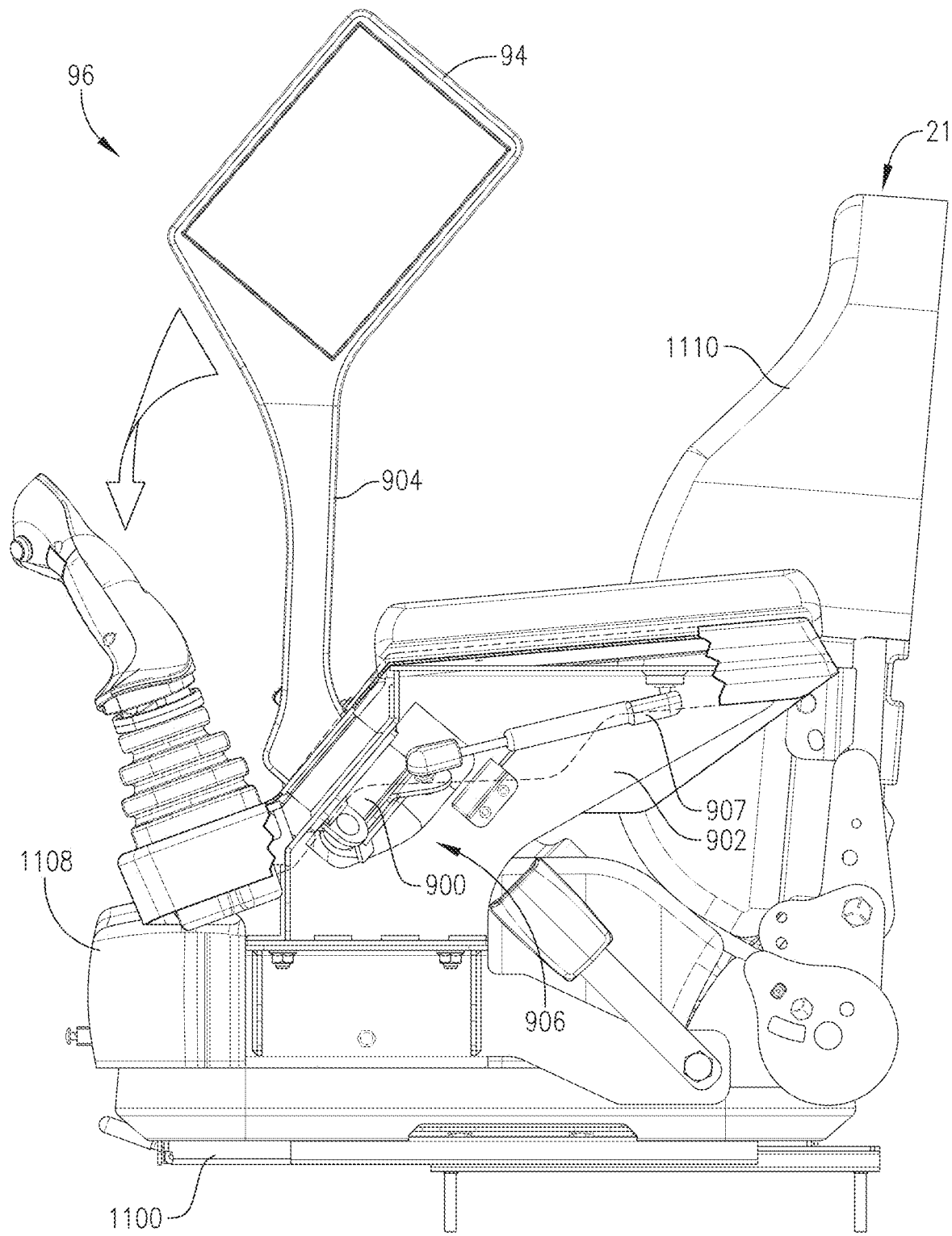
FIG. 47 is a side view of a seat constructed according to another embodiment of the invention with a lap bar in a raised, non-operating position.

Turning to FIG. 47, the lap bar 96 comprises a first portion 900 mounted to a frame structure 902 of the seat 21, such as an armrest support 902, a second portion 904 that is pivotally secured to the first portion 900, a sensor 906 for detecting the position of the first portion 900 and/or the second portion 904, and a gas spring 907 that biases the lap bar 96 in either a raised position or a lowered position. The first portion 900 may extend along an axis 908 (depicted in FIG. 48) that is oblique to a horizontal plane. The angle between the axis 908 and the horizontal plane may be about 30 degrees to about 50 degrees, or about 40 degrees. The first portion 900 may be at an angle relative to the horizontal plane to allow the second portion 904 to pivot without interfering with the joysticks 92. In some embodiments, the mount 1100 of the seat 21 is parallel to the horizontal plane and therefore the first portion 900 extends along an axis 908 that is oblique to the top surface of the mount 1100. The axis 908 may be oblique to a vertical plane and lie along a plane that is transverse to the vertical plane. In some embodiments, a portion of a front surface of the seat back 1110 is parallel to the vertical plane when the seat back 1110 is in the operating position so that the axis 908 is oblique to the portion of the front surface of the seat back 1110 when the seat back 1110 is in the operating position.

Figure 49:
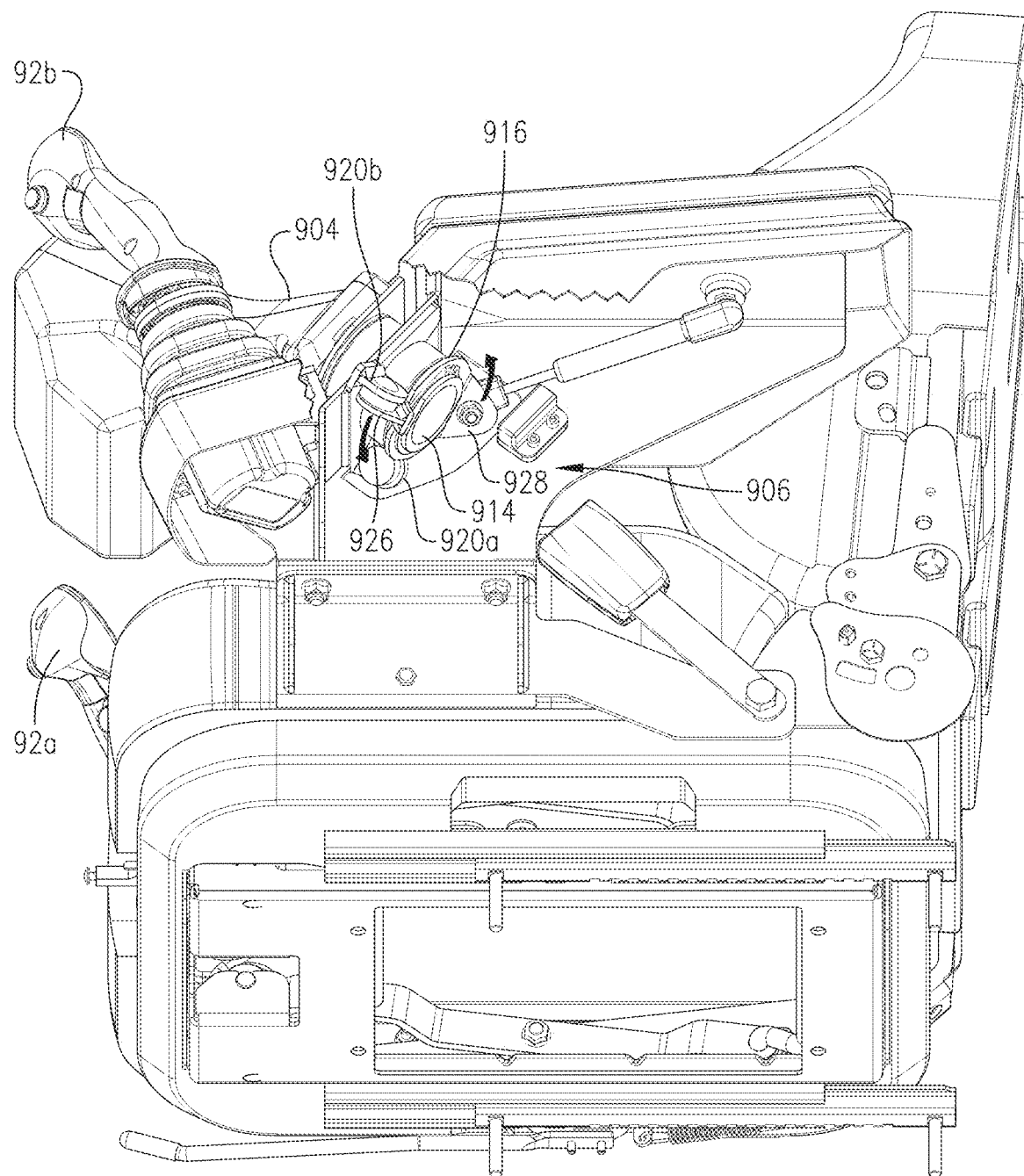
FIG. 49 is a side elevation view of the seat of FIG. 47 with the lap bar in the lowered, operating position.

The second portion 904 supports the display 94 and is operable to shift from a raised position and pivot downwards as indicated by the arrow in FIG. 47 to a lowered position (depicted in FIG. 49). The second portion 904 may pivot about the axis 908 so that it does not contact the joysticks 92a,b (depicted in FIG. 49) as it shifts between the raised and lowered positions. The second portion 904 may be parallel to the horizontal plane and/or the mount 1100 when the second portion 904 is in the lowered position. The second portion 904 may be parallel to the vertical plane when the second portion 904 is in the raised position. The second portion 904 may extend at an angle relative to the first portion 900. The second portion 904 may extend at an angle relative to the first portion 900 of about 115 degrees to about 135 degrees, and in preferred embodiments, at an angle of about 125 degrees.

Figure 48:
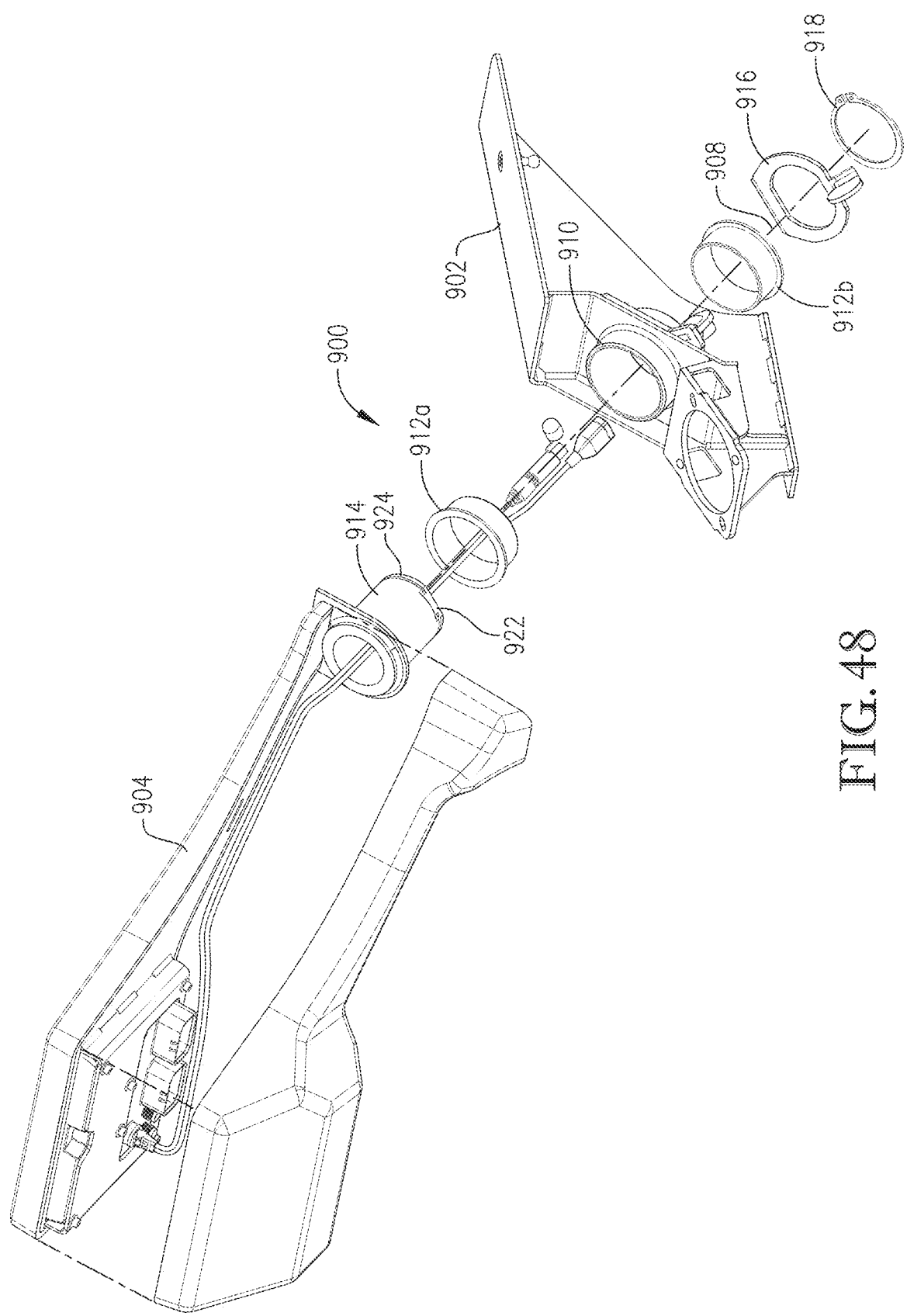
FIG. 48 is an exploded view of a first portion of the lap bar of FIG. 47.

FIG. 48 depicts an exploded view of the first portion 900 constructed according to an embodiment of the present invention. The first portion 900 may include a cylinder 910, a pair of bearing pieces 912a,b, a hollow shaft 914, a rotation limiter 916, and a locking mechanism 918. The cylinder 910 may be a stationary portion relative to the armrest support 902 and secured thereto. The cylinder 910 may receive the bearing pieces 912a,b. The cylinder 910 may include a pair of stops 920a,b (depicted in FIG. 49) that help limit the angle of rotation of the second portion 904, as discussed in further detail below.

The bearing pieces 912a,b receive the hollow shaft 914, which is connected to the second portion 904, and enable the hollow shaft 914 to rotate relative to the cylinder 910. However, the hollow shaft 914 may be fixed relative to the rotation limiter 916. In some embodiments, the hollow shaft 914 may include a key 922, such as a flat registering segment on its outer surface, that complements the rotation limiter 916 so that the rotation limiter 916 and the hollow shaft 914 are rotationally fixed relative to one another. The hollow shaft 914 may also include a groove 924 for receiving the locking mechanism 918.

Figure 50:
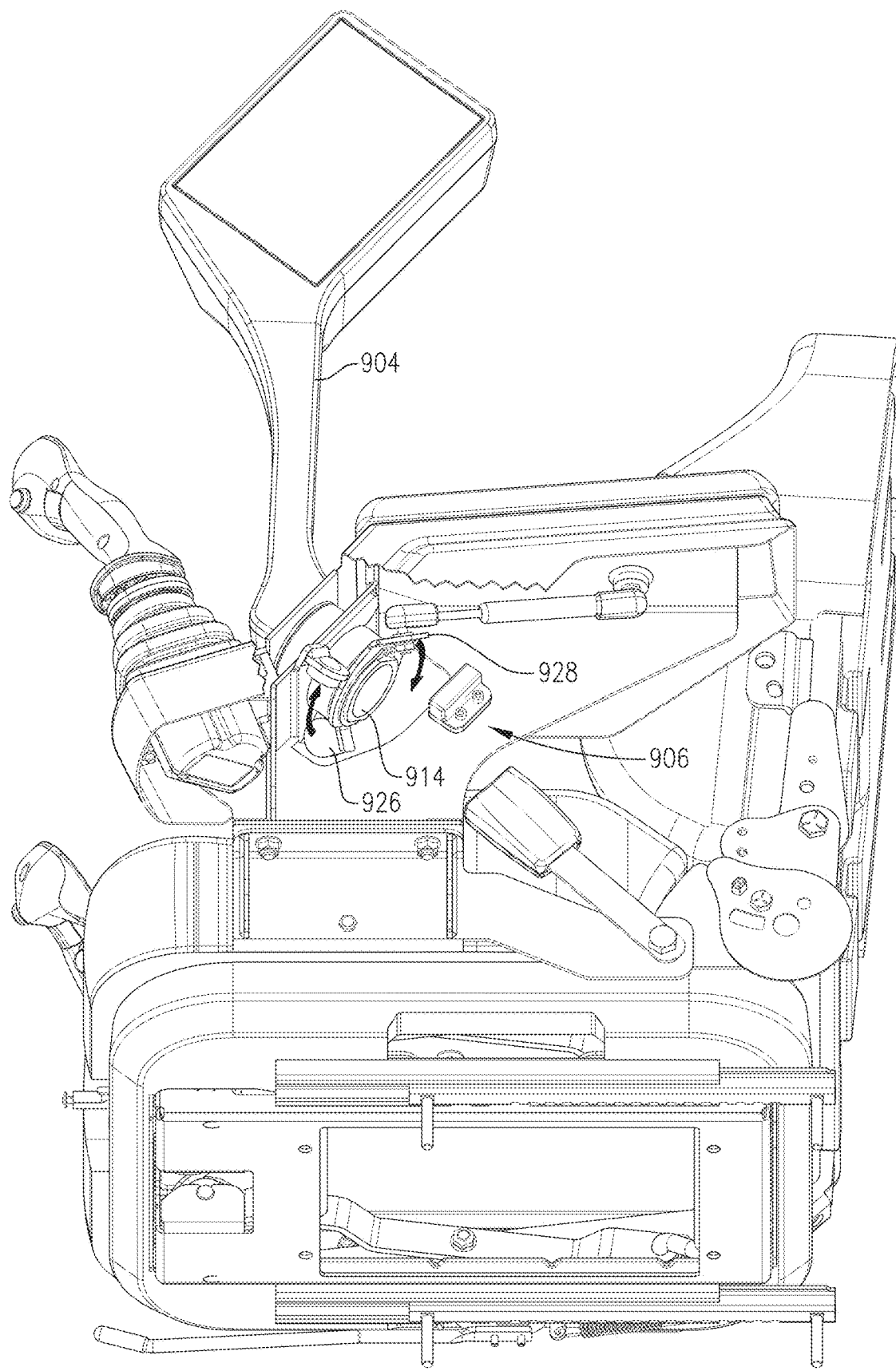
FIG. 50 is a side elevation view of the seat of FIG. 47 with the lap bar in the raised, non-operating position.

Turning to FIG. 49, the rotation limiter 916 receives the hollow shaft 914 and includes a first tab 926 for abutting the stops 920a,b to limit the angle of rotation of the rotation limiter 916, and therefore the hollow shaft 914 and the second portion 904. The first tab 926 may abut the stop 920b when the second portion 904 is in the lowered position. The rotation limiter 916 may also include a second tab 928 for securing to a linkage of the sensor 906. When the second portion 904 is being shifted to the raised position, the first and second tabs 926, 928 rotate as indicated by the arrows. FIG. 50 depicts the second portion 904 in the raised position and the tabs 926, 928 shifted accordingly with the first tab 926 abutting stop 920a. When the second portion 904 is being shifted back down to the lowered position, the tabs 926, 928 rotate as indicated by the arrows in FIG. 50.

Figure 51:
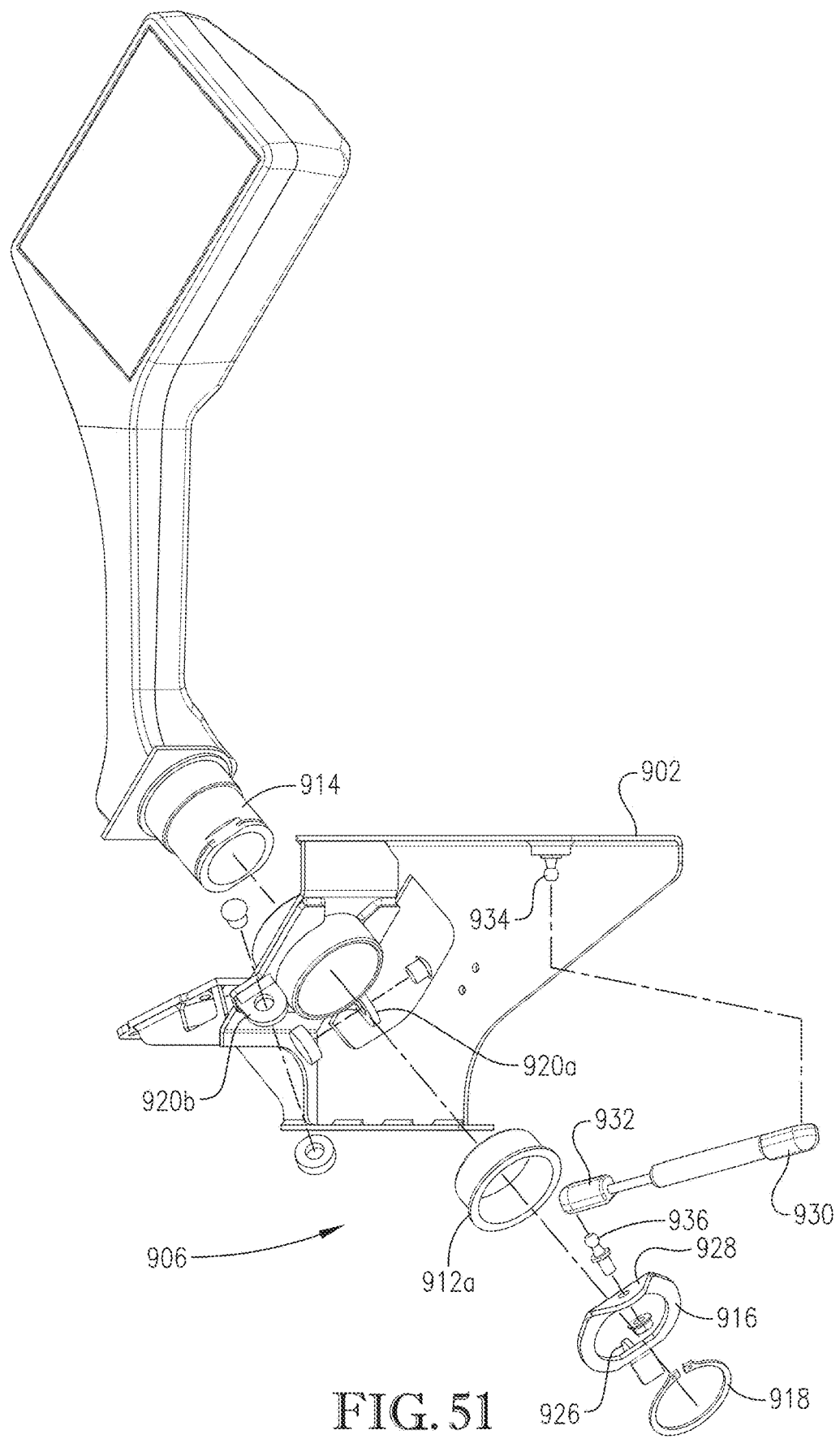
FIG. 51 is another exploded view of the first portion of the lap bar of FIG. 47.

Turning to FIG. 51, the sensor 906 may be a position sensor that detects a position of one or more components of the first portion 900, the second portion 904, or the gas spring 907. The sensor 906 may be configured to generate a signal representative of the position of one or more components of the lap bar 96. While the sensor 906 is depicted as being positioned proximate to the first portion 900, the sensor 906 may be connected to the second portion 904 without departing from the scope of the present invention. Further, the sensor 906 may be any other type of sensor for detecting positions of the tabs 926, 928 and/or other portions of the lap bar 96 without departing from the scope of the present invention.

In some embodiments, the sensor 906 may be configured to act as a switch so that the display is configured to turn off at least one function when the sensor 906 detects the second portion 904 is not in the lowered, operating position. The sensor 906 may be connected to a controller, as described elsewhere herein, and/or a processing element of the display 94. The processing element of the display 94 and/or the controller may be configured to receive signals from the sensor 906 and control activation and/or deactivation of certain functions of the touch screen or other user controls 22 based on the signals from the sensor 906. In some embodiments, the display may be completely turned off when the sensor 906 generates a signal indicative of the second portion 904 not being in the operating position. Additionally, the joysticks 92 may be inoperable when the sensor 906 generates a signal indicative of the second portion 904 not being in the lowered position.

The gas spring 907 is configured to bias the second portion 904 in the operating position and the raised position and aid in a smooth transition therebetween. The gas spring 907 comprises a cylinder 930 that is pivotally linked to the armrest support 902 and a rod 932 pivotally linked to the second tab 928 as the rod 932 extends and retracts from the cylinder 930 when the second portion 904 is shifted between the raised and lowered position. The cylinder 930 and rod 932 may be pivotally connected to ball joints 934, 936 on the armrest support 902 and the second tab 928.

Figure 52:
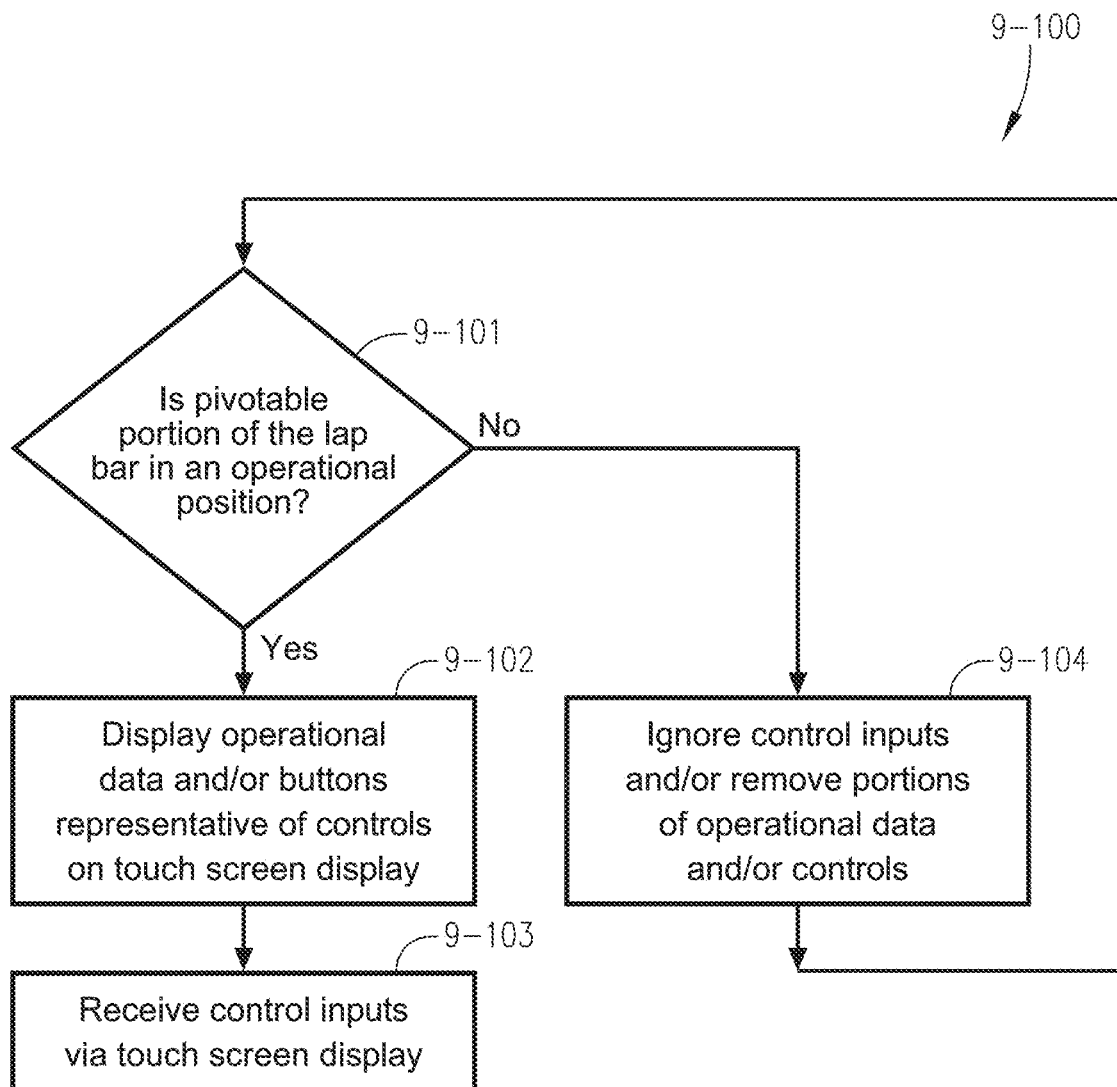
FIG. 52 is a flowchart depicting exemplary steps of a method of interfacing with a user of a work machine according to an embodiment of the present invention.

The flow chart of FIG. 52 depicts the steps of an exemplary computer-implemented method 9-100 of interfacing with a user of a work machine. In some alternative implementations, the functions noted in the various blocks may occur out of the order depicted in FIG. 52. For example, two blocks shown in succession in FIG. 52 may in fact be executed substantially concurrently, or the blocks may sometimes be executed in the reverse order depending upon the functionality involved. In addition, some steps may be optional.

The method 9-100 is described below, for ease of reference, as being executed by exemplary devices and components introduced with the embodiments illustrated in the figures. For example, the steps of the method 9-100 may be performed through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 9-101, a pivotable portion, or the second portion described above, of a lap bar is determined to be in an operational position via a sensor. The sensor may be configured to detect a position of the pivotable portion, which may pivot about an axis along which a stationary portion, or the first portion described above, extends. The stationary portion may be mounted to a seat of the work machine and extend obliquely relative to a horizontal plane. The sensor may be configured to detect that the pivotable portion, and therefore the lap bar, is in the operational position. The sensor may also be configured to detect that the pivotable portion is not in the operational position.

Referring to step 9-102, operational data of the work machine is displayed via a touch screen display mounted on the pivotable portion. The operational data may include an engine RPM, engine oil levels, fuel levels, engine temperature, hydraulic fluid levels, operation runtime, or the like. This step may also include graphically displaying buttons representative of work machine controls. The work machine controls may include a climate control function, control input configurations, audio controls, lighting controls, or the like.

Referring to step 9-103, control inputs are received via the touch screen display. The control inputs may include inputs associated with the climate control function, a selection of a control input configuration, an audio control input, a lighting control input, or the like.

Referring back to step 9-101, the pivotable portion may be determined, via the sensor, to not be in the operational position. This step may include the sensor determining that the pivotable portion has pivoted beyond a threshold angle. Alternatively, this step may include the sensor determining that the pivotable portion is not at a certain angular position relative to the stationary first portion. Alternatively, this step may include the sensor determining that the pivotable portion has pivoted all the way up to the raised position. The threshold at which this determination is made via the sensor and/or a processing element of the work machine may be of any range without departing from the scope of the present invention.

Referring to step 9-104, at least one of the control inputs received via the touch screen display is ignored via a processing element. Additionally, portions of the operational data may be removed from the touch screen display. In some embodiments, some of the control inputs may still be functional, and in other embodiments, this step may include deactivating or turning off, via the processing element, the touch screen display. This avoids mistaken control inputs when the lap bar is shifting or when not in use. This step may also include disabling, via the processing element, the joysticks of the work machine when the sensor detects that the pivotable portion is not in the operational position.

The method 9-100 may include additional, less, or alternate steps and/or device(s), including those discussed elsewhere herein. For example, the method 9-100 may include determining, via the sensor in the seat and/or the processing element, that the user is not in the seat and disabling, via the processing element, the joysticks when the sensor in the seat detects that the user is not in the seat.

Automatic Cab Tilting

Turning briefly back to FIG. 10, the actuator 46 may be connected to the rearward portion 12(b) of the frame and a bottom portion 1002 of the back side 74 of the cab 20. The actuator 46 may be pivotable relative to the rearward portion 12(b) of the frame and to the back side 74 of the cab 20. The actuator 46 may be operable to provide a force of at least 10,000 Newtons (N) of force (or 2,248 pounds-force) up to 20,000 N (4496 pounds-force). In preferred embodiments, the actuator 46 is rated to provide a static force of at least 15,569 N (3500 pounds-force). The actuator 46 may be configured to shift the cab 12 so that it pivots about the hinged connection up to 20 degrees. In some embodiments, the actuator 46 may be configured to shift the cab 12 so that it pivots about the hinged connection up to 30 degrees or up to 45 degrees.

In some embodiments, the actuator 46 comprises an electrohydraulic actuator having a housing 1004 connected to the rearward portion 12(b) and a driving piston 1006 connected to the back side 74 of the cab 20. The housing 1004 may be pivotally connected to the rearward portion 12(b) via a pivoting connector 1008, such as a clevis bracket.

A distal end 1010 of the driving piston 1006 may be pivotally connected to the back side 74 of the cab 20 via a pivoting connector 1012 (also perhaps referred to as cab pivot joint 304), which may also be a clevis bracket. The pivoting connector 1012 may be positioned between the hinged connection and the bottom of the cab 20 so that the actuator 46 does not require an excessive amount of force, thereby stressing the hinged connection, and can be compactly housed by the rearward portion 12(b) of the frame without requiring a wide angular clearance for pivoting when shifting the cab 20. In some embodiments, the pivoting connector 1012 is positioned a third of the way down to two-thirds of the way down from the hinged connection to the bottom of the cab 20. In some embodiments, the pivoting connector 1012 is positioned less than halfway down from the hinged connection to the bottom of the cab 20. In some embodiments, the pivoting connector 1012 is positioned about midway between the hinged connection and the bottom of the cab 20.

The driving piston 1006 may be operable to extend out of the housing 1004, thereby raising the cab 20, and retract within the housing 1004, thereby lowering the cab 20, when the actuator 46 is activated. As the driving piston 1006 extends out of the housing 1004, the cab 20 is tilted upwards about a laterally extending horizontal axis along the hinged connection of the cab 20 and frame 12. In some embodiments, the driving piston 1006 may have a stroke between 10 centimeters (cm) (or about 4 inches) up to about 46 cm (or about 18 inches).

Figure 53:
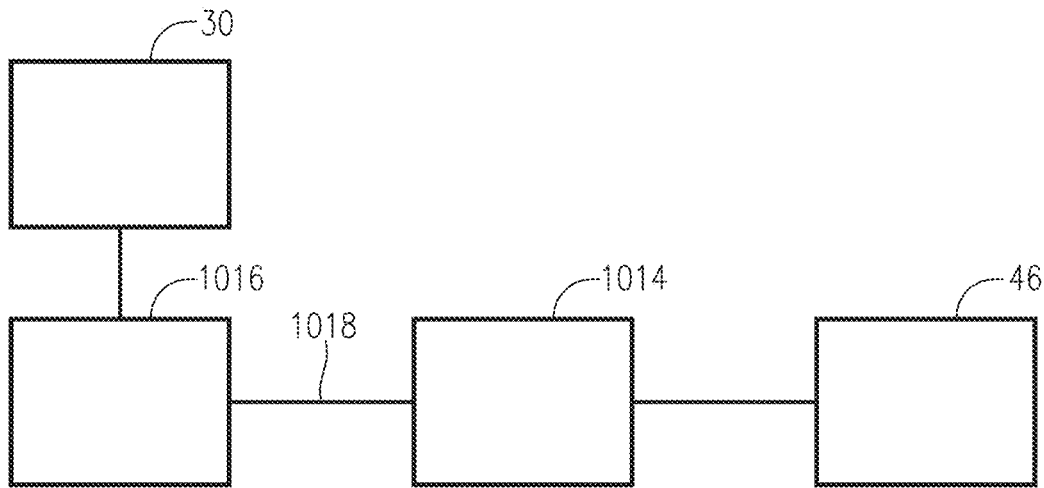
FIG. 53 is a schematic diagram depicting selected components of the loader of FIG. 1.

The actuator 46 may be powered by the energy storage device 1016, or battery, positioned in the interior compartment of the frame 12 so that the electrohydraulic actuator 46 can actuate the cab 20 when the engine is not operating. However, in alternative embodiments, the electrohydraulic actuator 46 can be powered by electricity generated by the alternator, which generates electrical power from mechanical energy of the engine. The actuator 46 may be activated by a switch 1014 (depicted in FIG. 1) that is electrically connected to the battery 1016 and operable to electrically connect the battery 1016 to the electrohydraulic actuator 46 and/or provide a control signal for directing the actuator 46 to raise or lower the cab 20. The switch 1014 is positioned outside the cab 20 so that an operator can lift the cab 20 to view components of the loader 10 beneath the cab 20 within the interior compartment of the frame 12. The actuator 46 may be electrically connected to the battery 1016 via an energy storage device connector 1018 (depicted in FIG. 53).

Figure 54:
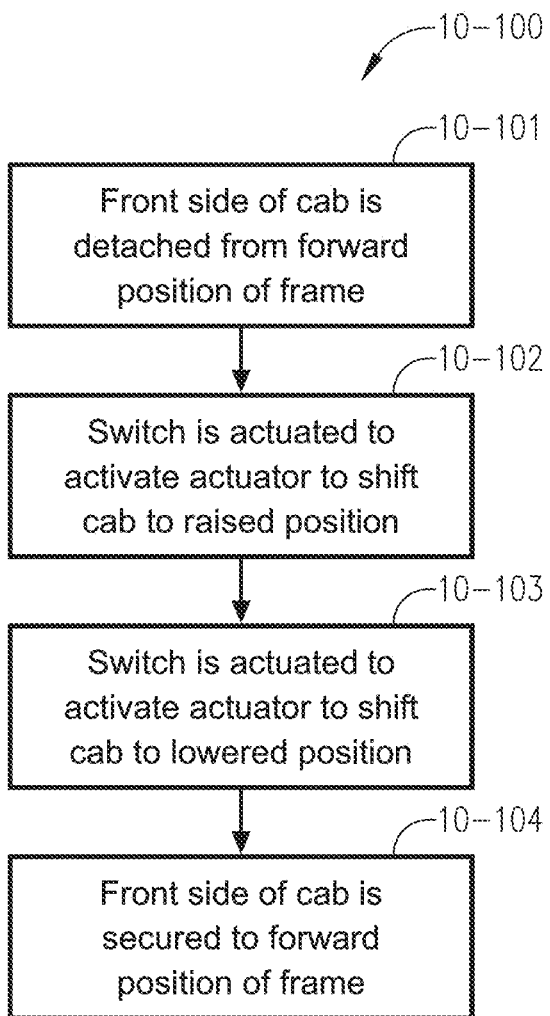
FIG. 54 is a flowchart depicting a method of providing access to components of a work machine according to an embodiment of the present invention.

The flow chart of FIG. 54 depicts the steps of an exemplary method 10-100 of providing access to components of a work machine. In some alternative implementations, the functions noted in the various blocks may occur out of the order depicted in FIG. 54. For example, two blocks shown in succession in FIG. 54 may in fact be executed substantially concurrently, or the blocks may sometimes be executed in the reverse order depending upon the functionality involved. In addition, some steps may be optional. The method 10-100 is described below, for ease of reference, as being executed by exemplary devices and components described herein with respect to embodiments of the present invention (e.g., processors, transceivers, hardware, software, firmware, or combinations thereof).

Referring to step 10-101, a front side of a cab of a work machine is unlatched or detached from a forward portion of a frame of the work machine. The front side of the cab may be secured to the frame via bolts, latches, pins, or the like. This step may include turning off an engine or motor of the work machine. Alternatively, the step may include turning on an engine or motor of the work machine in order to, for example, view the operation of the engine or motor after the cab is raised. This step may include electrically connecting an energy storage device connector to an energy storage device, or battery, positioned within said interior compartment.

Referring to step 10-102, a switch is actuated to provide a control signal and/or power to an actuator for shifting the cab of the work machine to its raised position. This step can be performed by the operator when the operator is positioned outside of the cab. The switch may be electrically connected to the battery or other power source separate from an alternator and rectifier circuit of the engine of the work machine. This enables the cab to be actuated when the engine is off. The switch may be electrically connected to the actuator, which may be an electrohydraulic actuator operable to extend and retract. While in the raised position, the components of the work machine mounted in the interior compartment on the frame below the cab may be accessed. The components may include the engine, hydraulic systems, or the like.

Referring to step 10-103, the switch is actuated to provide a control signal and/or power to the actuator for shifting the cab of the work machine to its lowered position. This step can also be performed by the operator being positioned outside of the cab.

Referring to step 10-104, the front side of the cab is latched or secured to the forward portion of the frame.

The method 10-100 may include additional, less, or alternate steps and/or device(s), including those discussed elsewhere herein.

Seat-Mounted Controls

Figure 55:
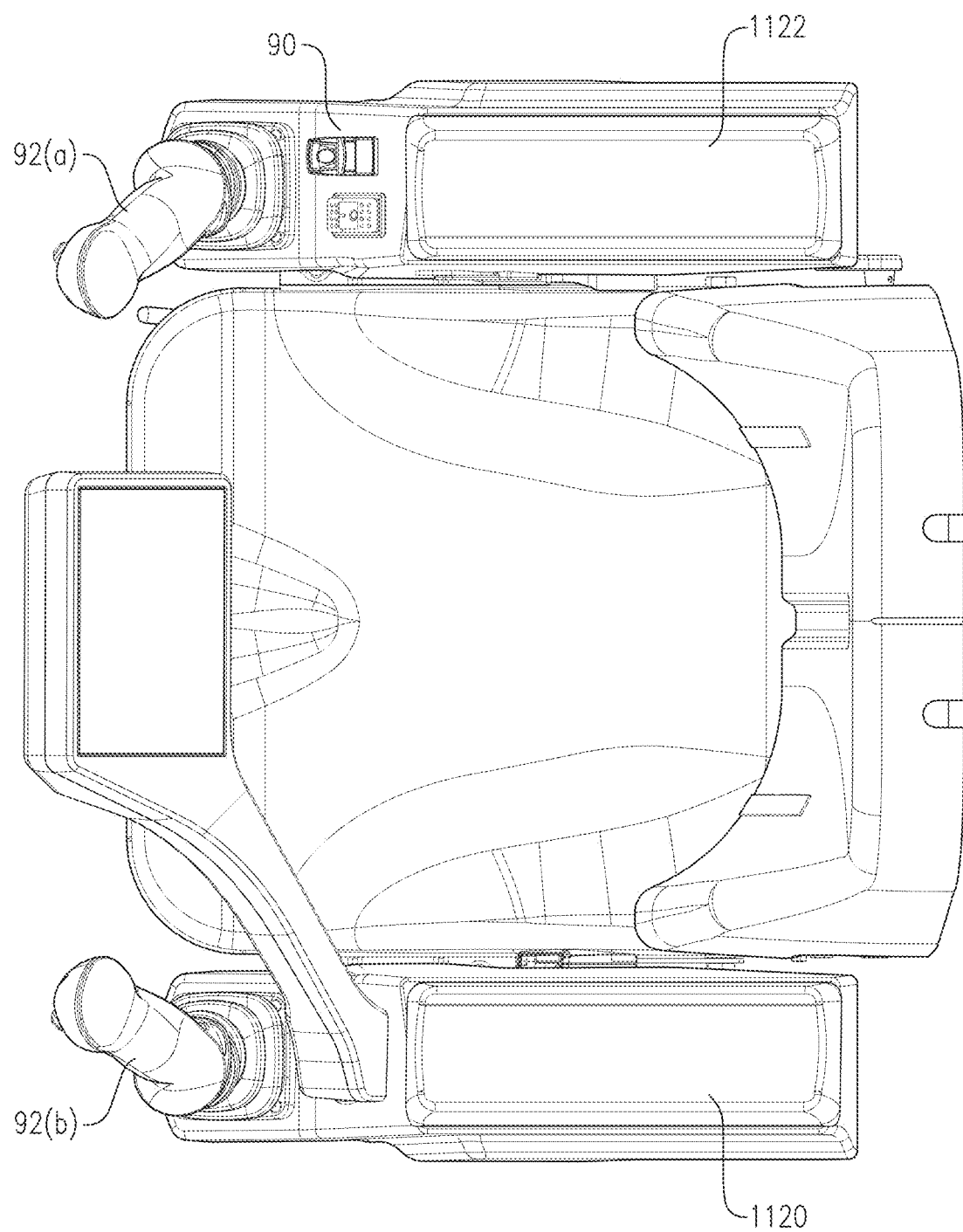
FIG. 55 is a top perspective view of the interior space of a cab of the loader from FIGS. 1-8.

As discussed above, the interior space of the cab 20 includes a plurality of user controls 22 (e.g., buttons, switches, levers, joysticks, touchscreen displays, etc.) that the operator can access and manipulate when the operator is seated on the seat 21. In more detail, and with primary reference to FIGS. 15a,b the seat 21 may include a suspension mount 1100, a seat frame 1102 (depicted in FIGS. 14a,b), a first armrest support 1104 (also depicted in FIGS. 14a,b), a second armrest support 1106, a seat base 1108, a seat back 1110, joystick supports 1112, 1114, the control panel 90, a lap bar support 1118, and a pair of armrests 1120, 1122 (See also FIG. 55) on which a user may rest his/her arms when seated in the seat 21 and operating the loader 10. The suspension mount 1100 supports the seat frame 1102 and is secured to a bottom panel 1124 of the cab 20. The suspension mount 1100 is operable to absorb vibrations generated from operation of the work machine 10. The suspension mount 1100 may comprise springs, elastomeric pieces, pneumatic or hydraulic cylinders, or the like that absorb at least some of the energy transferred from the bottom panel of the cab 20 to the seat 21.

As discussed above, the interior space of the cab 20 includes a plurality of user controls 22 (e.g., buttons, switches, levers, joysticks, touchscreen displays, etc.) that the operator can access and manipulate when the operator is seated on the seat 21. In more detail, and with primary reference to FIGS. 15a,b the seat 21 may include a mount 1100, a seat frame 1102 (depicted in FIGS. 14a,b), a first armrest support 1104 (also depicted in FIGS. 14a,b and referred to as armrest support 902 above), a second armrest support 1106, a seat base 1108, a seat back 1110, joystick supports 1112, 1114, the control panel 90, a lap bar support 1118, and a pair of armrests 1120, 1122 (See also FIG. 55) on which a user may rest his/her arms when seated in the seat 21 and operating the loader 10. The mount 1100 supports the seat frame 1102 and is secured to a bottom panel 1124 of the cab 20. The seat frame 1102 includes suspension elements that are operable to absorb vibrations generated from operation of the work machine 10. The suspension elements may comprise springs, elastomeric pieces, pneumatic or hydraulic cylinders, or the like that absorb at least some of the energy transferred from the bottom panel of the cab 20 to the seat 21.

The seat frame 1102 is secured to the mount 1100 and supports the armrest supports 1104, 1106, the seat base 1108, and the seat back 1110. The seat frame 1102 may be operable to shift relative to the mount 1100 so that the seat can be adjusted forwards and backwards. Additionally, the seat back 1110 may be pivotally connected to the seat frame 1102 so that the seat back 1110 can tilt forwards and backwards. The seat frame 1102 may also support at least a portion of a seat belt 1126 (depicted in FIGS. 14*a*,*b*).

The armrest supports 1104, 1106 support the armrests 1120, 1122 and in some embodiments, the armrest supports 1104, 1106 also support the joystick supports 1112, 1114, the control panel 90, and the lap bar support 1118. The control panel 90 and the lap bar support 1118 are mounted to their respective armrest supports 1104, 1106 between the respective joystick supports 1112, 1114 and armrests 1120, 1122. This enables the lap bar to pivot down onto the lap of the operator without contacting the joysticks. The armrest support 1106 has a top surface that is higher than the control panel 90 to prevent accidental pressing of buttons on the control panel 90 via an operator's forearm. The lap bar support 1118 also has a top surface that is lower than a top surface of armrest support 1104 so that the lap bar extends beneath an operator's arm when resting on the armrest 1120 when the lap bar is in a lowered position. The pair of joysticks 92 may be positioned forward of the armrests on the joystick supports 1112, 1114 such that an operator can comfortably reach the joysticks 92 when seated in the seat 21. The display 94 on the lap bar may be positioned so that at least a portion of it is generally at a midpoint between the joysticks 92. In some embodiments, the display 94 is shifted left of the midpoint by one inch or about 2.54 centimeters. In some embodiments the display 94 is within 5 centimeters of the midpoint.

In some work machines, the seat and controls often move or oscillate independently during operation. This creates unintended feedback loops, such as bucking or rocking. The inventors have found that because the controls (such as the joysticks 92, which may include throttle controls, the display 94, and the control panel 90) are secured to the seat 21, the controls and the seat 21 move synchronously and therefore reduce such unintended feedback loops. Further, the seat 21 and therefore the controls being suspended on the mount 1100 reduces other unintended feedback loops caused by vibrations during operation. These aspects improve the control and performance of the work machine 10. Additionally, the display 94 is also connected to the seat 21 via the lap bar 96 and lap bar support 1118, and is therefore also suspended, which reduces vibrations on the display 94. This increases the longevity of the display and enables the display 94 to present a higher number of graphical representations as the dampening of the vibrations helps an operator avoid pressing on the wrong portion of the display 94. This is at least partially enabled by the controls being EOH controls. Traditional hydraulic controls and linkages are more rigid than electrical lines and are often tethered to different portions of a cab, which requires the controls to vibrate generally synchronously with the cab. This prevents the controls from being partially mechanically insulated from the cab via suspensions as asynchronous movement could cause stress and wear on the controls.

Figure 56:
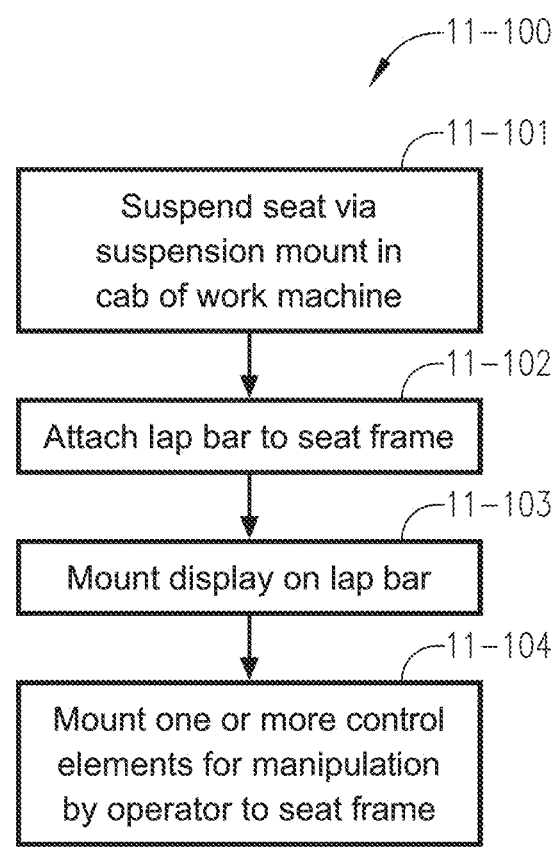
FIG. 56 is a flowchart depicting exemplary steps of a method of reducing unintended feedback loops during operation of a work machine according to an embodiment of the present invention.

The flow chart of FIG. 56 depicts the steps of an exemplary method 11-100 of reducing unintended feedback loops during operation of a work machine. In some alternative implementations, the functions noted in the various blocks may occur out of the order depicted in FIG. 56. For example, two blocks shown in succession in FIG. 56 may in fact be executed substantially concurrently, or the blocks may sometimes be executed in the reverse order depending upon the functionality involved. In addition, some steps may be optional. The method 11-100 is described below, for ease of reference, as being executed by exemplary devices and components described herein with respect to embodiments of the present invention (e.g., processors, transceivers, hardware, software, firmware, or combinations thereof).

Referring to step 11-101, a seat frame is suspended on a mount in a cab of the work machine. The seat frame may include armrest supports, supports for controls, etc. The supports for controls may include joystick supports, a control panel, and a lap bar support, and they may be attached to the armrest supports.

Referring to step 11-102, a lap bar is attached to the seat frame. The lap bar may be attached to the seat frame via the lap bar support and one of the armrest supports. The lap bar may be pivotable from a raised position to a lowered position.

Referring to step 11-103, a display is mounted to the lap bar. The display may be mounted to an end of the lap bar so that the display is positioned between the armrest supports of the seat in the operational position. The display may be a touchscreen display operable to receive control inputs from the operator.

Referring to step 11-104, one or more control elements configured to be manipulated by the operator to control functions of the work machine to the seat frame so that the control elements are also suspended, thereby at least partially synchronizing movement of the seat frame and the control elements and at least partially attenuating a transfer of energy from the cab to the seat frame to reduce the unintended feedback loop. The control elements may include buttons, joysticks, or the like.

The method 11-100 may include additional, less, or alternate steps and/or device(s), including those discussed elsewhere herein. For example, one or more inputs may be received via the control elements or the display.

Fan Nozzle

The present invention will now be described in more detail, and particularly with reference to embodiments of the cooling system. As was previously described, the cooling system may comprise the fan 40, which is attached to the rear side of the engine 30, as illustrated in FIGS. 12 and 13. In addition, the cooling system may comprise the radiator 42 positioned rearward of the fan 40 and integrated with the access door 28 (such that the radiator 42 is configured to rotate open and closed in conjunction with the access door 28). Turning to the fan 40 in more detail, the fan 40 may be housed within a grating-style frame assembly that helps protect the fan 40 from being damaged by impacting objects and also prevent potential injuries by individuals inadvertently contacting the fan 40.

Figure 57:
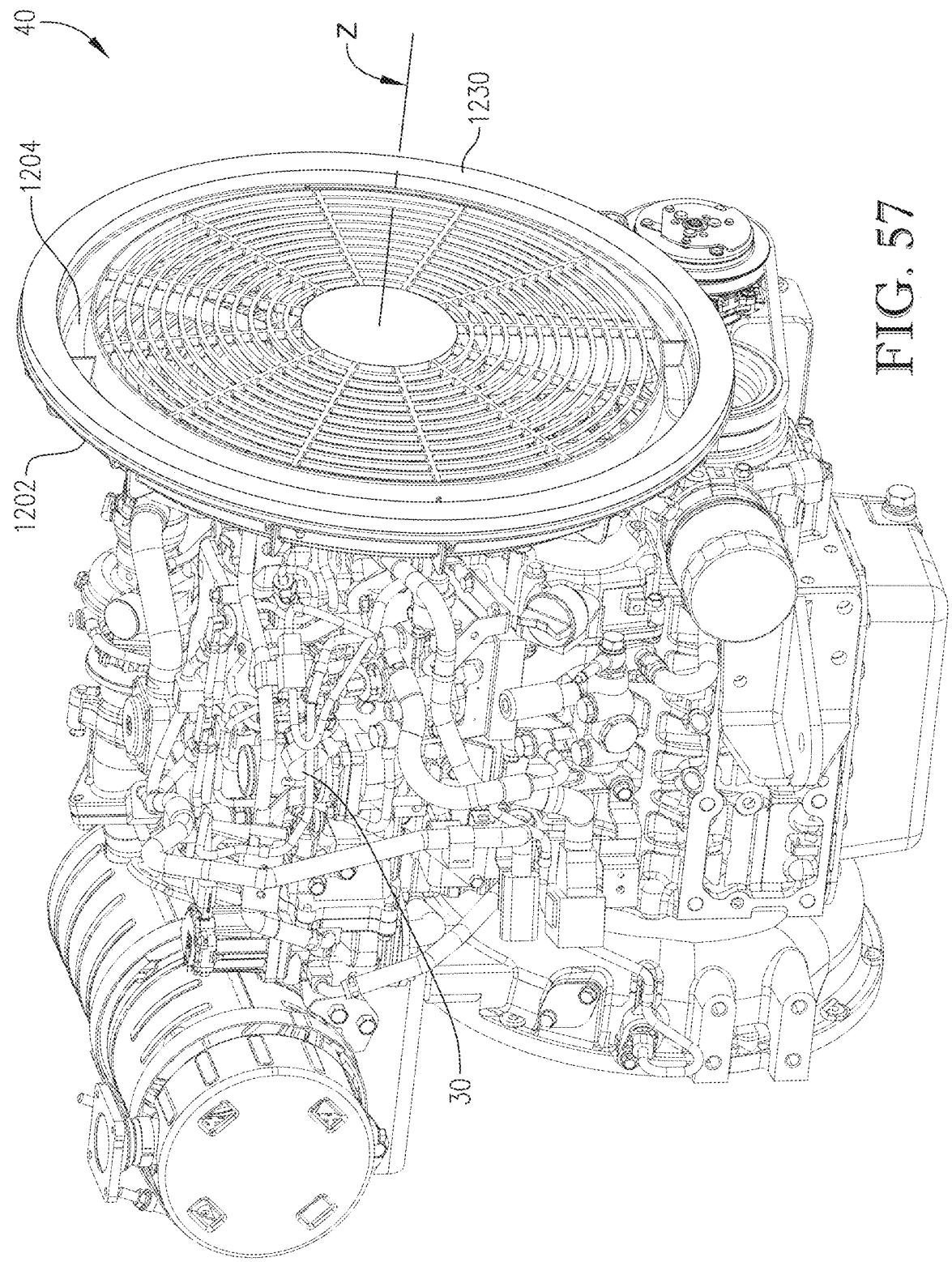
FIG. 57 is left side perspective view of an engine, as well as a fan and a nozzle from a cooling system associated with the engine, from the loader of FIGS. 1-8.
Figure 58:
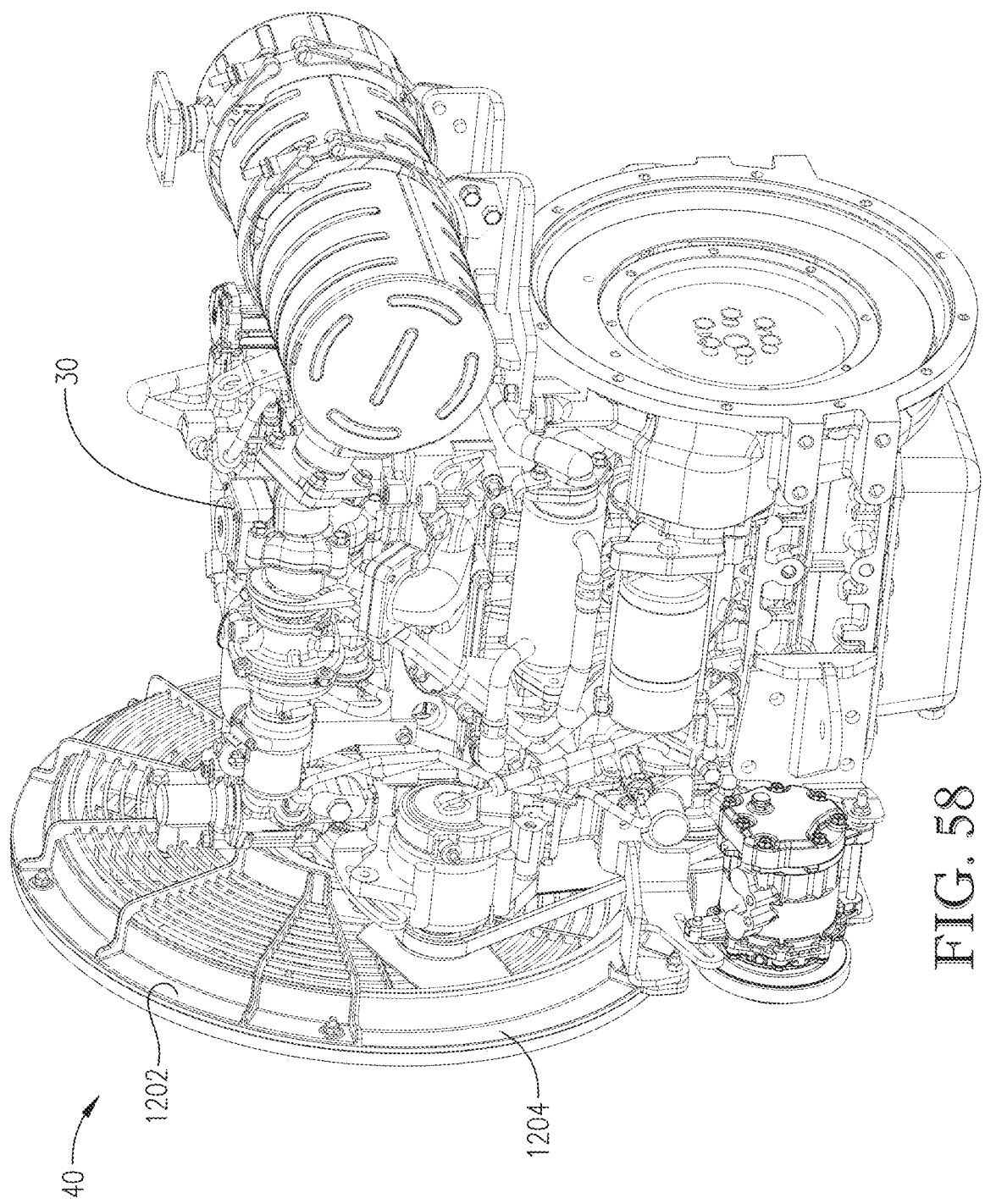
FIG. 58 is a right side perspective view of the engine, fan, and nozzle from FIG. 57.
Figure 59:
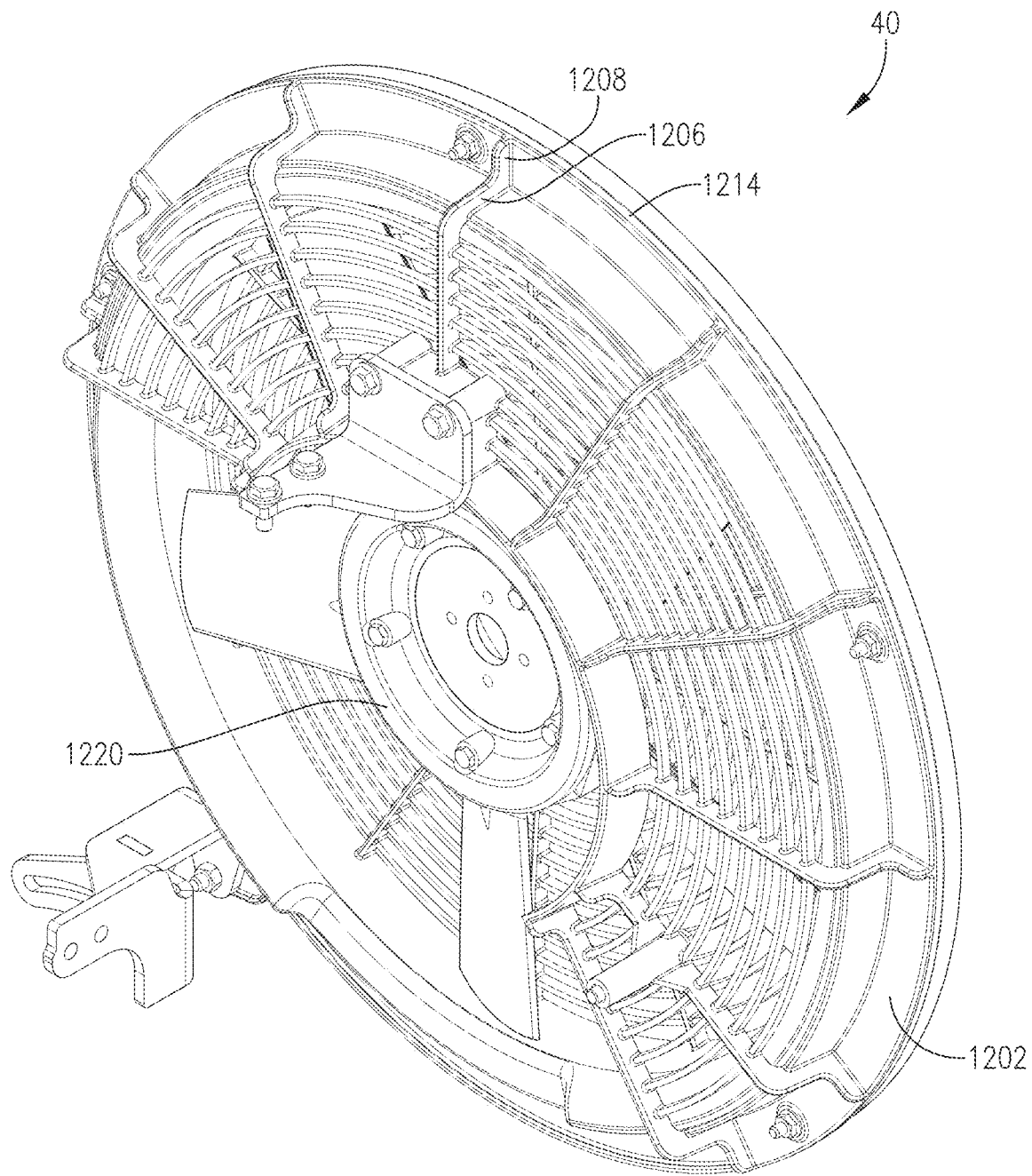
FIG. 59 is a front perspective of the fan and nozzle from FIGS. 57 and 58.
Figure 60:
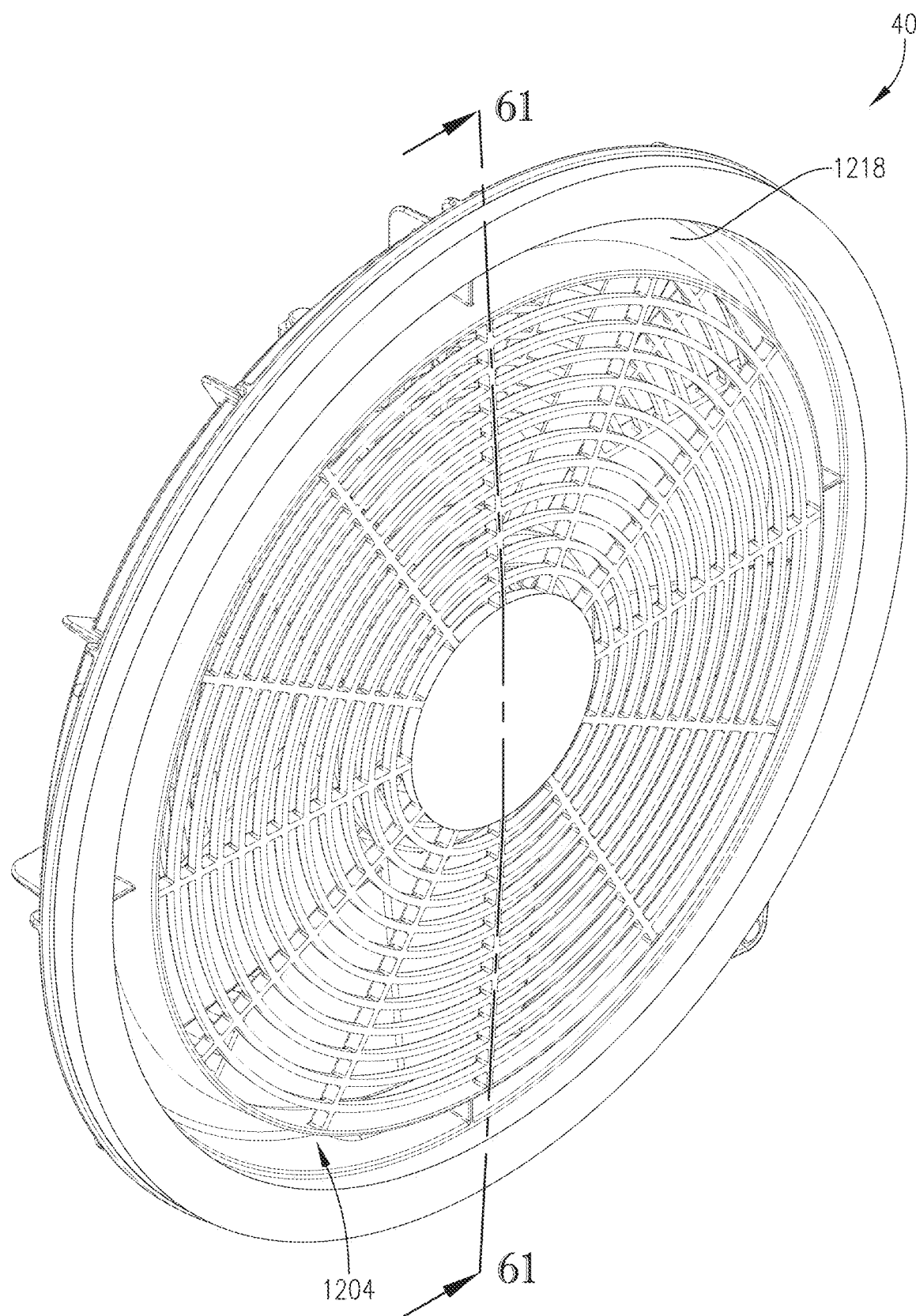
FIG. 60 is a rear perspective of the fan and nozzle from FIGS. 57-59.

Broadly, as illustrated in FIGS. 57 and 58, the frame assembly may be generally circular (e.g., having a perimeter surrounding a center) comprising a base frame 1202 and a nozzle frame 1204. The center of the frame assembly may be a rotational axis "Z" about which the fan 40 rotates (See FIG. 57). With reference to FIG. 59, the base frame 1202 may be in the form of a generally circular-shaped grating portion, which may comprise a plurality of concentrically positioned circular frame elements intersected by a plurality of radially extending and angularly spaced frame elements. Similarly, as shown in FIG. 60, the nozzle frame 1204 may be in the form of a circular shaped grating portion, which may comprise a plurality of concentrically positioned circular frame elements intersected by a plurality of radially extending and angularly spaced frame elements.

Figure 61:
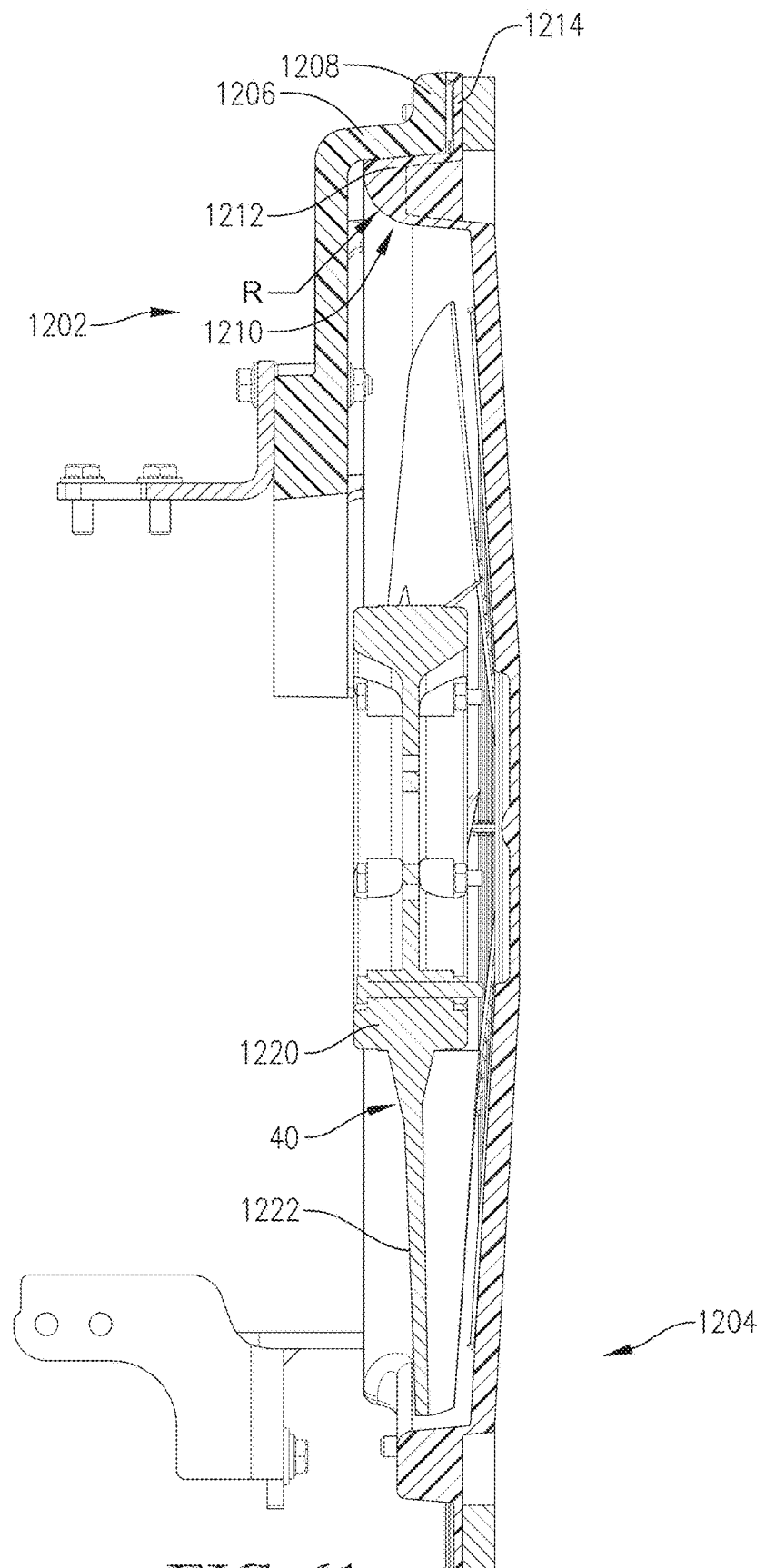
FIG. 61 is a cross section taken along the line 61-61 from FIG. 60.

With reference to FIG. 61, the perimeter of the base frame 1202 (e.g., at least partially circumscribing the rotational axis Z) comprises an axially-extending flanged surface 1206 that extends rearward and generally perpendicular to the grating portion of the base frame 1202. It is noted that the flanged surface 1206 extends generally parallel with the rotational axis Z of the fan 40. Thus, as used herein with respect to the cooling system, the term "axial" or "axially" is used to mean colinear with or parallel to an axis (e.g., the rotational axis Z). The perimeter of the base frame 1202 may additionally comprise a radially-extending flanged surface 1208 that extends outward and generally perpendicular to the cylindrical flanged surface 1206. The base frame 1202 may be directly mounted to the rear side of the engine 30 via one or more mounting brackets that couple the front side of the base frame 1202 to the rear side of the engine 30.

Remaining with FIG. 61, and as described in more detail below, the perimeter of the nozzle frame 1204 (e.g., at least partially circumscribing the rotational axis Z) comprises a convergent nozzle surface 1210 that extends in a curvilinear fashion forward and radially outward from the grating portion of the nozzle frame 1204. The perimeter of the nozzle frame 1204 may additionally comprise an axially-extending flanged surface 1212 that extends rearward from a forward edge of the convergent nozzle surface 1210. It is noted that the flanged surface 1212 extends generally parallel with the rotational axis Z of the fan 40. The perimeter of the nozzle frame 1204 may additionally comprise a radially-extending flanged surface 1214 that extends outward and generally perpendicular to the flanged surface 1212. The nozzle frame 1204 may be directly mounted to the rear side of the base frame 1202 by engaging the nozzle frame 1204 with the base frame 1202 such that the flanged surface 1212 of the nozzle frame 1204 is engaged with the flanged surface 1206 of the base frame 1202, and further such that the flanged surface 1214 of the nozzle frame 1204 is engaged with the flanged surface 1208 of the base frame 1202. Fasteners may extend through the adjacent flanged surface 1214, 1208 to secure the nozzle frame 1204 to the base frame 1202.

Returning to the convergent nozzle surface 1210 in more detail, the convergent nozzle surface 1210 may extend rearward from the forward edge of the cylindrical flanged surface 1212 to the grating portion of the nozzle frame 1204. The convergent nozzle surface 1210 may have a curvilinear shape, such that the interior diameter of the nozzle frame 1204 (as measured from a point on the convergent nozzle surface 1210, through the rotational axis Z, and to an opposing point on the convergent nozzle surface 1210 on an opposite side of the nozzle frame 1204) may reduce traveling along the convergent nozzle surface 1210 from front to back. In more detail, at a forward-most point, the convergent nozzle surface 1210 may extend generally perpendicularly from the cylindrical flange surface 1212, such that the forward-most portion of the convergent nozzle surface 1210 is approximately radially oriented. However, the convergent nozzle surface 1210 begins to flatten out, and extend axially, moving rearward along its curvilinear shape. In some embodiments, the convergent nozzle surface 1210 will have a radius of curvature R from 0.60 to 1.00 radians, from 0.65 to 0.95 radians, from 0.70 to 0.90 radians, from 0.75 to 0.85 radians, or about 0.80 radians. As a result, when the rearward-most end of the convergent nozzle surface 1210 contacts the grating portion of the nozzle frame 1204, the convergent nozzle surface 1210 has flattened out to form a generally axially-extending surface around the perimeter of the nozzle frame 1204. Such a cylindrical shape of the convergent nozzle surface 1210 (i.e., the rearward-most portion of the convergent nozzle surface 1210) is generally cylindrical so as to extend generally parallel with (e.g., circumscribing) the rotational axis Z of the fan 40.

Furthermore, and with reference to FIG. 60, a rearward-facing portion the nozzle frame 1204 may present a concavity 1218 at the perimeter where the convergent nozzle surface 1210 is joined with cylindrical flanged surface 1210 (See, FIG. 61). Such concavity 1218 permits for the formation of the convergent nozzle surface 1210 while using a reduced amount of material in the manufacture of the nozzle frame 1204. For example, in some embodiments, the nozzle frame 1204 may be formed from a plastic using an injection molding process, and the concavity permits for a reduced amount of plastic to be used during manufacturing.

When the nozzle frame 1204 is coupled with the base frame 1202, the grating portions of the two frames 1202, 1204 are set apart from each other so as to form an interior space referred to as a fan-receiving space, as illustrated in FIG. 61. The fan-receiving space is sufficiently sized to receive the fan 40 and to permit the fan to rotate therein. In some embodiments, the fan 40 may comprise a hub 1220 and a plurality of angularly spaced fan blades 1222 each extending radially from the hub 1220. The fan 40 may be configured such that free ends or tips of the fan blades 1222 may be spaced apart from the convergent nozzle surface 1210 from 0.10 to 0.40, from 0.15 to 0.35, from 0.20 to 0.30, or about 0.25 inches. The fan 40 may be configured to rotate via power provided by the engine 30. For example, the hub 1220 of the fan 40 may be aligned with a crank shaft of the engine 30 so as to be directly rotated by rotary power provided by the crank-shaft. In other embodiments, the fan 40 may be powered by an arrangement of belts and pulleys that receive rotary power from the engine 30 (e.g., interconnected with a pulley powered by the crank-shaft). In certain embodiments, the convergent nozzle surface 1210 may extend around the entire perimeter of the nozzle frame 1204; however, in other embodiments, the convergent nozzle surface 1210 may only extend around a portion of the perimeter of the nozzle frame 1204 (See, e.g., FIG. 59) so as to provide space for placement of belts and pulleys needed to power the fan 40. In some embodiments, the convergent nozzle surface 1210 will extend around at least 60%, at least 70%, at least 80%, at least 90%, or at least 95% of the perimeter of the nozzle frame 1204.

Similarly, in certain embodiments, the base frame 1202 may form a complete circular shape. However, in other embodiments, the base frame (including the grating portion and the perimeter portion) may only extend around a portion of the circular shape, such that the base frame is missing a "pie piece" or wedge portion necessary to complete the complete circular shape (See, e.g., FIG. 59). Such missing portions (of the complete circular shape) may provide space for placement of belts and pulleys needed to power the fan 40. In some embodiments, the base frame 1202 will form at least 60%, at least 70%, at least 80%, at least 90%, or at least 95% of a circular shape.

As was described previously, the cooling system may also include the radiator 42 incorporated within the access door 28, in such a manner that the radiator 42 can rotate along with the access door 28 between opened and closed positions. The radiator 42 may comprise a generally rectangular housing holding a plurality of fins through which fluid flows. Airflow can be passed over/through the fins so as to cool the fluid flowing therein. In some embodiments, the radiator 42 may include a shroud 1224 positioned on a forward side of the housing of the radiator 42, as shown in FIGS. 12 and 13. Thus, the shroud 1224 may be configured to rotate along with the radiator 42 when the access door 28 is opened and closed. The shroud 1224 may comprise a thin, rectangular plate with a circular-shaped opening. The opening of the shroud may be positioned over (and/or otherwise aligned with) the fins of the radiator such that airflow may pass through the opening of the shroud 1224 and through the fins of the radiator 42.

During normal operation of the cooling system, the access door 28 will be in the closed position, such that the radiator 42 is engaged with the nozzle frame 1204. In particular, the shroud 1224 may be engaged with the rear side of the flanged surface 1214 of the nozzle frame 1204. In certain embodiments, a ring gasket 1230, as shown in FIG. 57, will be positioned between the shroud 1224 and the rear side of the flanged surface 1214 of the nozzle frame 1204, so as to provide a secure, fluid-sealing connection between the shroud 1224 and the nozzle frame 1204. The ring gasket 1230, as well as the flanged surfaced 1214, may be sized with an interior diameter that is generally equivalent with the diameter of the circular opening of the shroud 1224, so as to facilitate airflow from the fan 40 into the radiator 42.

Figure 6:
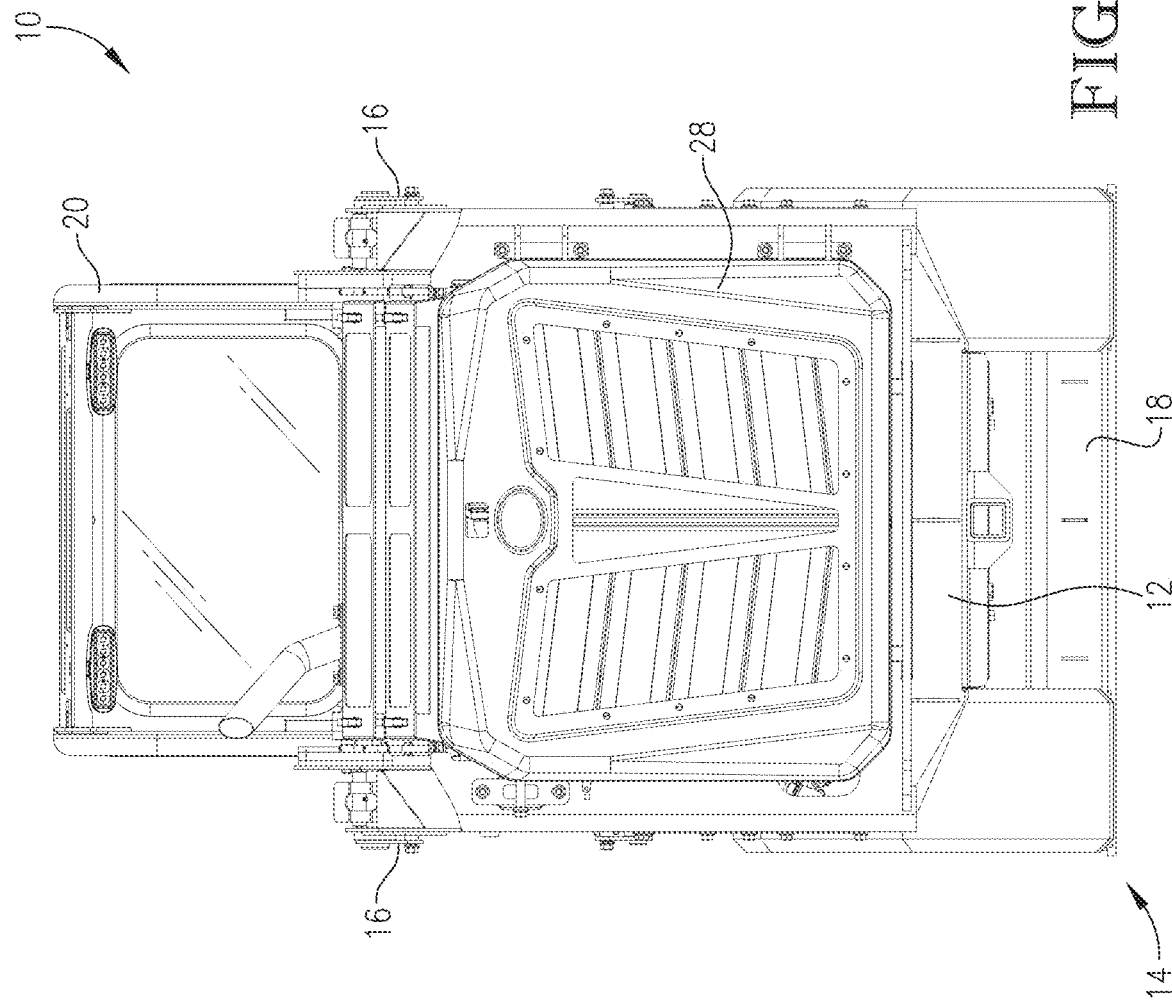
FIG. 6 is a rear elevation view of the loader from FIGS. 1-5.
Figure 7:
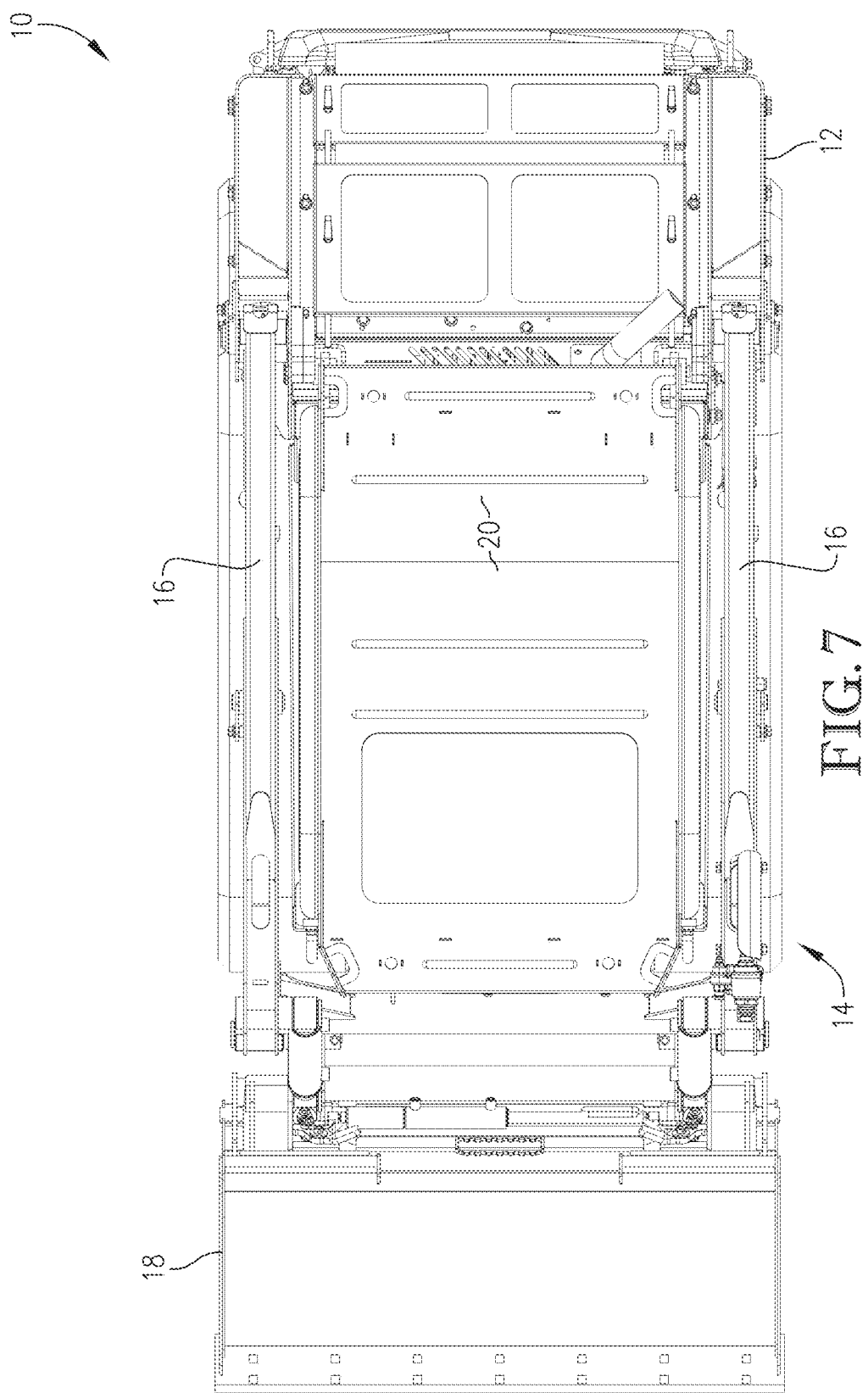
FIG. 7 is a top plan view of the loader from FIGS. 1-6.
Figure 8:
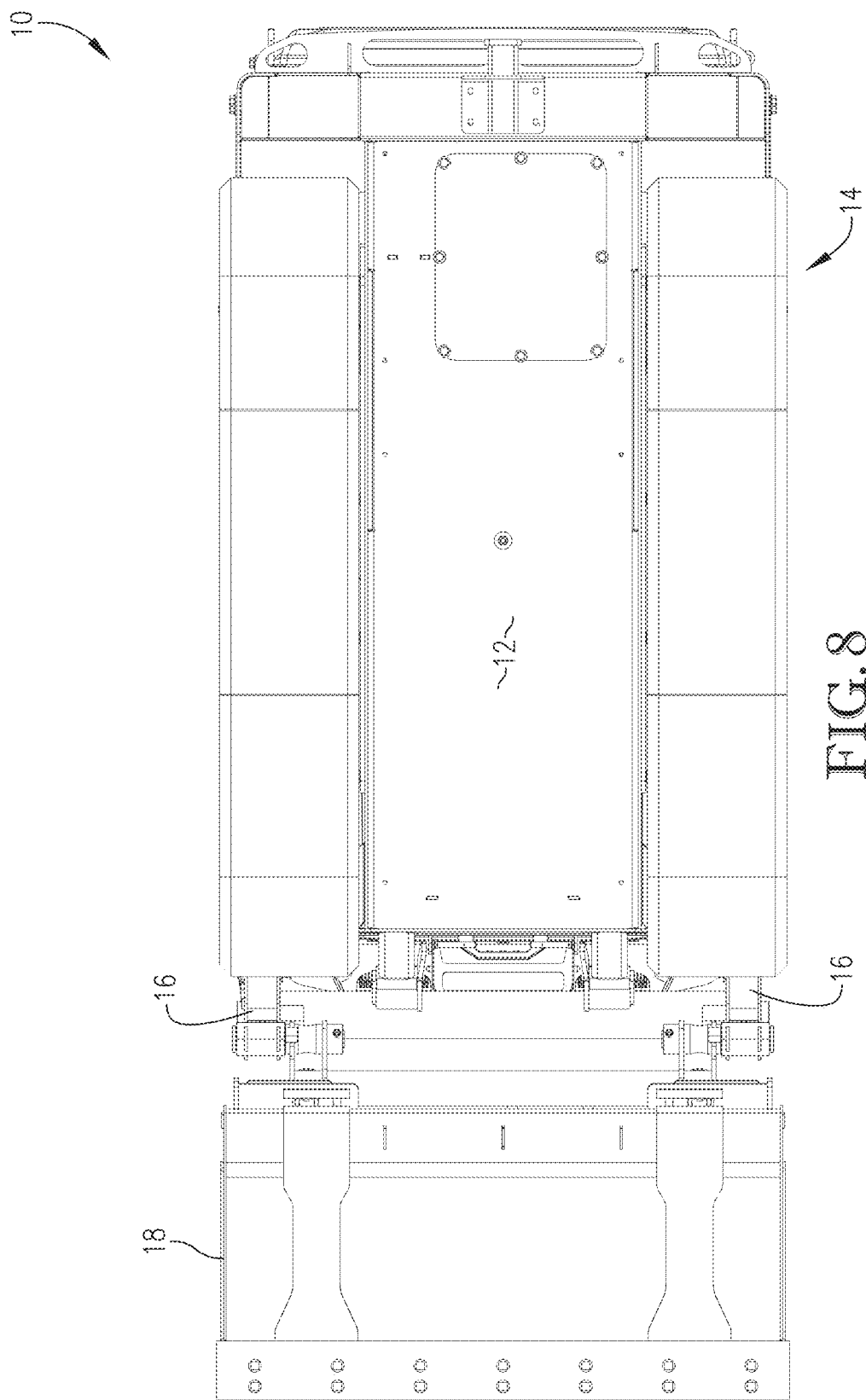
FIG. 8 is a bottom plan view of the loader from FIGS. 1-7.

In more detail, during normal operation, the fan 40 will rotate so as to draw airflow from the engine 30. In some embodiments, as perhaps best shown in FIGS. 7 and 10, the rearward portion 12(b) of the frame 12 may include inlet air vents positioned on a top side of the frame 12. Air can be drawn in from such air vents (via a negative pressure created by the fan 40) and forced (e.g., pulled) across the engine 30. The airflow will pass from the engine 30 and into the interior space presented by the base and nozzle frames 1202, 1204. The fan 40 will, thereafter force the airflow rearward through the opening in the shroud 1224 and through the fins of the radiator 42 (e.g., pushed through the radiator 42). Beneficially, the ring gasket 1230, which is compressed between the nozzle frame 1204 and the shroud 1224 of the radiator 42, permits the airflow to pass directly through the opening in the shroud 1224. Correspondingly, the opening in the shroud 1224 permits the airflow to pass directly over/through the fins of the radiator 42. The airflow will exit the frame 12 by passing through air vents located on the back side of the access door 28, such as illustrated in FIG. 6.

Beneficially, as the airflow passes through the nozzle frame 1204, the convergent nozzle surface 1210 forces the airflow to increase in speed, which provides more flow to the radiator 42 to allow for more efficient cooling operations. In addition, the increased speed of the airflow, as provided by the convergent nozzle surface 1210, has been shown to reduce turbulence, and therefore unwanted noise, generated by the fan 40. Furthermore, because the base frame 1202, the nozzle frame 1204, and the fan 40 are all attached to the engine 30 (instead of to the radiator 42 and/or the shroud 1224), the base frame 1202, the nozzle frame 1204, the fan 40, and the engine 30 all move/vibrate in unison, which can allow for smaller tolerances to be achieved for the manufacture and assembly of such components. Although the above description illustrates how the cooling system can be configured to pull air across the engine 30, through the fan 40, and through the radiator 42, other embodiments may be configured to push air across the engine 30. For example, the fan 40 and the frame assembly (i.e., the base frame 1202 and the nozzle frame 1204) may each be rotated about one-hundred and eighty (180) degrees about a vertical axis, so as to be flipped around. As such, the fan 40 may be configured to push cooling air across the engine 40. It should be understood that with the frame assembly flipped, the convergent nozzle surface 1210 will provide more flow to the radiator 42 to allow for more efficient cooling operations.

In some embodiments, the components of the cooling system may be formed from various types of materials. For instance, the base frame 1202 may be formed from metals (e.g., steel, aluminum, etc.) or other materials with high resistance to problems associated with interactions with high heat (e.g., heat generated by the engine 30). The nozzle frame 1204, on the other hand, may be formed from plastics, or other light-weight and durable material. In some embodiments, the nozzle frame 1204 may be injection or spin molded. The ring gasket 1230 may be formed from foam, rubber, plastic, or the like. Furthermore, as discussed above, the shroud 1224 may be formed from aluminum, plastic, or other light-weight and durable material.

Drivetrain Layout

Figure 62:
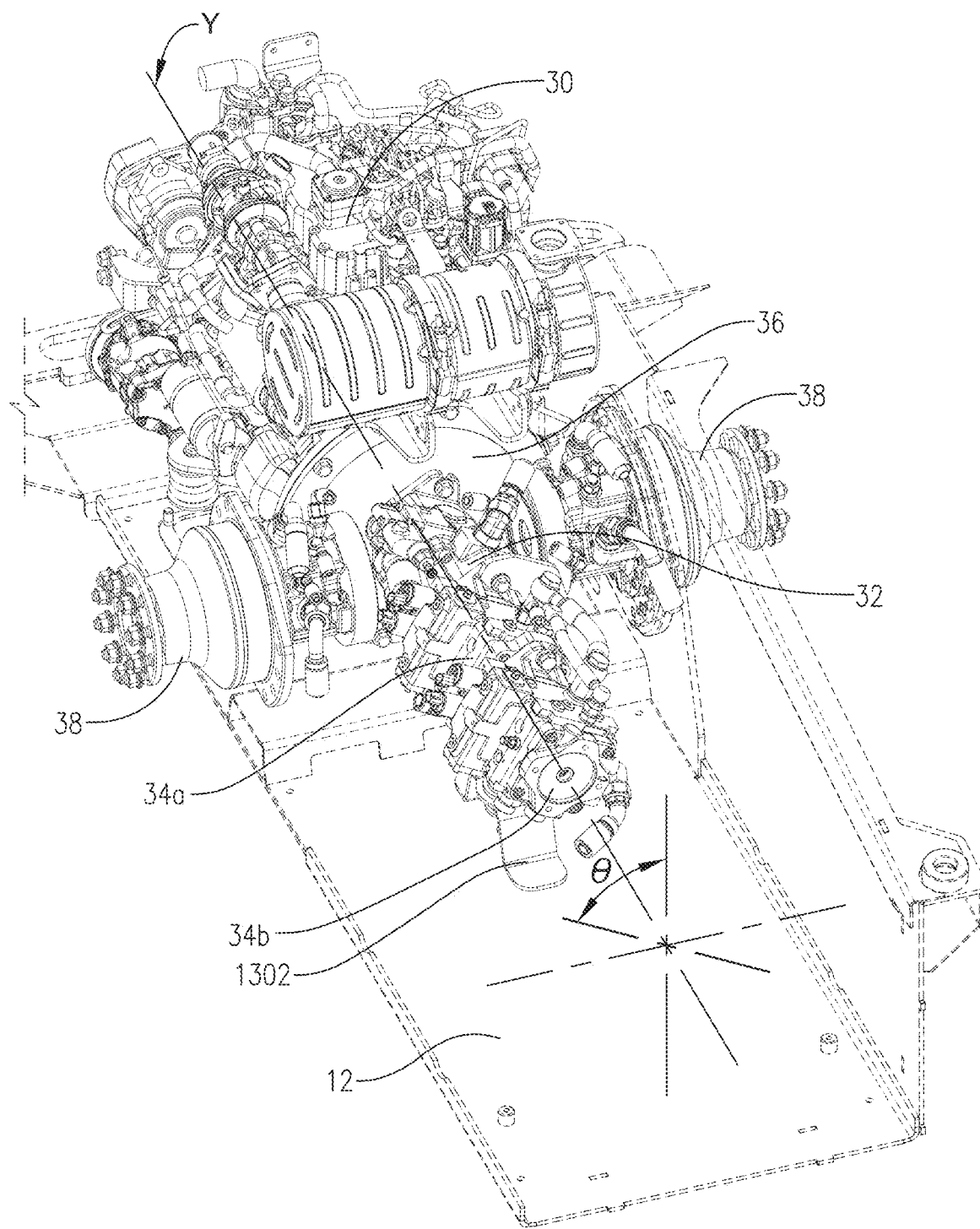
FIG. 62 is a perspective view of an engine, a hydraulic auxiliary pump, a first hydrostatic transmission, a second hydrostatic transmission, and hydraulic drive motors separate, with portion of the loader of FIGS. 1-8 removed.

As was described above, and as illustrated in FIG. 11, within the interior space of the frame 12 (i.e., within the housing of the frame 12) may be positioned the engine 30, the flywheel 36, the auxiliary pump 32, and the hydrostatic transmission 34. In some embodiments, as will be discussed in more detail below, the loader 10 may include a first hydrostatic transmission 34a and a second hydrostatic transmission 34b, as shown in FIG. 62. As such, the engine 30 may provide rotary power to each of the flywheel 36, the auxiliary pump 32, and the hydrostatic transmissions 34a, 34b. In some embodiments, the engine 30 may include a power take-off that is aligned along a drive axis "Y" that extends forward from the engine 30. The flywheel 36 may be coupled with a front side of the engine 30 with rotary power being transferred from the engine 30 to the flywheel 36 along the drive axis "Y." The auxiliary pump 32 may be coupled with a front side of the flywheel 36 with rotary power being transferred from the flywheel 36 to the auxiliary pump 32 along the drive axis "Y." In alternative embodiments, the loader 10 may not include a flywheel 36, in which case the auxiliary pump 32 may be directly coupled with the front side of the engine 30. The hydrostatic transmission 34 may be coupled with a front side of the auxiliary pump 32 with rotary power being transferred from and/or through the auxiliary pump 32 to the hydrostatic transmission 34 along the drive axis "Y." In some embodiments, as noted above and as illustrated in FIG. 62, the hydrostatic transmission 34 may be a first hydrostatic transmission 34a, and the loader 10 may additionally include a second hydrostatic transmission 34b. In such embodiments, the second hydrostatic transmission 34b may be coupled with a front side of the first hydrostatic transmission 34a with rotary power being transferred from the first hydrostatic transmission 34a to the second hydrostatic transmission 34b along the drive axis "Y." Thus, rotary power from the engine 30 can be passed, in sequence, to the flywheel 36, to the auxiliary pump 32, to the first hydrostatic transmission 34a, and to the second hydrostatic transmission 34b. Furthermore, in some embodiments, one (or both) of the first and second hydrostatic transmission 34a, 34b may be coupled to the interior of the frame 12 via a weldment or mounting bracket 1302, as shown in FIG. 62. Such weldment or mounting bracket 1302 may aid in supporting the first and second hydrostatic transmission 34*a*, 34*b*, as well as the auxiliary pump 32, at their proper position/orientation within the frame 12.

In view of the above, and as shown in FIGS. 11 and 62, the auxiliary pump 32 may be positioned forward of the engine 30 (and/or the flywheel 36). Correspondingly, the first and second hydrostatic transmissions 34*a*, 34*b* may be positioned forward of the auxiliary pump 32. As such, the auxiliary pump 32 may be positioned between (in a forward-rearward, longitudinal direction) the engine 30 (and/or the flywheel 36) and the first and second hydrostatic transmissions 34*a*, 34*b*. Furthermore, as illustrated in FIGS. 11 and 62, in some embodiments, the auxiliary pump 32 may be positioned between the pair of drive motors 38 (in a side-to-side, lateral direction).

Figure 63:
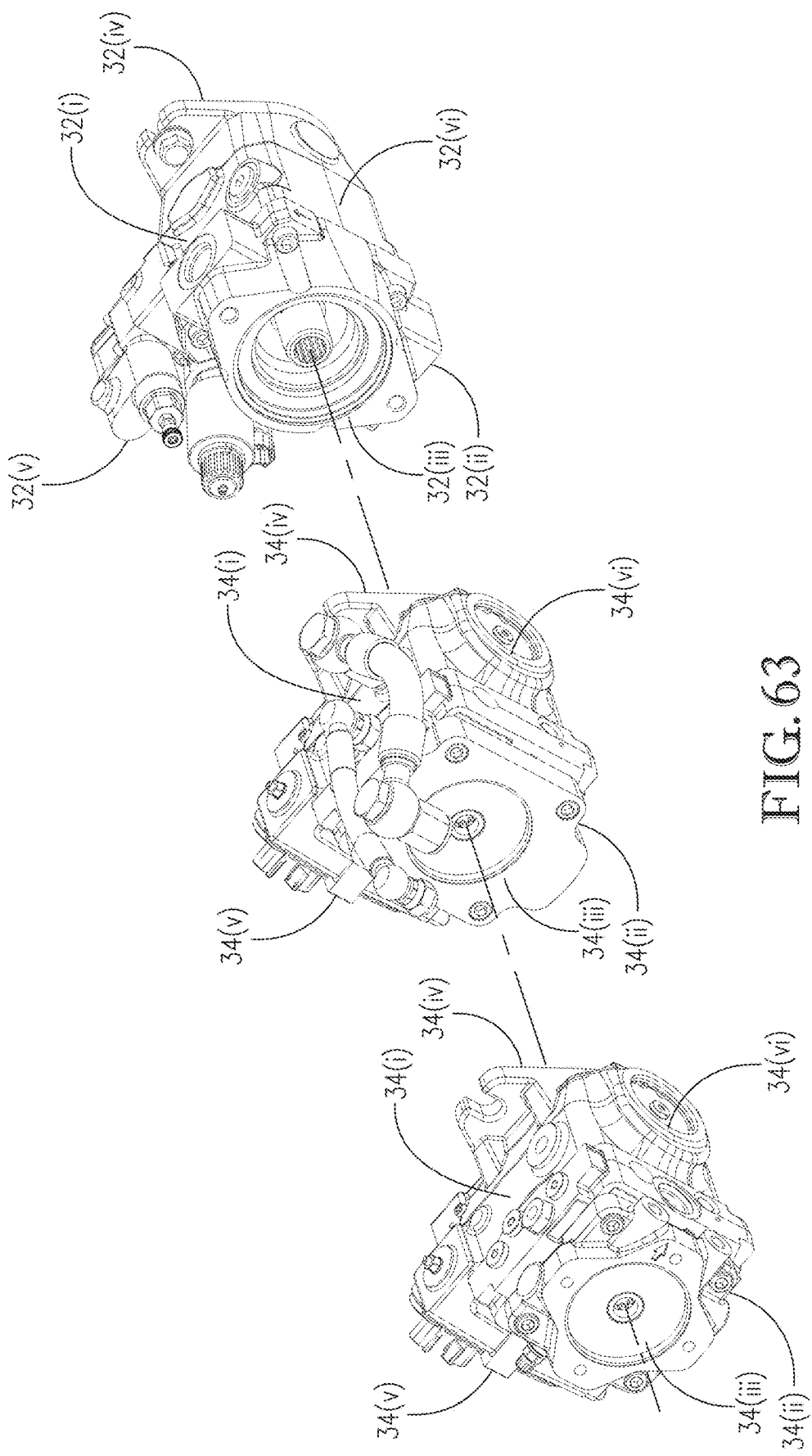
FIG. 63 is an exploded view of the hydraulic auxiliary pump, the first hydrostatic transmission, and the second hydrostatic transmission from FIG. 62.

The auxiliary pump 32 will generally comprise a hydraulic pump fluidly connected to the hydraulic fluid reservoir and to (i) the actuators associated with the loader arms 16 (e.g., tilt actuators 62, lift actuators 66, etc.), (ii) the actuators associated with the hitch assembly 60 (e.g., to couple/de-couple attachments 18 to the hitch assembly 60), and/or (iii) the attachments 18. As such, the auxiliary pump 32 can receive rotary power from the engine 30 (e.g., via the intermediary flywheel 36) and convert such rotary power into hydraulic power which can be provided to the loader arms 16, the hitch assembly 60, and/or the attachment 18. The auxiliary pump 32 may, as illustrated in FIG. 63, have a general shape of a cuboid with a top side 32(*i*), a bottom side 32(*ii*), a front side 32(*iii*), a back side 32(*iv*), a right side 32(*v*), and a left side 32(*vi*). In some embodiments, the length of the auxiliary pump 32 may be greater than the height or width of the auxiliary pump 32. To facilitate placement of the auxiliary pump 32 within the interior space of the frame 12, the orientation of the auxiliary pump 32 may be configured such that either (or both) of the right side 32(*v*) and or left side 32(*vi*) of the auxiliary pump 32 forms an angle "θ" between 15 and 70°, between 20 and 60°, between 25 and 50°, or about 30° with respect to a vertical axis (See, e.g., FIG. 62). Specifically, with the auxiliary pump 32 initially positioned with the right and left sides 32(*v*), 32(*vi*) aligned with a vertical axis, the auxiliary pump 32 may be rotated about the drive axis "Y" until the right and left sides 32(*v*), 32(*vi*) form the angle "θ" with the vertical axis. As used herein, the angle θ formed between the right and/or left sides 32(*v*), 32(*vi*) of the auxiliary pump 32 and the vertical axis is formed between the vertical axis and a generally flat plane that extends substantially along the right and/or left sides 32(*v*), 32(*vi*) and intersects the top and bottom sides 32(*i*), 32(*ii*) of the auxiliary pump 32.

Given the angular orientation of the auxiliary pump 32 (i.e., rotated so as to form the angle "θ" with the vertical axis), the auxiliary pump 32 can be positioned within confined spaces, such as within the interior space of the frame 12 between the drive motors 38. Such angular orientation is particularly beneficial as the hydraulic lines (feeding and/or removing hydraulic fluid from the auxiliary pump 32) extend generally from the cuboid sides of the auxiliary pump 32 (the top side 32(*i*), the bottom side 32(*ii*), the right side 32(*v*), and/or the left side 32(*vi*), and the angular orientation aids in preventing the hydraulic lines from interfering with (or otherwise making unwanted contact with) the drive motors 38 or other components of the loader 10. Such angular orientation is also beneficial in permitting preventing the hydraulic lines from interfering with (or otherwise making unwanted contact with) the bottom side 76 (e.g., the main platform 84) of the cab 20.

The first and second hydrostatic transmissions 34*a*, 34*b* will each generally comprise a variable output hydraulic pump fluidly connected to the hydraulic fluid reservoir and to one of the drive motors 38. As such, for instance, the first hydrostatic transmissions 34*a* may provide variable hydraulic power to one of the drive motors 38 (e.g., the left side drive motor 38), while the second hydrostatic transmissions 34*b* may provide variable hydraulic power to the other of the drive motors 38 (e.g., the right side drive motors 38). As such, the first and second hydrostatic transmissions 34*a*, 34*b* can receive rotary power from the engine 30 (e.g., via the intermediary auxiliary pump 32 and/or flywheel 36) and convert such rotary power into hydraulic power which can be provided to the drive motors 38. In some embodiments, as described above, the first hydrostatic transmissions 34*a* may be coupled with the auxiliary pump 32 and receive rotary power from and/or through the auxiliary pump 32, while the second hydrostatic transmissions 34*b* may be coupled with the first hydrostatic transmission 34*b* and receive rotary power from and/or through the first hydrostatic transmission 34*b*.

The first and second hydrostatic transmissions 34*a*, 34*b* may, as illustrated in FIG. 63, each have a general shape of a cuboid with a top side 34(*i*), a bottom side 34(*ii*), a front side 34(*iii*), a back side 34(*iv*), a right side 34(*v*), and a left side 34(*vi*). In some embodiments, the respective length of the first and second hydrostatic transmissions 34*a*, 34*b* may be greater than the respective height or width of the first and second hydrostatic transmissions 34*a*, 34*b*. To help facilitate placement of the first and second hydrostatic transmissions 34*a*, 34*b* within the interior space of the frame 12, the orientation of the first and second hydrostatic transmissions 34*a*, 34*b* may each be configured such that either (or both) of the right side 34(*v*) and or left side 34(*vi*) of each of the first and second hydrostatic transmissions 34*a*, 34*b* forms an angle "θ" between 15 and 70°, between 20 and 60°, between 25 and 50°, or about 30° with respect to a vertical axis (See, e.g., FIG. 62). Specifically, with the first and second hydrostatic transmissions 34*a*, 34*b* initially positioned with the right and left sides 34(*v*), 34(*vi*) aligned with a vertical axis, the first and second hydrostatic transmissions 34*a*, 34*b* may be rotated about the drive axis "Y" until the right and left sides 34(*v*), 34(*vi*) form the angle "θ" with the vertical axis. In some embodiments, each of the auxiliary pump 32, the first hydrostatic transmission 34*a*, and the second hydrostatic transmission 34*b* will be oriented to form the same angle "θ" with the vertical axis. As used herein, the angle θ formed between the right and/or left sides 34(*v*), 34(*vi*) of the first and second hydrostatic transmissions 34*a*, 34*b* and the vertical axis is formed between the vertical axis and a generally flat plane that extends substantially along the right and/or left sides 34(*v*), 34(*vi*) and intersects the top and bottom sides 34(*i*), 34(*ii*) of the first and second hydrostatic transmissions 34*a*, 34*b*.

Given the angular orientation of the first and second hydrostatic transmissions 34*a*, 34*b* (i.e., rotated so as to form the angle "θ" with the vertical axis), the first and second hydrostatic transmissions 34*a*, 34*b* can be operably positioned within confined spaces, such as within the interior space of the frame 12. Such angular orientation is particularly beneficial as the hydraulic lines (feeding and/or removing hydraulic fluid from the first and second hydrostatic transmissions 34*a*, 34*b*) extend generally from the cuboid sides of the first and second hydrostatic transmissions 34*a*, 34*b* (the top side 34(*i*), the bottom side 34(*ii*), the right side 34(*v*), and/or the left side 34(*vi*)), and the angular orientation aids in preventing the hydraulic lines from interfering with (or otherwise making unwanted contact with) the components of the loader 10. Such angular orientation is also beneficial in permitting preventing the hydraulic lines from interfering with (or otherwise making unwanted contact with) the bottom side 76 (e.g., the main platform 84) of the cab 20. It may be noted that in some embodiments, the size of the hydrostatic transmissions 34a, 34b (i.e., length, width, and/or height) may be greater than the size of the auxiliary pump 32. Thus, in such embodiments, it may be preferable for the auxiliary pump 32 to be positioned between the drive motors 38 as such positioning may require the smaller size or volume footprint associated with the auxiliary pump and not the larger size or volume footprint of the hydrostatic transmissions 34a, 34b In view of the above, embodiments of the present invention include a method of operating a work machine, e.g., the loader 10, that operably supports an attachment 18. The method may include an initial step of providing the drive assembly 14 configured to propel the work machine over a ground surface, a pair of drive motors 38 configured to power the drive assembly 14, and an engine 30. An additional step includes providing rotary power from the engine 30 to an auxiliary pump 32 configured to provide hydraulic power to the attachment 18. The auxiliary pump 32 may be positioned between the pair of drive motors 38, so as to facilitate compact positioning of the components of the work machine. A further step may include providing rotary power from and/or through the auxiliary pump 32 to at least one hydrostatic transmission 34 (e.g., both of the first and second hydrostatic transmissions 34a, 34b configured to provide hydraulic power to the pair of drive motors 38.

In some embodiments, the auxiliary pump 32 and the at least one hydrostatic transmission 34 are each formed as a cuboid with a top side, a bottom side, a front side, a back side, a left side, and a right side. In addition, the auxiliary pump 32 and the at least one hydrostatic transmission 34 may be oriented such the respective left side of each forms an angle between 30 and 60° with respect to the vertical axis. In some additional embodiments, the at least one hydrostatic transmission 34 is a first hydrostatic transmission 34a, and the work machine comprises a second hydrostatic transmission 34b. In some of such embodiments, the auxiliary pump 32 is positioned forward of the engine 30, the first hydrostatic transmission 34a is coupled to (and forward of) the auxiliary pump 32, and the second hydrostatic transmission 34b is coupled to (and forward of) the first hydrostatic transmission 34a.

Software

Figure 64:
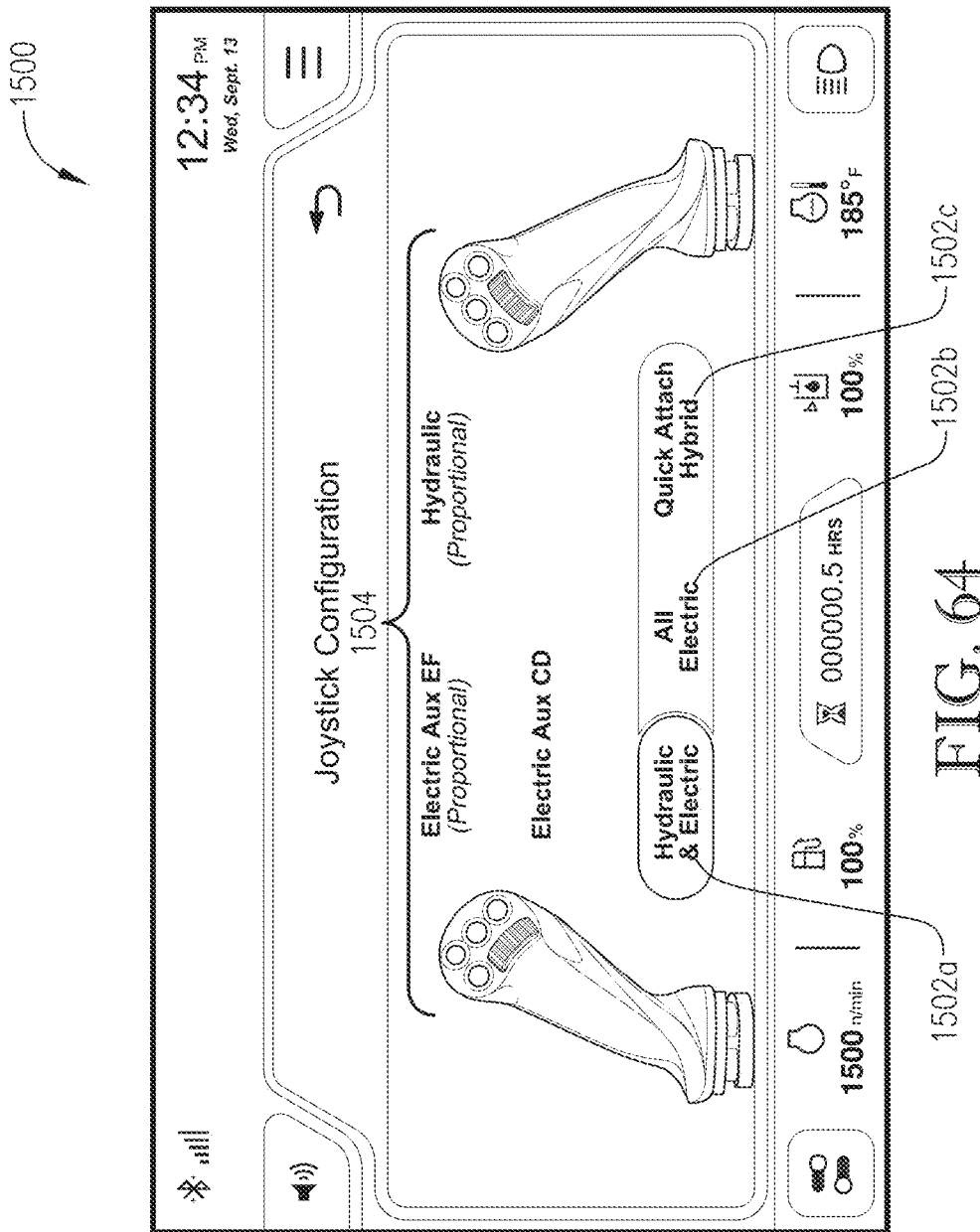
FIG. 64 is an exemplary user interface of the graphic display of FIGS. 15a,b depicting various control modes.

Turning to FIG. 64, an exemplary user interface 1500 of the touch screen graphic display 94 is depicted. The user interface 1500 may be configured to display one or more graphical elements 1502a,b,c representative of various control modes. As used herein, graphical elements may comprise icons, pictures, symbols, text, buttons, switches, toggles, figures, or the like that are displayed on the graphic display 94. As depicted, the user interface 1500 may simultaneously display a graphical element 1502a,b,c for each of the control modes. The touch screen graphic display 94 may act as a selector element and receive an input representative of a selection of one of the control modes. When a control mode is selected, its graphical element 1502a may be distinguished in some form, such as by highlighting the selected control mode, and the user interface 1500 may display a graphical representation 1504 of function assignments associated with the selected control mode.

The function assignments are control settings that connect control elements or user controls 22 to one of a plurality of functions of the loader 10. The user controls 22 may include thumbwheels and/or buttons located on the joysticks 92 or the joysticks 92 themselves. The functions of the work machine or loader 10 include controlling a quick attach coupler 1506 (depicted in FIGS. 65 and 66), controlling one or more electrical outputs 1508, 1510 (See, e.g., FIGS. 1 and 65, with output 1510 illustrated in FIG. 65), controlling a hydraulic coupler 64 (See, e.g., in FIG. 1) output, controlling the loader arms 16, and/or controlling the motors 38.

As discussed further below, electrical outputs 1508, 1510 may provide electrical power for attachments. The power may be provided by the electrical power system of the loader 10, such as the battery and/or a power circuit connected to an alternator driven by the engine 30. A controller may monitor and/or control an electrical driver that connects the power to the electrical outputs 1508, 1510. The controller may receive the control signals from one of the user controls 22 for controlling the electrical driver. As shown in FIG. 1, the electrical output 1508 may be from a single electrical outlet having a number of electrical pins (e.g., a 14-pin outlet).

Further, the hydraulic components, such as the quick attach coupler 1506, the hydraulic coupler 64 outputs, the loader arms 16, or the motors 38, may be provided hydraulic pressure via the auxiliary pump 32 of the hydraulic system. A controller of the hydraulic system may receive control signals generated by the user controls 22 and direct one or more electrohydraulic valves to actuate to provide and/or adjust the hydraulic flow to the hydraulic components. For example, one of the thumbwheels on the joysticks 92 may be operable to control the outputs of the hydraulic coupler 64.

One of the control modes 1502a may comprise function assignments connecting the control elements 22 to hydraulic- and electrical-related functions. One of the control modes 1502b may comprise function assignments connecting the control elements to only electrical-related functions. Another control mode 1502c may comprise function assignments connecting the control elements to hydraulic-related functions, electrical-related functions, and the quick attach coupler 1506. In some embodiments, all the control modes 1502a,b,c include a function assignment for controlling the engine 30 or motor 38 for moving the loader 10 that is the same in all of the control modes 1502a,b,c. For example, each control mode may include a function assignment that connects the control of movement of the loader 10 to one of the joysticks 92. The hydraulic-related functions may include controls in connection with the hydraulic coupler 64. For example, if an attachment 18 includes one or more devices that are hydraulically actuated and/or operated via the hydraulic coupler 64, then the user controls assigned to the hydraulic-related functions control that device of the attachment 18. Similarly, if an attachment 18 includes one or more devices that are actuated and/or operated via electrical power from the electrical outputs 1508, 1510, then the user controls assigned to the electrical-related functions control those devices of the attachment 18.

Figure 65:
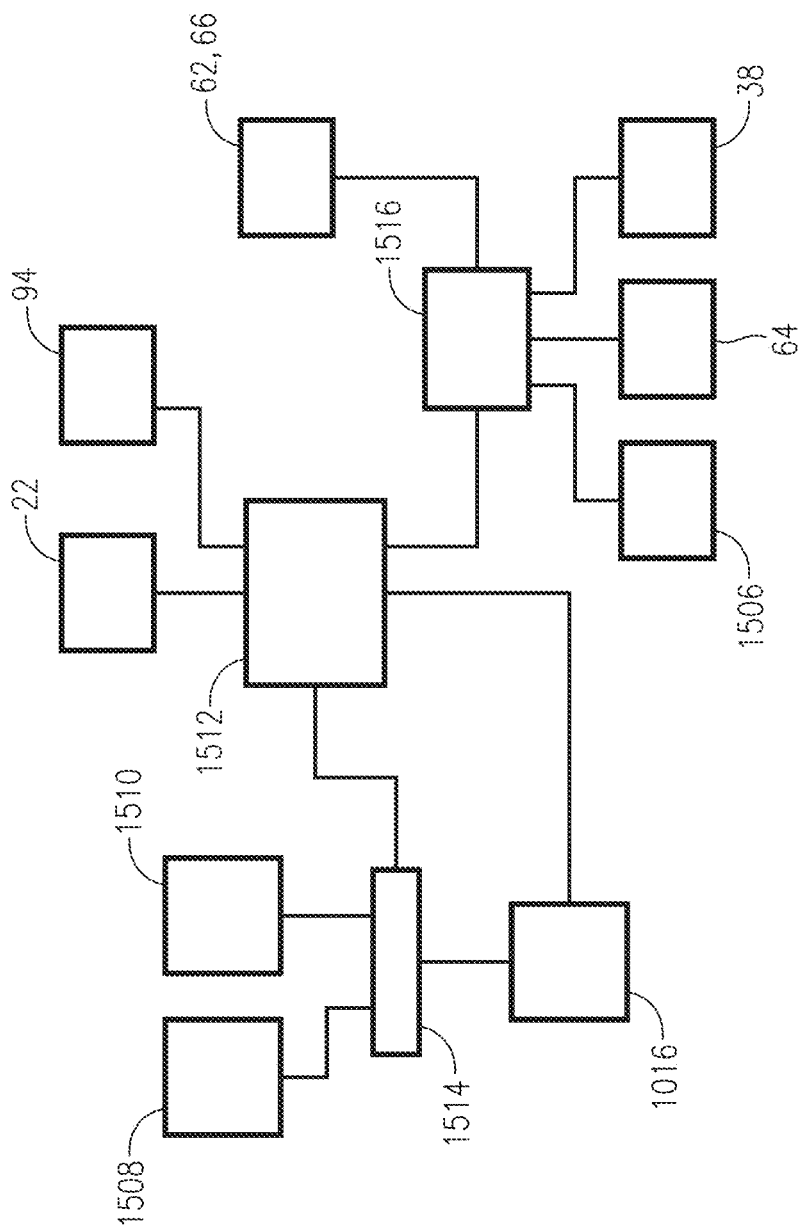
FIG. 65 is a schematic diagram depicting an exemplary control architecture with select components of the loader of FIGS. 1-8.

Turning to FIG. 65, a schematic diagram depicting an exemplary control architecture with selected components of the loader 10 is shown. The loader 10 may include a controller 1512 that provides control signals to one or more power switching or electrical drive components 1514 for supplying power from the energy storage device 1016 or battery, or energy generating device (such as an alternator), to the electrical outputs 1508, 1510. The controller 1512 may be part of the display 94 or integrated with one or more controllers discussed elsewhere herein and may comprise one or more memory elements and processing elements. The controller 1512 may be configured to receive a signal representative of a selection of one of the control modes from the display 94 and adjust function assignments of the user controls 22 based at least in part on the selection. The controller 1512 may also be configured to send control signals to the hydraulic system 1516 (which may include the auxiliary pump 32) as relayed from the user controls 22 to the actuators 62, 66 of the lift arms 16, the hydraulic coupler 64, the quick attach coupler 1506, and the motors 38. In some embodiments, the function assignment for controlling the actuators 62, 66 is the same in all the control modes. For example, each of the control modes may include a function assignment that connects one or more buttons on the joysticks 92 to the actuators 62, 66.

FIG. 66 depicts the quick attach coupler 1506 of the loader 10. The quick attach coupler 1506 is configured to secure attachments 18 to the loader and may include an actuator 1518, such as a hydraulic actuator, for actuating locking mechanisms 1520a,b that secure an attachment 18 to the loader 10. As discussed above, one or more of the control modes 1502a,b,c may include a function assignment that connects a user control 22 to the quick attach coupler 1506 so that a user can toggle to that control mode 1502c and remove and/or secure an attachment 18 from within the cab 20.

Figure 67A:
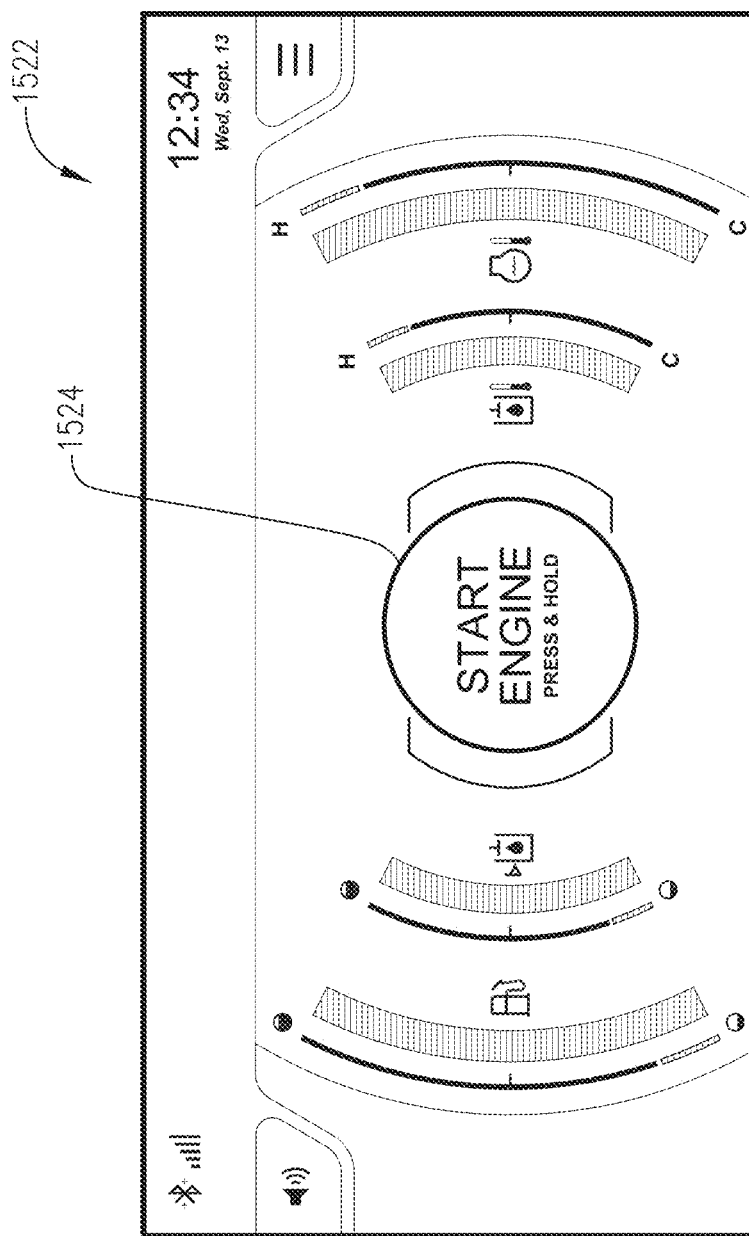
FIG. 67a is an exemplary user interface of the graphic display of FIGS. 15a,b depicting a start engine button.
Figure 67B:
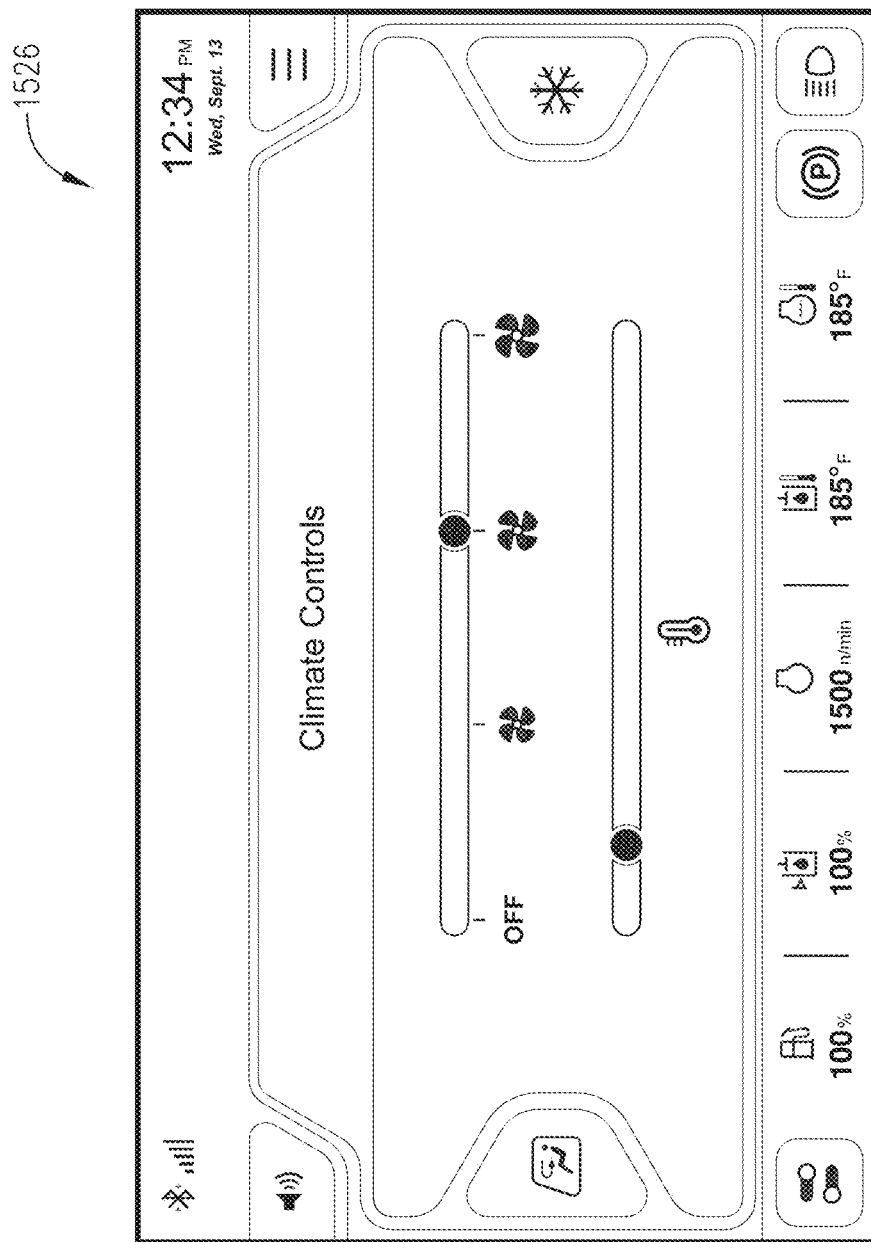
FIG. 67b is an exemplary user interface of the graphic display of FIGS. 15a,b depicting climate controls.
Figure 67C:
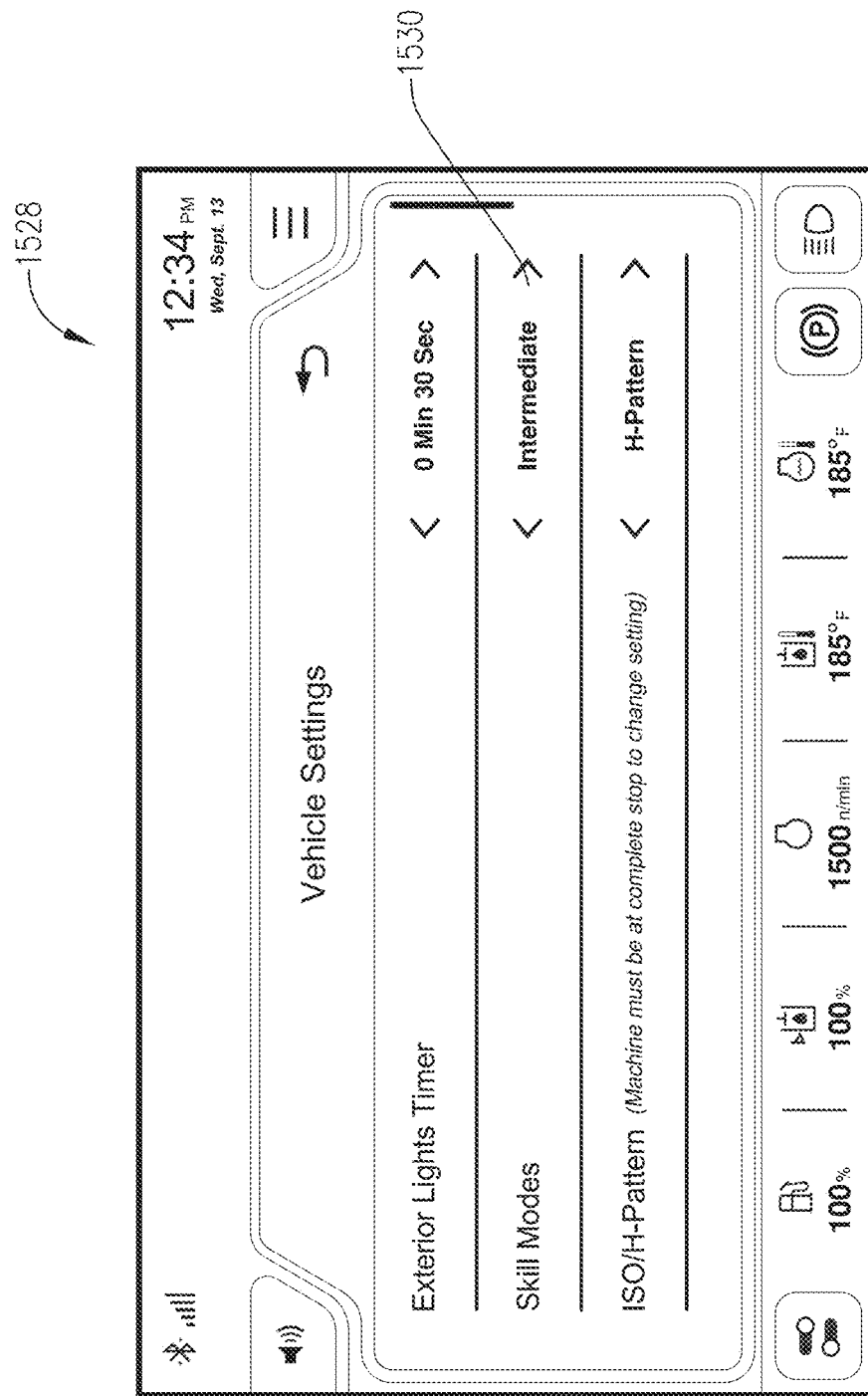
FIG. 67c is an exemplary user interface of the graphic display of FIGS. 15a,b depicting a selectable skill mode.

Turning to FIGS. 67a,b,c, various additional user interfaces for operating functions of the loader 10 are depicted. FIG. 67a depicts an exemplary user interface 1522 with a graphical element comprising a button 1524 representative of an engine ignition or start switch. The touch screen display 94 may be configured to receive an input representative of an instruction to turn on or off the engine of the loader 10. FIG. 67b depicts an exemplary user interface 1526 with graphic representations of climate controls. The touch screen display 94 may also be configured to receive inputs representative of an adjustment to climate settings via the user interface 1526. FIG. 67c depicts an exemplary user interface 1528 with a graphical element 1530 representative of a selected skill mode. The skill mode may represent a sensitivity level of the joysticks 92. For example, a higher skill level may indicate a higher sensitivity of the joysticks 92 so that a smaller input into the joysticks 92 by a user results in more output at one or more outputs, such as the actuators or motors. The touch screen display 94 may be configured to receive inputs representative of an adjustment to the sensitivity level.

Figures 68, 69:
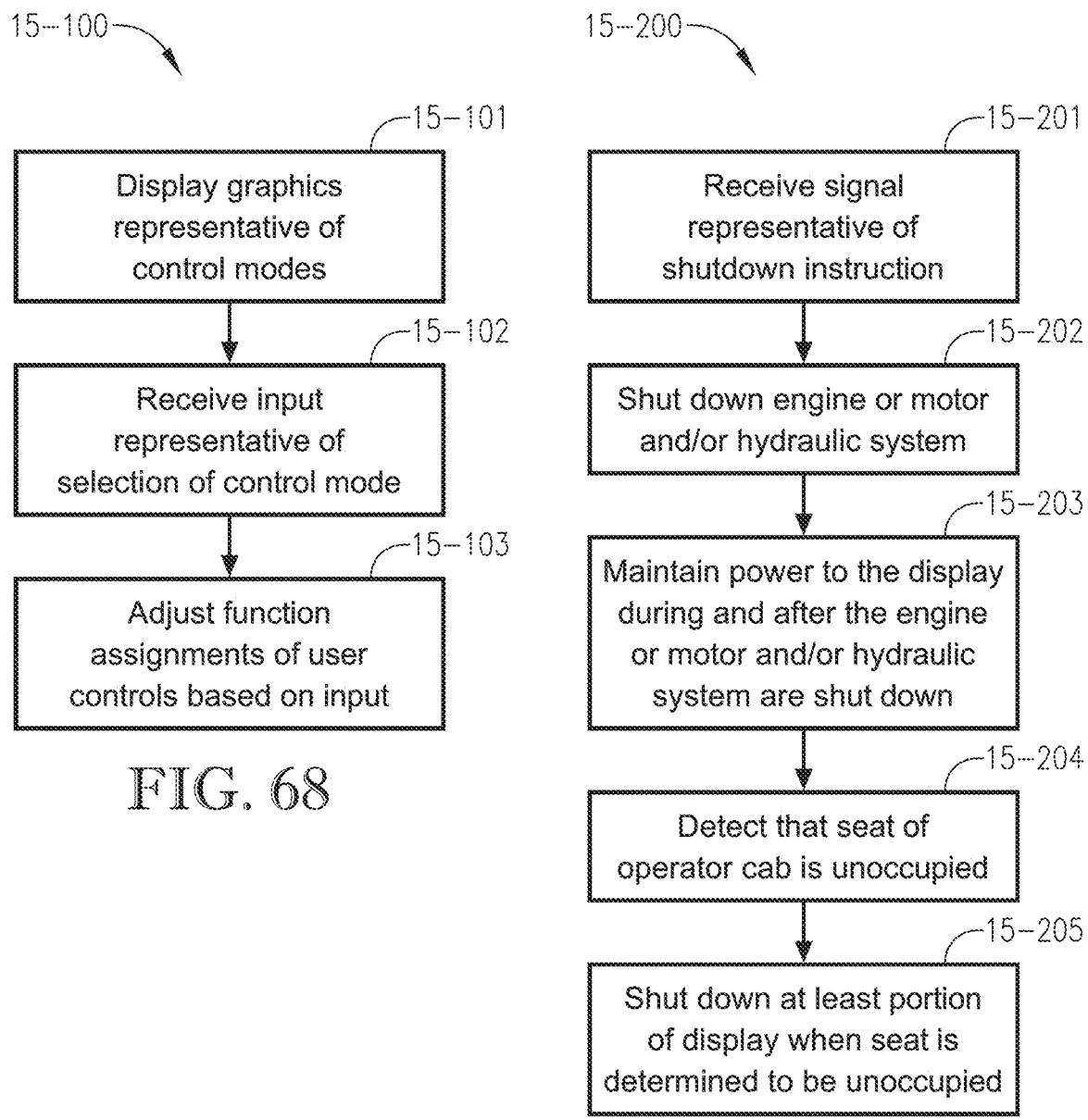
FIG. 68 is a flowchart depicting exemplary steps of a method of toggling between control modes of the loader of FIGS. 1-8 according to an embodiment of the present invention.
FIG. 69 is a flowchart depicting exemplary steps of a method of managing controls of the loader of FIGS. 1-8 according to an embodiment of the present invention.

The flow chart of FIG. 68 depicts the steps of an exemplary computer-implemented method 15-100 of toggling control modes of a work machine. In some alternative implementations, the functions noted in the various blocks may occur out of the order depicted in FIG. 68. For example, two blocks shown in succession in FIG. 68 may in fact be executed substantially concurrently, or the blocks may sometimes be executed in the reverse order depending upon the functionality involved. In addition, some steps may be optional.

The method 15-100 is described below, for ease of reference, as being executed by exemplary devices and components described herein with respect to embodiments of the present invention. For example, the steps of the method 15-100 may be performed through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 15-101, a plurality of graphics representative of control modes are displayed via the touch screen display. The control modes may include the first control mode having function assignments connecting user controls to only electrical-related functions, the second control mode having function assignments connecting the user controls to hydraulic- and electrical-related functions, and the third control mode having function assignments connecting the user controls to hydraulic-related functions, electrical-related functions, and the quick attach coupler.

Referring to step 15-102, a touch screen input representative of a selection of at least one of the control modes is received via the touch screen display. This step may include receiving the input via the touch screen display and transmitting a signal representative of the input to the controller. This step may also include highlighting the selected control mode and displaying its corresponding function assignments via the touch screen display.

Referring to step 15-103, function assignments of user controls are adjusted via the controller based at least in part on the touch screen input. This step may include receiving, via the controller, the signal representative of the input; retrieving from a portion of a memory element of the controller, via a processing element of the controller, the function assignments associated with the selected control mode; and adjusting, via the controller, the control configurations of the control elements based on the function assignments.

As discussed elsewhere in the present application, each of the function assignments connects one of the user controls to one of the functions of the loader. The user controls may be associated with the joysticks, including the joysticks themselves, buttons on the joysticks, or thumbwheels on the joysticks. The functions of the loader may include the quick attach coupler for securing an attachment, the hydraulic coupler, and/or the electrical outputs. The method 15-100 may include additional, less, or alternate steps and/or device(s), including those discussed elsewhere herein.

The flow chart of FIG. 69 depicts the steps of an exemplary computer-implemented method 15-200 of controlling operations of a work machine. In some alternative implementations, the functions noted in the various blocks may occur out of the order depicted in FIG. 69. For example, two blocks shown in succession in FIG. 69 may in fact be executed substantially concurrently, or the blocks may sometimes be executed in the reverse order depending upon the functionality involved. In addition, some steps may be optional.

The method 15-200 is described below, for ease of reference, as being executed by exemplary devices and components described herein with respect to embodiments of the present invention. For example, the steps of the method 15-200 may be performed through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 15-201, a signal representative of a shutdown instruction is received via a user control. The user control may be a power switch, such as a power switch positioned on the control panel. Alternatively or additionally, the user control may be a graphic representation of a power switch displayed on the touch screen display.

Referring to step 15-202, the engine or motor and/or the hydraulic system of the loader is/are shut down via the controller based at least in part on the signal representative of a shutdown instruction. The controller may be configured to generate control signals that disconnect electrical power to the engine and/or the hydraulic system or otherwise execute a process that turns the engine and/or hydraulic system off.

Referring to step 15-203, power is maintained on the display of the loader during and after the engine or motor and/or the hydraulic system are shut down via the controller. This step may include maintaining power to graphics representative of lighting controls and radio controls. This enables a user to turn lights on in the cab and/or around the loader when the engine or motor and/or the hydraulic system are shut down.

Referring to step 15-204, the seat of an operator cab may be detected as being unoccupied via a sensor on the seat. This step may additionally or alternatively include detecting via the sensor of the lap bar that the lap bar is in a raised position and/or is not in the lowered, operating position.

Referring to step 15-205, the display is shut down via the controller when the sensor detects the seat is unoccupied. The display may be partially and/or completely shut down. For example, the display may be configured to ignore inputs for one or more of the buttons on the touch screen while continuing to display items on the screen. Alternatively or additionally, the display may remove certain buttons from view. This step may include tracking, via the controller, an amount of time since the signal representative of a shutdown instruction was received. It may also include shutting down, via the controller, the display of the work machine after the amount of time has reached a predetermined threshold. Prior to shutting down the display, this step may also include disconnecting, via the controller, control signals from certain user controls, such as the joysticks, when the lap bar sensor detects the lap bar is in not in the operating position.

The method 15-200 may include additional, less, or alternate steps and/or device(s), including those discussed elsewhere herein.

Open Center Control Valve

Figure 70:
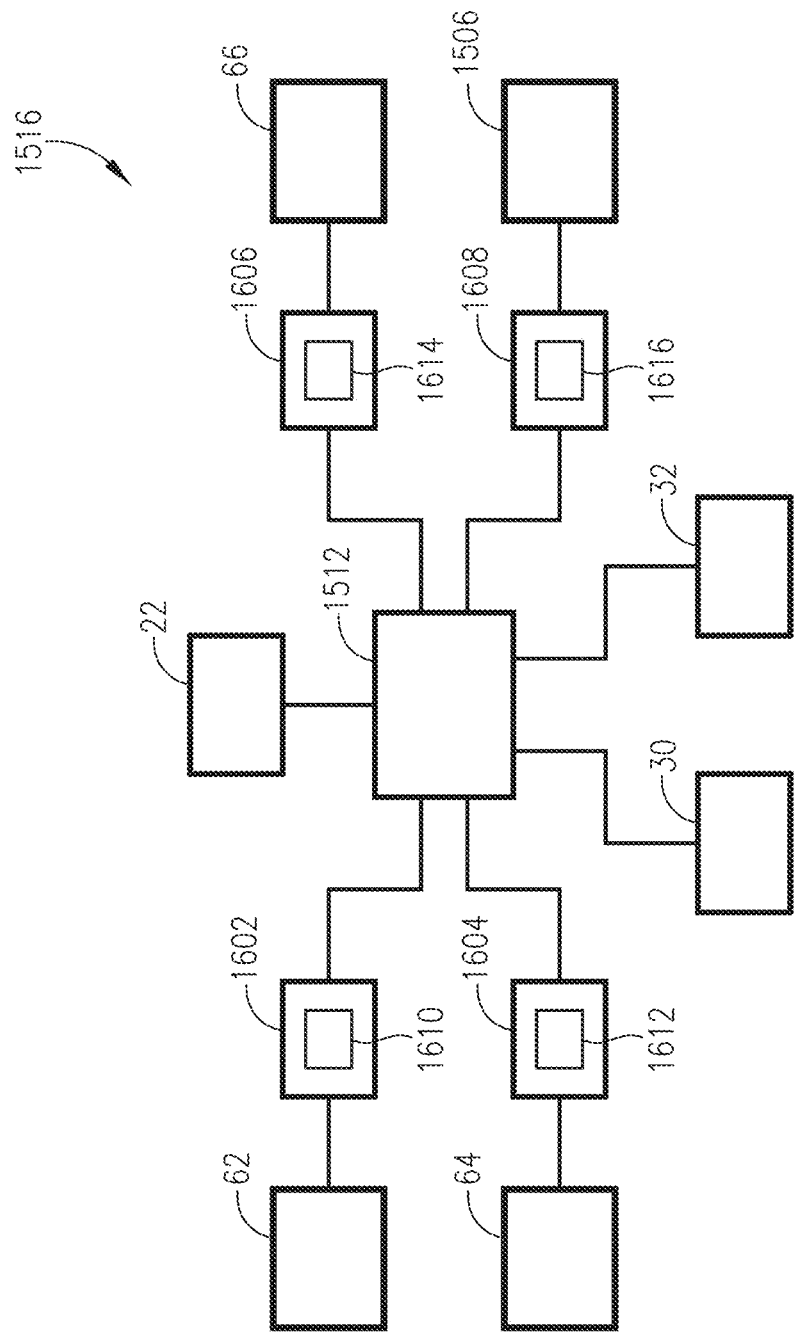
FIG. 70 is a schematic diagram depicting select components of an exemplary hydraulic control architecture of the loader from FIGS. 1-8.

In some embodiments, the hydraulic system 1516 may comprise a plurality of control valves that hydraulically connect the auxiliary pump 32 to various hydraulic functions of the loader 10. FIG. 70 depicts a schematic diagram of portions of an exemplary control architecture of the hydraulic system 1516. The depicted control valves 1602, 1604, 1606, 1608 are controlled by the controller 1512 and/or the user controls 22 to selectively hydraulically connect the auxiliary pump 32 to the various hydraulic functions of the loader 10, including the actuators 62, 66, the hydraulic coupler 64. The control valves 1602, 1604, 1606, 1608 may be operable to vary an amount of hydraulic flow transferred to their respective functions.

The control valves 1602, 1604, 1606, 1608 may include actuators 1610, 1612, 1614, 1616 configured to adjust spools (schematically depicted in FIG. 71) of the valves and controlled by the user controls 22 and/or the controller 1512. In preferred embodiments, the actuators 1610, 1612, 1614, 1616 comprise electrical actuators. In some embodiments, the control valves 1602, 1604, 1606, 1608 comprise open center valves, and the auxiliary pump 32 comprises a variable displacement pump, as discussed further below.

Figure 71:
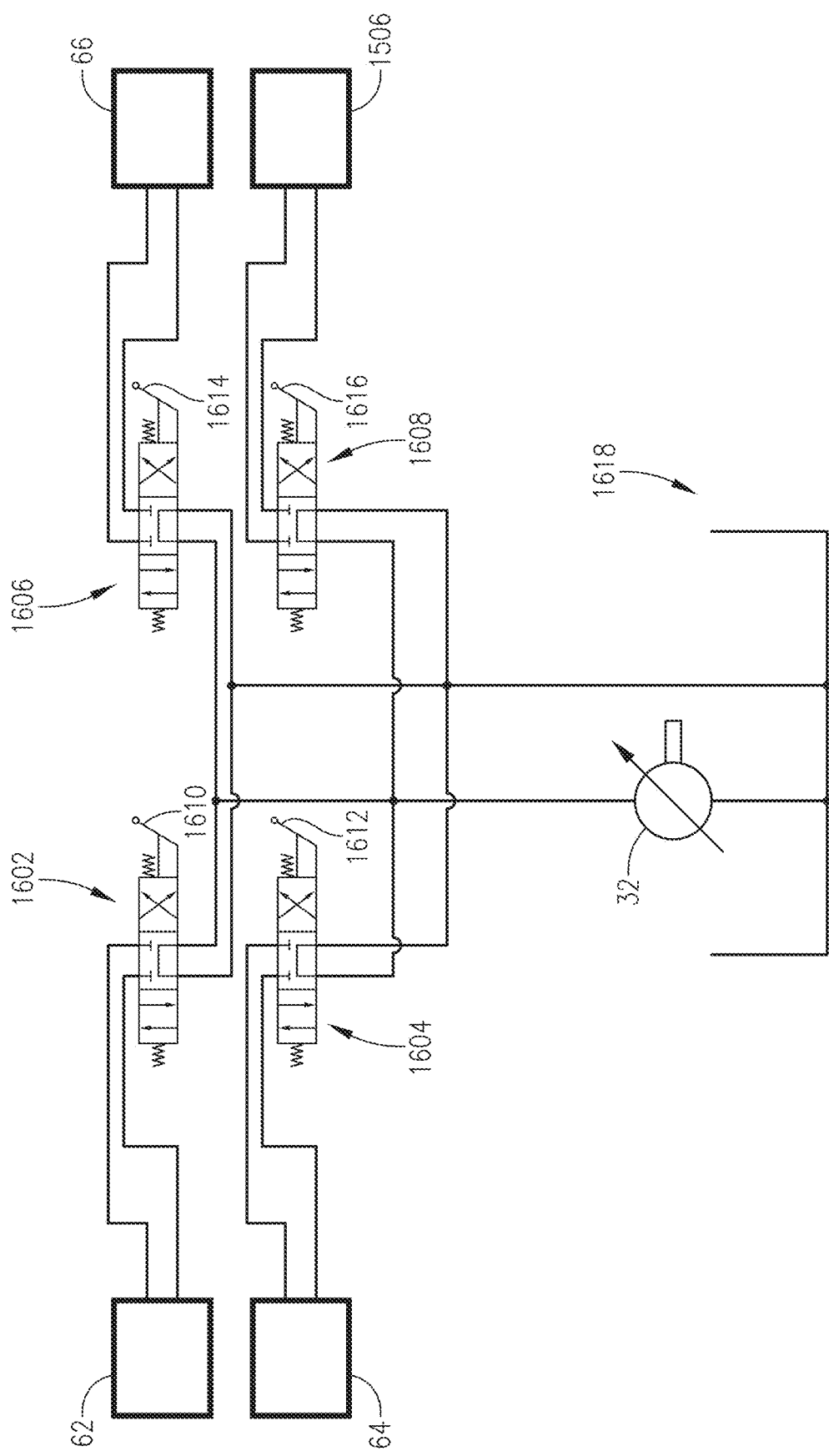
FIG. 71 is a schematic diagram depicting select components of the hydraulic system of the loader from FIGS. 1-8.

Turning to FIG. 71, a schematic diagram of selected components of the exemplary hydraulic system 1516 is depicted. The control valves 1602, 1604, 1606, 1608 comprise open center control valves that are hydraulically connected to the auxiliary pump 32, which comprises a variable displacement pump, and hydraulically connected to a hydraulic reservoir 1618. Open center control valves 1602, 1604, 1606, 1608 include central passages that allow a continuous flow of hydraulic fluid from the pump 32 to the control valves 1602, 1604, 1606, 1608, and from the control valves 1602, 1604, 1606, 1608 to the reservoir 1618 and back to the pump 32. The spools of the control valves 1602, 1604, 1606, 1608 allow the hydraulic fluid to flow through the central passages when in the neutral position.

As discussed elsewhere herein, the engine or motor 30 provides rotary power to the auxiliary pump 32, which converts the rotary power to hydraulic pressure. The engine or motor 30 may be configured to adjust its power output based on the load and/or detected pressure of the auxiliary pump 32. The auxiliary pump 32 may be configured to adjust an amount of displacement of its pistons to modify a magnitude of its output hydraulic flow based at least in part on a hydraulic load, control signals from the user controls 22 and/or the controller 1512, detected hydraulic pressure, and/or the like. The variable displacement increases the efficiency of the pump 32 and requires fewer controls while being more responsive, which improves the performance of EOH controls. The auxiliary pump 32 may pump hydraulic fluid, such as oil, from the hydraulic reservoir 1618 to the control valves 1602, 1604, 1606, 1608. Because the control valves 1602, 1604, 1606, 1608 are open center control valves, the fluid is constantly flowing between the auxiliary pump 32, the control valves 1602, 1604, 1606, 1608, and the reservoir 1618 when the auxiliary pump 32 is operating. In some embodiments, the reservoir 1618 may be positioned in the interior compartment of the frame 12.

The control valves 1602, 1604, 1606, 1608 transfer hydraulic flow provided by the auxiliary pump 32 to the actuators 62, 66, the hydraulic coupler 64, the, and/or other hydraulic functions. Specifically, electrical control signals may be generated at the user controls 22, which may be directly connected to the actuators 1610, 1612, 1614, 1616 of the control valves 1602, 1604, 1606, 1608, electrical drivers thereof, and/or the controller 1512. The electrical control signals cause one or more of the actuators 1610, 1612, 1614, 1616 to adjust the spools of the control valves 1602, 1604, 1606, 1608 and thereby provide hydraulic pressure to one or more of the actuators 62, 66, the hydraulic coupler 64, and/or the quick attach coupler 1506. While the control valves 1602, 1604, 1606, 1608 are depicted as open center control valves, one or more may comprise float center, tandem center, regen center, or the like without departing from the scope of the present invention.

Figure 72:
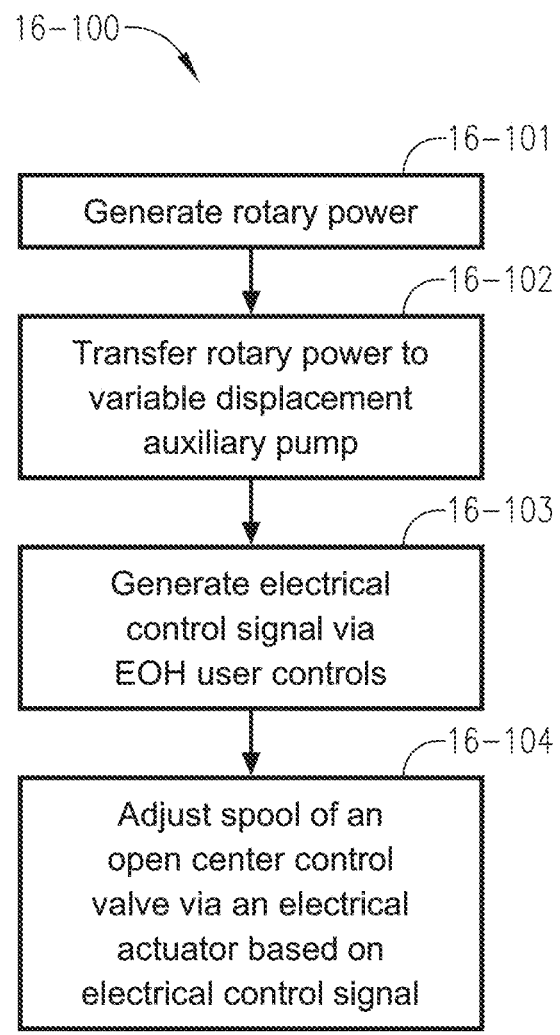
FIG. 72 is a flowchart depicting exemplary steps of a method of powering hydraulic actuators of a loader.

The flow chart of FIG. 72 depicts the steps of an exemplary computer-implemented method 16-100 of powering hydraulic actuators of a work machine. In some alternative implementations, the functions noted in the various blocks may occur out of the order depicted in FIG. 72. For example, two blocks shown in succession in FIG. 72 may in fact be executed substantially concurrently, or the blocks may sometimes be executed in the reverse order depending upon the functionality involved. In addition, some steps may be optional.

The method 16-100 is described below, for ease of reference, as being executed by exemplary devices and components described herein with respect to embodiments of the present invention. For example, the steps of the method 16-100 may be performed through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 16-101, rotary power is generated via an engine or motor. This step may include adjusting an amount of power generated via the engine or motor based on a signal representative of the displacement of variable auxiliary pump, control signals from the controller and/or user controls, a sensed load, a sensed hydraulic pressure, and/or the like.

Referring to step 16-102, at least a portion of the rotary power is transferred to an auxiliary pump. The auxiliary pump is configured to provide hydraulic power to hydraulic actuators, the hydraulic coupler, and/or other hydraulic functions of the work machine. The auxiliary pump may be a variable displacement pump that varies the volume of displacement of its cylinders based on control signals from the controller and/or the user controls. Further, the variable displacement pump may vary the volume of displacement of its cylinders based on detected hydraulic pressure. The auxiliary pump may be forward of the engine or motor and between the pair of drive motors that power the drive assembly. The pair of hydrostatic transmissions may be positioned forward of the auxiliary pump and configured to provide hydraulic power to the drive motors.

Referring to step 16-103, an electrical control signal is generated via one or more of the user controls in the cab of the work machine. The electrical control signal may be generated via an EOH control, such as a joystick, button, switch, or the like. This step may include passing the control signal to a controller and/or electrical drive.

Referring to step 16-104, a spool of one or more control valve is adjusted via an actuator of the control valve. The actuator may comprise an electrical actuator. The control valve may hydraulically connect the auxiliary pump to the hydraulic actuators, the hydraulic coupler, and/or other hydraulic functions. The spool is adjusted based at least in part on the electrical control signal generated at the user controls. In preferred embodiments, the control valves are open center control valves. This step may include providing hydraulic pressure, via the control valve, to lift actuators to raise or lower loader arms of the work machine. It may also include providing hydraulic pressure, via the control valve, to tilt actuators to adjust an orientation of the hitch assembly. It may also include providing hydraulic pressure, via the control valve, to an attachment coupled to the hydraulic coupler.

The method 16-100 may include additional, less, or alternate steps and/or device(s), including those discussed elsewhere herein.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A work machine comprising:
a frame presenting an interior compartment and comprising a bottom portion and a rearward portion extending vertically from said bottom portion;
an operator cab presenting an interior space and including a back side hingedly connected to said rearward portion of the frame at a cab pivot point so that said cab can be selectively positioned in a lowered position and a raised position; and
an electrohydraulic actuator secured to said rearward portion of the frame at a position rearward of the cab pivot point and to said back side of said cab at a position between the cab pivot point and a bottom of the cab, wherein the electrohydraulic actuator is configured to shift said cab between the lowered position and the raised position.

2. The work machine of claim 1, further comprising a battery positioned in the interior compartment of the frame and operable to power said electrohydraulic actuator.

3. The work machine of claim 2, wherein said interior compartment is at least partially defined by said rearward portion, and said electrohydraulic actuator and said battery are housed in said rearward portion.

4. The work machine of claim 2, further comprising a switch electrically connected to said battery and operable to electrically connect said battery to said electrohydraulic actuator.

5. The work machine of claim 2, further comprising an engine supported on said frame, wherein said battery is configured to provide power to said electrohydraulic actuator when said engine is not operating.

6. The work machine of claim 1, wherein said rearward portion comprises a front, and said back side is hingedly connected to said front of said rearward portion.

7. The work machine of claim 1, wherein the electrohydraulic actuator is pivotable relative to said rearward portion of the frame and to said back side of said cab.

8. The work machine of claim 1, wherein said cab is operable to pivot about a horizontal axis.

9. The work machine of claim 1, wherein said electrohydraulic actuator comprises a housing connected to said rearward portion and a driving piston connected to said back side of said cab.

10. The work machine of claim 1, wherein said frame comprises a forward portion extending from said bottom portion, said forward portion having a height that is less than a height of said rearward portion.

11. A method of providing access to components of a work machine, the method comprising:
electrically connecting a switch positioned outside an interior space of a cab of the work machine to an energy storage device connector positioned within an interior compartment defined by a frame of the work machine, wherein said cab is hingedly connected to said frame at a cab pivot point so that said cab shifts between a lowered position and a raised position; and electrically connecting to said switch an electrohydraulic actuator that is secured to a rearward portion of said frame and to a back side of said cab so that said electrohydraulic actuator can shift said cab to the raised position, wherein the electrohydraulic actuator is hingedly secured to said rearward portion of the frame at a position rearward of the cab pivot point and to said back side of said cab at a position between the cab pivot point and a bottom of the cab.

12. The method of claim 11, further comprising electrically connecting said energy storage device connector to an energy storage device positioned within said interior compartment.

13. The method of claim 12, further comprising actuating said switch so that said energy storage device provides electric power to said electrohydraulic actuator and said cab shifts to the raised position.

14. The method of claim 13, further comprising turning off an engine to the work machine before actuating said switch.

15. The method of claim 13, further comprising turning on an engine to the work machine before actuating said switch.

16. A work machine comprising:
a frame presenting an interior compartment and comprising a bottom portion and a rearward portion extending vertically from said bottom portion;

an operator cab presenting an interior space and including a back side hingedly connected to said rearward portion of the frame at a cab pivot point so that said cab can be selectively positioned in a lowered position and a raised position;

an energy storage device connector in said interior compartment;

an engine positioned in said interior compartment; and an electrohydraulic actuator secured to said rearward portion of the frame at a position rearward of the cab pivot point and to said back side of said cab at a position between the cab pivot point and a bottom of the cab, wherein the electrohydraulic actuator is configured to shift said cab between the lowered position and the raised position, wherein said electrohydraulic actuator is electrically connected to said energy storage device connector, such that said electrohydraulic actuator is operable without said engine operating.

17. The work machine of claim 16, further comprising a switch electrically connected to said energy storage device connector and said electrohydraulic actuator.

18. The work machine of claim 17, wherein said switch is positioned outside said interior space of said cab.

19. The work machine of claim 16, wherein said rearward portion comprises a front, and said back side is hingedly connected to said front of said rearward portion.

20. The work machine of claim 16, wherein said electrohydraulic actuator comprises a housing connected to said rearward portion and a driving piston connected to said back side of said cab.

* * * * *